United States Patent
Lai

(10) Patent No.: US 8,346,929 B1
(45) Date of Patent: Jan. 1, 2013

(54) SYSTEM AND METHOD FOR GENERATING SECURE WEB SERVICE ARCHITECTURES USING A WEB SERVICES SECURITY ASSESSMENT METHODOLOGY

(75) Inventor: Ray Y Lai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 3237 days.

(21) Appl. No.: 10/657,992

(22) Filed: Sep. 9, 2003

Related U.S. Application Data

(63) Continuation-in-part of application No. 10/642,928, filed on Aug. 18, 2003.

(51) Int. Cl.
   *G06F 15/173* (2006.01)
(52) U.S. Cl. .................................................. 709/226
(58) Field of Classification Search ........... 709/220–226
   See application file for complete search history.

(56) References Cited

U.S. PATENT DOCUMENTS

| | | | |
|---|---|---|---|
| 6,738,908 B1 * | 5/2004 | Bonn et al. ................... | 726/4 |
| 6,792,605 B1 | 9/2004 | Roberts et al. | |
| 6,996,500 B2 * | 2/2006 | O'Konski et al. ............. | 702/186 |
| 7,028,223 B1 | 4/2006 | Kolawa et al. | |
| 7,047,243 B2 | 5/2006 | Cabrera et al. | |
| 7,051,045 B2 | 5/2006 | Cirinna et al. | |
| 7,055,143 B2 | 5/2006 | Ringseth et al. | |
| 7,114,146 B2 * | 9/2006 | Zhang et al. ................... | 717/106 |
| 7,162,649 B1 * | 1/2007 | Ide et al. ........................ | 709/223 |
| 7,207,067 B2 * | 4/2007 | Feng et al. ..................... | 726/26 |
| 2003/0097464 A1 | 5/2003 | Martinez et al. | |
| 2003/0110242 A1 | 6/2003 | Brown et al. | |
| 2003/0163694 A1 | 8/2003 | Chen et al. | |
| 2006/0112367 A1 | 5/2006 | Harri | |

OTHER PUBLICATIONS

Roger Wolter, "XML Web Services Basics," Microsoft Corporation, Dec. 2001, 5 pages.
Aaron Skonnard, "The XML Files," msdn Magazine, Microsoft Corporation, 2006, 11 pages.
Aaron Skonnard, "Understand SOAP," Mar. 2003, 2006 Microsoft Corporation, 12 pages.
Karsten Januszewski, "The Importance of Metadata: Reification, Categorization, and UDDI," Sep. 2002, Microsoft Corporation 2006, 11 pages.

(Continued)

*Primary Examiner* — Hussein A. Elchanti
(74) *Attorney, Agent, or Firm* — Robert C. Kowert; Meyertons, Hood, Kivlin, Kowert & Goetzel, P.C.

(57) ABSTRACT

System and method for designing and implementing secure Web Services according to a Web Services Security Assessment structured methodology and design patterns. Lifecycles of the Web Services Security Assessment structured methodology may include, but are not limited to: vision and strategy, architecture design, development, integration, and deployment. In one embodiment, security components may be identified based on one or more use case requirements. Web Services objects that need to be protected may be identified. The object relationship for security protection may be defined, and associated trust domains, security policy and strategy and threat profiles may be identified. Protection schemes for these Web Services objects may be generated. Web Services security design patterns may be applied. One embodiment may be implemented as a secure Web Services architecture design mechanism that may receive Web Services requirements as input and assist a user in designing and generating a secure Web Services architecture.

57 Claims, 104 Drawing Sheets

OTHER PUBLICATIONS

IBM and Microsoft, "Reliable Message Delivery in a Web Services World: A Proposed Architecture and Roadmap," Mar. 13, 2003, Microsoft Corporation 2006, 8 pages.

IBM and Microsoft, "Security in a Web Services World: A Proposed Architecture and Roadmap," Apr. 7, 2002, Version 1.0, Microsoft Corp. 2006, 20 pages.

Sun Microsystems, Inc., "Web Services Made Easier: The Java APIs and Architectures for XML A Technical White Paper," Jun. 2002, Revision 3, 33 pages.

Dan Malks, et al., "Developing Web Services with ebXML and SOAP: An Overview," Mar. 3, 2003, Sun Microsystems, Inc. 7 pages.

Ed Ort, et al., "Web Services Developer Pack Part I: Registration and the JAXR API," Feb. 2002, Sun Microsystems, Inc., 23 pages.

Ed Ort, et al., "Part 2: RPC Calls, Messaging, and the JAX=RPC and JAXM API," Oct. 2002, 34 pages (double sided).

Arun Gupta, et al. "Getting Started with JAX-RPC," Apr. 2002, Sun Microsystems, Inc., 11 pages.

Qusay H. Mahmoud, "Registration and Discovery of Web Services Using JAXR with XML Registries such as UDDI and ebXML," Jun. 2002, Sun Microsystems, Inc., 18 pages.

Heather Kreger, "Web Services Conceptual Architecutre (WSCA 1.0)," IBM, May 2001, 40 pages.

Kendall Grant Clark, "A Tour of the Web Services Architecture," Jun. 18, 2003, O'Reilly Media, Inc., 5 pages.

"Web Services Architecture Overview," IBM, Sep. 6, 2000, 7 pages.

"Web Services Architecture Using MVC Style," IBM, Feb. 1, 2002, 6 pages.

"Global XML Web Services Architecture," White Paper, Microsoft Corporation, Oct. 2001, 11 pages.

Adams et al., "Best practices for Web services: Part 1, Back to the basics," http://www-106.ibm.com/developerworks/library/ws-bestl/, Oct. 1, 2002, (6 pages.).

"IBM Patterns for E-business,", http://www-106.ibm.com/developerworks, Jun. 3, 2003, (4 pages).

* cited by examiner

| Tiers/ Platform Layer | Client Tier | Presentation Tier | Business Tier | Integration Tier | Resource Tier |
|---|---|---|---|---|---|
| Application Platform Layer | | | Order management Trade settlement Risk management Price discovery Securities accounting CRM Business Intelligence | Service Registry | ERP systems Policy Server Directory Server |
| Virtual Platform Layer | | J2EE | | SOAP ebXML | Policy Server Directory Server |
| Upper Platform Layer | Client Browser | Messaging Servers Web Server Portal Server | Application Server | | Database Server Policy Server Directory Server |
| Lower Platform Layer | PDA WAP phone | Solaris OE | Solaris OE | Solaris OE | Policy Server Directory Server |
| Hardware Platform Layer | PDA WAP phone | Spare Unix | | | Mainframe Storage devices/SAN |

FIG. 22

| "ilities" | Client Tier | Presentation Tier | Business Tier | Integration Tier | Resource Tier |
|---|---|---|---|---|---|
| Performance, throughout, and scalability | | HTTP-based load balancing for SOAP servlet SOAP/XML cache | Vertical scaling Horizontal scaling | HTTP-based load balancer for Service Registry SOAP/XML cache | Federated Directory Server |
| Reliability and availability | Reliable and clustered hardware platform | Reliable and clustered hardware platform Clustered messaging servers | Reliable and clustered hardware platform Clustered Application Server | Clustered Service Registry | Master-slave Directory Server for HA Parallel database server Standby database server Reliable and clustered hardware platform |
| Security | HTTPS VPN gateway | HTTPS VPN gateway | HTTPS | XML security (e.g., DSIG WS-security) | XML security standards (e.g., SAML, XACML) Trusted Solaris OE |
| Manageability | System management tools | System management tools | System management tools | System management tools | System management tools |
| Flexibility | | Decoupling presentation from business (e.g., XML for data, HTML for presentation) | | Update URL end-point in Service Registry without re-binding run-time (re-compilation) | |
| Reusability | | | SOAP-enabled business services | SOAP-enabled business services | SOAP-enabled business services |

*FIG. 23*

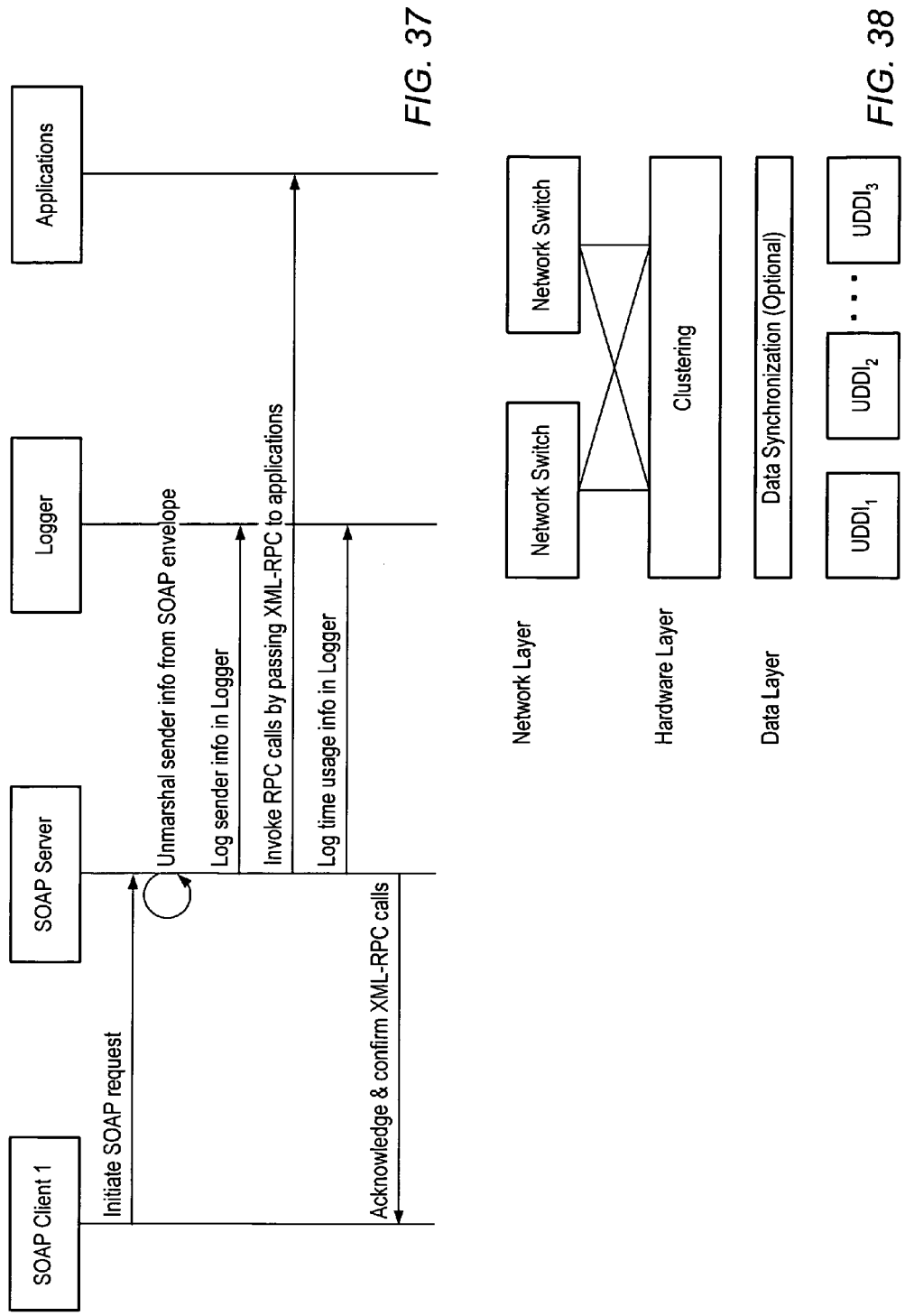

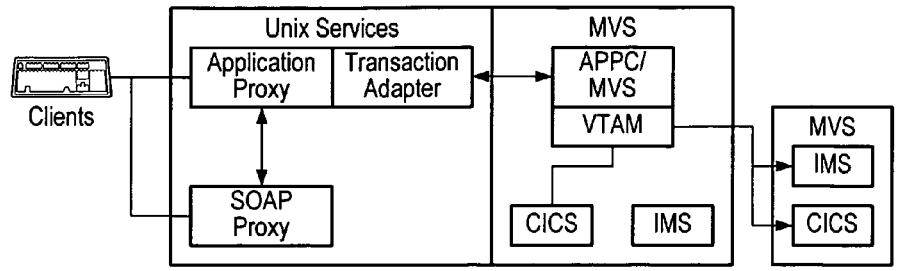

FIG. 49

| Technology Approach | Business Tier (Application Server) | Integration Tier | Resource Tier (Back-End Legacy System) |
|---|---|---|---|
| CICS Transaction Gateway | | CICS Transaction Gateway--use of ECI, EPI, and ESI calls | |
| CICS Web Support | | | CICS Web Support--using CWS to Web-enable 3270-based CICS applications |
| Java | Enterprise Java Beans-- abstracting business functionality from legacy systems | Java Connector Architecture-- standardizing connectors to legacy systems | CICS EJB Server-- EJB container to support EJB |
| SOAP Proxy on Mainframe | | Forte Transaction Adapter--building Application Proxy for back-end resources | Forte Transaction Adapter--server side for APPC conversation |

FIG. 50

| Migration Approach | When To Use | Pros | Cons |
|---|---|---|---|
| Transcode | Existing legacy applications have a low complexity. This applies to both off-line and batch processing. | The legacy code conversion can be automated and thus there is a low change impact for COBOL code written in a general well-documented programming style. | There are manual changes needed for high-complexity programs with dead code. |
| Recompile | This is suitable for stable legacy system functionality where there is no anticipated change or no strategy for future enhancement or re-engineering. | There is minimal impact to the existing architecture. There is no need to migrate the back-end database resources. | The application requires upgrading the legacy operating system to z/OS and installing a Java Virtual Machine in LPAR for run time. Thus, architects and developers cannot decouple the business functionality from the legacy platform. |
| Rehost | This applies to many batch and off-line programs. | It has a lower impact of changes. | This is not ideal for online legacy systems as this may incur considerable changes to hardware and software environment. |
| Refront | This allows re-engineering of business logic incrementally. | Developers can take the chance to clean up dead code. | There is a high risk of re-engineering business logic. |

FIG. 59

|  | Client Tier | Presentation Tier | Business Tier | Integration Tier | Resource Tier |
|---|---|---|---|---|---|
| Application Layer |  |  |  | Process Models Process Monitor Workflow Rule Engine Integration Manager |  |
| Virtual Layer |  | XSLT | XML | JMS RPC COM CORBA | JCA XQL |
| Upper Layer | HTTPS SOAP | HTTPS SOAP SMTP FTP | SOAP |  |  |
| Lower Layer | Network Identity/ Single Sign-on PKI Directory server | Network Identity/ Single Sign-on PKI Directory server | Network Identity/ Single Sign-on PKI Directory server | Network Identity/ Single Sign-on PKI Directory server | Network Identity/ Single Sign-on PKI Directory server |

*FIG. 64*

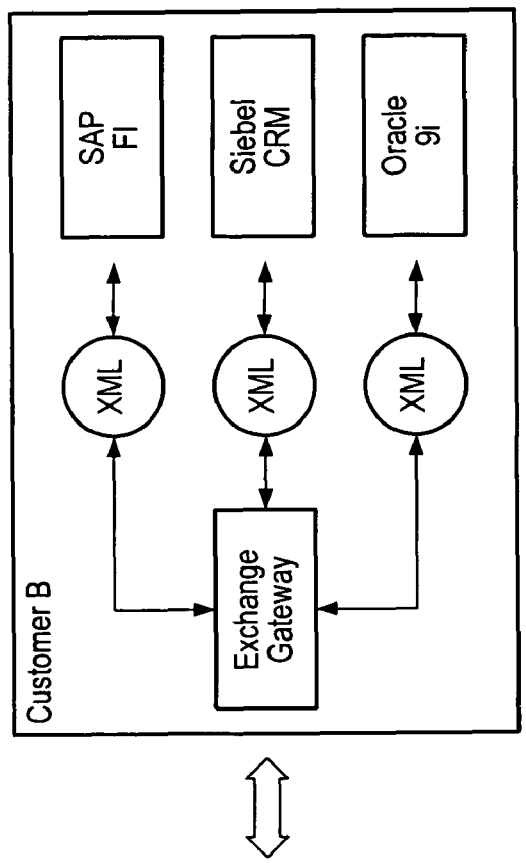
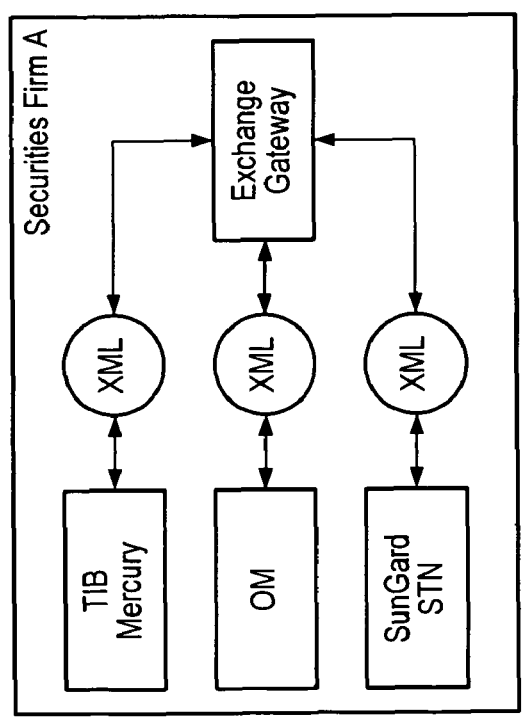
FIG. 81

| Integration Patterns | When to Use | Benefits | Consideration |
| --- | --- | --- | --- |
| Application to Application | Point-to-point exchange | Tight integration | Limited scability |
| Standard Build | Strong branding Strong urge to standardize | Reduce deployment effort Standardize service, faster deployment with no customization | Consensus on standard builds |
| Hub-Spoke Replication Federated Replication Multi-step Application Integration | Hub-spoke business model Intra-enterprise integration | Flexible workflow integration Reliable and consistent multi-step application integration | Inter-enterprise integration with many customization options |
| Data Exchange | Large number of partners to integrate with heterogeneous platforms & standards | Accommodating differences in standard/interfaces | Emerging standards and technology |
| Closed Process Integration Open Process Integration | Shared business processes Workflow-oriented services | Richer support for process integration Cohesive and tightly integrated services | Complexity for partners to agree and implement |
| Service Consolidation-Broker Integration Reverse Auction-Broker Integration | Single front-end for multiple Service Providers | Added values and Service-Provider neutral | Handling service failure of partners |

FIG. 91

| Integration Patterns | Typical Technology Used | Typical Standards Used | Examples |
|---|---|---|---|
| Application to Application | Customized adapters EDI translator | Proprietary XML variants | Ariba Commerce One |
| Standard Build | Proprietary | Proprietary | Hexagon |
| Hub-Spoke Replication Federated Replication Multi-step Application Integration | EAI solutions, such as Amtrix, Mercator, and TIBCO | JMS, SOAP-JMS binding | eXonomy |
| Data Exchange | XML Web Services | XML and SOAP, UDDI, WSDL | AIG Visa Commerce |
| Closed Process Integration Open Process Integration | EAI solutions or middleware, such as Sun ONE Integration Server EAI edition, XML Web Services technology | BPEL4WS | |
| Service Consolidation-Broker Integration Reverse Auction-Broker Integration | Hybrid of any integration technology | Hybrid of any integration standards | Yahoo! Digilogistics (obsolete) CFOWeb Vcheq (obsolete) Bumiputra Commerce Bank |

*FIG. 92*

| | Security Mechanism | Examples of Security Protection | Security Standards Specifications |
|---|---|---|---|
| Service Negotiation | Identity management<br><br>Access control and policy management<br>Single Sign-on | Liberty-complaint Identity Server<br><br>Access control for XML messages<br>Single Sign-on products | Identity management--Liberty 1.1, XML Key Management Specification (XKMS), WS-Federation Entitlement--SAML, XACML, WS-Authorization<br><br>Policy--WS-Policy<br>Others--WS-Secure Conversation, WS-Trust, WS-Privacy |
| Service Discovery | Service Registry security | UDDI Service Registry security features<br>Protection for WSDL documents | UDDI<br><br>WSDL |
| Transaction Routing | Messaging security | Data encryption<br><br>Digital signature<br><br>Key management and managing credentials | XML Encryption (XML-ENC)<br>XML Signature (XML-DSIG)<br>WS-Security<br>XKMS |
| Transport | Data transport security | 128-bit SSL with HTTPS<br><br>Protocol security for FTP, SMTP, and so forth | HTTPS<br>HTTPR<br>IPSec |
| Internet | Network connectivity security | Leased line or router-level encryption<br>Virtual Private Network<br>(VPN) gateways | |
| Platform | Operating system security<br><br>Penetration testing<br><br>Key exchanges between hosts | Solaris OE™ hardening<br><br>Linux Operating System (OS) hardening<br><br>Window OS hardening<br><br>Professional Penetration Testing | |

*FIG. 93*

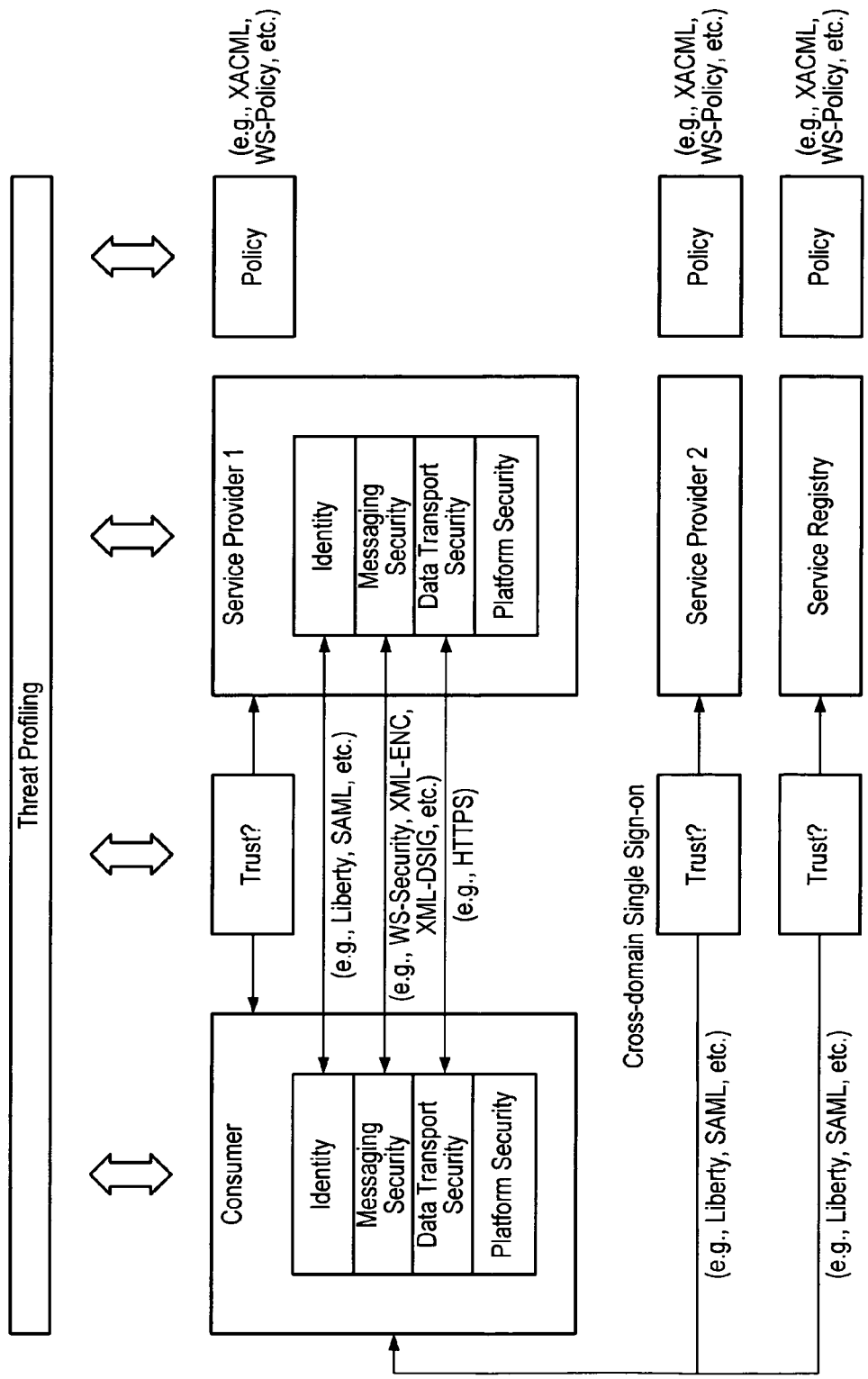

|  | Security Technology or Standards | Security Requirements |
|---|---|---|
| Trust Domains | | |
| Key management | XKMS<br>Host security hardening | Authentication<br>Confidentiality<br>Traceablilty<br>Non-repudiation |
| Authentication | Single Sign-on with SAML and Directory Server | Authentication<br>Entitlement<br>Traceability<br>Availability |
| Transactional security | XML Encryption, ZML-DSIG<br>XACML<br>WS-Security<br>Client and host security hardening | Entitlement<br>Confidentiality<br>Availability<br>Data integrity<br>Non-repudiation |
| Threat Profiling | | |
| Web Services objects | Security hardening for UDDI configuration files and WSDLs | Data integrity<br>Availability |
| Hacker attack | Profiling of transaction loading/capacity to support availability and scalability<br>Client and host security hardening<br>Virus protection for hosts<br>Intrusion detection testing<br>Patch management for software platform (for example, buffer overflow) | Availability<br>Confidentiality<br>Traceability<br>Entitlement<br>Non-repudiation |

*FIG. 97*

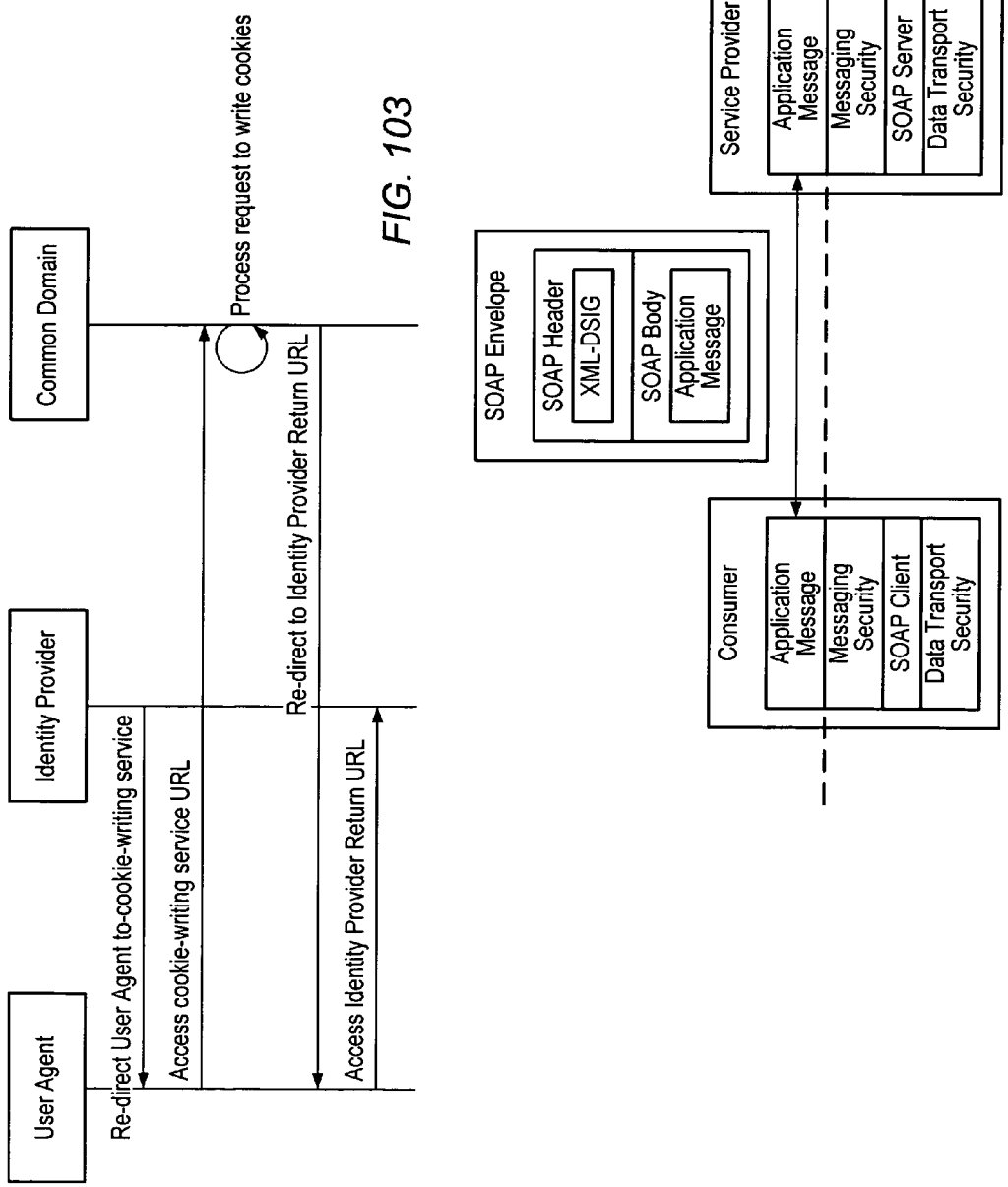

| Web Services Objects | Location | Remarks |
|---|---|---|
| Web Container | | In this example, this is Apache Tomcat 4.x |
| User access control list | D:\Dev\WSDP\conf\ tomcat-users.xml | This file contains the user names, user passwords, and roles that are allowed to access and execute resources under the web Container. |
| Server configuration files | D:\Dev\WSDP\conf\ server.xml | This file contains the server configuration (for example, port number) for running the Tomcat server. |
| Log Files | | |
| Web Container log files | D:\Dev\WSDP\logs | In this example, Tomcat log files are used. This directory contains log files for Tomcat server (Catalina.out), server administration log (localhost_admin_log*.logand access_log*.log and services_log*.log), as well as Service Registry log (xindice.log). |
| Developer tool log files | D:\Dev\WSDP\logs\ jwsdp_log*.log | In this example, Java Web Services Developer Pack's log files are shown. |
| Service Registry update activity log file | D:\Dev\WSDP\tools\ xindice\logs\ xindice.log | In this example, the Xindice database activity log file is used |
| Message Provider | | |
| ebXML message provider administration logs | D:\Dev\WSDP\work\ Services Engines\ jaxm-provider\ebxml | There are four subdirectories that contain the message received, sent, to be dispatched, and to be sent. This denotes the physical location where the JAXM message provider will send or receive the messages with the reliable message delivery capability. |

*FIG. 105A*

| Web Services Objects | Location | Remarks |
|---|---|---|
| SOAP Remote Provider message provider administration logs | D:\Dev\WSDP\work\ Services Engines\ jaxm-provider\soaprp | There are four subdirectories that contain the messages received, sent, to be dispatched, and to be sent. This denotes the physical location where the SOAP remote message provider will send or receive the messages with the reliable message delivery capability |
| Service Registry | | In Java Web Services Developer Pack, UDDI Service Registry is implemented using Xindice object database. |
| Service Registry files | D:\Dev\WSDP\tools\ xindice\db | This file location contains the subdirectory 'system' for the object database system files and security information, and the subdirectory 'uddi' for the actual UDDI data store. |
| WSDL documents | N/A | In this demo environment, the WSDL documents are generated dynamically and do not store in the Service Registry |

*FIG. 105B*

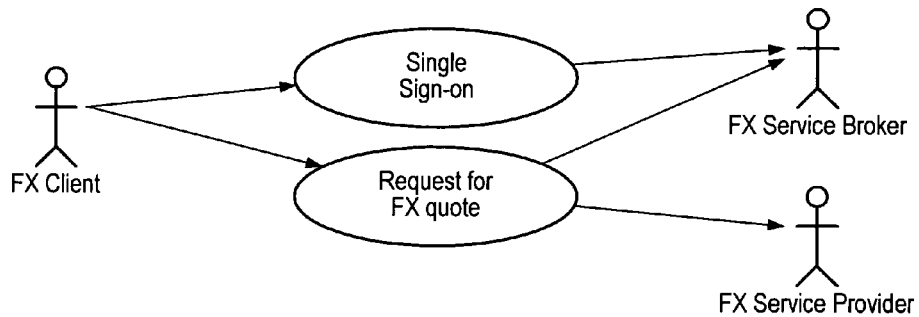

*FIG. 106*

|  | Client | Presentation | Tiers Business | Integration | Resource |
|---|---|---|---|---|---|
| Application Platform Layer | User id and password are used for authentication. | Control Servlet uses HTML and JSP for presentation and inquiry.<br><br>JSPs can be cached to enhance performance. | Java beans are used to implement some of the business logic.<br><br>The remote FX Quote Service is a black box, accessible via JAX-RPC. | N/A | N/A |
| Virtual Platform Layer | HTTP<br><br>HTTPS with SSL can be used for better security. | HTTP<br><br>HTTPS with SSL can be used for better security. | JAXM-TSIK Message Provider provides secure messaging transport for SOAP messages over HTTP. | JAX-RPC JAXM are used to integrate different remote services. | JAXR is used to access the Service Registry. |
| Upper Platform Layer | In the future, 128-bit SSL can be used for better security. | HTTP load balancing can be used for better scalability. | N/A | In the future, server clustering can be used for availability. | In the future, server clustering can be used for availability. |
| Lower Platform Layer | Basic Operating System security is provided with id and password. | N/A | N/A | N/A | N/A |
| Hardware Platform Layer | SSL accelerator can be added in the future for faster performance when using HTTPS. | Reliability and securability can be enhanced in the future with server hardening, firewall configuration, and hardware clustering. | Reliability and securability can be enhanced in the future with server hardening, firewall configuration, and hardware clustering. | N/A | Reliability and securability can be enhanced in the future with server hardening, firewall configuration, and hardware clustering. |

*FIG. 110*

SYSTEM AND METHOD FOR GENERATING SECURE WEB SERVICE ARCHITECTURES USING A WEB SERVICES SECURITY ASSESSMENT METHODOLOGY

CONTINUATION DATA

This application is a continuation-in-part of U.S. patent application Ser. No. 10/642,928, titled "Structured Methodology and Design Patterns for Web Services" filed Aug. 18, 2003.

BACKGROUND OF THE INVENTION

1. Field of the Invention

This invention relates to computer software, and more particularly to Web Services.

2. Description of the Related Art

The term Web Services has quickly become a buzzword in the market. There are true successes, and also much hype about Web Services technology solutions. Much of the market hype focuses on what it can do, rather than on integration. Some generalize that Web Services technology can address all types of business problems. Web Services technologies are a good technology enabler for legacy system integration and cross-platform interoperability, but may not necessarily be the perfect solution to all types of business problems. Such Web Services interest has coincided with the proliferation of XML and Java technology and Business-to-Business (B2B) commerce. The key attraction of Web Services comes from the business drivers of cost reduction and B2B integration. There are many aspects of the changing economic landscape and emerging trends that support the potential use of Web Services, especially in the financial services and B2B commerce areas.

Web Services technology and associated vendor products have evolved greatly over the past few years, from SOAP 1.0 to SOAP 1.2. New related technologies emerge from time to time, such as the earlier releases of the Java Web Services Developer Pack™ (including JAX Pack) and Apache Axis. Java™ has become the de facto lingua franca of Web Services. Previously, developers needed to build their own application infrastructure tools to handle security, exceptions, and logging. They also needed to write programming routines to handle message acknowledgement and exception handling routines to ensure SOAP messages were reliably exchanged. Today, new Web Services tools such as Java Web Services Developer Pack™ and Apache Axis provide many built-in Web Services security features, SOAP messaging capabilities, and SOAP server infrastructure tools. These technologies have changed the previous Web Services programming model and landscape.

Web Services technologies enable the reuse of business functionality provided by mainframes and legacy systems. They help protect past investments of business functionality developed on legacy and proprietary platforms and ease building "killer" applications based on existing customer and account data kept by these legacy systems. "Killer" applications may create user stickiness by aggregating useful and timely customer and account information from different data sources that may run on legacy systems using Web Services as the technology enabler.

Many systems are deployed without a reliable, scalable architecture and thus suffer from capacity and performance issues. Some of them do not have reusable components. Many Web Services initiatives begin and end with SOAP-UDDI programming yet lack a framework for reusable components, scalability, and performance management. Therefore, it may be desirable to provide a generic Web Services solution that leverages application component framework and technical infrastructure investment by focusing on opportunities that can leverage reusable components and that leverages limited component frameworks, distributed services, and platform and network engineering resources.

There are prior art architectures labeled under Web Services. There are Web Services architectures published by various technology vendors. These architectures include, but are not limited to, Sun ONE™ Architecture Framework, IBM's Web Services Architecture, and Microsoft's Global XML Web Services Architecture. At least some other prior art architectures are primarily a rebranding of vendor product architectures. Prior art Web Services architectures generally lack structure and guiding principles; a product architecture that lacks structure and guiding principles is not useful for scalable and reliable Web Services.

Prior art Web Services literature typically addresses how to build SOAP programs or lab prototypes. There are Web Services architectures available in the prior art, but these are typically vendor product architectures, rather than generic Web Services reference architectures. Therefore, it may be desirable to provide a generic Web Services solution to interoperate with legacy mainframe applications and/or to integrate with Business-to-Business applications.

Web Services Related Technologies eXtensible Markup Language (XML) is a tag language, derived from the Standard Generalized Markup Language (SGML) and endorsed by W3C, to describe business data in human-eligible format and is intended to facilitate machine-to-machine or system-to-system communication over the Internet. The XML data construct can be defined and validated (with XML parsers) by XML 1.0 syntax (for example, Document Type Definitions [DTDs]), XML Namespaces, or XML Schemas.

DTDs specify rules about the tag names, data structure (for example, string), and permissible elements (for example, repeatable elements). DTDs can be stand-alone or incorporated in an XML document.

An XML Namespace is a collection/group of names—i.e. a prefix added to XML element to differentiate elements with the same name (such as name, customer:name, or buyer: name). Using a unique element, this addresses conflicting names while exchanging XML documents with partners. It is identified by a URI reference, qualified names/elements, and attribute names within an XML document (such as buyer: trade-Header). The syntax is: xmlns:_Namespace prefix_URI_

An XML Schema is a more general and flexible way to describe the data structure of an XML document (for example, data type or attributes). Although not required, SOAP uses XML Schema instead of DTD to represent data in the SOAP requests and responses. SOAP can use XML Schema to serialize/deserialize data from parameters to method calls and returned values.

XML documents are usually validated by XML parsers for their well-formedness. There are three major types of parsers:
Document Object Model (DOM)
Simple API for XML
JDOM Java™ is a platform independent programming language. Java has a "sandbox" architecture that has inherent application security. On the enterprise level, Java 2 Enterprise Edition™ (J2EE™) is the building block for components and integration points. Both Java and NET have similar programming strengths. Java™ is more popular with cross-platform deployment consideration, yet .NET is also now available on Linux.

The Java™ XML Pack (JAX Pack) is an all-in-one download of Java technologies for XML. Java™ XML Pack brings together several of the key industry standards for XML—such as SAX, DOM, XSLT, SOAP, UDDI, ebXML, and WSDL—into one convenient download, thereby giving developers the technologies needed to get started with Web applications and services.

JAX Pack is a bag of Java-based APIs for developing and managing XML, SOAP, and UDDI:

JAXP—Java API for Parsers
JAXM—Java API for Messaging
JAXB—Java API for Binding
JAXR—Java API for Registries
JAX-RPC—Java API for RPC JAX Pack is a reference implementation for JAX, and is now part of Sun's Java Web Services Developer Pack.

JAXP is a lightweight Java API library for parsing and transforming XML documents. It is a high-level wrapper for different parsers; it can use Xerces or Crimson as the underlying parser. It allows parsing of an XML document using:

Event-driven (SAX 2.0)
Tree-based (DOM Level 2)
XML documents transformation
XML to XML/other data format using XSL/XSLT
Rendering to PDF or graphics using Cocoon JAXP provides an interface layer to XML parsers. The reference parser is Apache Crimson, but developers can use other parsers such as Apache Xerces. The reference parser supports both event-driven (SAX) and tree-based XML parsing (DOM).

SAX performs well-formedness validation of XML documents. It can be used for reading specific elements. SAX is based on a specific event and enables sequential read access only (that is, one-time access). The strength of SAX is that documents do not have to be entirely in memory, thus it is fast and efficient. However, it cannot modify elements of the XML document. To parse an XML document, developers define a Java class that extends the DefaultHandler, which will create a new instance of SAXParserFactory. The SAXParserFactory provides handlers such as startElement, endElement, and characters to process different events during the parsing.

The Document Object Model (DOM) is an API for processing XML documents. It defines the logical structure of documents and a way to access and manipulate the documents. The strengths of DOM are that DOM can build documents, navigate their structure while in memory, and DOM can add, modify, or delete elements or content of the XML document. However, the in-memory processing is resource-hungry. To parse an XML document, developers need to define a Java class to create an instance of DocumentBuilderFactory, which will create a new object DocumentBuilder. The DocumentBuilder will then create nodes (objects in the DOM) for different XML elements and tags.

JAXM refers to the Java technology support for sending and receiving SOAP messages, which is based on the SOAP 1.1 and the SOAP with Attachment specifications. It supports higher level and application-specific protocols built on top of SOAP, including multiple transports such as HTTP, SMTP, and so forth. In addition, JAXM supports both synchronous (request-reply) and asynchronous (one-way) mode. JAXM is preferable to JAX-RPC because of its support for asynchronous messaging, multiparty message routing, and reliable messaging (that is, guaranteed delivery). JAXM is a pluggable provider class for the SOAP server. The provider class supports different data transports, such as HTTP, SMTP, and JMS. For example, if Company X sends a SOAP message using a SOAP provider over HTTP to Company Y, the JAXM provider will create a connection to the specified URL endpoint with Company A's SOAP provider, create a SOAP message instance, and get the SOAP envelope and body. With JAXM, developers can make SOAP messaging reliable with message acknowledgement and guaranteed message delivery using JMS.

JAXB denotes Java Architecture for XML Binding. JAXB creates an XML-to-Java binding schema (XJS), which maps XML elements to Java objects, and stores it in XJS files (.xjs extension). You can compile them with a schema compiler called xjc and output the source code to a set of Java classes for marshalling and unmarshalling. An XML-to-Schema Compiler (xjc) is a Unix shell script that invokes com.sun.tools.xjc.Main, which reads in a DTD and a XJS binding schema, and generates a set of Java source files. An XJS binding schema file defines the mapping.

In the JAXB architecture, the utility xjc creates Java source files to bind a DTD or XML Schema to Java data objects. Developers can then add additional program code if necessary and compile the Java source files into Java classes for execution. This can potentially reduce some coding effort and processing time to transcode XML elements in an XML document using JAXP. JAXB version 1.0 supports both DTD and XML Schema. Developers can use the same xjc compiler to generate Java binding files for an XML Schema under Windows or Unix. Using JAXB to bind an XML Schema to the Java data structure, developers can probably write less program code using an XML parser (such as DOM or SAX) to transform XML content into Java data objects. This is a considerable benefit to the productivity.

JAXR is a standard Java API for accessing diverse and heterogeneous Business Service Registries. It is a unified information model for describing business registry content. It provides multi-layered API abstractions for simple, high-level, business API, and flexible, low-level, generic API. It is the enabling technology for Web Services and peer-to-peer computing in the J2EE™. In the JAXR architecture, a JAXR client is basically a registry client (RC) that is connected to the registry service (RS) via a JAXR pluggable provider. The JAXR provider is able to use any capability-specific interfaces such as ebXML provider or UDDI provider that is specific to a particular Service Registry platform. Developers can also write their own JAXR provider class to accommodate any new Service Registry platform. In this way, the JAXR client only needs to use one single set of program code to access different service registries; it need not be rewritten and recompiled.

JAX-RPC stands for Java API for XML-based Remote Procedure Calls (RPC). JAX-RPC enables Java technology developers to build Web applications and Web Services incorporating XML-based RPC functionality according to the SOAP 1.1 specification. JAX-RPC allows distributed client/server mode over the Web using the Standard Web Services technologies: SOAP, WSDL, and HTTP. Using the JAX-RPC API and the tools, it simplifies the creation of a Web Service for a Java programmer as it hides all the complexities of generating SOAP and WSDL, but provides tools to generate these using Java Interfaces and some additional configuration information. All the code to map Java data type information to XMUSOAP is generated by the tools "wscompile" and "wsdeploy" from Java Web Services Developer Pack (JWSDP) 1.0.1 (which supersedes the tool "xrpcc" in JWSDP 1.0). The JAX-RPC runtime will take care of the transport. In the JAX-RPC architecture, in order to invoke a remote business service, the client program needs to install a "stub," which enables it to communicate with the remote application service via the remote "ties." Both the client and the remote server (services) need to install JAX-RPC runtime, which enables both ends to exchange SOAP messages. This is a typical Remote Procedure Call model.

Universal Description, Discovery, and Integration (UDDI) typically denotes a Service Registry such as a business Yellow Page for an e-business service. It also denotes a standard specification for service discovery and description. There are at least three public operator nodes: Microsoft, IBM, and Ariba. SAP provides a public UDDI node as well.

The UDDI registry enables businesses/corporations to register public information about themselves (such as service type, products, URL) and provides service categories or classifications using standards code such as NAICS (North American Industry Classification System, a product code classification system for trading used by the U.S. Census Bureau) and UN/SPSC (United Nation Standard Products and Services Classification, a product classification system developed by Dun & Bradstreet).

There are primarily three types of information: (1) White Pages—business names, description, contact information; (2) Yellow Pages—business categories using standard codes such as NAICS, UN/SPSC, and geographical taxonomy; and (3) Green Pages—information model to store implementation information of business processes, service descriptions, and binding information. The UDDI information model is a data model that encapsulates the business information of business organizations and service details.

In UDDI, a business entity contains the definition of business services (White Pages), and each business service contains a binding template (Yellow Pages) that shows to the service end-points URL. The information in the binding template is also stored in the UDDI information model tModel and tModelInstance objects, which are accessed during the service discovery process. The same information in the binding template is also referenced in the Implementation section of the WSDL document (Green Pages). The Implementation section is also referenced in the Interface section of the WSDL document. If developers want to store the WSDL document in the UDDI Service Registry, they can reference the Interface section in the tModel object.

SOAP stands for Simple Object Access Protocol. The original specification has three parts: extensible envelope (headers and body), simple type marshalling schema, and HTTP RPC protocol. The SOAP RPC layer acts as a client proxy that initiates SOAP calls, creates SOAP envelope and message body, and exchanges with the SOAP server. The logical components of the "tier" are elaborated as the SOAP server. The SOAP server handles message routing, marshals, and unmarshals the SOAP messages via RPC router servlet and message router servlet (these are transport listeners). All SOAP messages are transported on top of HTTP or HTTPs, and can even be bound to JMS using customized pluggable providers.

The SOAP client sends a SOAP RPC request to the RPC router servlet. The RPC router servlet looks up the Deployment Descriptor from the service manager. Upon successful retrieval, the RPC router servlet locates the configuration details and passes the request to appropriate pluggable provider. For instance, the pluggable provider is an EJB provider, and it invokes the remote business service via RMI/IIOP protocol.

Web Services Description Language (WSDL) uses XML to describe Web Services by:
   End-points operating on SOAP messages
   SOAP messages containing either document-oriented (for example, XML doc) or procedure-oriented information (for example, XML-RPC)
   Operations and messages
   Bindings of network protocol and message format to end-points WSDL also defines network accessible services functionality, such as protocol and deployment details. It is submitted to W3 as a basis for XMLP Web Service metadata definition. In a WSDL document, the service (service endpoint URL), operation name (the remote business service), message name (input or output), and the type (data type) are usually of interest to developers, as they are the key information to build a Web Services client.

WSDL documents can be stored in the UDDI registry. There is a close relationship between the UDDI information model and the WSDL documents. SOAP clients look up the UDDI registry for a specific business service and find the service key and the associated service end-points from the WSDL or the tModel. Then they can invoke the business service remotely. In a WSDL document, the service name is mapped to the BusinessService attribute of a tModel, the port name to the BindingTemplate, and the service interface section to the tModel and tModelInstanceInfo attributes.

Electronic Business XML Markup Language (ebXML) is an international initiative to define a framework for finding, exchanging, developing, and implementing business services. It focuses on B2B and Small Medium Enterprise needs, and is backed up by standards bodies (such as OASIS, UN CE/FACT) and communities (such as the Open Applications Group or OAG).

As an example of using ebXML, two business applications may want to exchange business documents in a reliable manner. Both ends need to establish a trading partner agreement (e.g. using CPP, CPA) prior to document exchange. The sender business application initiates a connection, sends the business documents in ebXML manifest (which is wrapped in a SOAP envelope using SOAP 1.1 with Attachment), and waits for message acknowledgement from the recipient business application. The ebXML architecture also allows business process collaboration using a business process specification shared between the business applications.

A typical ebXML message makes use of the SOAP messaging as the transport and routing protocol. An ebXML message may include a payload (usually called Manifest), which is wrapped by a SOAP envelope (including a SOAP envelope and SOAP body). ebXML encapsulates the SOAP envelope and the payload under a MIME structure, and thus allows capturing either text or binary objects (such as a picture, or an EDI message) in the payload.

Currently, Service Registry has two variants: UDDI and ebXML. OASIS supports both variants. UDDI Service Registry has been on the market for some time. IBM, Microsoft, HP, and SAP manage the public UDDI Service Registry nodes. Although they are intended to be a public Service Registry, most people use them for testing instead. There are also a few open-source implementations of UDDI Service Registries, including UDDI registry from Sun's Java Web Services Developer Pack. Most J2EE™ Application Server vendors also provide UDDI Service Registry. ebXML Service Registry is a standards-based Service Registry. Its functionality is similar to UDDI. In addition, it supports service contracts (that is, CPA, CPP) and workflow-related entities (as per ebXML specifications).

SUMMARY

Embodiments of a system and method for generating a generic, vendor-independent secure Web Services architecture incorporating a Web Services Security Assessment structured methodology and security design patterns for designing and implementing secure Web Services are described. Lifecycles of the Web Services Security Assessment structured methodology may include one or more of, but are not limited to: vision and strategy, architecture design, development, integration, and deployment. In one embodiment, in the Vision and Strategy Web Services life cycle, architects may collect user security requirements and technical security requirements, and encapsulate them into use case requirements using Use Case modeling techniques. Architects may identify a set of Web Services objects that need to be protected and secured, and their associated relationship in the context of the deployment infrastructure. In the Architecture Design life cycle, architects may define trust domains, define security policy, and identify potential security threats. In the Development life cycle, architects may develop protection measures or security application codes to protect the Web Services objects and components. If necessary or desired, architects may apply one or more Web Services security tools. In the Integration life cycle, architects may apply one or more Web Services security design patterns to integrate different Web Services components together. In the Deployment life cycle, architects may deploy the Web Services infrastructure in accordance with the generated secure Web Services architecture. Security of the deployed Web Service may then be assessed.

In one embodiment of a Web Services Security Assessment methodology design process, one or more security components may be identified and implemented based on one or more use case requirements. The Web Services objects or components that need to be protected may be identified. The object relationship for security protection may be defined, and the associated trust domains, security policy and strategy and threat profiles may be identified. A set of protection schemes and measures for these Web Services objects may be derived. One or more supporting Web Services (security) tools may be applied to complete the security protection schemes, if necessary. Web Services design patterns, including security design patterns may be applied wherever appropriate. In some cases, re-architecting or re-engineering may be desired or required. Upon deployment to production, the security levels may be assessed by tiers, e.g. host scan and host security health checking.

One embodiment may be implemented as a Secure Web Services architecture design mechanism. The secure Web Services architecture design mechanism may receive Web Services requirements as input and, using the input, assist a user in designing and generating a secure Web Services architecture using the Web Services Security Assessment methodology and design patterns including security design patterns. A Web Services infrastructure may then be deployed or implemented in accordance with the secure Web Services architecture.

BRIEF DESCRIPTION OF THE DRAWINGS

FIG. 22 is a table that shows an exemplary tiers vs. platform layers analysis, according to one embodiment.

FIG. 23 is a Quality of Services analysis matrix, according to one embodiment.

FIG. 37 is a SOAP Logger Sequence Diagram according to one embodiment.

FIG. 38 illustrates an example of clustering the hardware platform of multiple Service Registries according to one embodiment.

FIG. 49 illustrates an exemplary high-level application architecture for a SOAP Proxy on a Mainframe according to one embodiment.

FIG. 50 is a table of Integration Points for Mainframe Interoperability, according to one embodiment.

FIG. 59 is a table that illustrates some possible considerations for determining when to use legacy code migration tools according to one embodiment.

FIG. 64 is a table that summarizes the integration components and enabling technology by tiers versus layers according to one embodiment.

FIG. 81 illustrates a Data Exchange Design Pattern according to one embodiment.

FIGS. 91 and 92 are tables that describe integration scenarios and design patterns according to one embodiment.

FIG. 93 is a table that illustrates a Web Services Security Stack, according to one embodiment.

FIG. 96 illustrates a Web Services Security Framework according to one embodiment.

FIG. 97 is a table that illustrates Trust Domains and Threat Profiling according to one embodiment.

FIG. 103 is a Common Domain Cookie Management sequence diagram according to one embodiment.

FIG. 104 illustrates a security pattern through which the security processing logic may be decoupled from the application business logic according to one embodiment.

FIGS. 105A and 105B is a table that illustrates exemplary Web Services objects for security protection and checking under the exemplary Java Web Services Developer Pack development environment according to one embodiment.

FIG. 106 illustrates exemplary Use Cases for an exemplary FX Spot Rate Quote Web Service according to one embodiment.

FIG. 110 illustrates an exemplary Quality of Services analysis according to one embodiment.

FIG. 121 is a flow diagram illustrating lifecycles of the Web Services Security Assessment methodology, processes within the lifecycles, and the flow through the lifecycles according to one embodiment.

FIG. 122 is a flowchart of a Web Services Security Assessment methodology design process according to one embodiment.

FIG. 123 illustrates a system implementing a Secure Web Services architecture design mechanism according to one embodiment.

Figure 1:
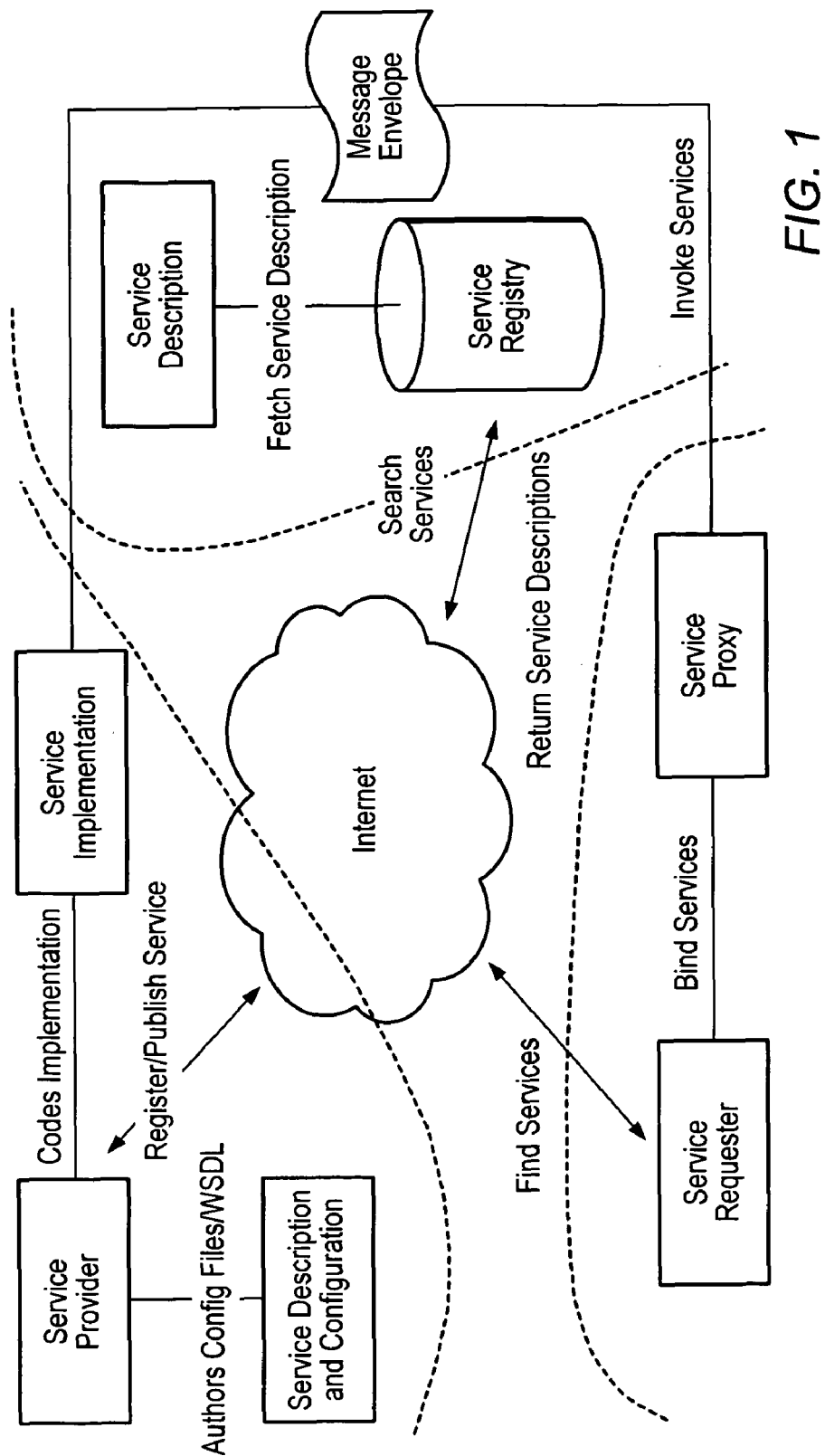
FIG. 1 illustrates the Web Services consumer-service provider relationship according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EAIBODIMENTS

Embodiments of a system and method for providing a generic Web Services architecture incorporating a structured methodology and design patterns for implementing Web Services, including secure Web Services, are described. Embodiments of this Web Services architecture may incorporate a structured methodology, best practices and design patterns that address the reliability, availability and scalability aspects of Web Services architecture. Embodiments may be used in designing, implementing, and managing end-to-end Web Services solutions that may incorporate, for example, reliability, scalability, and availability. Embodiments may provide a mechanism for designing and implementing Web Services as business (or other application) solutions that may include mainframe and legacy systems interoperability and cross-enterprise integration (for example, SOAP-JMS binding).

Embodiments may provide mechanisms for integrating different technology components such as SOAP and ebXML into Web Services solutions. Embodiments may provide a vendor-independent Web Services architecture framework and reusable Web Services design patterns, which may help in creating end-to-end solutions based on past experience and best practices.

Embodiments of a generic Web Services architecture may provide a repeatable and consistent way to design and deploy scalable, reliable Web Services, independent of the underlying vendor products. Embodiments may provide a vendor-independent architecture framework to design Web Services and to bring different technology pieces together in a big, complete picture. Embodiments may include best practices of delivering Web Services solutions with Quality of Services.

Web Services design patterns and when-to-use architecture principles are described. The Web Services design patterns and best approaches address the different needs of infrastructure architects, J2EE developers, security architects, and integration architects. In one embodiment, Web Services design patterns may be designed based on Quality of Service principles. Embodiments may be used in designing and implementing Quality of Services (the so-called "ilities") for reliable, available, and scalable Web Services. One embodiment may provide a Business-to-Business Integration (B2Bi) integration framework for Web Services. In this embodiment, one or more of the design patterns may be extended to B2Bi.

Embodiments may provide a Web Security framework. Embodiments may provide a security framework to design end-to-end Web Services security. Embodiments may address security at different levels, from network level, infrastructure level, message level, to application level, and may bring different security technologies together in the security framework.

Embodiments of a system and method for providing a structured methodology and design patterns for implementing Web Services may include one or more of, but are not limited to:

Deployment (Quality of Service)
    Scalability design patterns—e.g. SOAP server farm (load balancing SOAP requests), SOAP cache, multiple servlet engines, proxy/gateway, etc.
    Reliability design patterns—e.g. session management, state management, SOAP logger, etc.
    Availability design patterns—e.g. redundant SOAP servers, high availability service registries, etc.

Service Registry
    Service versioning and registry management.
    Registry deployment (e.g. centralized and federated).
    Publish, unpublish to registry—JAXR.
    Synchronization of registries (content management).

Integration
    Application-to-application patterns.
    Standard build design pattern.
    EAI design pattern—e.g. hub-spoke, replication, federated replication, multi-step application integration, etc.
    Data exchange design patterns.
    Process integration design patterns—e.g. closed process, open process, etc.
    Broker integration design patterns—e.g. service consolidation broker, reverse auction broker, etc.

Security
    Protecting Web Services objects.
    Cross-domain single sign-on.

In this document, design patterns are defined in structured pattern format (e.g. context, problem, force, and solution) and are further described using Unified Modeling Language (UML) notation (e.g. sequence diagrams).

Embodiments of the Web Services architecture are generally described herein using Sun's Web Services technology (for example, JWSDP and JAX) with a Sun ONE architecture and J2EE flavor. Note, however, that embodiments are not limited to these technologies, and may be implemented with other Web Services technologies.

Web Services technology can be described in terms of a Service Requester-Service Provider relationship, as illustrated in FIG. 1. The Service Provider runs business services from their systems locally and remotely. Business services provided can be found in a Service Registry. In order to register and publish the business service in the Service Registry, the Service Provider defines (authors) service description and configuration information (such as configuration files or WSDL-Web Services Description Language) and then codes the implementation (Service Implementation). The Service Implementation may be from existing legacy system functionality via Remote Procedure Calls or new applications.

The Service Requester is a consumer of business services. This may be the end-user (as in Business-to-Consumer) or server (as in Business-to-Business scenario). The Service Requester finds the business services from the Service Registry via a Service Proxy (such as an Apache SOAP server). Upon a successful search, the Service Registry, which may be provided by the same Service Provider or by a public Service Registry node, fetches the appropriate service description (for example, WSDL) and returns the service end-points (that is where the business service is located) to the Service Requester. Then the Service Requester can "bind" the business service to the actual service endpoint or location.

In summary, the Service Provider uses WSDL to describe the business service and configuration to implement business services. Service descriptions (such as WSDL) are then published in the Service Registry (e.g., UDDI or ebXML).

The Service Provider may use SOAP technology (such as SOAP Proxy) to wrap existing legacy system functionality as reusable business services. The Service Requester discovers business services dynamically via a SOAP Proxy from the Service Registry, and binds the business services to the actual URI (Universal Resource Identifier) locally or remotely. The business services are encapsulated in XMIL messages using a SOAP message envelope. This enables easier data manipulation and processing using XML-based products and applications.

Figure 2:
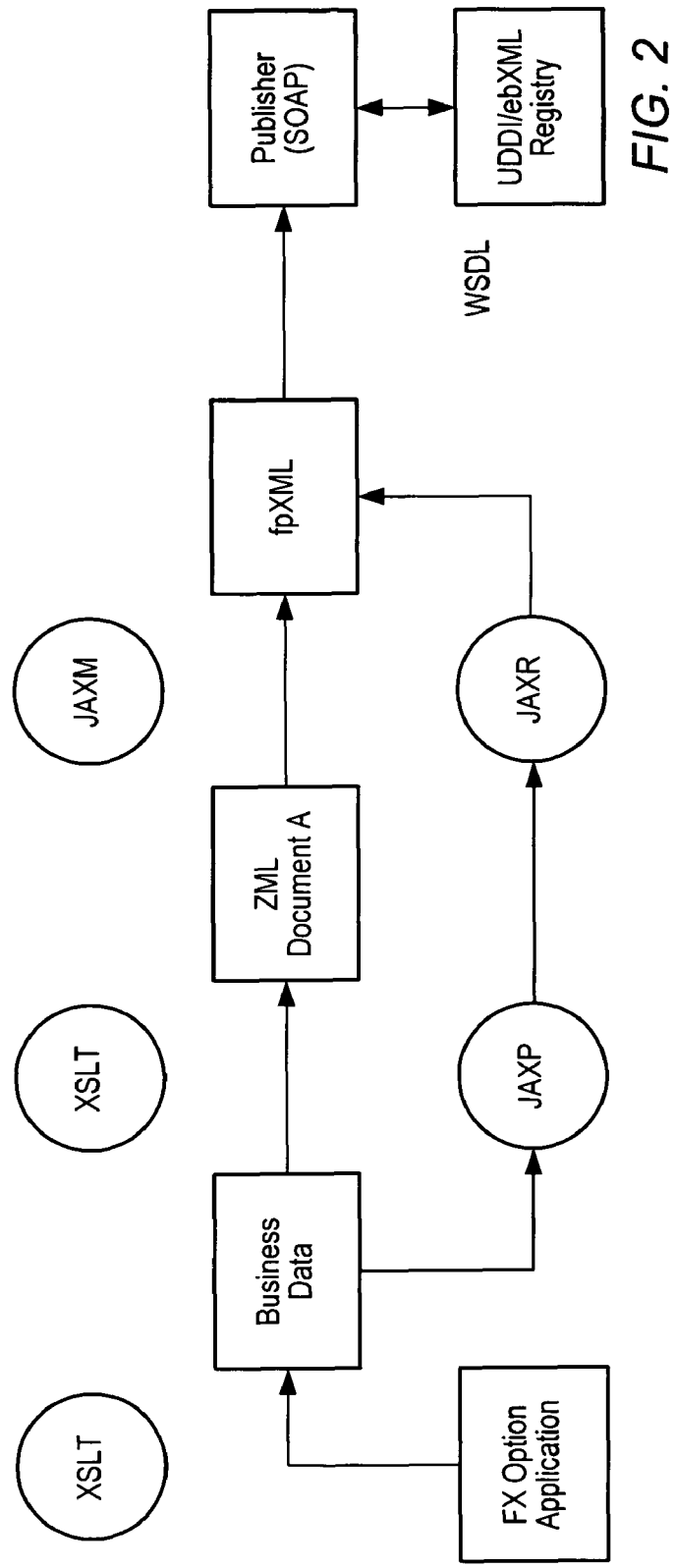
FIG. 2 illustrates an exemplary complete Web Services application according to one embodiment.

Throughout this document, a Foreign Exchange trading Web application may be used as an exemplary application of embodiments of the generic Web Services architecture in practice. FIG. 2 illustrates an exemplary complete Web Services application according to one embodiment. To build a complete application as illustrated in FIG. 2, a developer may follow the examples and concepts of embodiments of the generic Web Services architecture described herein to wrap an existing business service as Web Services (for example, using JWSDP's wsdeploy or Axis), publish it in a Service Registry (for example, using JAXR), expose the business service via a Message Provider (for example, using JAXM), and/or parse data from the business partners using JAXP and XSLT.

The following describes two exemplary scenarios where Web Services technology implemented according to embodiments of the generic Web Services architecture may be a good fit. The first exemplary scenario is a membership award program, which is a common customer loyalty program, and provides a seamless integration between a credit-card bonus point system and business partners for redemption, account balance, activity tracking, and cross-selling. The second exemplary scenario is a single payment gateway that enables corporate banking customers to utilize payment services from multiple banks, referred to as a Payment Services scenario.

To establish a business case for Web Services implementation, some common characteristics and prerequisites of the candidates are discussed, followed by the selection criteria of a pilot project, business benefits, and some risk analysis. Typically, many corporations would start a pilot program (or Proof of Concept) to justify the business case and to mitigate the technology risks. A sample Return On Investment (ROI) model, based on the pilot scenario, is provided in the business case.

The target candidate for Web Services implementation may be one where existing monolithic services may be decomposed into more atomic business services. By exposing these atomic business services, business information from various sources may be aggregated with a business process engine into meaningful business information and customer-oriented services. Preferably, the target candidate should have one or more of, but not limited to, the following characteristics:

Trading Partners. There may be more than one external trading partner involved. There is also a need to interoperate with back-end legacy systems and heterogeneous platforms. Otherwise, the low complexity does not justify using Web Services technology.

Reusability. The reusability of business services and customer information should be high. If the solution is very unique and cannot be reusable anywhere, then there is no business case.

Branding. Some people believe integrating two different services may lose the original branding, as either or both parties may need to compromise in some areas to accommodate technical constraints. While keeping a consistent branding, we need to provide flexibility (such as providing personalized or customized services for managed services), especially for white labeling services. The integration technology used must be flexible enough to accommodate the different constraints of the back-end services.

Technology Constraints. Back-end business services or application functionality are unlikely to be re-engineered. Thus, the technology used should coexist and leverage existing back-end services and should not require a rewrite or significant modification.

Limited Delivery Time Window. There should be a short and limited time window to deliver the system. Thus, the technology used must be easy and quick to deploy. The integration framework needs to support different protocols and message formats, including a variety of industry standards and platforms.

Figure 3:
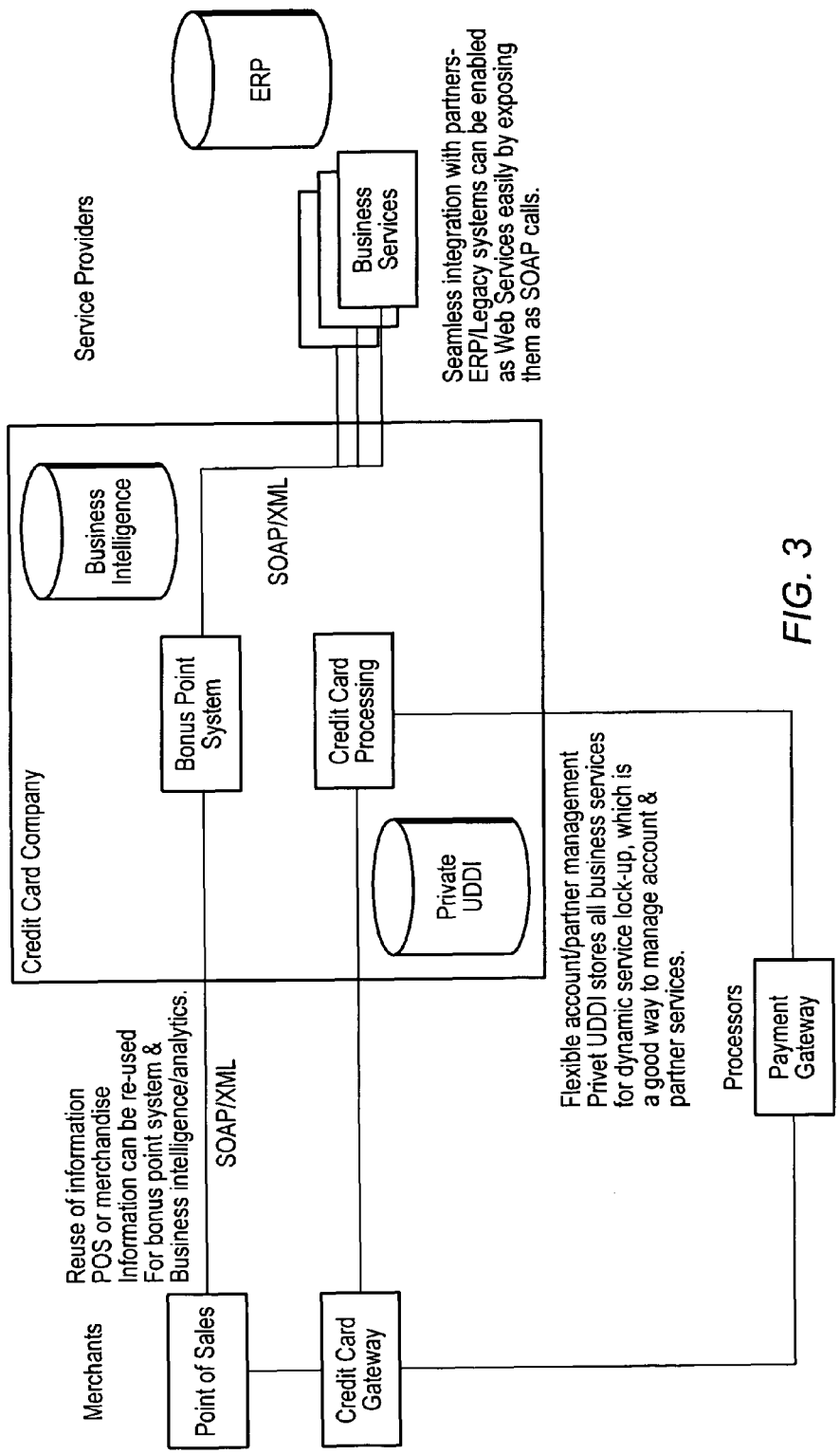
FIG. 3 illustrates an exemplary Membership Award scenario according to one embodiment.

FIG. 3 illustrates an exemplary Membership Award scenario according to one embodiment. Membership award is a customer loyalty program that may be used in credit card services. Customers who register with a credit card company Web site may redeem bonus points in exchange for gifts from the membership award site. An objective of this exemplary scenario is to provide a seamless integration for bonus point redemption and partner services.

In FIG. 3, the point of sales (POS) terminal residing in the merchant's store connects to a credit card gateway, which will dial up to the Processor (such as the acquirer bank that offers merchant accounts) to request authorization and debit processing. Upon successful authentication and authorization, the Processor will process the card payment via the payment gateway with the credit card company. Thus, Customer Service Agents or Operations personnel from the credit card company may not need to re-enter the payment transaction details into their bonus point system in order to process the reward redemption requests. Further Business Intelligence applications may retrieve the membership award activities for data mining or direct marketing.

Web Services technology may be used here to wrap the Point of Sales payment functionality as a reusable business service. This enables the POS or merchandise in formation (such as payment transactions) to be captured in SOAP messages and reused by the bonus point system. The credit card company may also make available partial contents of the customer transactions with other business service providers who need them to process the award redemption request. This not only reduces paper work, it can also expedite the processing time of the reward redemption.

The bonus point system may also make use of Web Services technology to integrate seamlessly with back-end ERP or legacy systems or to exchange membership award information with service providers via SOAP messages. This allows a flexible and low-cost means of Business-to-Business integration (B2Bi), without creating proprietary and dedicated interfaces.

In addition, with the use of a private UDDI service registry, the credit card company may store the service information of different service providers to enable dynamic service look-up of various membership award services. Customer and business information may then become timely, and thus the award redemption service preferably becomes a good user experience. In addition, consumers, merchants, or service providers participating in the membership award service (or affinity program) need to pre-register first in the private UDDI service registry with the credit card company. They are authenticated each time before they can use the membership award service. This registration process may preferably facilitate better account and partner management with security and foster the growth of the user community.

Figure 4:
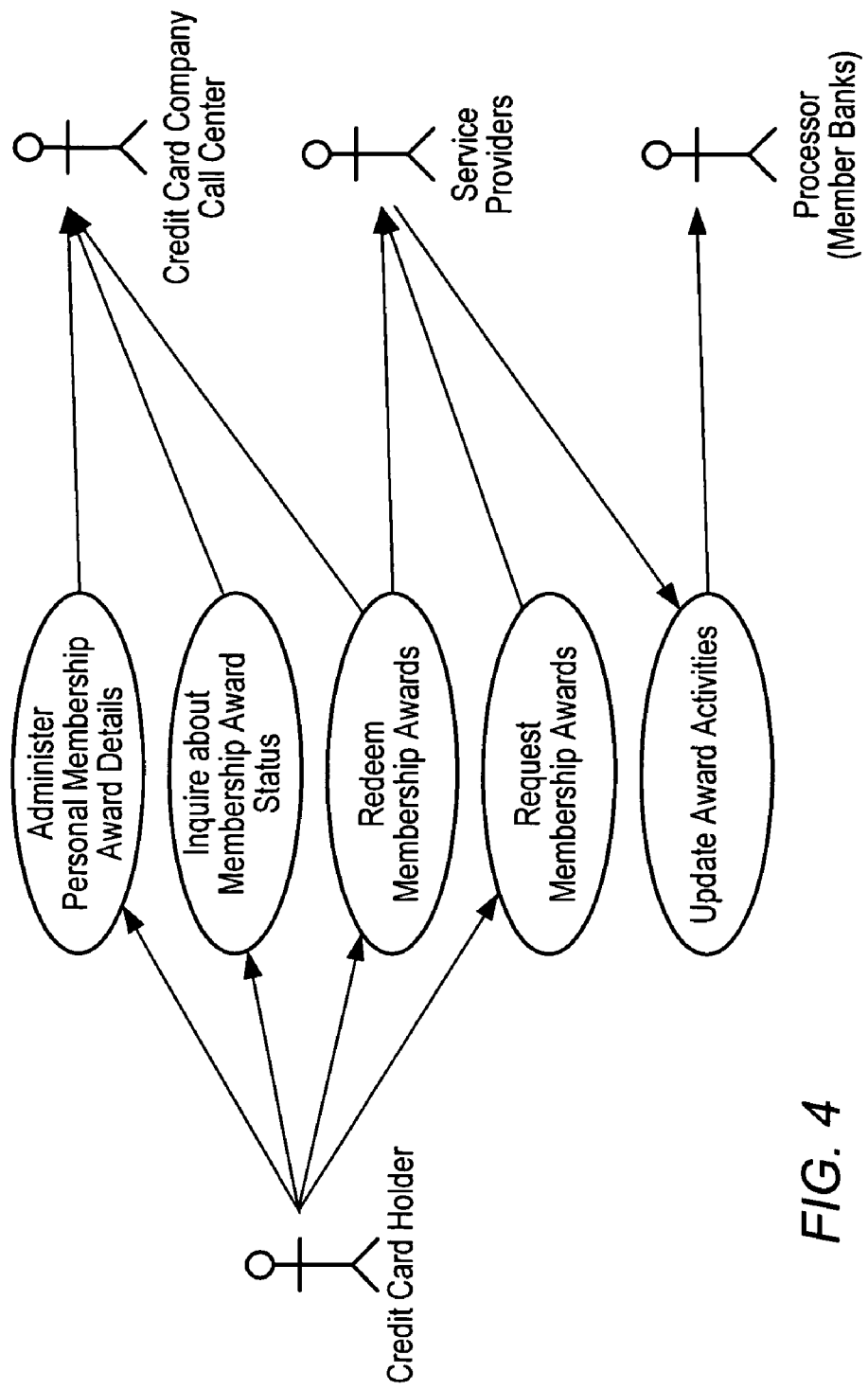
FIG. 4 illustrates business scenarios or use cases for the membership award processes according to one embodiment.

FIG. 4 illustrates business scenarios or use cases for the membership award processes according to one embodiment. Before a credit card holder can enjoy membership award services, the holder needs to register with the credit card company's call center (or Web site.) The credit card holder also needs to administer personal membership details.

Upon successful membership registration, the credit card holder, who has made a POS purchase using the credit card, may go to the credit card company's Web site to inquire about membership award status. If the credit card holder has enough bonus points to redeem some merchandise, the holder would like to make a redemption request with a service provider. Service providers may then process the redemption requests, arrange merchandise delivery to the credit card holder, and return membership award status to the credit card company's call center (or the Processor, if they share the same affinity program) so that they can update their bonus point system.

Figure 5:
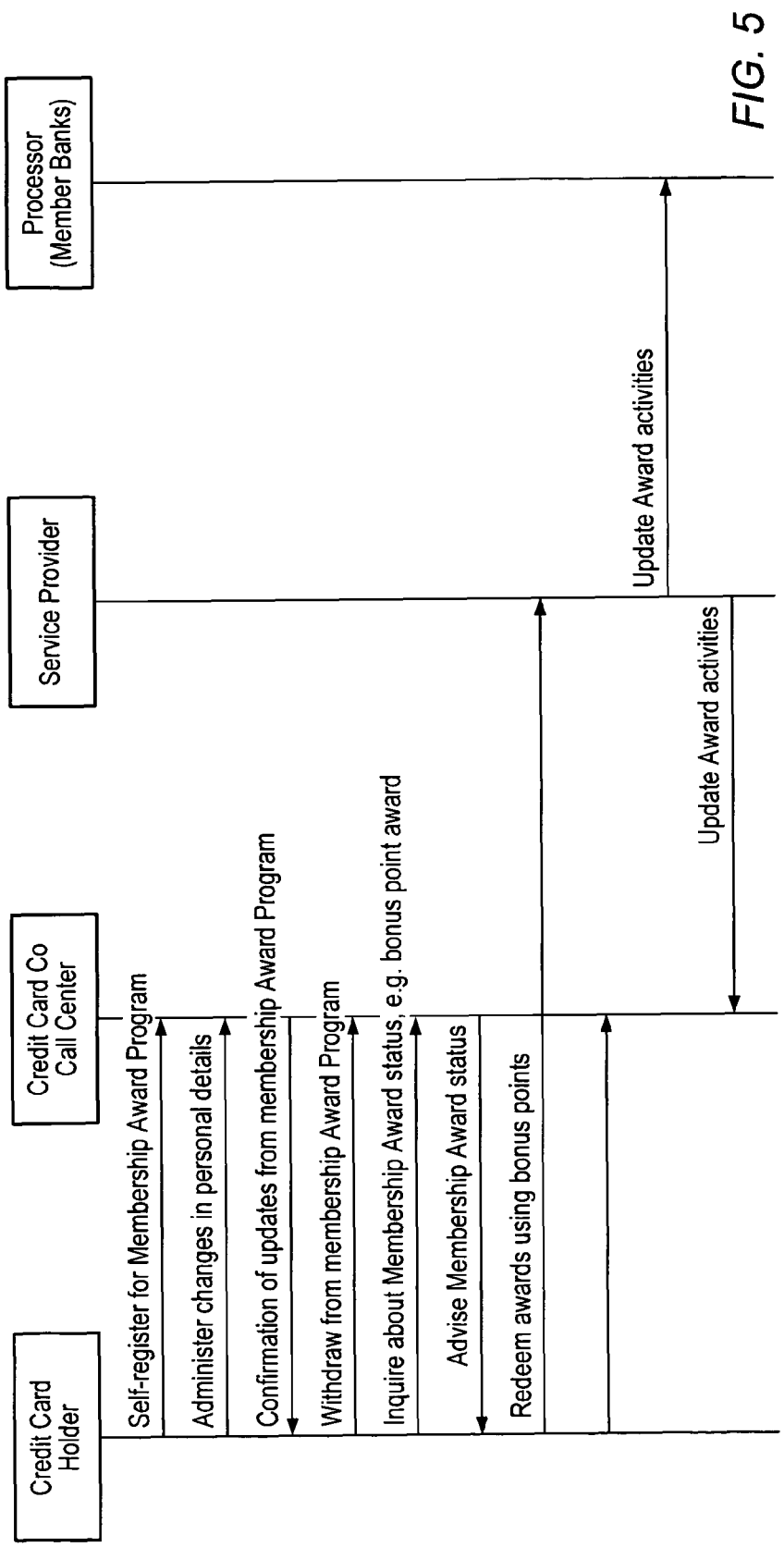
FIG. 5 illustrates an exemplary Membership Award Sequence Diagram according to one embodiment.

FIG. 5 illustrates an exemplary Membership Award Sequence Diagram according to one embodiment. The credit card holder self-registers for the membership award program with the credit card company's call center. This is a typical online service, or a self-registration service exposed as a Web Service from the call center system.

Upon successful registration, the credit card holder can administer changes to personal details, such as address changes. The call center system confirms the update with the credit card holder. Similarly, the credit card holder may withdraw from the membership award program online. The membership administration or update may be a typical online functionality from the call center system, or Web Services provided by the call center system (if the call center system is provided by an Application Service Provider).

If the credit card holder inquires about the current status of membership awards (such as the bonus point balance), the call center system may generate an inquiry request in a SOAP message, where the call center system can aggregate membership award information in real-time from different service providers using Web Services.

Similarly, if the credit card holder wants to redeem an award with earned bonus points, the call center system may generate a redeem award request and send it to the relevant service provider for award redemption. Upon completion of the award redemption, service providers can send SOAP messages to the call center system and/or the Processor to update the membership award activities. The benefit of using Web Services technology here is the ease of integration and interoperability with multiple service providers.

A benefit of using Web Services is to enable interoperability and integration among Processors (in this exemplary scenario, banks), trading partners, and credit card company with reusable data over the existing infrastructure. It also reuses the existing Point of Sales (POS) and merchandise information (thus no duplicate re-entry) for bonus point processing, business intelligence, and award redemption. There is preferably seamless integration with trading partners' legacy and ERP systems. It also enables flexible account and partner service management.

Figure 6:
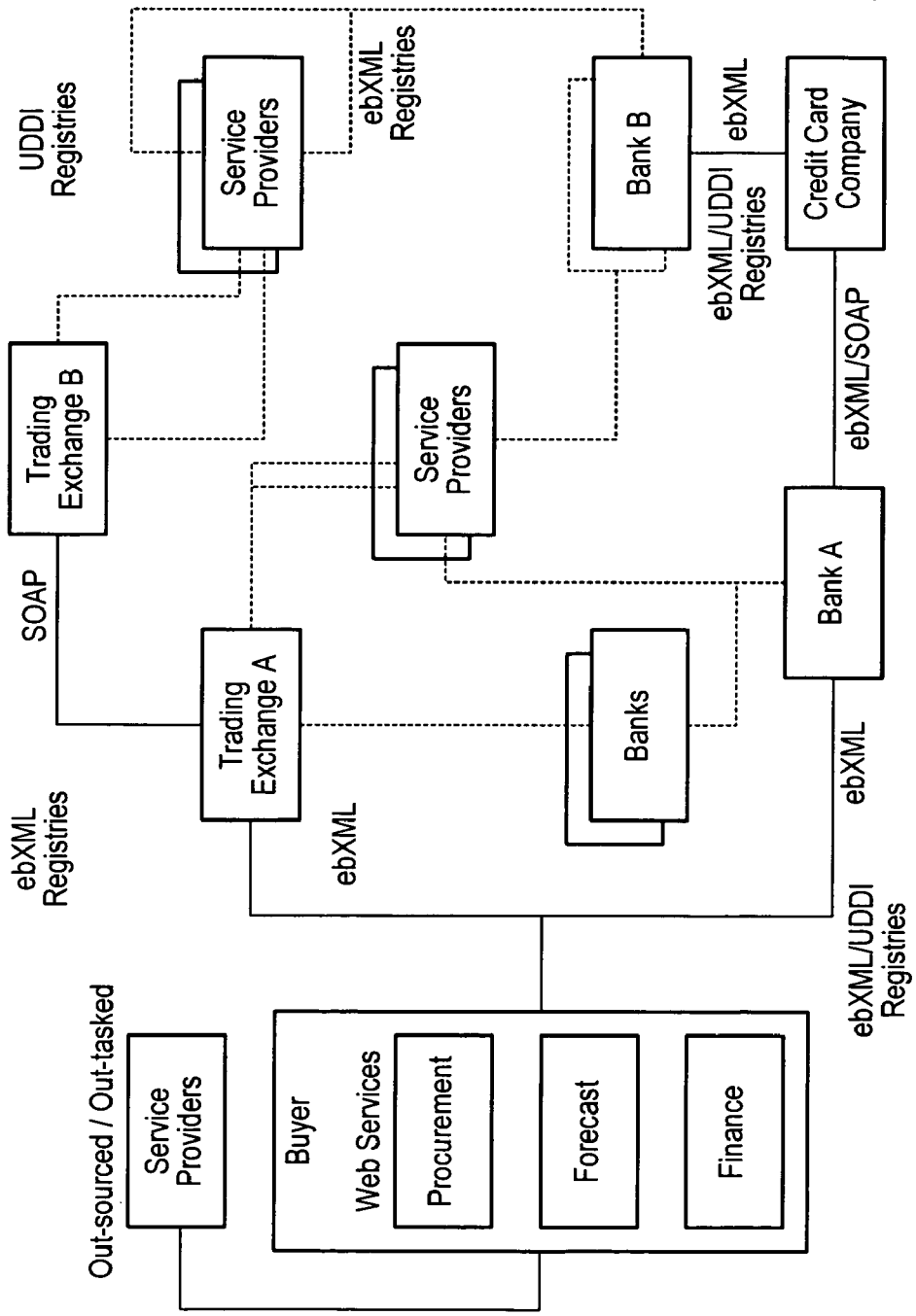
FIG. 6 illustrates an exemplary Business-to-Business Payment Services scenario according to one embodiment.

FIG. 6 illustrates an exemplary Business-to-Business Payment Services scenario according to one embodiment. An objective is to provide a single payment gateway to settle cross-border payments with multiple banks. Web Services technology may enable multiple banks and credit card companies to reuse the same purchase order contents, and may enable interoperability and integration between banks and credit card companies with reusable data over existing infrastructure.

In FIG. 6, an international buyer has a supply chain management system hosted in a data center managed by an outsourcing (or out-tasked) service provider. The buyer is making online purchases via Trading Exchange A and Trading Exchange B with suppliers from different parts of the world. Each Trading Exchange has many service providers (or suppliers) and uses different banks to settle payment upon delivery of goods to the buyers. If credit cards (in this case, B2B corporate cards, not consumer credit cards) are used to purchase merchandise, the buyer's bank (either Bank A or Bank B) will clear payment of the merchandise with the credit card company.

Web Services technology may play a key role in facilitating B2B payment services. In this business scenario, the Trading Exchange may have a UDDI or ebXML service registry that stores service provider information, their merchandise, and their corresponding business services. Buyers may browse the merchandise from the service registry, and make a purchase by invoking an online order request service. This allows a SOAP call to the remote order management system to confirm a trade order or to decline the order if it is out of stock. Upon completion of order execution, the service provider's system may return an order acknowledgement or order delivery in a SOAP message to the buyer's procurement system.

Upon delivery of merchandise, the buyer's back office system (finance module) may settle the payment using a B2B credit card service. The buyer's back office system may also generate a payment instruction in a SOAP message to the credit card issuer bank, which may then clear the payment with the credit card company. As service providers may be using different messaging protocols and data formats, they may use SOAP or ebXML messaging to exchange trading documents or payment instructions. The benefit of using SOAP or ebXML messaging is that they are able to integrate with the buyer's or service providers' back-end systems. Trading documents encapsulated in XML structure within a SOAP message may be transcoded into a format that can be understood by the back-end ERP or legacy systems. Thus, the integration effort may be lower and reusable for other Trading Exchanges, and may not require all service providers to use the same vendor solution or to adopt a proprietary data format.

Figure 7:
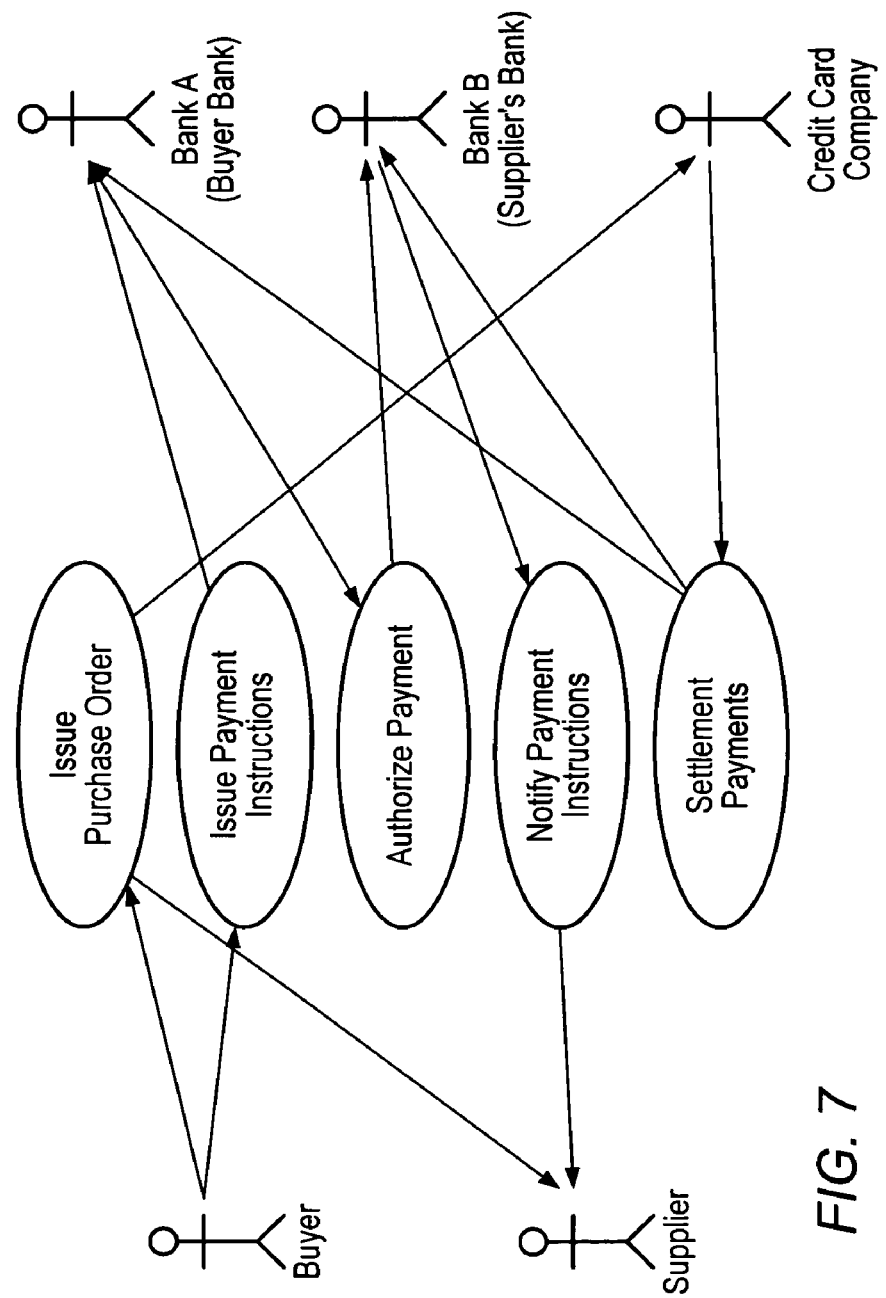
FIG. 7 illustrates business scenarios or use cases for the payment services according to one embodiment.

FIG. 7 illustrates business scenarios or use cases for the payment services according to one embodiment. Upon browsing the service registry (e.g., an online catalog), the buyer may select the merchandise and issue an online purchase order. In this example, the buyer uses a B2B payment service from the credit card company to place an online purchase order. Upon delivery of merchandise, the buyer may issue payment instructions to the buyer's bank (Bank A). The buyer's bank will then authorize the payment and advise the supplier's bank (Bank B). Bank B will then notify the supplier about the payment instructions. Finally, the credit card company will act as a clearing agent for Bank A and Bank B.

Figure 8:
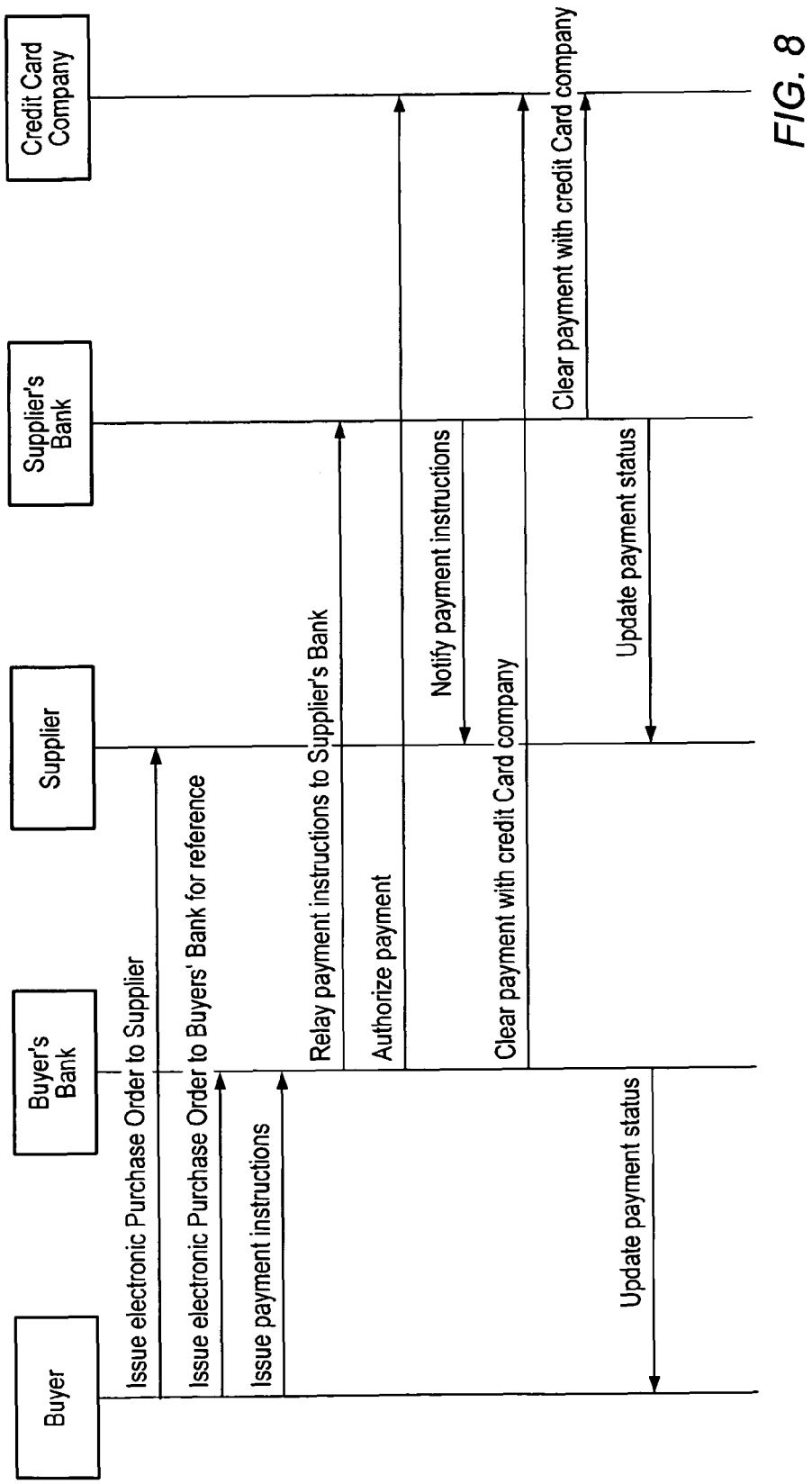
FIG. 8 is a Payment Services Sequence Diagram according to one embodiment.

FIG. 8 is a Payment Services Sequence Diagram according to one embodiment. The buyer issues an electronic purchase order to the supplier in a SOAP message, and copies the purchase order to the buyer's bank for reference. Upon successful delivery of merchandise, the buyer may desire to make payment by issuing payment instructions to the buyer's bank. The buyer's bank in turn relays the payment instructions to the supplier's bank in a SOAP message. Upon receipt of the payment instructions, the buyer's bank may authorize payment with the credit card company, because the buyer is using B2B payment service from the credit card company. The supplier's bank may also notify the supplier about the receipt of payment instructions from the buyer.

The buyer's bank may then initiate clearing the payment with the credit card company and the supplier's bank. Upon completion of clearing the payment, both banks may update the payment status and notify their corresponding banking customers (the buyer and the supplier, respectively). The notification may be in the form of alerts sent to their email addresses or mobile devices in SOAP messages.

A benefit of using Web Services illustrated in this exemplary scenario is to enable high-value cross-border payment using a credit card. As a result, banks may preferably enjoy seamless integration with buyers and suppliers' back office systems using reusable system components over the existing infrastructure.

To establish a business case for Web Services implementation, there is preferably a clearly defined business problem. A Web Services initiative is usually driven by addressing specific business problems or pain points, such as cost reduction or integration issues. Typically, a business case will include a pilot or a small Proof of Concept to illustrate the cost-benefits and to mitigate technology risks. The pilot project may also act as a "lessons learned" experiment before Web Services becomes a technology strategy.

The above two scenarios are examples of potential pilot projects that may be selected for the business case. Factors to consider when determining whether the business scenario is suitable as a pilot project may include one or more of, but are not limited to:

Business Value. The target pilot project preferably has considerable (nontrivial) business value or the potential for positive impact to the company's bottom line cost or revenue. Some pain points can be chosen as the basis for a pilot project if Web Services technology can address them in short-to-medium term.

Thought Leadership. The vendor (or architects within the company) preferably demonstrate thought leadership in Web Services areas. The architects or resources from the vendor (or within the company) preferably also exhibit some working knowledge or perhaps subject matter expertise in the vertical solution (for example, financial services).

Choice of Solution Options. From an IT investment perspective, it may be too risky to bet on a single vendor product. The software vendor solution set preferably interoperates with other Web Services products.

Process. A Web Services architecture framework, methodology, or development tool is preferably available and adapted, and supplemented by a sensitive development methodology. Implementation may be made successful with appropriate, though not excessive, processes.

Service Support. Service support from the vendor is preferably available locally.

To mitigate implementation risks, Web Services (using asynchronous messaging) may provide reusable interfaces using open standards. Web Services solutions implemented according to embodiments of the Web Services architecture described herein may be scalable and available. Web Services-enabled legacy systems and mainframes may be maintained "as-is" (e.g., run-time bindings for XML-RPC), and preferably no system infrastructure needs to be changed. Embodiments of the Web Services architecture may also provide a security framework to address different levels of security threats.

Benefits of implementing Web Services technology may include one or more of, but are not limited to:

Interoperability. Web Services technology is a low-cost technology tool to meet time-to-market requirements. It provides better integration and interoperability for cross-platform systems and legacy back office applications. In contrast, EAI is typically proprietary, and does not easily interoperate with another EAI if they are from different vendors.

Reusability and Maintainability. Business services may be exposed as Web Services. These are preferably highly reusable, and are platform- and vendor-independent. The service calls and interfaces are preferably easy to maintain. In contrast, EAI products and screen-scraping technology are typically platform- and vendor-dependent.

ROI (Return On Investment). Web Services technology may preferably be deployed within weeks or months, with lower cost of integration and maintenance. Return on immediate cost savings can be measured.

Web Services are units of business services, applications, or system functionality that can be accessible over the Web (either Internet, extranet, or intranet). Web Services can enable legacy system functionality to be exposed as a reusable business service (for example, publish a legacy function as an API), without rewriting it. The technology can be used as a cross-system or cross-enterprise integration framework. This may be useful, for example, for outsourced or managed services interoperating with in-house applications.

The enabling technologies for Web Services are built on top of XML. They are also referred to as "XML Web Services." The Web Services technology stack may include a transport layer (for example, SOAP over HTTP), a service description language (for example, WSDL), transaction routing (for example, ebXML Message Service), and service negotiation (for example, ebXML Business Process).

Business services provided by existing system functionality may be exposed to external systems as Web Services. This enables a legacy system to become a service-based or component-based architecture. However, the use of XML does not necessarily mean that the application is Web Services-enabled. SOAP is one of the key technologies for Web Services, but it is not the only technology (ebXML is another).

Applications and business services developed and deployed using Web Services technology may have one or more of, but not limited to, the following characteristics:

Loosely-coupled components. Components are loosely coupled (for example, messages are decoupled from the data transport) and are preferably easy to integrate with other platforms and open standards technology. In other words, changing the implementation of one component does not require changing the rest of the services, which makes configuration and deployment easier to manage. They are also highly reusable.

Self-describing and adapting. Using XML technology for data contents and information exchange enables transactions and information to be self-describing and adaptive, without requiring a prior knowledge of the applications or the interfaces. Web Services technology uses the Web Services Description Language (WSDL) in the XML structure to define the interfaces, network connection, and service end-points. Only the business-level interfaces, rather than the fine-grained, low-level interfaces, need to be exposed. As a result, data is decoupled from process logic, which makes integration easier and cleaner.

Distributed and location-independent. The use of ebXML and UDDI registries enables business services to be location-independent and highly distributed. This also enables non-core (and even core) business services to be out-tasked to a specialized service provider, even in remote areas, at a lower total cost ownership, while maintaining control of ownership and integrating with the core back office systems. The "contracted" functions of the Web Services make use of publicly available standard description languages (such as WSDL). This enables business services to be discovered and bound/unbound from the Web Services registries (for example, ebXML registries).

Dynamic and extensible. As information and transactions are encapsulated in XML, they can be dynamically aggregated, transformed, and processed at real-time. Thus, the business services become more dynamic and easily extensible without rewriting the back-end systems.

Open Standards-based. The architecture framework of Web Services is based on open standards technology such as J2EE™, XML, SOAP, and UDDI, instead of proprietary or vendor-specific technology. This enables a wider choice of vendor solutions and easier integration between components, as well as easy migration to newer technologies later.

There are two major variants of Web Services standards (WSDL-UDDI-SOAP and ebXML). ebXML uses SOAP 1.1 with Attachment as the transport and routing. It provides benefits to Web Services with guaranteed messaging and workflow functionality. With JAX Pack, developers can use both variants of Web Services technology seamlessly.

Figure 9:
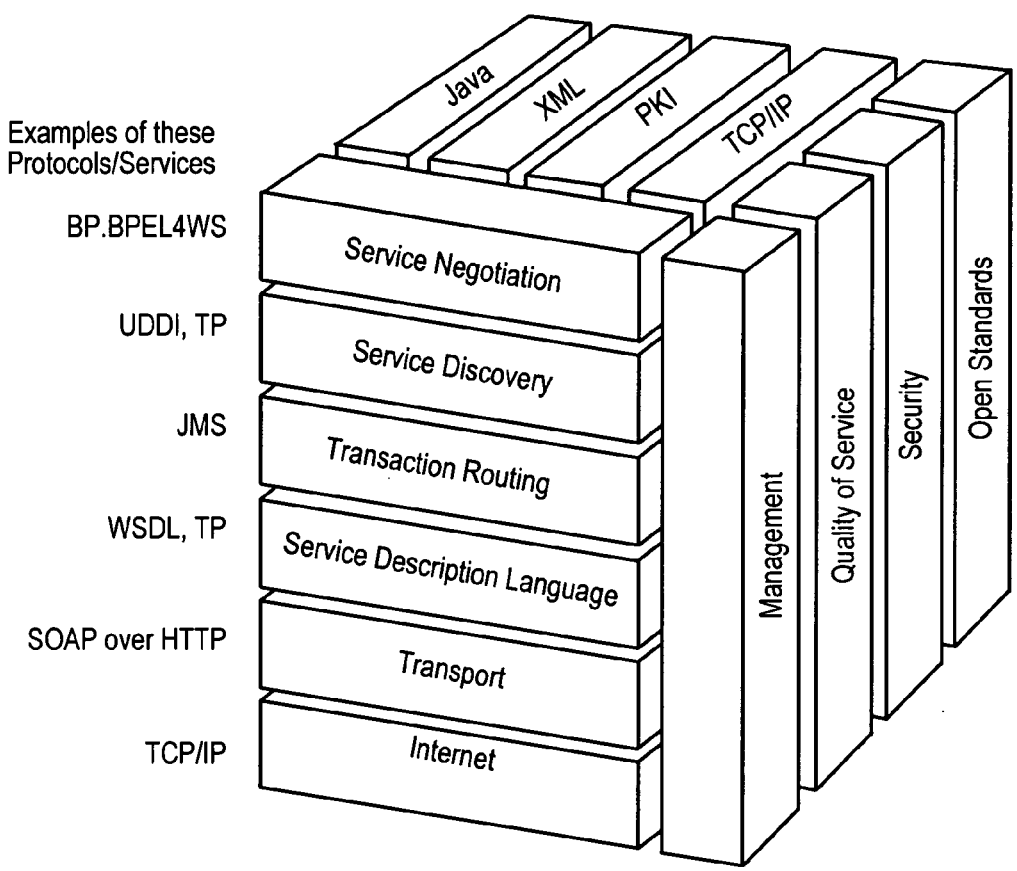
FIG. 9 illustrates different layers of the Web Services technology stack according to one embodiment.

FIG. 9 illustrates different layers of the Web Services technology stack according to one embodiment. The following describes the layers of the technology stack. Note that some embodiments may not include one or more of these layers, or may include additional layers:

Internet. The underlying network for services is the public Internet over TCP/IP.

Transport. The underlying transport layer may be HTTP, SMTP, SOAP over HTTP, and so forth Service Description Language. The business service is described in a common language that depicts the service type and functionality (for example, URI, ports, end-points).

Transaction Routing. Transaction routing of the data contents and transactions to the next business service node, using the lower transport layer with guaranteed (or without guaranteed) message delivery.

Service Discovery. Search and locate a business service from Service Registry nodes.

Service Negotiation. Agreement on what can be exchanged and is interoperable between the service requester and the service provider Service Dimension.

Management. Provisioning of services and monitoring and administration of services.

Quality of Service. Different aspects of "ilities," such as availability and scalability.

Security. Message and transport layer security to support authentication, entitlement, and non-repudiation.

Open Standards. For example, XML

Web Services typically include several key players, including one or more of, but not limited to, service requester, service provider, and service broker. A service registry is a Yellow or White Page that hosts all business services, and the associated service providers. A service registry may be an ebXML or UDDI service registry, for example. A service registry may be used by a service requester to look up relevant business services. A service requester is a consumer (such as the buyers, buying agents, or suppliers) that requests a particular business service, for example after searching (discovering) a service registry. Typically, a service requester will use a standard protocol to discover the services from a service registry (for example, ebXML or UDDI). Once a service is found, the service requester will bind the service via a SOAP Proxy. A service broker is an intermediary or broker that negotiates, aggregates, and provides business services for a particular request on behalf of the service requester. Typically, service brokers are like portals for information and services, or trading exchanges. The business services typically reside in standards-based repositories such as ebXML or UDDI. A service provider may serve as the service broker. A service provider creates and/or provides the business services or system functionality (as a producer role—for example, a supplier is a service provider for retail services to buyers). Business services are published in standard description languages such as WSDL. The service requester accesses the services provided by the service provider with interfaces and descriptions that are available by standard protocols (of course, with appropriate security) provided by the service provider.

Figure 10:
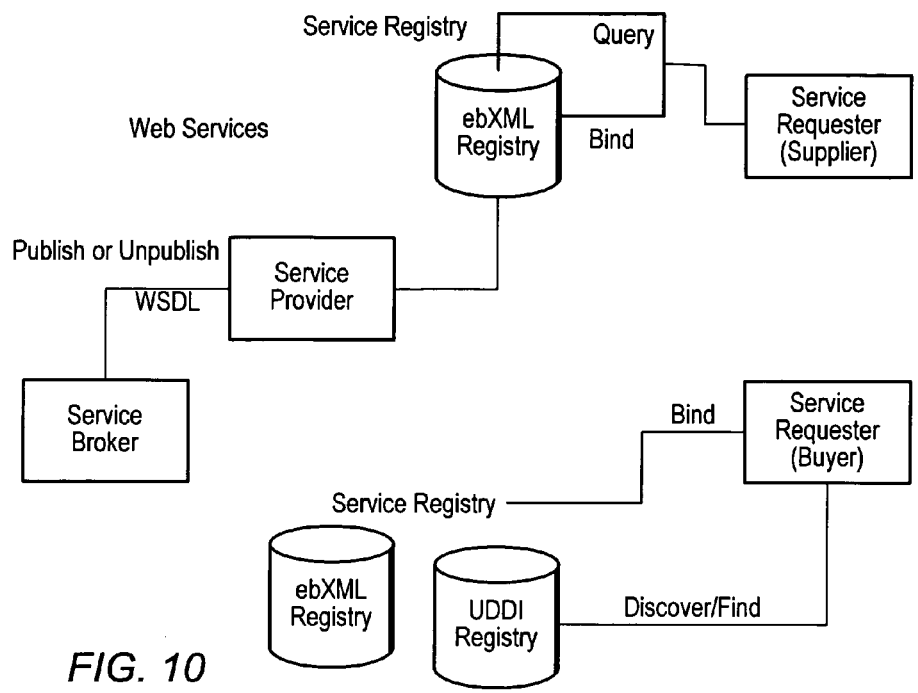
FIG. 10 presents a typical scenario for using Web Services according to one embodiment.

FIG. 10 presents a typical scenario for using Web Services according to one embodiment. The Service Requesters (in this case, Supplier and Buyer) are consumers of the business services. The Supplier is a client of the Service Provider. The Buyer is a client of the Service Broker. The Service Broker acts as an intermediary for different business services provided by the Service Provider. The Service Broker publishes their business services in a private Service Registry (both ebXML and UDDI Registries). The Service Provider also publishes their business services (using, for example, WSDL) in a private ebXML Service Registry and to the Service Broker.

The Buyer is interested in finding a specific business product from the Service Broker. The Service Broker also stores the business services provided by the Service Provider. During service discovery, the Buyer finds an appropriate business service from the Supplier via the Service Broker's ebXML Service Registry. Then the Buyer binds and invokes the business service. Actions in a typical Web Services scenario may include one or more of, but are not limited to:

Discover/Find. Searching for a particular business service, usually by a standard reference (for example, UN/SPSC number).

Query. Inquiring about the service, using a predefined set of parameters (such as URI or end-point).

Bind. Run-time binding of the service name, the end-point, and the actual URL; this is like connecting the phone line after the actual phone number is dialed.

Publish. Publishing the business service to the Service Registry using a standard interface specification (such as WSDL).

Unpublish. Unpublishing the business service to the Service Registry using a standard interface specification (such as WSDL).

WSDL is the standard interface definition depicting the business service provided (such as the port or URI that can access the business service). The standard interface also describes the message content (such as message name and data type), operation name (such as what method or action can be operated on the message content), and binding name (what data transport is used, such as SOAP over HTTP using Remote Procedure Call). This provides all information necessary for browsing business services from a user perspective and for developing system interfaces from a developer or system perspective.

Figure 11:
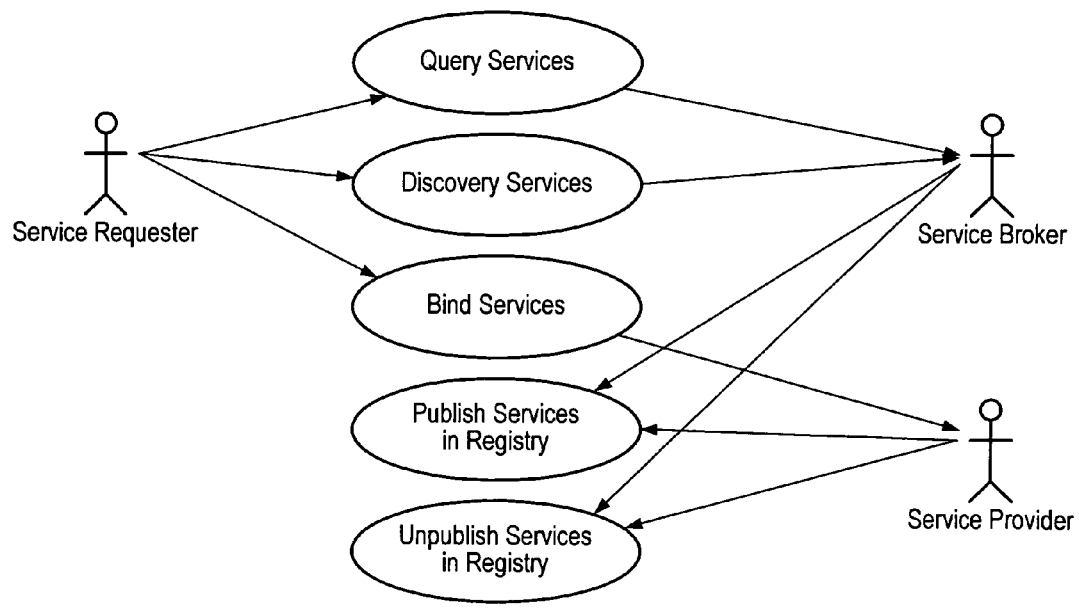
FIG. 11 illustrates Web Services use cases according to one embodiment.
Figure 12:
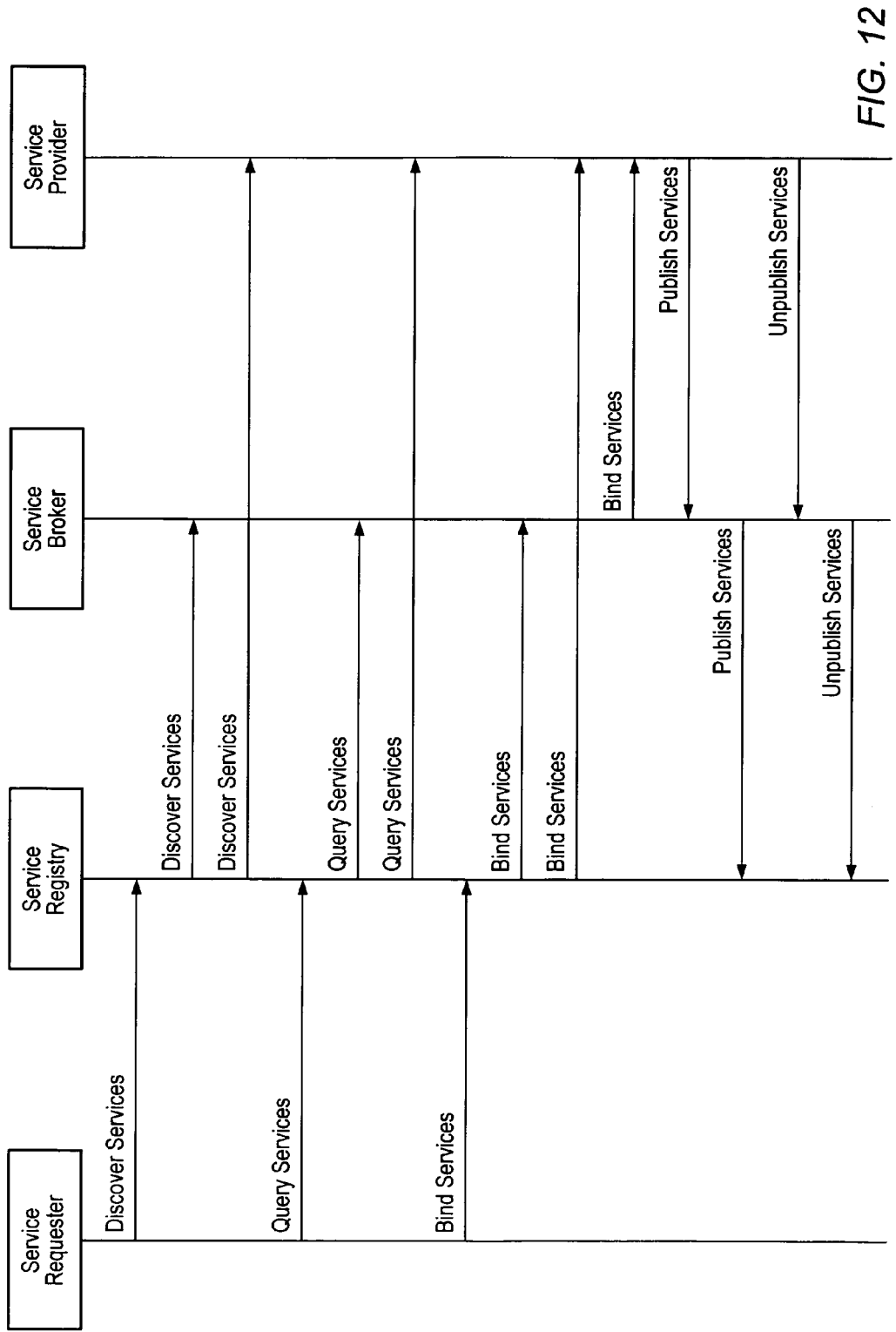
FIG. 12 is a Web Services sequence diagram according to one embodiment.

FIGS. 11 and 12 are in UML notation and describe the use case and the associated sequence diagram, respectively. FIG. 11 illustrates business scenarios or use cases about how Web Services are used according to one embodiment. A Service Requester wants to browse through a Service Registry and inquire (or query) about different business services that interest her. Once the Service Requester discovers the appropriate business services that it would like to use (or invoke), the Service Registry will bind the services with the remote Service Provider. Service Brokers and Service Providers need to pre-register with the Service Registry owner first. Upon successful registration, they can publish or unpublish their business services, which are usually published to the Service Registry.

FIG. 12 is a Web Services sequence diagram according to one embodiment. In FIG. 12, the Service Requester browses through a Service Registry, which includes different taxonomies of Service Brokers' or Service Providers' business organizations and their business services. Browsing through and looking up different taxonomies may initiate API calls such as find_business and find_service UDDI API calls (for UDDI Service Registry), or OrganizationQuery or ServiceQuery ebXML registry calls (for ebXML Service Registry). This is the process of discovering services.

Once the Service Requester has selected a specific business organization (either Service Broker or Service Provider), the Service Registry client may issue a query API to the Service Registry. If this is a UDDI Service Registry, it will be a get_businessDetail or get_serviceDetail UDDI API. If this is an ebXML Service Registry, the previous OrganizationQuery or ServiceQuery would have returned the business or service details in the registry query result already. The Service Registry may then return the organization information (such as business name, address, and contact person) or business service details.

If the Service Requester wants to use (or invoke) the business service immediately, the Service Registry client can issue a find binding service call to locate the URI (Universal Resource Identifier, or the service endpoint URL describing the Service Provider's service) specific to the business organization or service. Once the URI (or WSDL document) is retrieved, the Service Requester can initiate a SOAP call, based on the port type, the operation names, and the service endpoint URL or URI. The service endpoint URL refers to the business services that may, for example, be denoted by URLs, and are hosted by the Service Brokers or the Service Providers.

If Service Providers or Service Brokers desire or need to publish a new business service to the Service Registry, or to update an existing business service, they may use several APIs to publish the business organization, business service details, and the service endpoint URL. APIs available for UDDI Service Registry may include, but are not limited to, save_business, save_service, and save_binding. For ebXML Service Registry, the Service Registry may need to specify the business organization and service details in the SubmitObject requests. Similarly, if Service Providers or Service Brokers want to unpublish (remove business information) from the Service Registry, they may use the same set of APIs.

Web Services technology enables easier interoperability between systems to aggregate information. It is a technology enabler for consolidating services (for example, UDDI Service Registry) and customer information (such as wealth management/eCRM). It is designed to enable developers to develop and deploy services quicker, compared with traditional technology tools. Besides, business services can be exposed to be easily deployable, reusable, and independent of the underlying platform.

Web Services technology is also an alternative to integrating with legacy systems without rewriting them. It resolves the firewall-unfriendly interoperability of RPC-based applications (for example, tight firewall policies often block RMI and RPC-based internal applications from external Internet access). Use of XML data transformation and message exchanges allows a simpler architecture (for example, consolidating interfaces and services), which may result in lower operating cost.

Service Registries

A Service Registry may be used in the following contexts:

Private Service Registry. For B2B transactions, business partners and consumers can be brought together in a closed private community (for example, stored value card, reward card). The private community environment also allows a more secure business environment for member services or credit card transactions. Customers and business partners need to be pre-registered in the private community. The private community provides customized member services and benefits, and it can be a tool for increasing enterprise product usage and services.

Internal Service Directory. Service Registry can be implemented for Business-to Employee use. Employees can look up different internal services, ranging from HR, staff travel, or homegrown applications. These internal services may be legacy mainframe systems or out-tasked services provided by Data Center services.

Developer Resources Directory. Utilities, common APIs, or libraries can be stored in the Service Registry, which functions as a "developer portal." Developer resources can be looked up and retrieved by WSDLs.

Considerations when selecting a specific Service Registry implementation may include one or more of, but are not limited to:

Back-end Implementation. Some Service Registry implementations may be proprietary and not portable to other platforms. However, they may be designed to optimize a specific database engine for faster performance. There may be benefits to implementing the UDDI Service Registry using Directory Server. Because the UDDI information model (tModel) is hierarchical, developers may leverage on Directory Server's replication features for easy master-slave replication and synchronization, as well as reuse the existing security and deployment policies. ebXML Service Registry implementation requires handling complex information models (for example, complex data type, object relationship) and can reside on different database platforms. However, hierarchical LDAP implementation may not be desirable for ebXML implementation.

Search Engine. Service Registry vendors may implement the search engine differently with their homegrown search algorithm. Some of them just do an exact match of the service key entries, while others may be able to handle complex keyword search (for example, a partial keyword in one of the tModel elements) with a combination of logical operators (such as AND, OR).

User Experience. Some Registry Browsers or Service Registry administration front-ends are easier and more intuitive to use. For example, some front-ends may require many data entry screens before administrators can complete a single business service record. This would not be a desirable experience for the user.

Registry Provider. Most Service Registries have different APIs (or servlets) to access their registry contents. If Java API for Registries (JAXR) is used, the same Java API may be used with different registry properties (a property file stores the specific registry servlet or URIs).

Although the two variants of Service Registry (UDDI and ebXML) provide similar functionality, there are differences in what they provide. These two Service Registries are not necessarily exclusive, as they have different value propositions for different business and technical requirements. Comparisons of these two Service Registries may include, but are not limited to:

Information Model. UDDI focuses on publishing and discovering businesses (for example, NAICS codes), services, and technical specifications (such as WSDL). ebXML focuses on Organization and Registry Objects (such as service description, product catalogs, standards, XML Schema, WSDL documents, movies, and audios).

Relationship Support. A Service Registry allows the grouping of different business organizations under a specific classification taxonomy. In some classification taxonomies, two organizations can be grouped together under the same package or bundle of content, as in a parent-child relationship or holding company group subsidiary relationship. Currently, UDDI supports three classification taxonomies, but not all classification taxonomies support parent-child relationship. UDDI requires a change to the specification in order to add a new relationship. ebXML supports a general-purpose ability to define arbitrary relationships via UML modeling (for example, grouping Registry Object to one or multiple packages).

Classification Support. The UDDI Service Registry supports three classification taxonomies including NAICS, UN/SPSC, and ISO 3166 Geography (such as country codes). ebXML can download external classification taxonomies or create new classification taxonomies.

Query Support. The UDDI Service Registry provides querying the business organization, service name, or tModel by name, identity, and classification category. Boolean predicate or clause support (such as AND, OR) within the queries is not supported. The ebXML Service Registry provides a more sophisticated query capability with a general-purpose filter query and an advanced SQL query mechanism for ad hoc queries.

Registry Security. The UDDI Service Registry supports a user ID and a password as credentials. It protects data confidentiality and integrity via HTTPS and local access control policy (depending on the back-end implementation, such as RDBMS). However, it does not support authenticity of contents (for example, it may not really be XXX who submits the contents even though the submitter declares its identity as XXX) or an audit trail. The ebXML Service Registry security is dependent on digital certificates, which address the requirements of authenticity of contents, data confidentiality, and integrity using encryption and a digital signature. An audit trail is implemented using AuditableEvent in the ebXML Service Registry.

Registry Interface. The UDDI Service Registry uses SOAP 1.1 over HTTP and HTTPs to access the registry contents. The ebXML Service Registry supports both ebXML Messaging Service (that is, SOAP 1.1 with Attachment over HTTP) and SOAP/HTTP binding. Now, the JAXR protocol provides a standardized interface to access both the UDDI and ebXML Service Registries.

Distributed Registry Support. The UDDI Service Registry supports a single global (centralized) Service Registry model and the replication capability is dependent on the back-end implementation (such as RDBMS, Directory Server). The ebXML Service Registry 2.0 and 3.0 support a federated registries (distributed) model.

Web Services Security

Most Web Services security has focused on SOAP message security. As the data contents in the SOAP message are decoupled from the data transport layer, the transport layer security is often overlooked. End-to-end Web Services security should support Authentication, Entitlement (authority and access control), Data and transaction integrity, Confidentiality, Auditing, and non-repudiation. A broader view of the Web Services security may cover one or more of, but is not limited to:

SOAP message security (for example, DSIG, WS-security)
Network/data transport security (for example, use of VPN)
Transactional security (such as data encryption, authentication, and access control [SAML])
Service Registry security (such as UDDI registry, WSDL in clear text)
Client-side security (for example, a UDDI browser)
Core security services and the integration with XML Web Services (for example, XML Key Management Specification [XKMS])

Figure 13:
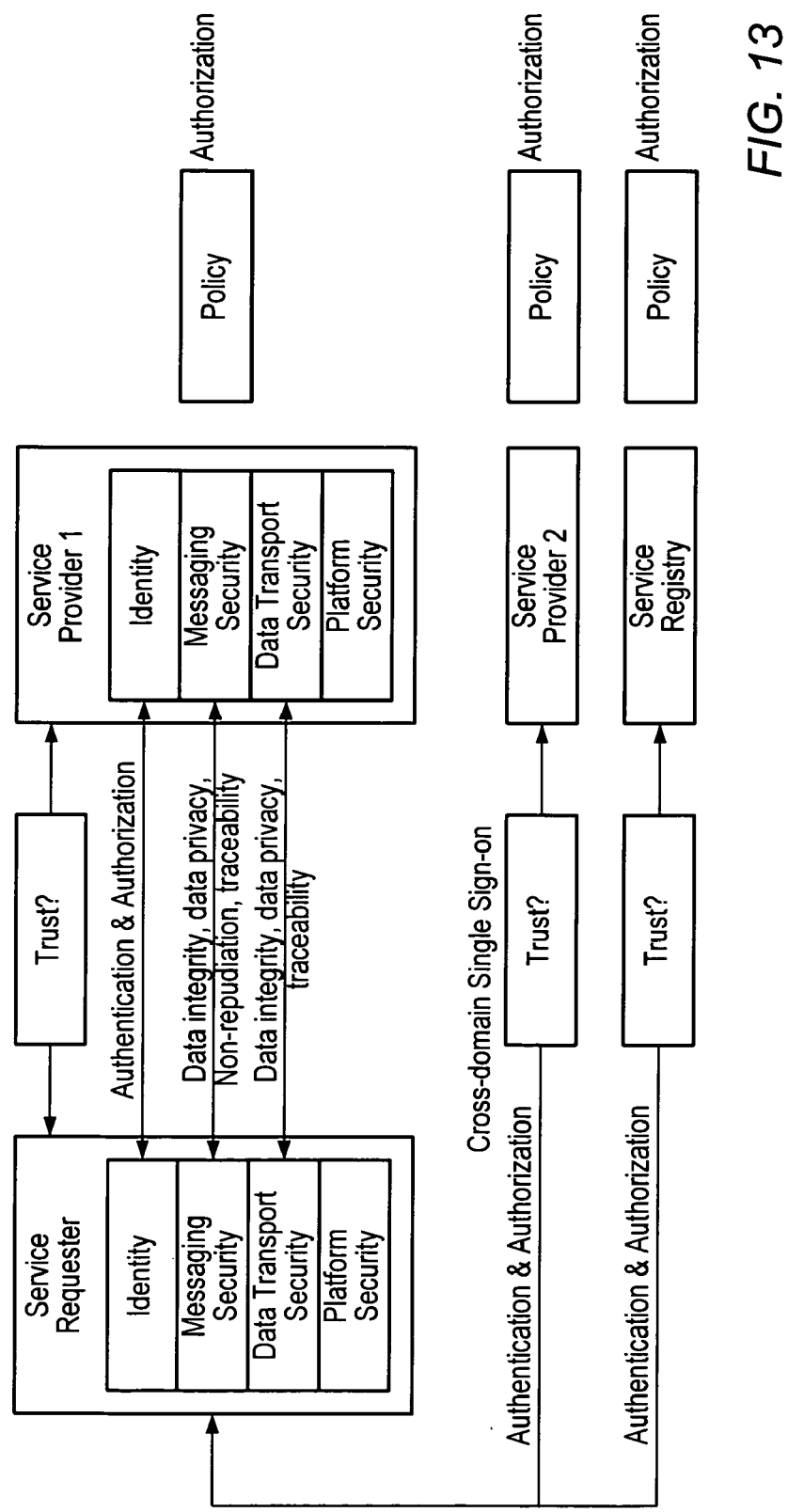
FIG. 13 illustrates different areas of Web Services security according to one embodiment.

FIG. 13 illustrates different areas of Web Services security according to one embodiment. These areas may need to be considered during the design and implementation as a complete picture. Prior art security standards tend to address one specific area, and the challenge of the architect is to put them into the right context. The scope of Web Services security covers message security (for example, WS-Security protects SOAP messages), data transport security (for example, HTTPs and data encryption secure the data transport layer), and platform security (for example, Solaris platform security hardening and intrusion detection system protect the platform). These are valid security mechanisms to support data integrity, data privacy, non-repudiation, and traceability requirements. End-to-end Web Services security also preferably ensures that the identity of both the Service Requester and that the Service Provider is valid and trustable (authentication and authorization requirements). Web Services security may involve the use of Public Key Infrastructure, XKMS, Liberty, and SAML. This may be particularly important if there is a requirement to perform a cross-domain single sign-on across multiple service providers. Examples of security standards for Web Services may include, but are not limited to:

XML Key Management Specification (XKMS). XKMS is intended for requesting authentication of a specific user. It specifies different key storage and management tiers. These APIs defines XML messages that let applications register key pairs, locate keys for later use, and validate information associated with a key. VeriSign has built the first implementation of this Trust Web Service.

SAML. This is initiated mainly by Netegrity and other vendors. The objective is to provide a vendor-neutral way to retrieve the access profile from a Policy Server. It is intended for Single Sign-on across enterprises.

WS-Security. This is a joint proposal from Microsoft, IBM, and VeriSign to converge different security token technologies (such as Kerberos, X.509v3 digital certificates) for Web Services security. It supersedes previous Web Services security standards proposed by Microsoft and IBM—namely, SOAP-SEC, WS-Security.

SOAP and ebXML

Web Services technology is intended to be platform- and vendor-neutral. It is expected that this technology be highly flexible for interoperability and integration. SOAP and ebXML standards are used for different reasons. This can be understood in the context of their underlying design principles and value proposition.

The initial design of SOAP does not cater to non-XML contents such as EDI transactions. SOAP 1.1 with Attachment is a major breakthrough; it uses MIME to embed binary objects. The original design principles behind SOAP also support non-HTTP transport, though it has not been implemented at all. The security design of SOAP is highly volatile and weak at this stage.

ebXML can be used to exchange XML contents (incorporating any XML document in the SOAP Body) and non-XML contents (embedding ANSI X12 transactions as attachments). The latter is the mechanism by which ebXML supports EDI documents. It now uses SOAP as the transport layer. ebXML differentiates from SOAP/UDDI by introducing business processes and JMS binding. It uses UML to model business processes. The business process and information models will help integrate with the business entities' back office applications. JMS binding provides a secure and reliable transport mechanism over HTTP.

Building a Web Services Solution

Figure 14:
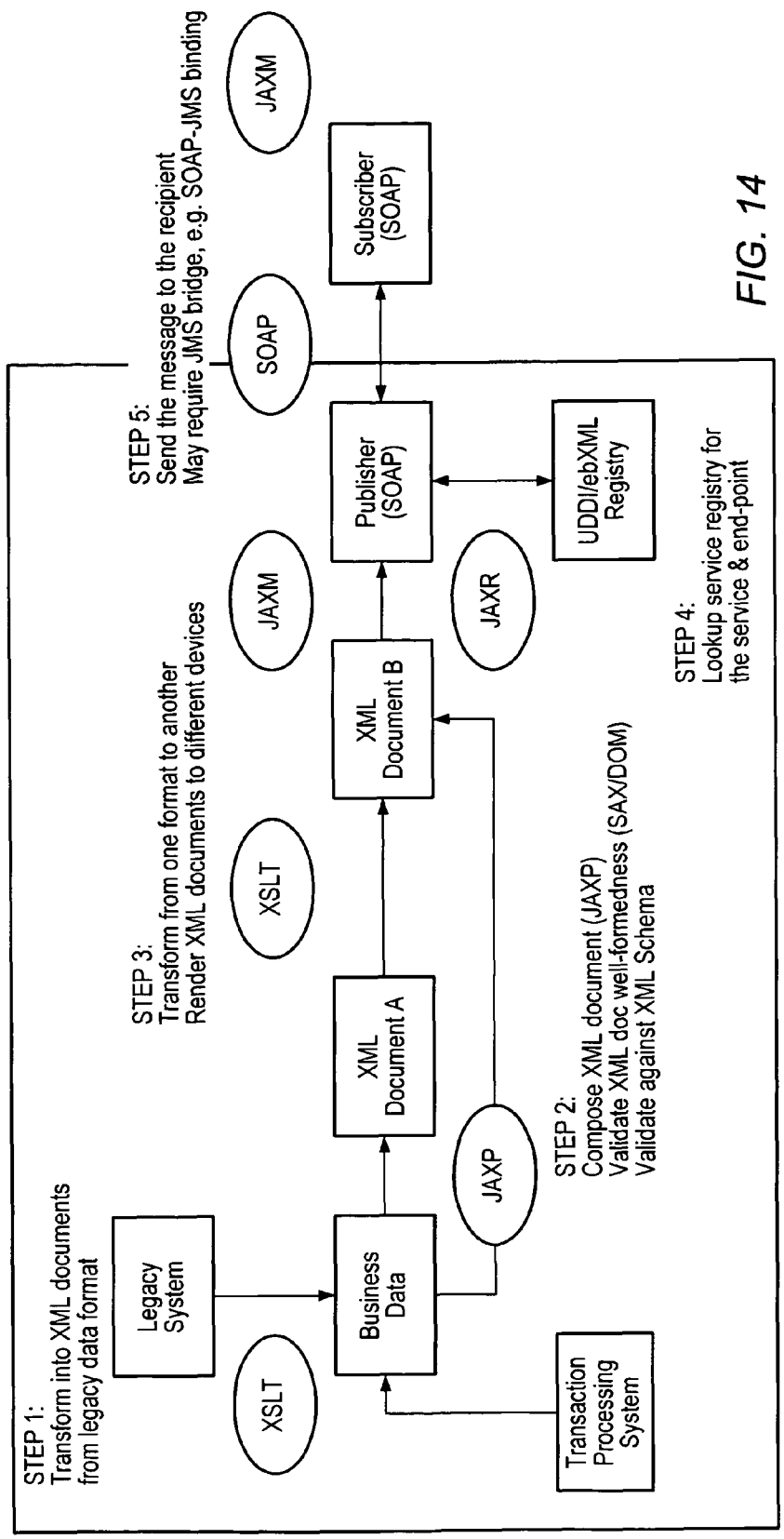
FIG. 14 illustrates a process for bringing together the various technologies described so far in order to build a workable Web Services solution according to one embodiment.

FIG. 14 illustrates a process for bringing together the various technologies described so far in order to build a workable Web Services solution according to one embodiment. In FIG. 14:

1. Select a business service, which may be an existing Transaction Processing system or legacy system functionality. There are several approaches to XML-enable them, such as using an XML adapter or legacy system XML connector, writing JAXP codes, or using SOAP administration to map the data fields.
2. Compose (or transform) XML documents; validate their well-formedness using SAX or DOM with XML Schema.
3. If necessary, transform one format to another format or XML variant or render XML documents into different devices for multichannels. JAX and XSLT may be the appropriate technologies.
4. The client looks up the UDDI/ebXML Service Registry for the business service, service key, and end-points using JAXR.
5. Any transaction request or reply can be wrapped in a SOAP message to the service provider using JAXM. JAXM supports both SOAP and ebXML Messaging Services.

Web Services-Enabling Applications

Figure 15:
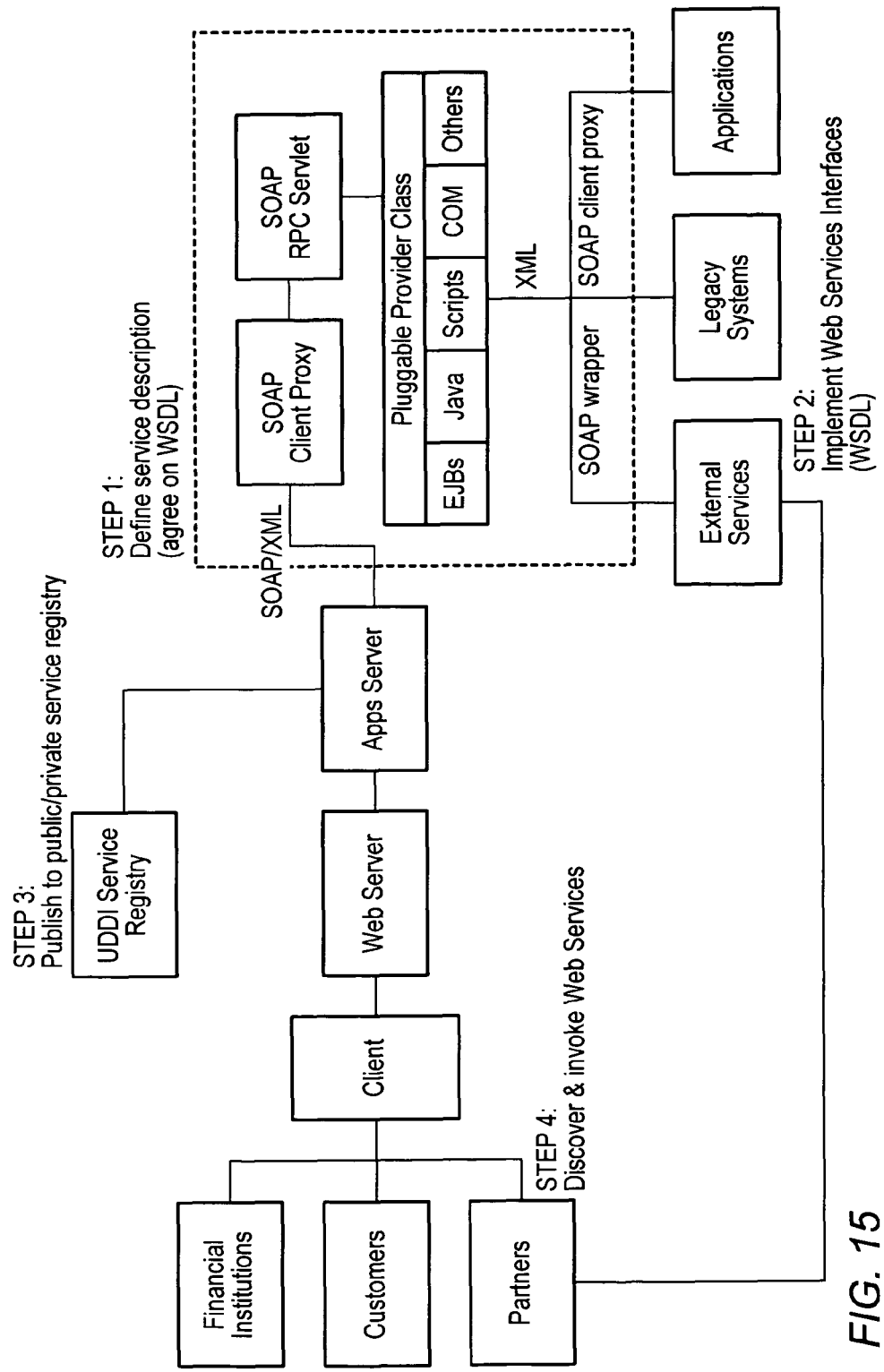
FIG. 15 illustrates a process for Web Services-enabling an application or applications according to one embodiment.

FIG. 15 illustrates a process for Web Services-enabling an application or applications according to one embodiment. The process in FIG. 15 may include, but are not limited to:
1. Define Service Description
   Agree on the WSDL with trading partners or adopt an industry specific WSDL.
   Define service description, such as define WSDL (by hand or with a tool), generate WSDL using tools such as WSTK or AXIS java2wsdl, and place WSDL in a SOAP server and UDDI registry by deploying it.
2. Implement WSDL
   Determine a programming language (such as Java, C#) and the access method (XML document or XML-RPC).
   Identify the end-point, access method, and binding method from the WSDL.
   Write a client by hand-coding with an editor, using a developer workbench (IDE) environment, performing simple testing in testing environment, or with testing the SOAP server.
3. Publish to Registry
   Upon successful testing of the WSDL, the service, and client programs, publish the WSDL to the relevant UDDI/ebXML registry.
   Depending on the nature, the registry may be a public UDDI node or a private node.
   For the UDDI registry, exploit JAXR/UDDI4J to publish.
4. Invoke Web Services
   Discover/look up relevant services from the UDDI/ebXML Service Registry.
   Invoke the Web Services from a UDDI browser, a UDDI browser plug-in for Web browsers, host-to-host, or a rich client.

Figure 16:
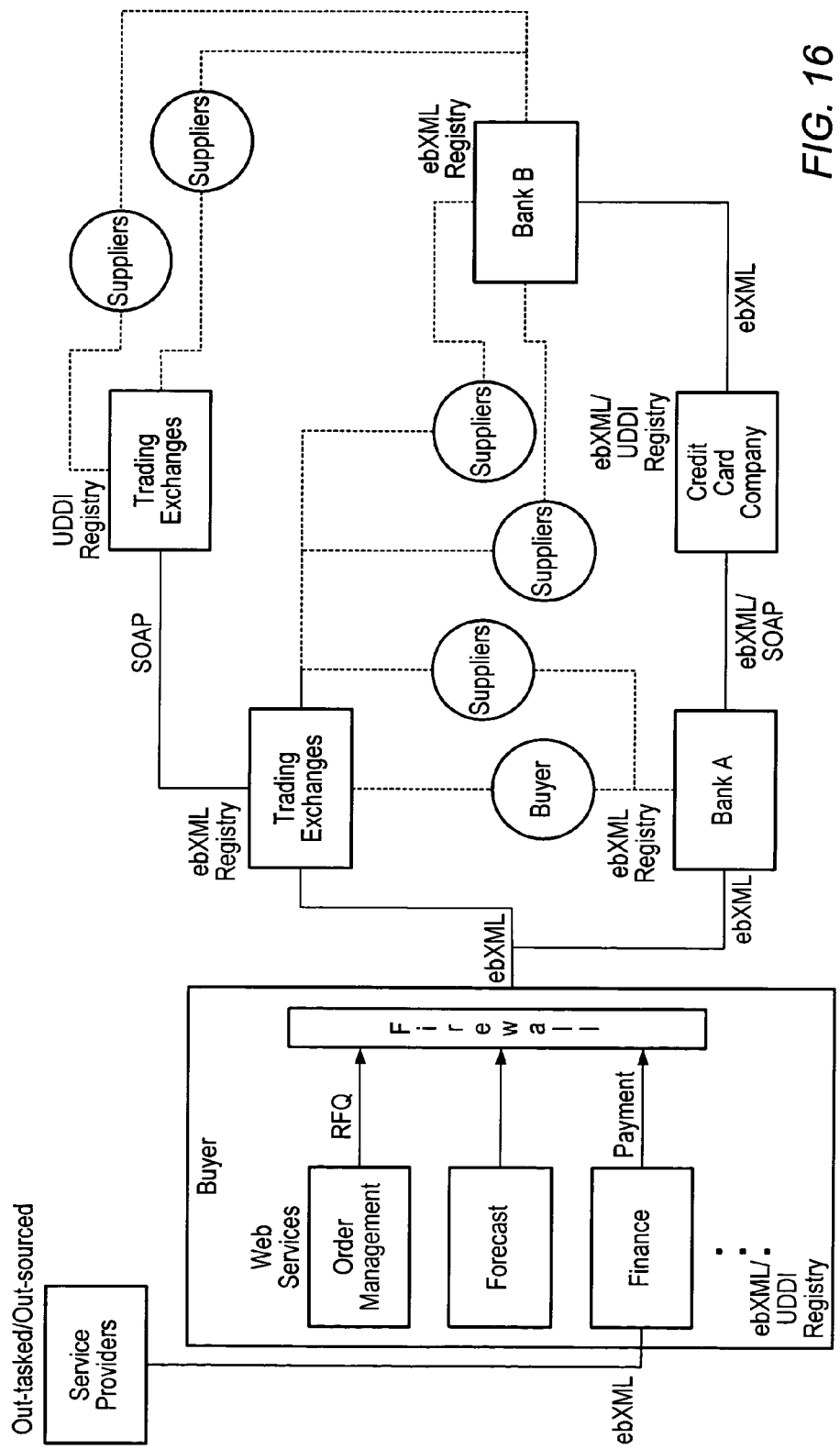
FIG. 16 illustrates an exemplary Web Services scenario according to one embodiment.

FIG. 16 illustrates an exemplary Web Services scenario according to one embodiment. The Buyer is running Web Services internally for order management, production forecast, and finance applications. The finance applications are out-tasked to an external financial services service provider using Web Services. The Buyer places the Request for Quote and Purchase Orders with a Trading Exchange (in ebXML/Web Services), which in turn trades with another Trading Exchange (in SOAP/Web Services). The Buyer also uses B2B payment Web Services from Bank A and credit card/customer support Web Services from the Credit Card Company. Both of them use ebXML-based Web Services. The Credit Card Company also provides credit card Web Services to Bank A using ebXML.

An objective of developing a Web Services solution in this exemplary scenario is to provide a single payment gateway in order to settle cross-border payments with multiple banks. Challenges that may be faced may include one or more of, but are not limited to:
   Buyers have many Electronic Banking systems; cannot use one single front-end to settle payments with multiple banks.
   It cannot support cross-border payment.
   There is no agreeable data format for exchanges, buyers, suppliers, banks, or credit card companies to share and reuse.

Web Services technology may enable multiple banks and credit card companies to reuse the same purchase order contents. Web Services technology may enable interoperability and integration between banks and credit card companies with reusable data over the existing infrastructure.

Benefits of a Web Services solution for this exemplary scenario may include one or more of, but are not limited to:
   Enables high-value cross-border payment using credit cards.
   Seamless integration with buyers and suppliers' back office systems using reusable system components over existing infrastructure.
   Better flexibility to their customers and trading partners.
   Easier integration with multiple trading partners, trading exchanges, and business partners (for example, banks).
   Integration with out-sourced or out-tasked business services.
   Platform-independent.
   Support of open standards.

Simple Web Services refer to simple synchronous Web Services calls (such as JAX-RPC) that invoke business functionality remotely. They do not require complex workflow or any additional dependency in order to complete the service call. In simple Web Services, the service requester will use XML, SOAP, WSDL, and UDDI to locate the Web Services via the Web. The client application will discover how to invoke the Web Services and then submit the request. The Web Services server will process the request and return the result to the requester.

Complex Web Services refer to sophisticated business functionality that requires additional steps or workflow, such as multilevel payment authorization, matching outstanding credit balance and payment amounts, and so forth. They are likely to be in asynchronous messages (or document-based Web Services) and require business process orchestration from multiple trading partners or systems. In some complex Web Services, there will be multiparty and long-running transaction support, collaboration and business process management, transactional integrity, and transactional security (such as non-repudiation and digital signature), as well as context sensitivity (ordering of steps and described conversations).

Identifying and Selecting a Pilot

It may be preferable to identify and select a pilot before adopting a Web Services strategy. Suggestions for identifying and selecting a pilot may include one or more of, but are not limited to:
   Business/Operational
      Processes that require intensive manual or semi-manual procedures or duplicate data entries.
      Processes that take a long time (such as several days) because systems are not interconnected.
      Meaningful and simple (reasonably sophisticated, not overcomplicated) processes are required.

ROI or immediate benefits can be realized within a few months.

Management sponsorship for the pilot.

Technology

Applications that involve more than one external party.

Heterogeneous platform interoperability required.

Similar interfaces that can be refactored into reusable components.

Viability—achievable within two-three months; do not pick any system candidates that require heavy IT investment, or large infrastructural changes.

In one embodiment, an approach to implementing Web Services may include one or more of, but is not limited to:

Identify the business services for the Web Services candidate.

Define the Web Services architecture for the candidate. Sun's ONE™ framework is an exemplary Web Services architecture that supports open standards and easy interoperability.

Integrate the Web Services with the business model and business processes.

Integrate the Web Services with any back office systems, if necessary.

Start a pilot.

Interoperate with other Web Services and e-Marketplaces.

Factors for success when implementing Web Services may include one or more of, but are not limited to:

Focused Business and Clear Vision. It may be preferable to have a clear vision and a focused business. Non-core business services may be good candidates for out-tasking as Web Services, which may result in better economy of scale.

Right Resources and Expertise. The right personnel, an appropriate combination of disciplined and creative staff, may be critical to success. Subject matter experts related to e-Marketplaces and Web Services may be introduced from vendors such as Sun Professional Services.

Limited Scope. Do not be too aggressive in implementing too many business services at one time. Start small and grow.

In one embodiment, a reasonably rich set of functionality that can be implemented within three to six months may be selected. The candidate should be able to demonstrate the benefits immediately. A Total Cost of Ownership (TCO) model is preferably developed. Involve Web Services vendors for technology skill transfer, for example:

Customize a Web Services training workshop using the pilot requirements.

Assess the Web Services solution architecture.

It may be preferable to not be too ambitious with too many dependencies or items that require longer lead-time (for example, SOAP-enabling a mainframe platform). It may be preferable to not start implementation without support from senior management. It may be preferable to not start a pilot using a mission-critical functionality. It may be preferable to not involve a big team in the pilot. Start with a small team.

Exemplary applications for Web Services solutions may include, but are not limited to:

Credit card information for partners, merchants, third-party bill presenters, or aggregators—This reduces individual customized integration efforts and provides timely reporting of card information.

Instant credit standings check—A merchant or Service Provider submits a service request for credit checking to the bank's Web Services. A response is made from the bank's Web Services in real time to reduce business exposure to risks.

Customer support for new credit card applications—The customer support center may be out-tasked to a third party. New customers can enter the Web Services to apply for a new credit card.

B2B payment services—Purchase Orders and payment instructions can be exchanged between merchants or B2B exchanges and the banks.

Web Services Architecture

Embodiments of the Web Services architecture may provide a framework and reference architecture for building scalable and reliable Web Services. Embodiments may provide an architecture framework including, but not limited to, reusable components, principles, and design patterns, for building Web Services solutions. Embodiments may provide a framework to systematically define components that can support different levels of Quality of Services ("ilities" based on individual requirements). In embodiments, a comprehensive architecture framework may help when selecting the appropriate tools to enhance productivity during the development and deployment life cycle (for example, Web Services load testing). Embodiments may include Web Services design patterns that may be used for delivering Quality of Services.

Embodiments of the Web Services architecture may enable developers to build reusable components, distributed services, and sharable systems infrastructure (for example, server, storage, network, performance, and availability management). This may preferably improve programmer productivity (speed), compress development cycles (speed), reduce infrastructure and support costs (cost), mitigate risk through use of pretested components (quality), and enhance Quality of Services, such as scalability and availability (quality).

In this document, a reference architecture may include, but is not limited to, the following characteristics:

Underlying Architecture Framework that provides a structure (meta-architecture) that defines the logical and physical components that constitute the business services, and the processes used to develop it.

Architectural Principles—rules and guidelines that help design and govern scalable, reliable architecture.

Design Patterns—models that tell when and what technology to use.

Supporting Software Tools—a reference architecture is not a laboratory product. It should have supporting commercial implementations and off-the-shelf vendor products.

Architecture Framework

A meta-architecture abstracts what the architecture components should have, so that the architecture can be easily extended or simplified based on business needs. Meta-architecture is to architecture as grammar is to a language. A good meta-architecture should be product- and platform-neutral. Product architecture provides product-specific components. An application can derive the application architecture from a meta-architecture based on the business architecture (for example, data architecture and business object modeling) and technical architecture (for example, vendor products and physical infrastructure) components of the business system functionality.

A reference architecture can be defined for each domain based on a meta-architecture (for example, online securities trading) and used as a blueprint for designing and building applications. A reference architecture provides a better context and vocabulary for developers and practitioners.

Figure 17:
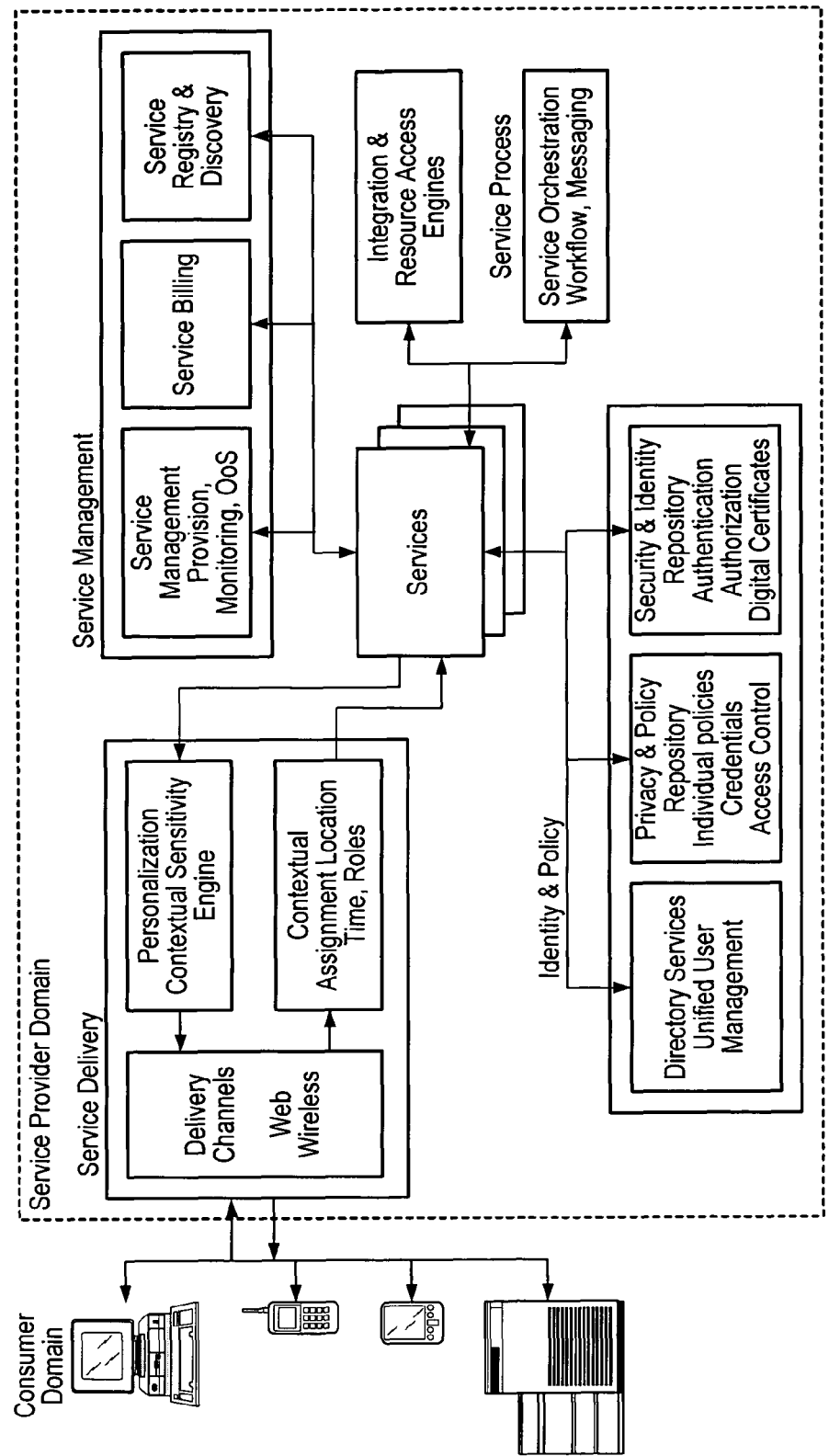
FIG. 17 illustrates an exemplary Web Services architecture using Sun ONE Framework according to one embodiment.

Sun ONE™ is an example of a meta-architecture. FIG. 17 illustrates an exemplary Web Services architecture using Sun ONE Framework according to one embodiment. Sun ONE defines a Web Services architecture with seven meta-components, with each having different architecture components to interact with one another. Each meta-component (for example, identity and policy) may include different components and services, (for example, directory services, privacy, and policy). Service Delivery components (for example, delivery channels) may have multi-channel gateways (for example, Web wireless access and WAP). Services components (Web Services) may have an accounting system, such as a billing engine. Service Management components provide provisioning of business services (such as allocating an IP address to a wireless J2ME device), monitoring of the service level, and metering the business services for services billing. Service process components (for example, service orchestration) are the integration channels to the back-end systems or external trading partners.

Service Requesters (or consumers) may be accessing the business services from a variety of mobile devices or a browser. This belongs to the consumer domain. All other architecture components are part of the Service Provider domain. A client may use a phone to inquire about an account balance, where the relevant Web Services components may process the balance inquiry and perform transcoding for different client devices wherever necessary. A client may receive an account balance from a PDA, WAP phone, or another device based on a personalization profile.

Figure 18:
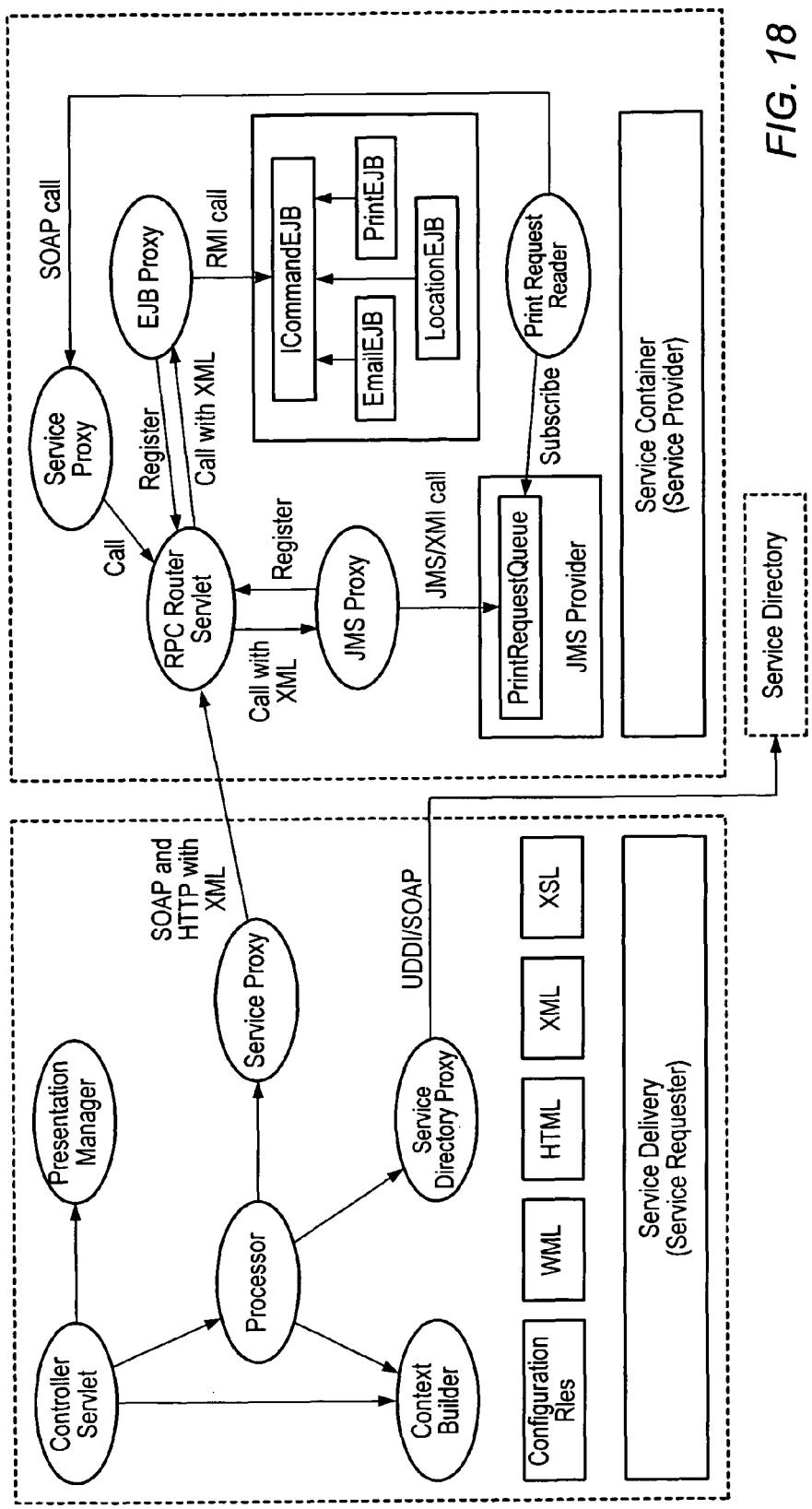
FIG. 18 illustrates an exemplary detailed Web Services architecture according to one embodiment.

FIG. 18 illustrates an exemplary detailed Web Services architecture according to one embodiment. In the Service Delivery component, there is a controller servlet that can handle service requests from the Service Requester's mobile devices or browser. The Service Requester may initially look up the business service from a service directory (in this example, it is a UDDI registry) via the service directory proxy.

If this is a SOAP call, the controller servlet passes control to the processor, which then passes the SOAP service request to a service proxy (SOAP client proxy). The service proxy is a client stub and communicates with the RPC router servlet (SOAP server). The RPC router servlet, which runs under a service container (such as J2EE application server), determines whether this is an RPC call (service proxy), RMII/IOP call to EJBs (EJB proxy), or another asynchronous message provider (JMS proxy).

Business data returned from the RPC router servlet may be captured by the service proxy in XML format. The presentation manager may reformat the data and transcode into HTML, or WML using XSL if applicable. This enables the Service Requester to view in a format that is displayable on any mobile device or browser.

Architecture Methodology and Development Life Cycle

Unified Process has a structured approach or methodology to define and analyze any architecture (including Web Services) by tiers, layers, or platform with different views. Rational Unified Process from IBM Rational is one of the commercial implementations commonly used in the IT industry. Large vendors may have a customized version of Unified Process-based methodology (for example, Sun's SunTone Architecture Methodology). The Unified Process methodology defines different stages of IT development, ranging from the Inception phase (where requirements are defined), the Elaboration phase (where design or proof of concept is done), the Construction phase (where software is being built), the Transition phase (where software is being configured and deployed), the Production phase (where software enters into service), and the Retirement phase (where software reaches end-of-life).

Architecture is usually defined during the Inception (for example, reference architecture, logical components) and Elaboration (for example, detailed application architecture design) phases of a development life cycle. It may be preferable to trace back the architecture design from the functional requirements—that is, validate each architecture component from the functional requirements and service level. For example, there is preferably no component (e.g., personalization server) that is not supported by requirements.

Figure 19:
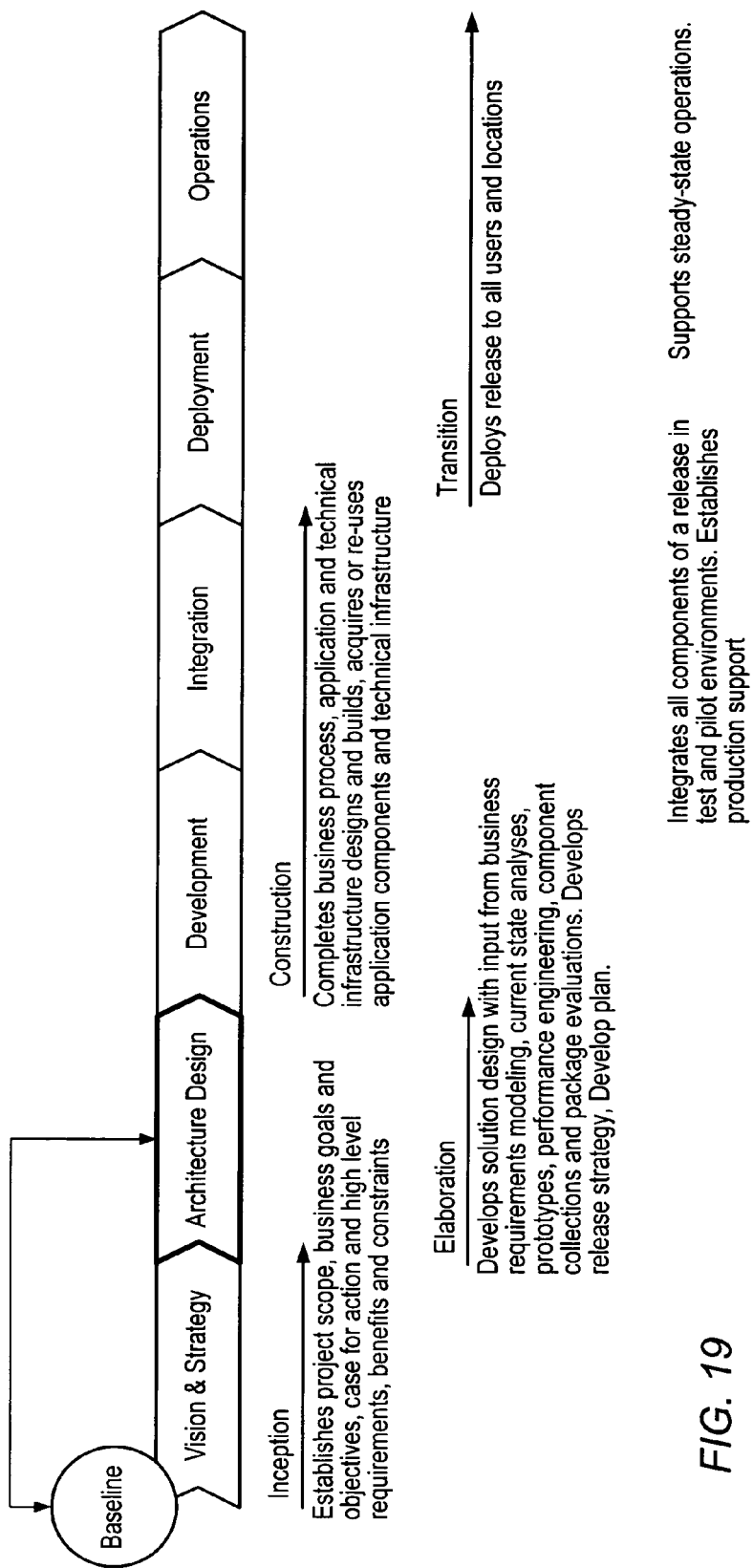
FIG. 19 illustrates an example of a Web Services development life cycle using the Unified Process development methodology.

The architecture methodology and development life cycle are generic to application development, including Web Services technology. FIG. 19 illustrates an example of a Web Services development life cycle using the Unified Process development methodology. A Web Services project typically starts with defining the business vision and strategy (Inception phase), then moves to crafting the architecture design (Elaboration phase), developing the integration and interoperability modules, integrating with the back-end systems and trading partners (Construction phase), testing, and finally deploying to production (Transition phase). Due to the nature of Web Services technology, there may be less development effort, but more integration effort and interoperability testing.

Figure 20:
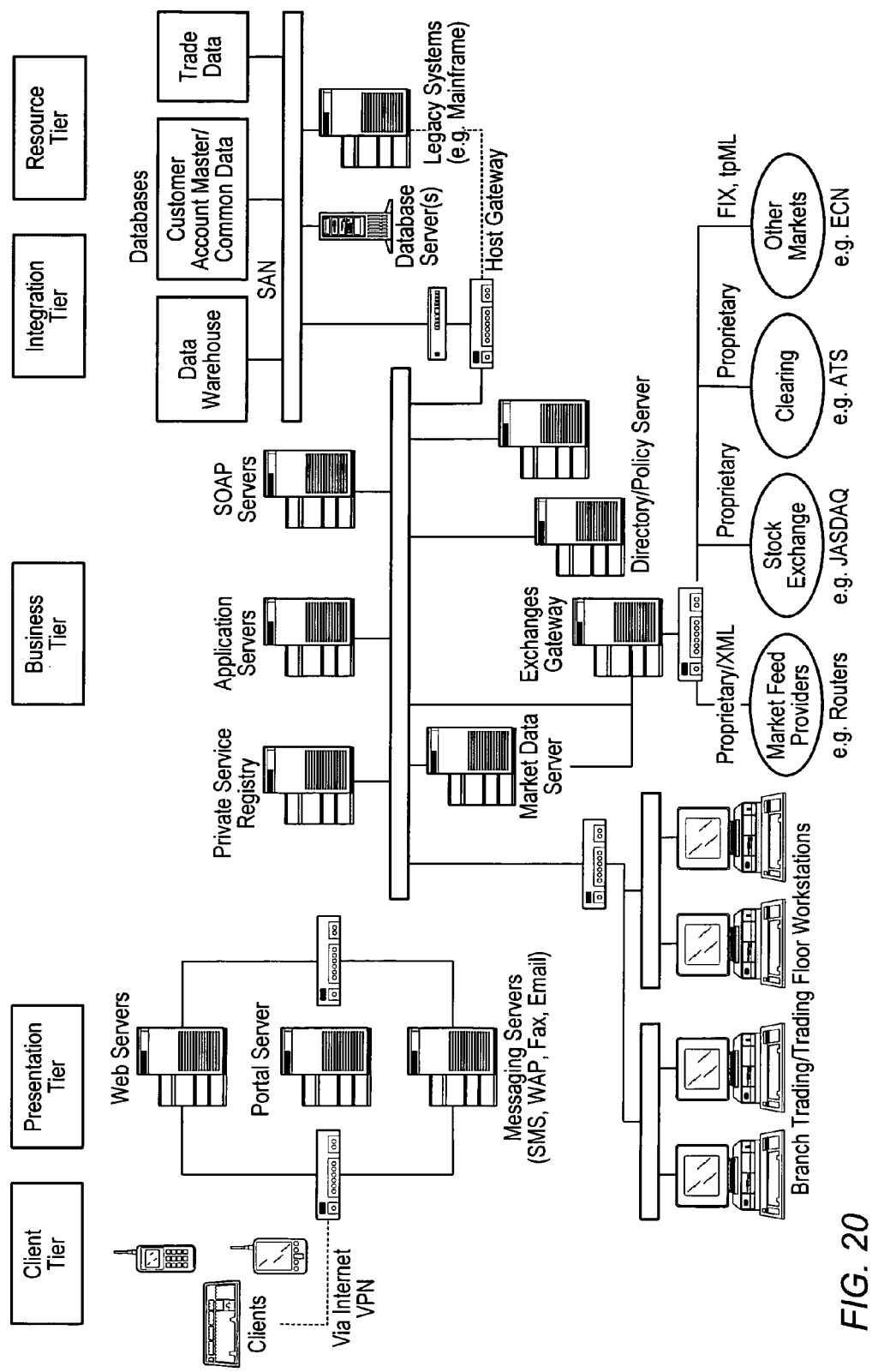
FIG. 20 illustrates a server-level architecture view of a securities trading (or brokerage) firm that adopts Web Services technology according to one embodiment.
Figure 21:
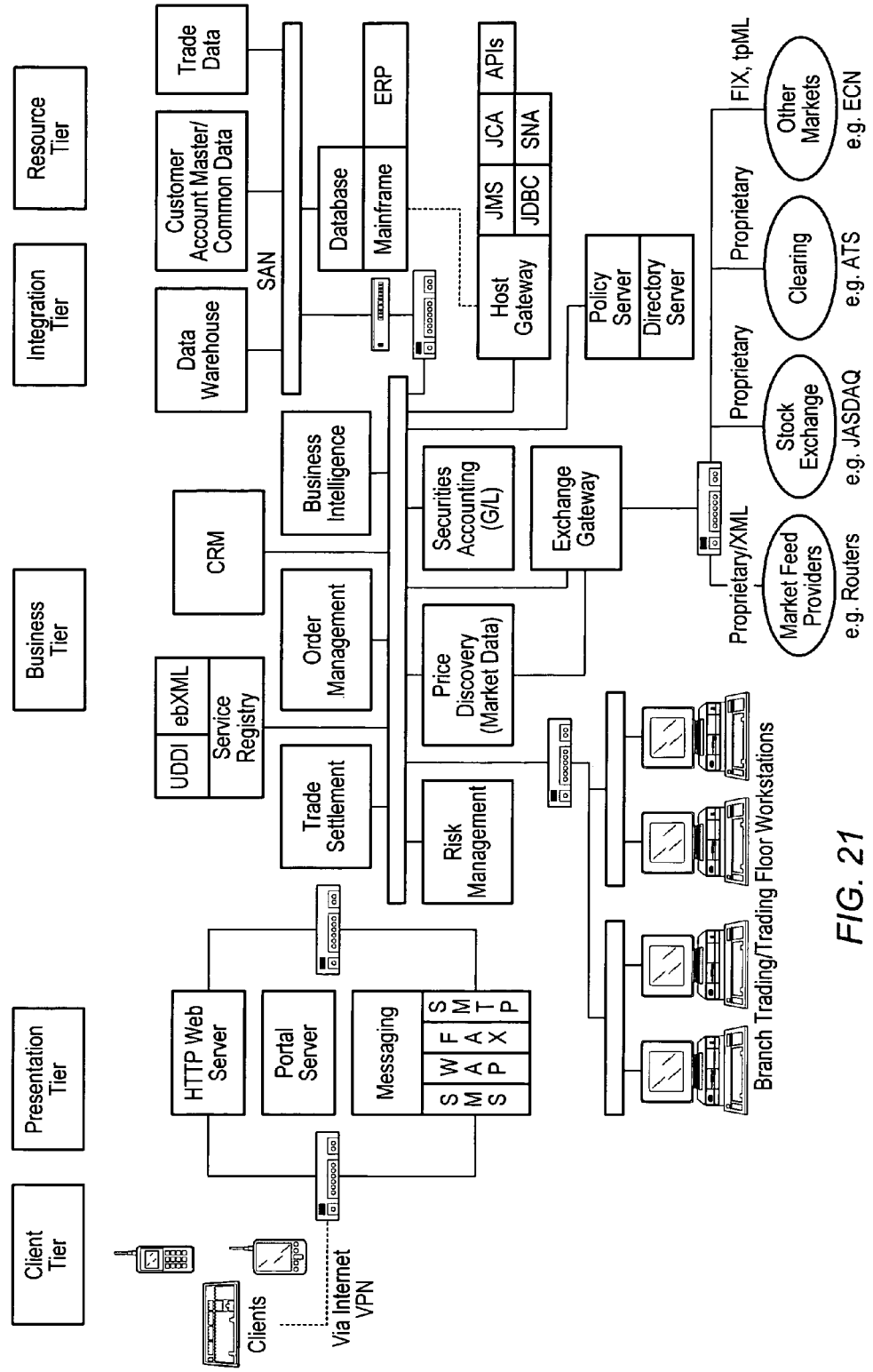
FIG. 21 elaborates on the architecture diagram in FIG. 20 and depicts the logical components in each server according to one embodiment.

FIGS. 20 and 21 illustrate an exemplary reference architecture for securities trading, with the two Figures showing servers and logical components respectively, according to one embodiment. FIG. 20 illustrates a server-level architecture view of a securities trading (or brokerage) firm that adopts Web Services technology according to one embodiment. The architecture components are categorized into five different tiers based on their functionality or role. Between the tiers, there may be separate routers (thus creating different IP subnets) and firewalls that segregate the servers for security and network management reasons.

The Business Tier includes service components that provide the core business logic. In this example, the core online securities trading applications run on clustered J2EE application servers. A private Service Registry (for dynamic service look-up), a set of SOAP servers (acting as a service proxy to back-end legacy systems or remote trading partners' systems), and a market data server (for publishing foreign exchange rates and latest stock prices) also reside in the Business Tier.

The Integration Tier hosts the integration components (such as messaging bus), gateways (such as Host Gateway for legacy mainframe systems, and Exchanges gateway for Stock Exchanges), and security components (such as Directory Server and Policy Server). The Host Gateway provides a channel to invoke applications running on legacy mainframes. There is also an Exchanges gateway, which acts as a channel to execute trade orders with local exchanges (such as NASDAQ and JASDAQ) or other markets (such as Instinet, which is an Electronic Communication Network), subscribe market data from market data feeds providers (such as Reuters or Bloomberg), and clear trade orders with local clearing organizations (such as Hong Kong Exchange, Deposit Trust, and Clearing Corporation). The Directory Server provides enterprise-level authentication. The Policy Server stores access rights and policies that govern the access level of each service component or system by users and by roles. These security components may span two or more tiers.

The Resource Tier typically hosts all data stores (such as customer account master and trade data residing on a database server running a relational database), data warehouse, Enterprise Resource Planning (ERP) systems, and legacy mainframe applications. These resources may physically reside on a Storage Area Network (SAN) for better data availability and management.

On the client side, the Client Tier may include any client front-end that accesses the online securities trading functionality. This may include, but is not limited to, browsers, rich clients (such as Java SWING client), and mobile devices (such as PDA and WAP phones).

The Presentation Tier handles HTTP requests from the client side, processes the presentation logic, and transforms it into some other messaging format. This includes, but is not limited to, the HTTP Web servers (handling static Web pages), a portal server (personalizing contents and aggregating information), and messaging servers (such as SMS server or WAP gateway).

The SOAP server and UDDI Service Registry are two architecture components that characterize a Web Services architecture. In this example, Web Services technology is used for internal applications, not for public consumer use. The UDDI Service Registry is used as a private Service Registry and thus reduces the risk of external security attack. For similar reasons, both the SOAP servers and UDDI Service Registries reside in the Business Tier. If Web Services are provided to public consumers, then the UDDI Service Registry (public Service Registry) and SOAP server may reside in the Presentation Tier. Segregating the SOAP server and UDDI Service Registry from the application server may preferably lower the security risk of all servers being exploited.

The exemplary architecture components in FIG. 20 may include one or more of, but are not limited to:

Web Servers. HTTP Web server farms that handle HTTP requests (such as Web pages navigation) from the browsers or mobile devices Portal Server. Provides personalization of contents and channels to aggregate information contents and/or transactions Messaging Servers. Delivery channels for emails (SMTP), pagers (SMS), WAP phones (WML), and faxes Private Service Registry. UDDI or ebXML business Service Registry where users can look up any Service Providers by names, product codes, or industry categories Application Servers. Servlets or EJB containers to support the complete life cycle of application services and data SOAP Server. Servlet that handles SOAP messaging Market Data Server. Market data feeds handler and administration to receive and broadcast multiple market data feeds Databases. Back-end databases that provide data store for common data and codes, customer account master, trade data, and data mart/warehouses Host Gateway. Gateway that connects and provides access to the back-end hosts or legacy systems Directory/Policy Server. Directory server that stores user credentials and access rights; policy server stores access rights and security policies Exchanges Gateway. Gateway that connects to and accesses external parties and exchanges FIG. 21 elaborates on the architecture diagram in FIG. 20 and depicts the logical components in each server according to one embodiment. Using the unified process methodology, this logical view may be defined in the Inception phase, and may serve as a starting point to design the Quality of Services, such as reliability, availability, and scalability, for each component. The following describes the functionality of the logical components in the Business Tier, which may reside in one or multiple application servers:

Price Discovery. This includes a quote server that provides the latest stock price quotes or foreign exchange rates based on the market data and a market data server that hosts all market data from market data feeds Service Providers.

Order Management. An application that helps brokers handle trade orders from customers. This includes getting a quote, placing a trade order, acknowledging a trade order, confirming a trade order, routing a trade order, and executing a trade order.

Trade Settlement. An application that performs matching between trade orders and executed trade orders and prepares for trade settlement with local clearing organizations.

Securities Accounting. A back-office system that manages the accounting of trade orders, clearing, and settlement.

Business Intelligence. This provides analytics (operations reporting), data mining (for cross-selling and marketing), and customer reporting (for compliance purposes).

Customer Relationship Management. This makes use of different delivery channels or touch points to manage the life cycle of customers by cross-selling, up-selling, and call center services.

In a securities trading business, the logical components (such as order management and price discovery) resemble multiple business services, which can be exposed as Web Services. This logical view may help identify new service components that can be shared and reused. In this example, Web Services technology may help aggregate customer and account information that is captured in a trade order (order management), past credit history (risk management), and past trading history (securities accounting) to support cross-selling and customer sales analytics (CRM) in real-time. Without Web Services, architects may need to build interfaces to extract the customer information into a data warehouse. These interfaces may not be real-time, and may not be reusable for other systems.

Categorizing the architecture components in tiers preferably helps architects segment the components, showing how each component operates and interacts with other components in different levels. Architects may also scale up the architecture components by exposing and distributing the business services into multiple machine instances (horizontal scaling) or by allocating workload to different instances by business functionality (for example, instance A performs equities trade orders for retail customers and instance B performs equities trade orders for private customers and options). These are different options showing how architects can improve the Quality of Service of the business services using Web Services technology. Thus, architects can scale up (or down) the workload easily without rewriting the application.

Analyzing the technology stacks by platform layers also helps improve the Quality of Services. The platform layer categorization refers to the technology stack, from hardware to the application. The Application Platform Layer denotes the applications (such as risk management system) running on a host with the business logic. The Virtual Platform Layer denotes the middleware or protocol that communicates with the operating system, application server, or other external components, such as SOAP protocol, J2EE RMI/IIOP. The Upper Platform Layer is typically the application server, which consists of the Web container (such as a Web server) and the EJB container (such as a J2EE application server). This provides the application infrastructure for the applications with the business logic. The Lower Platform Layer is typically the operating system, such as Solaris OE. The Hardware Platform Layer refers to the underlying hardware, including, for example, a Sparc machine and the associated storage solutions.

Analyzing the architecture components by platform layers may help identify areas where Quality of Services measures (such as vertical scaling and high availability) may be applied. For instance, architects may use hardware and database clustering technology to improve the service level of availability for the UDDI service registries. FIG. 22 is a table that shows an exemplary tiers vs. platform layers analysis, according to one embodiment, that may be used to identify the service components that need to be scaled or made reliable. In the table of FIG. 22, the logical components are categorized by tiers and platform layers. Some components may span tiers. This may be a first step in determining what business services are available, where the service components are, and which ones can be made reliable, available, and scalable. For instance, Service Requesters around the world may desire to browse through a UDDI Service Registry for different products and services and to look up and invoke appropriate remote business services, such as placing a trade order. Therefore, it is crucial that the Service Registry be able to operate around the clock (7 days__24 hours). Because the Service Registry resides in the Integration Tier and in the Application Platform Layer, architects may review options within this tier or layer to scale up the Application Platform Layer, and to make it highly available.

FIG. 23 is a Quality of Services analysis matrix, according to one embodiment, that may be applied to each tier or platform layer, so that reliability, availability, and scalability options are identified prior to the Web Services implementation. The matrix shows how each component can support different "ilities" in different tiers and layers. This may be applicable, for example, in identifying areas for improving scalability and availability. The "ilities" column shows a list of Quality of Services attributes, such as performance, throughput, and scalability. The other columns show different technology options that may be used to design the Quality of Services attributes under different tiers. For instance, reliability and availability for a UDDI Service Registry may be accomplished by clustering the Service Registry hardware. Under a clustered Service Registry, if the master Service Registry has a hardware failure, it will fail over to the secondary Service Registry, without disrupting the lookup service (there may be a short failover lead time). This may preferably meet around-the-clock service level (7 days__24 hours). A High Availability Service Registry design pattern is discussed later in this document.

Web Services Architecture Principles

The following architecture principles and ground rules present a high-level view of how to architect Web Services solutions. These principles and ground rules may be used as a checklist prior to reviewing a Web Services project proposal or a design artifact. The ground rules refer to the extension of the associated high-level architecture principles, or propositions inferred from the principle.

General Principles

One general principle is that a Web Services-based solution is preferably built to satisfy user requirements at the time of delivery, where user requirements may evolve with a better understanding of the system and integration capability. Iterative requirements analysis techniques are preferably used to avoid rigid requirements. Integration and interoperability requirements are preferably driven from the business vision. Focus is preferably on broader architecture items and system reusability.

Another general principle is that business results are preferably achieved through a series of successes by breaking down any large and high-risk Web Services initiatives into a small and manageable number of pieces. Besides, a small series of projects that are cohesive to the bigger picture of the Web Services initiative may be deployed. Next, it is preferable to avoid re-engineering the entire business process while achieving a small success. People may perceive the focus as business changes. For example, if the Web Services project is anticipated to be a large-scale application implementation with 24 elapsed months, then it is preferable to split the project into smaller projects of three to four months' duration.

Another general principle is that it is preferable to mitigate business and technology risks with pilot or reusable prototypes. Traditional development methodology requires lengthy requirements and design processes, before a pilot or prototype can be produced. An option is to use an iterative development process with appropriate user involvement for feedback (such as a Use Case workshop).

A general ground rule is that Web Services solution release preferably delivers quantifiable business value.

Another general ground rule is that the cost of Web Services infrastructure and integration implementation (for example, the implementation cost for UDDI and SOAP server) preferably does not exceed the business value delivered (such as the sum of cost savings or additional revenue generated from delivering all Web Services solutions). This is preferably expanded in the business case justification.

Another general ground rule is that architects preferably avoid time-consuming analysis of current states and interoperability constraints. This is because Web Services implementation is not intended to re-engineer the entire enterprise architecture (which is usually done by analyzing current states and interoperability). The Web Services technology is suitable for exposing business services and system functionality from legacy systems (e.g. black-box systems) without refactoring or re-engineering them. This preferably enables a fast interoperability solution. For example, it is not recommended to re-engineer the business process of securities trading (for Straight-through Processing) while implementing a new messaging infrastructure using SOAP messaging over JMS. This will add to the project implementation risks.

Another general ground rule is that Web Services are preferably time-boxed into a three- to five-month delivery time window. Another general ground rule is that reusable prototype (with performance benchmarking) are preferably exploited to mitigate business and technology risks.

Lower Platform Layer Principles

A lower platform layer principle is that Web Services technology preferably operates independently of the Operating System or the Lower Platform. However, the availability of Web Services solutions may be dependent on the reliability and availability of the Lower Platform (such as hardware and software clustering, High Availability configuration, and system management).

A lower platform layer ground rule is that the hardware and software level's reliability and availability (for example, clustering or hot failover) are preferably considered and included during the Web Services implementation. UDDI or ebXML Service Registry and SOAP appliances are examples of service components where the hardware and software's reliability and availability may be of importance.

Upper Platform Layer Principles

An upper platform layer principle is that Web Services solutions may run on any Web or servlet container (such as Tomcat), not necessarily on an EJB container.

However, it may still be architecturally desirable to have the same vendor servlet container for the same operating environment. Most RPC-based SOAP calls do not manage session or state. Keeping track of the states for each call or every child process may not be necessary or desirable for some RPC-based (synchronous) Web Services for performance reasons.

An upper platform layer ground rule is that many Web Services calls are stateless beans making RPC calls. The session information (such as who has initiated a payment request, and when) may be stored when a SOAP call is initiated in order to support Single Sign-on and identity management. This will allow the security infrastructure (such as identity server) to track each security session and Web Services management tools to meter the remote business services for billing or performance-monitoring purposes.

Another upper platform layer ground rule is that it is preferable to not store the state of the Web Service if it spans different legacy systems or multiple nodes, as that requires complex application design to support multiphase commit and rollback. For example, if developers want to aggregate account balances from multiple banking systems to provide a consolidated investment portfolio using synchronous Web Services (say, JAX-RPC), they should not persist the session state of each connection to the individual banking system. Otherwise, if one connection fails, the account balance aggregation service may hang up the entire application (thus, performance overhead). If one of the connections with the banking system needs to make a secondary RPC call to perform a business transaction and the secondary RPC call aborts with an exception, should the developer roll back the transactions or not? This may be a complex design issue to address, if the states of each connection or RPC calls are persisted and tracked.

Virtual Platform Layer Principles

A virtual platform layer principle is that the message exchange between the SOAP Service Provider and the SOAP consumer may be one-way (asynchronous) or two-way (synchronous), bound to the data transport such as HTTP, SMTP, JMS, and so forth. The choice of synchronous messaging may be appropriate for the RPC application model. Asynchronous messaging may be appropriate for sending or receiving XML documents and may be supplemented by SOAP-JMS binding for guaranteed message delivery.

Business transactions and business process orchestration may require reliable messaging infrastructure to support. Without reliable messaging, Service Requesters may not know the requests have been received and processed by the Service Provider. This may result in potential financial loss.

A virtual platform layer ground rule is that, if guaranteed message delivery is required, then asynchronous SOAP calls with SOAP-JMS binding (SOAP messages bind to a reliable messaging layer using JMS) are preferably used. This addresses the issue of the reliability of SOAP messaging over HTTP. There are vendor products that provide JMS bridge functionality to bind SOAP messages to JMS; developers need not build this functionality from scratch.

Application Platform Layer Principles

An application platform layer principle is that it may be easier to wrap a legacy system with a SOAP client proxy. However, it may be preferable to be coarse-grained, and to not wrap every functional call. Some SOAP calls may be cached with a time period if the data is relatively static within the predefined time period.

An application platform layer ground rule is that the Web Services calls are preferably coarse-grained when defining new business services from an existing system. For instance, if an EJB has 100 methods of inquiring about a customer account, it may not be practical to expose all 100 methods as Web Services. A coarse-grained approach to exposing business functionality as Web Services may suggest three to five Web Services calls, where similar account information may be encapsulated into one Web Services call.

Supporting Software Tools

The following lists some supporting software tools that may be utilized. Note that other software tools not listed may be used.

Web Services Development Platform Tools
    TCPTunnel. This is a utility that listens to the TCP/IP port, say, port 8080 for SOAP messages. It comes with Apache SOAP Axis.
    SOAP Debugger. An example is XMLSpy, which is an XML editing utility with some SOAP debugging capability.

Web Services Deployment Platform Tools
    Unit Testing. An example is jTest, which is a Java-based unit testing tool.
    Stress/Load Testing. An example is Mercury Interactive's LoadRunner, which is an application stress test tool.
    Regression Testing. An example is Rationale Test Studio, which provides regression testing capability.
    SOAP Testing/Performance Testing. Examples are Empirix's FirstAct (commercial product that simulates end-user SOAP client's testing), PushtoTest (a SOAP testing utility), and SOAPTest (a public utility for generating stress testing for SOAP clients).
    Web Services Management/Network Services. These vendors provide routing of Web Services for different versioning and network management tools for remote Web Services.

Infrastructure Tools
    Version Management. Version management tools keep track of different versions of SOAP applications. Examples are CVS and Rational ClearCase.
    Release Control. Release control tools help when deploying, by upgrade or fallback, a specific version of SOAP applications to the target platform. An example is Rational ClearCase.
    Application Server Analyzer. Application server analyzer helps analyzing the performance and different components (for example, states or cookies) of the J2EE application server. Examples are WebSphere Web Site Analyzer from Altaworks and Omegamon XE from Candle.
    Systems Management Tools. These tools provide infrastructure support and health check for the platform. Examples are BMC Patrol and OpenView.
    Performance Tuning. There are performance tuning methods and tools for Unix, NT platform, vendor-specific database tuning tools, and Java application tuning tools.
    Middleware Monitoring Tools. If middleware is used, these tools help monitor the middleware components such as the queue management. These are vendor-specific middleware administration control and monitoring tools.

Security Infrastructure Tools
    Certificate Management. If digital certificates are used for generating digital signatures, then a certificate management server will be essential. An example is Sun ONE certificate manager server.
    Hardware Encryption. Hardware encryption tools may include SSL accelerator for HTTPS connectivity and Hardware Security Module (HSM) for storing the public and private keys. There are various vendor-specific products for hardware encryption and HSM.

Policy Server. A policy server that integrates different directory servers and provides Single Sign-on is essential. An example is Netegrity's Siteminder.

Directory Server. A directory server provides authentication and entitlement services for applications. It is also a core component for network identity management. An example is Sun ONE Directory Server and Identity Server.

Web Services Open Standards Tools

Major Web Services security standards are SOAP-SEC (SOAP security using XML digital signature), XML Key Management Services (XKMS), Security Access Markup Language (SAML), and XML Access Control Mark-up Language (XACML).

Product Architecture Tools

J2EE Application Server Platform. These are typically application servers, and they usually come with many development tools. Examples are Sun ONE Application Server, IBM WebSphere, and Microsoft .NET Server.

Edge Products. These products provide peripheral utilities that enhance performance (for example, caching product) and scalability (for example, load balancing). An example is Progress eXcelon XIS (aka X/VIUSOAP Cache).

SOAP Architecture

This section discusses the characteristics of the SOAP architecture and its architecture implications. Applications built on the SOAP architecture may share one or more of, but not limited to, the following characteristics:

They are built on loosely-coupled message-based architecture.

They have two modes of communication: synchronous (request-reply, RPC), and asynchronous (document, one-way).

The transport and message levels are decoupled.

SOAP does not mandate SOAPAction in the HTTP header; thus the SOAP message can be decoupled from the HTTP header.

The underlying transport HTTP is stateless. In other words, synchronous communication simulates request-reply on stateless HTTP by storing the state. Different SOAP message constructs may be needed to handle synchronous and asynchronous modes. The same client may not be used to handle both modes. The security is preferably handled by a mixture of transport-, message-, and application-level protection. The configuration files and WSDL stored in the SOAP server are in clear text, and this may have security implications.

The protocol itself does not provide guaranteed message delivery or message-level Quality of Service. For instance, SOAP-RPC invokes remote application calls but it does not assure the call is always successful. It cannot specify Quality of Service priority (that is, high, critical, guaranteed delivery) when passing messages. The protocol cannot support polymorphism, for example, based on the parameter to invoke different methods. It does not provide workflow integration capability.

UDDI Architecture

This section discusses the design of the UDDI Service Registry and its architecture implications to developers. Most UDDI implementations are targeted as a private Service Registry, not a public Service Registry. UDDI has a sound business information model, tModel, to represent business service information. Business and service information is cross-referenced by service keys. UDDI Service Registry is intended to be like DNS (for IP address for domains). The UDDI browser plug-in is available for client browsers. The service look-up performance and UDDI server security depend on the vendor implementation.

The service endpoint does not need to be looked up by service keys in order to invoke the Web services. UDDI look-up provides the benefits of central repository of services information and runtime bindings (instead of hardcoding). Every user is able to browse and access the UDDI Service Registry, if the user has access. Vendor-specific implementations may provide additional security (for example, UDDI implemented on a LDAP server).

The key differentiator for UDDI implementation is the availability of a powerful, algorithmic-based, search engine to navigate and locate Service Provider information faster. Another feature is the browser-based GUI to create multiple levels of tModel relationships and Service Provider product hierarchy. A user-friendly GUI administration wizard to guide defining GUID and service end-points would be essential, as it does not require users to understand the nitty-gritty of tModels. It may also be preferable to have a test UDDI prior to publishing it, tight integration to any developer workbench, and a built-in UDDI browser plug-in available for Web browsers.

Overall, there is preferably robust local UDDI security features (for example, RDBMS security, Access Control Levels for different UDDI levels, and capability to support LDAP authentication). The UDDI implementation preferably does not lock in any underlying vendor product infrastructure or software platform.

The reliability and scalability of UDDI implementation is vendor-specific. UDDI does not address trading partner profiles and communications contracts like CPP and CPA in ebXML. Thus, there is no constraint or service agreement in client-server or server-server data exchange.

ebXML Architecture

This section discusses the design features of ebXML, the architecture implications, and their constraints. In summary, ebXML architecture, which supports Web Services, has the following characteristics:

They should have loosely-coupled message-based architecture.

Similar to SOAP, ebXML decouples transport and message level and supports synchronous and asynchronous communication.

They have sophisticated business process models, and some of them reflect previous EDI data exchange paradigms (many OASIS participants and contributors are EDI veterans).

The Collaboration Partner Profile and Collaborative Partner Agreement (aka the service contract between trading partners) need to be agreed upon between trading partners. This is more complicated to implement than WSDL-UDDI-SOAP technology because ebXML can be used to support complex Web Services for workflow processing and collaboration.

ebXML Message Service (ebMS) allows guaranteed delivery of messages even if the recipient is not online temporarily. It requires a message provider class that ensures messages are delivered after the recipient is back online. The SOAP message service may be made more reliable by binding it to Java Message Service (JMS). It is sometimes called SOAP-JMS binding for message services. This requires using a JMS bridge to intercept a SOAP message, with a message provider delivering the message to the recipient using the underlying middleware infrastructure.

The complexity of the business process model makes design and implementation difficult. Thus, it may take longer for architects and developers to implement complex workflow processing using ebXML.

Web Services Design Patterns

The term "design pattern" may denote some reusable framework or objects.

Design Patterns show a structure that can be applied if certain conditions are met. They are best practices and are accumulated from past implementation experience.

The term "design patterns" may be used to describe the relationship of objects and components in application design in the categories of creational patterns (for example, factory methods), structural patterns (for example, facade, proxy) and behavioral patterns (for example, observer, visitor). Web Services design patterns may primarily include structural design patterns, in the context of deploying an end-to-end architecture with Quality of Services.

Web Services design patterns may include one or more of, but are not limited to:

Scalability Design Patterns—SOAP cache, JMS Bridge, multiple servlet engines, HTTP load balancer.

Reliability Design Patterns—State management, SOAP logger.

Manageability Design Patterns—Publish/unpublish/discover Web Services, managing different versions of Web Services deployment with Service Registry, registry content management.

Availability Design Patterns—High Availability for UDDI.

Security Design Patterns—UDDI deployment patterns.

Web Services design patterns associated with designing a high level of Quality of Services are described. The context (background or requirements), problem (problem statement), force (design factors to be considered, or when to use the pattern), solution (proposed solution depicted in Use Cases and sequence diagrams), risks (design or implementation risks, and the risk mitigation), and relevant examples may be described for each of the design patters. Design guidelines and best practices associated with designing and deploying Web Services may also be described.

SOAP Cache Design Pattern

Context

In a Service Registry environment, Service Requesters may dynamically look up a business service by finding the business organization name and service category (such as NAICS) to locate a service key. With a service key, Service Requesters may retrieve the service endpoints URI and bind the URI to the remote business service using a client SOAP proxy. This dynamic service look-up may be beneficial to managing business services within a large user community (such as millions of content providers and mobile phone subscribers), where business services and content are typically added or modified in real-time. It may not be practical to store a predefined URI or network address of the remote business service in the client's front-end, because every change in the business service information or the URI may require a program recompilation at the client front-end.

Although dynamic service look-up allows flexibility in managing changes in service information, it has a system performance overhead. The SOAP client front-end that looks up a Service Registry may take up to a few seconds' overhead to invoke a remote Web Service call. This may not be acceptable to at least some customers. One solution is to reduce the service look-up overhead by caching frequently accessed Web Services at the SOAP client's side. Another solution is to cache the frequently accessed Web Services at the SOAP server's side. Caching the result from frequently accessed Web Services may improve performance of the services if the result contains static information (such as a code look-up table) that is valid within a given time window.

Problem

Every time a SOAP client looks up the service endpoint URL from the Service Registry, there is a performance overhead. The response time may, for example, sometimes take half a second to two seconds, depending on the infrastructure set-up and application design. Frequently accessed transactions, such as stock quotes or common data look-up, may take a considerable amount of CPU cycles and network I/O.

Force

For high transaction volume and high performance applications, there is a strong requirement to process a large quantity of SOAP requests during peak hours. If a normal distribution curve is extracted from the SOAP requests and there is a considerable number of frequently accessed service endpoint URLs (that is, these frequently accessed service endpoints are in the center of the bell curve), then this SOAP cache pattern may be applicable to address the performance overhead of dynamic service look-up.

Client-side SOAP caching may be desirable if it can be deployed to the Service Requester's side in a manageable manner. For example, if the Service Requester uses a Java-rich client, then the client-side SOAP cache can be implemented and updated easily with Java Web Start. Server-side SOAP caching may be desirable if the Service Requester is using a browser or mobile device and loading cached processing logic in an applet is difficult due to performance constraints.

Solution

Figure 24:
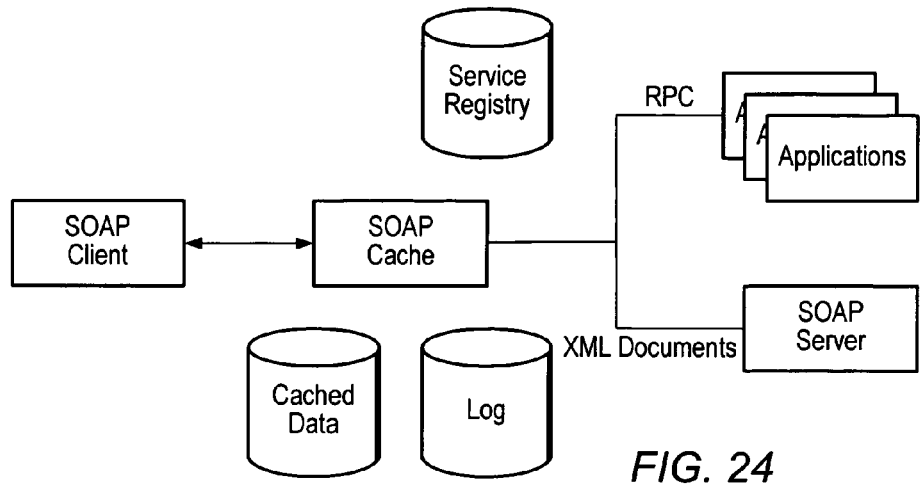
FIG. 24 illustrates the logical process of SOAP cache according to one embodiment.
Figure 25:
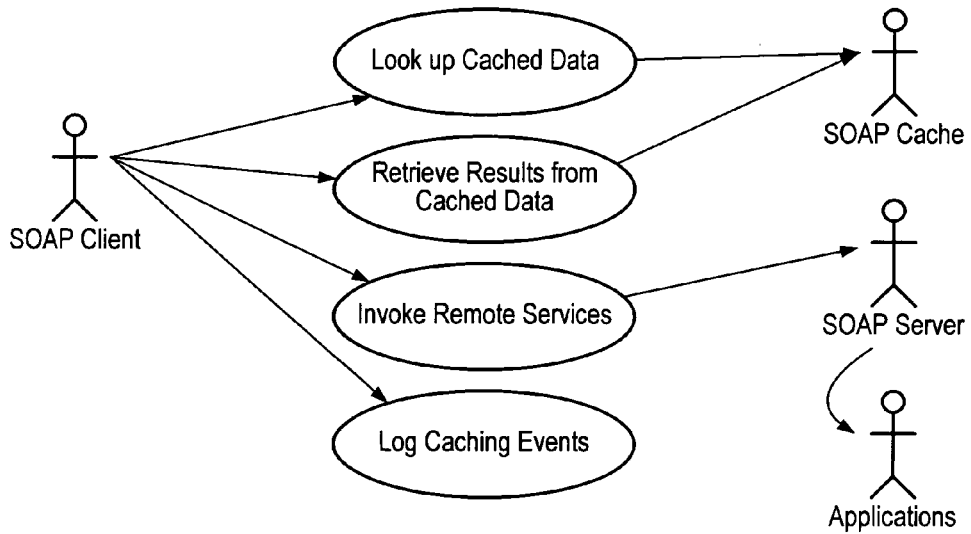
FIG. 25 illustrates four Use Cases for managing a SOAP cache according to one embodiment.
Figure 26:
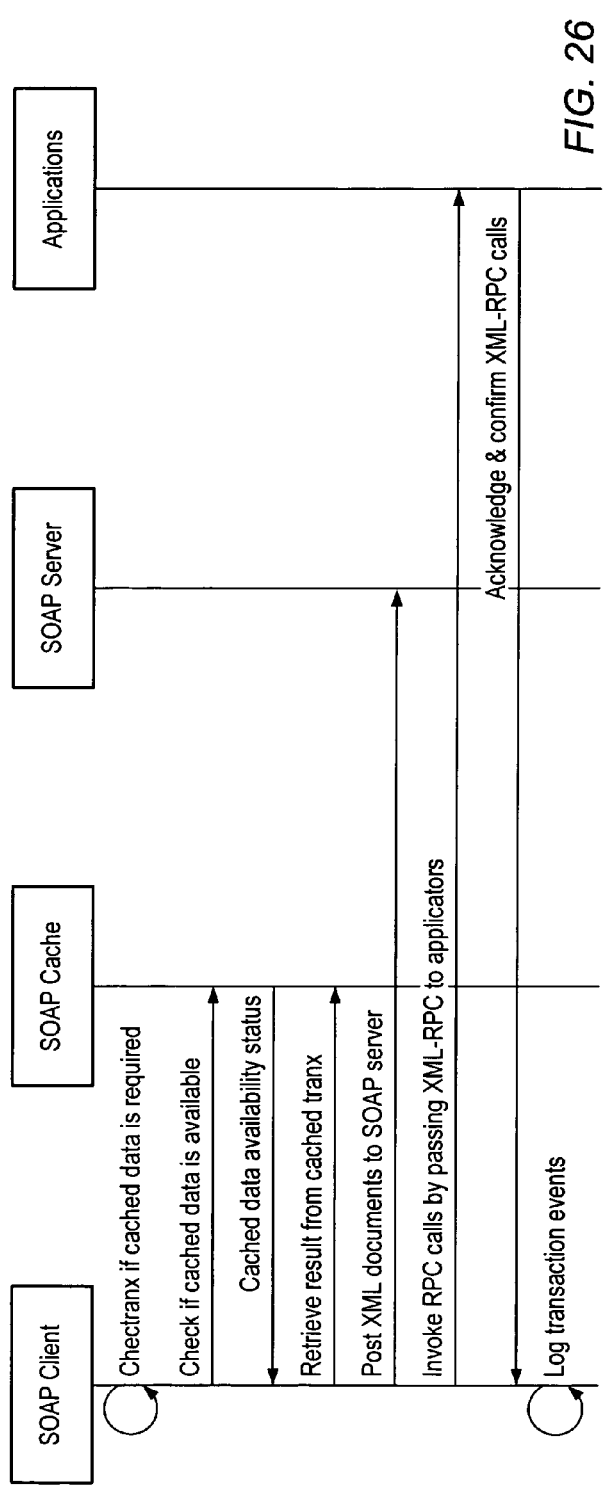
FIG. 26 is a SOAP cache sequence diagram.

FIGS. 24, 25 and 26 illustrate the logical process with Use Cases and sequence diagrams for SOAP Cache according to one embodiment. These figures illustrate the context, and how the solution can address the dynamic service look-up overhead. FIG. 24 illustrates the logical process of SOAP cache according to one embodiment. In FIG. 24, a SOAP client intends to initiate an RPC call to a remote business service according to one embodiment. Instead of dynamically looking up the service endpoint URL from a Service Registry, the SOAP client accesses a SOAP cache first. The SOAP cache may be implemented as a hash table stored in the physical memory of the SOAP client or the SOAP server for fast access. If the service endpoint URL is available in the cache and the cached data is not yet expired, then the SOAP client may bind the service endpoint URL. If the cached data is already expired (or there is no cached data available), the SOAP client may look up the Service Registry. The new service information (including service endpoint URL) may be stored in the SOAP cache for faster retrieval with an expiry time frame. The expiry time frame may be arbitrary. For example, a public portal service supporting a non-real-time stock quote or foreign exchange rate inquiry may set the expiry time to be every 15 minutes.

FIG. 25 illustrates four business scenarios, or Use Cases, around managing a SOAP cache according to one embodiment. A SOAP client looks up the cached data from a SOAP cache and retrieves business service information (such as service endpoint URLs) from the cached data. If the cached data is available, then the SOAP client may not need to look up the Service Registry, which may reduce the dynamic service look-up overhead. It may then bind to the service endpoint URL and invoke the remote business service via by the SOAP server. If the cached data is not available (or expired), the SOAP client may perform a dynamic service look-up from the Service Registry. Newly fetched business service information may be added or updated to the SOAP cache, and this may be logged for event tracking.

FIG. 26 is a SOAP cache sequence diagram that illustrates some details of the SOAP cache Use Cases previously described. The SOAP client may need to look up a service endpoint URL to invoke a remote business service. The SOAP client checks whether the nature of the remote business service supports cached business service information. An indicative foreign exchange rate inquiry is an example of using SOAP cache. The SOAP client may then access the SOAP cache, which may be implemented as a hash table stored in the physical memory of the SOAP client. If the cached data is available and is still timely, the SOAP client may retrieve the business service information from the SOAP cache. The business service information may show the binding information of the service endpoint URL. Retrieving cached data (or even cached transaction information such as foreign exchange rates) from the physical memory may be fast and may not require routing the service look-up request to a Service Registry that may reside on another network. This preferably reduces CPU and network resources.

The SOAP client may then generate a SOAP request in an XML document and send it to the SOAP server (RPC router servlet). The SOAP server may initiate an RPC call to the application providing the business services. Using a synchronous Web Services call, an acknowledgement and the inquiry details (or transaction information) may be returned to the SOAP client. Both the caching event and the business transaction may be logged for tracking and management purposes.

Detailed Design

Transaction Cache Creation. Predefined transaction types may cache transaction contents and results. Cached data may be stored in serialized data objects, databases, XML cache (edge products), and LDAP with time stamp, version, and transaction type/ID. Cache data (read-only) can be represented in XML structure and can be parsed/retrieved via DOM, SAX, JDOM, or Xpath.

There is a time-to-live time window. New and updated versions of cache data may be indicated by version and time stamp, whereas outdated/obsolete data may be decommissioned upon creation. If cached data is unavailable (for example, if it is corrupted, or being updated or removed), transaction contents are preferably refetched and recached.

Retrieval of Cached Data. The SOAP Cache may be configured to intercept a normal SOAP request, check whether the transaction has been cached, before retrieving the cached data or passing through to applications or the SOAP server. A hash key may be generated to determine whether the transaction cache data is available. Data synchronization may be critical; otherwise, obsolete data may be retrieved.

Implementation. SOAP Cache may be "homegrown" or off-the-shelf using an XML database (such as Progress eXcelon's XIS). In one embodiment, the logical steps for implementing a SOAP Cache may include, but are not limited to, the following:

Read in XML-RPC request.
Check if cache is available against the cache hash table.
Locate the relevant cached data (XML file).
If available:
Read cached data, identify the cached result by key
Present result
Else, if not available:
Format XML-RPC request
Send XML-RPC request to SOAP server Some frequently accessed real-time (within a time window) or off-line applications may cache their transactions to boost performance and to reduce network traffic. Cached transaction results may be placed in memory and/or in edge products, instead of fetching the same requests from the application servers or from the database.

JMS Bridge Design Pattern

Context

Java Message Service (JMS) is part of the J2EE technology that provides reliable messaging for business transactions. JMS provides a set of high-level abstraction APIs to abstract connectivity and message delivery and is implemented using a middleware product or by reusing a J2EE application server infrastructure. JMS also allows richer and more flexible mechanisms (such as using Java Connector Architecture together) to integrate with other system components. JMS-based messaging provides the benefits of guaranteed delivery and work flow integration capability.

However, one trading partner (such as an investment manager) may not be able to send business transactions using a specific JMS vendor product to another trading partner (such as a sales trader or broker) who uses another JMS vendor product. This is because the underlying data transport implementation for the two JMS vendor products may be different. A messaging bridge capability (such as JMS bridge using SOAP messaging) may be required to exchange business transactions and documents in a common format that can be understood by different JMS vendor implementations.

Figure 27:
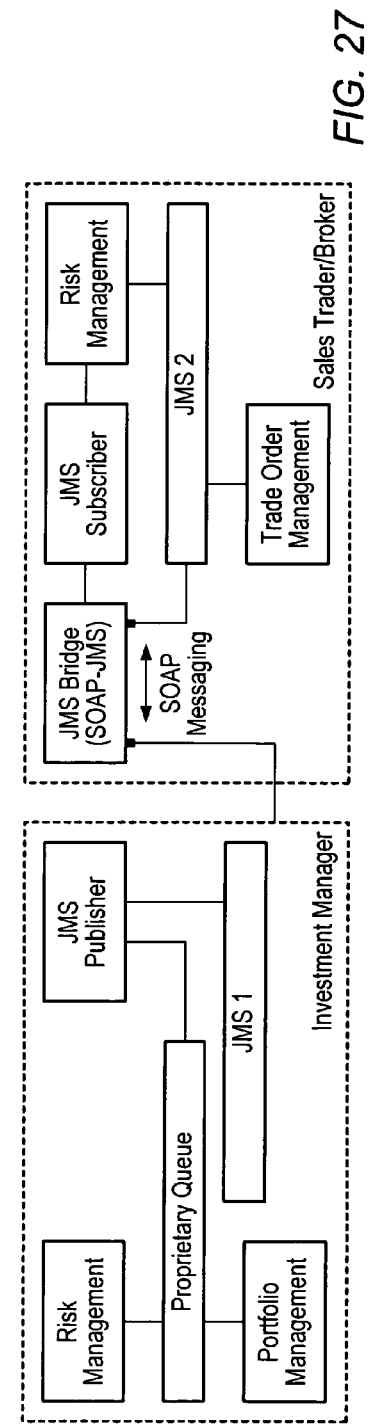
FIG. 27 illustrates an exemplary case of an investment manager placing a trade order with a brokerage firm.

Reliable messaging using Web Services technology is preferable when delivering financial messages or high-value transactions. FIG. 27 illustrates an exemplary case of an investment manager placing a trade order with a brokerage firm. Both trading partners have JMS implementations in their back-office infrastructure. However, the two JMSs are using two different underlying middleware products. If the investment manager is placing a trade order of 10,000 lots of high-value technology stocks with the brokerage firm and his portfolio management system uses JMS to exchange trade orders, then the two different JMS vendor implementations cannot exchange messages directly. This is because they have different underlying data transport. The trading partners may want to utilize the benefits of SOAP messaging as a standards-based integration and interoperability technology, which is applicable for cross-institution interoperability or B2B integration. One solution approach is to use a JMS bridge for SOAP messaging, so that the trading partners can benefit from easier integration and interoperability using Web Services technology and JMS. This design pattern describes what a JMS bridge is, and how it can be implemented.

Problem

JMS is an integration technology that provides good Quality of Service and reliability for business transactions. However, different JMS vendor implementations are not interoperable, as the underlying transport and application protocols are different.

Force

JMS provides reliable message delivery within one application infrastructure. To interoperate with another infrastructure or other institutions, it may be preferable to build a JMS bridge between two different JMS vendor products. SOAP messaging is a flexible and standards-based interoperability technology and can be bound to JMS in the data transport layer to offer reliable message delivery. This design pattern may be applicable, for example, in business scenarios where there is a need to interoperate between two different JMS vendor products or two different middleware products.

Solution

Figure 28:
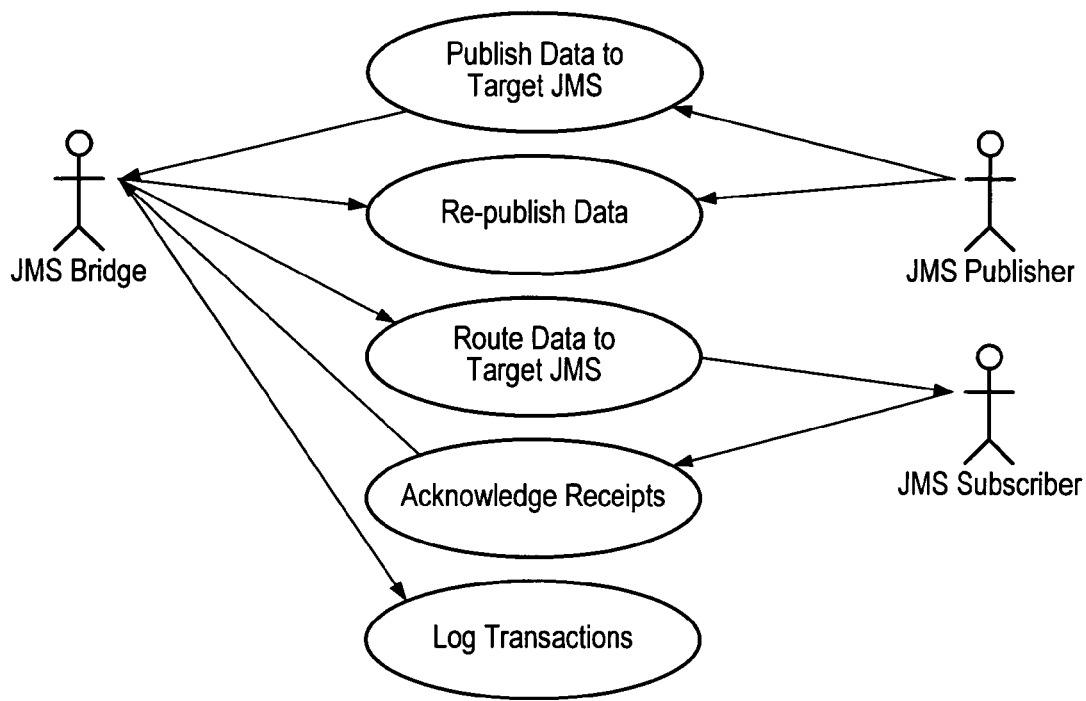
FIG. 28 illustrates five business scenarios or business cases according to one embodiment.
Figure 29:
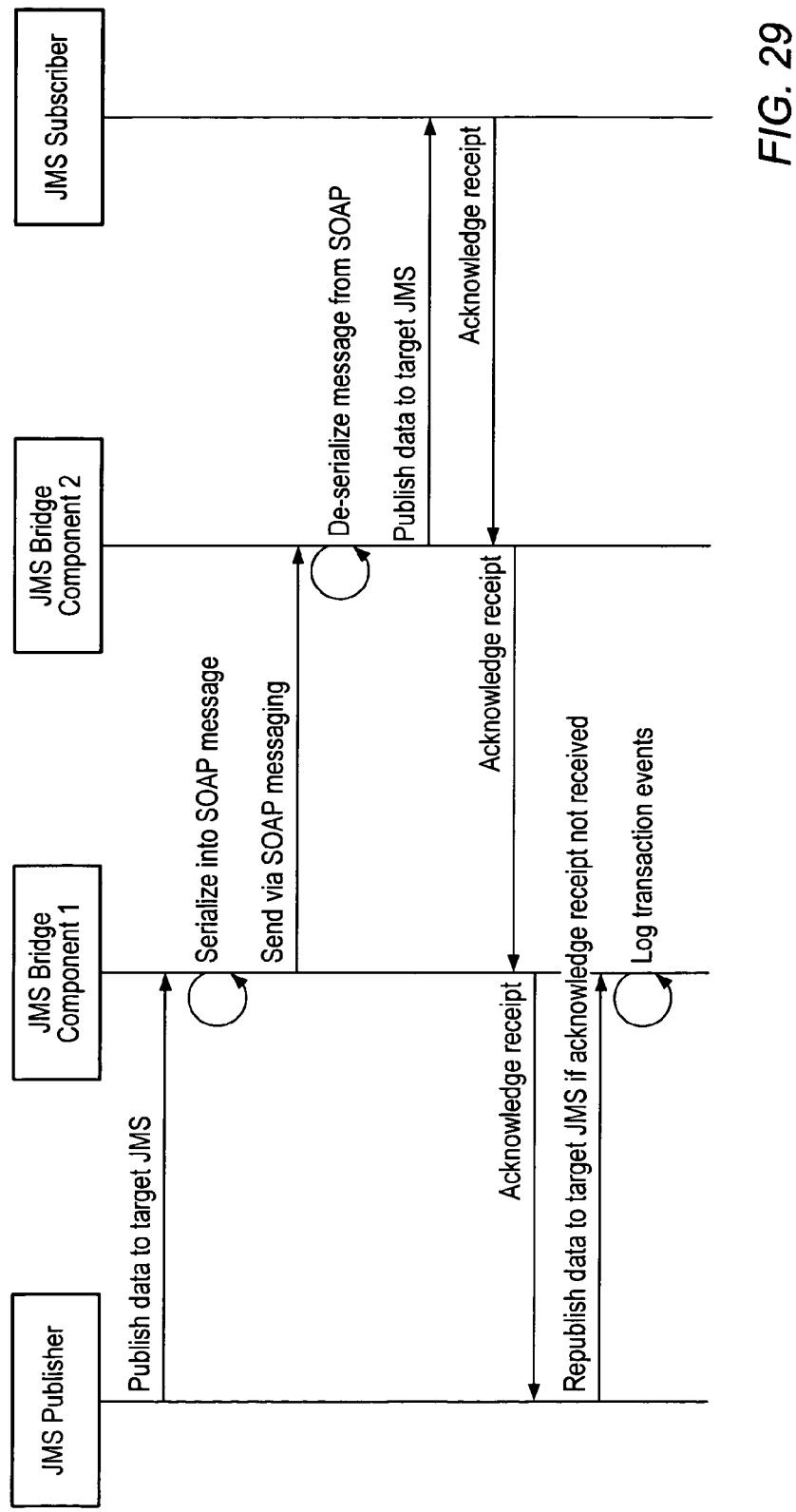
FIG. 29 is a JMS Bridge sequence diagram according to one embodiment.

FIGS. 28 and 29 illustrate the logical process with exemplary Use Cases and sequence diagrams for a JMS bridge according to one embodiment. FIG. 28 illustrates five business scenarios or business cases according to one embodiment. As an example, a trading partner (e.g., an investment manager, who is also a JMS publisher) wants to send business transactions to another trading partner (e.g., a sales trader, who is also a JMS subscriber). The JMS publisher publishes the business transaction information to a predefined JMS topic using the same JMS vendor implementation (e.g., JMS product 1). The JMS bridge picks up the business transaction information from the JMS queue, routes it, and resends it to the JMS subscriber under another specific JMS topic using a common JMS vendor implementation (e.g., JMS product 2).

In one embodiment, the JMS bridge may include two components, one of which (JMS bridge component 1) works with JMS product 1 and another (JMS bridge component 2) which works with JMS product 2. The two components exchange the business transaction information via SOAP messaging. Upon successful message delivery to the JMS subscriber, the JMS bridge may return an acknowledgement to the JMS publisher. The JMS bridge may also log transaction and exception events for monitoring and audit trail purposes.

FIG. 29 is a JMS Bridge sequence diagram that elaborates on details of the Use Cases previously described according to one embodiment. The JMS publisher publishes business transaction information to a predefined JMS topic, where JMS bridge component 1 can pick them up. The JMS publisher and JMS bridge component 1 may share the same JMS vendor implementation. The JMS bridge component 1 then serializes the content into a SOAP message and sends it to JMS bridge component 2. There may be a built-in control mechanism to ensure the SOAP messages are resent if JMS bridge component 2 does not receive the content under the same JMS bridge. For instance, the business transaction information may be persisted in an XML cache, where JMS bridge component 1 can resend it later, even if JMS bridge component 2 is unavailable temporarily.

The JMS bridge component 2 deserializes the SOAP message and publishes to another JMS topic, which the JMS subscriber subscribes to using the same JMS vendor implementation. Upon successful delivery of the message to the JMS subscriber, the JMS subscriber may return an acknowledgement receipt to the JMS bridge. The JMS bridge may then acknowledge receipt with the JMS publisher. The JMS bridge may also log the messaging events for tracking purposes. This completes the entire life cycle of interoperating with two different JMS implementations.

In case any component is unavailable, the business transaction information is encapsulated in SOAP messages and is persisted, for example in an XML cache or a relational database. If the JMS subscriber is not available online, the JMS publisher may persist the message on the queue and republish the SOAP messages when the JMS subscriber resumes online.

Detailed Design

Creating a JMS Bridge. The topics/queue names of the target JMS are preferably registered in the JMS bridge. A JMS bridge client listens to the target topics/queue names, unmarshals the data objects or messages from the original JMS, serializes them into a SOAP message, and then posts the SOAP message to the recipient JMS bridge client. Data may also be stored in XML cache for audit logging and for message recovery. If there is no message acknowledgement, then the JMS bridge client may recover the message from the XML cache and resends it.

Receiving Messages. The JMS bridge recipient listens to any SOAP messages (synchronous or asynchronous) and acknowledges receipt of messages. Received messages may be stored in XML cache for audit logging and message recovery. Based on the previous SOAP message routing information, the JMS bridge recipient may act as a JMS publisher to publish the message content to the target JMS. The JMS bridge recipient (JMS publisher) may republish from the XML cache if necessary to provide guaranteed message delivery.

Using JMS Bridge design patterns, there may be no need to develop or implement a vendor-specific adapter to bridge two underlying middleware vendors. Caching XML data between two JMSs may preferably provide availability and interoperability. There are edge products (such as XML database) to cache XML data from one JMS that can be passed to another JMS (that is, JMS bridge or JMS-SOAP bindings). A JMS bridge is vendor/JMS-independent. JMS Bridge preferably provides guaranteed messaging between two JMSs.

Multiple Servlet Engines Design Pattern

Context

A SOAP server handles incoming service requests from SOAP clients. If there are an increasing number of SOAP service requests, a single SOAP server may become a bottleneck. If a SOAP server cannot handle the large influx of incoming service requests, the Service Requester may experience events such as a browser hanging up while waiting for an HTTP connection, HTTP connection drops, and SOAP messaging results. These exception events are examples of a poor service level, even though the service availability of the SOAP server still appears to be high.

A SOAP server is primarily a set of servlets running on top of a Web container (servlet engine). By scaling the SOAP servers vertically on the infrastructure level, architects may preferably improve the Quality of Services without changing the application.

Problem

A large influx of incoming SOAP service requests during peak hours may deteriorate the performance of SOAP servers. Adding more machines configured as SOAP servers (horizontal scaling) to meet a high volume of SOAP service requests may be expensive due to additional hardware and maintenance cost. In addition, a single SOAP server on a single Unix machine may underutilize the capacity of the CPU and memory of the operating platform.

Force

Vertically scaling the SOAP server platform may be desirable if there is excessive processing capability in the same machine hosting the SOAP server. This is typically implemented by using additional physical memory, disk space, and network adapter cards.

Solution

To horizontally scale up a servlet engine (Web container), multiple instances can be added to the same machine (e.g. Unix or Windows machine). For an entry-level Unix machine, two or more servlet engines (such as Apache HTTP server) may be configured. This may be done, for example, by installing multiple instances of the servlet engine under different directories. Administrators may also need to modify the configuration parameters (such as defining separate IP ports for each servlet engine instance and adding different environment variables or paths). A SOAP server is a set of servlets running on top of the servlet engine. Each SOAP server uses a separate IP port number. This is typically well documented in the servlet engine administration guide and the SOAP server installation guide.

Figure 30:
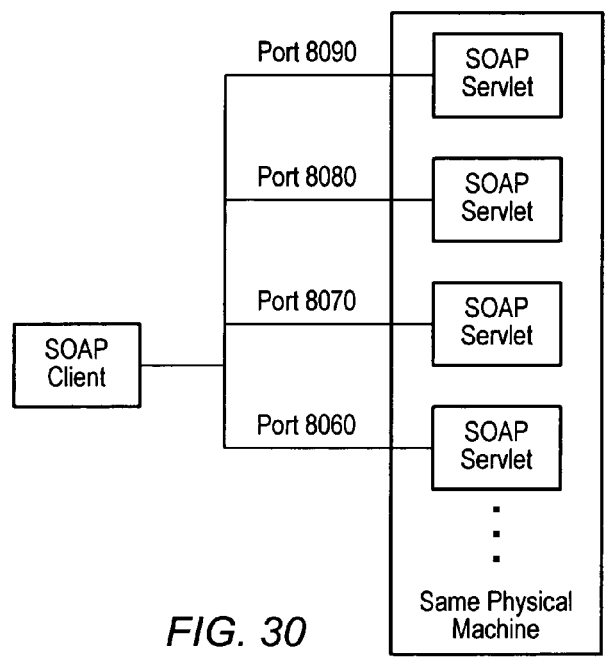
FIG. 30 illustrates an exemplary scenario with four instances of SOAP servers, each of which uses a separate IP port number, according to one embodiment.

FIG. 30 illustrates an exemplary scenario with four instances of SOAP servers, each of which uses a separate IP port number (ports 8060, 8070, 8080, 8090 respectively), according to one embodiment. As there are four instances running on the same Unix machines, there are hardware requirements, including sufficient physical memory allocated to each virtual host, an individual network adaptor for each virtual host, and more CPUs. A separate hardware capacity sizing plan exercise is preferable.

Detailed Design

Administering Multiple Servlet Engines. Install multiple servlet engines; installation and configuration may vary by vendor implementation. For example, Tomcat 4.x requires creating the variables CATALINA_HOME, CATALINA_BASE, and CATALINA_OPTS to reference to the base instance. Different ports may need to be defined in the server.xml of the $CATALNA_HOME/conf directory.

Configuring Servlet Engines. Different priorities and resources may be assigned to different servlet engines on Unix, just like any Unix processes. There may be different configurations for different servlet engines in the server.xml file, or equivalent—for example, different services and resources mapping.

Application Partitioning. Different instances of servlet engines may be dedicated to support specific applications.

Vertical scaling optimizes existing computing capacity by running multiple instances of the SOAP servlet engines. Multiple servlet engines may support application partitioning to preferably provide better performance and scalability.

Multiple SOAP engines (which are physically servlets) may be created and run on the same machine. For example, a Windows PC may run two instances of Tomcat servers, and each instance can run a separate SOAP engine.

HTTP Load Balancer (SOAP Server Farm) Design Pattern

Context

A SOAP server handles incoming service requests from SOAP clients. Vertically scaling up SOAP servers with multiple instances on the same Unix machine may allow handling a large number of incoming service requests from SOAP clients simultaneously. However, vertical scaling may reach a saturation point, where a single machine becomes a bottleneck, and potentially a single point of failure.

Horizontal scaling of SOAP servers may be implemented, for example, by connecting multiple SOAP servlets with a number of HTTP load balancers. The HTTP load balancers may preferably allow any incoming SOAP service request to be allocated to an available SOAP server instantly. To increase the processing power of SOAP service requests during peak hours, an additional SOAP server machine may be added and attached to the subnet connecting to the HTTP load balancers. This preferably does not impact the existing SOAP messaging or HTTP requests routing operations. In addition, there may be no need to cluster the SOAP servers, because if one SOAP server dies, the HTTP load balancers will allocate workload to another SOAP server automatically.

A SOAP server is primarily a set of servlets running on top of a Web container (servlet engine). By scaling the SOAP servers horizontally on the infrastructure level, architects may preferably improve the Quality of Services without changing the application.

Problem

Massive volumes of SOAP service requests are not easily handled and processed by a single SOAP server machine, even if it is configured with multiple instances. A single SOAP server machine may be exposed to the risk of single point of failure. If an instance of a SOAP server causes any system failure, the entire machine may need to be rebooted. This may be disruptive to the service operation, impacting the service level.

Force

Horizontal scaling of SOAP servers may be appropriate for a large user community with numerous simultaneous SOAP service requests. The traffic volume requirement is greater than the case in a single SOAP server machine with vertical scaling.

The implementation consideration for horizontal scaling is the server consolidation strategy. Although horizontal scaling may be implemented with low-cost machines (such as blade servers and Linux machines) and load-balancing switches, maintaining a SOAP server farm may entail considerable administrative and maintenance costs.

Solution

Figure 31:
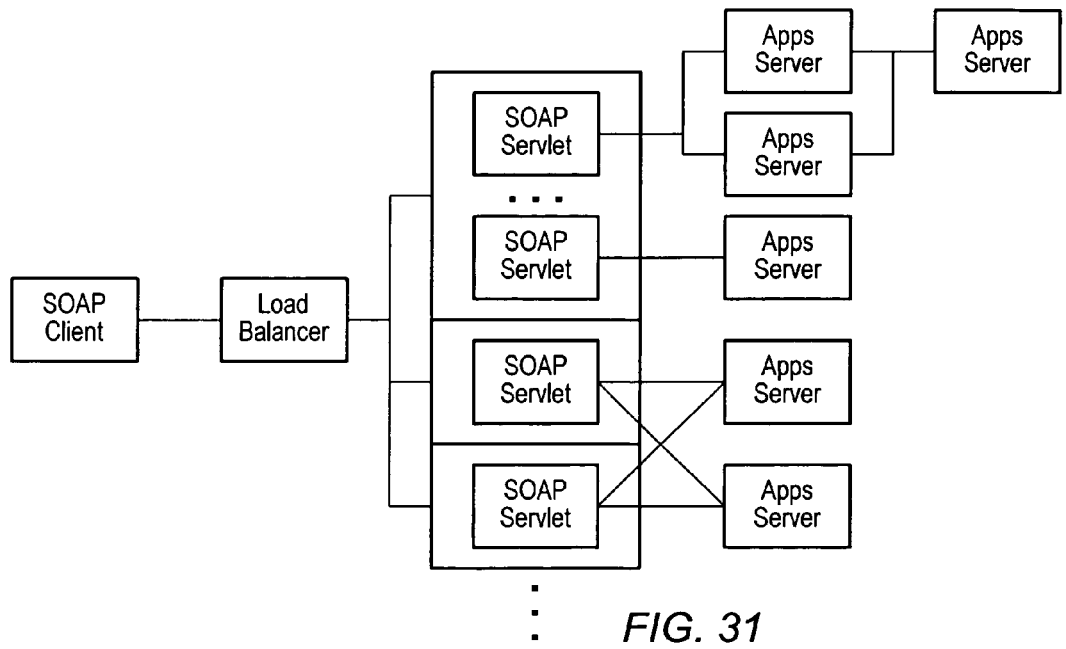
FIG. 31 illustrates an exemplary scenario using three SOAP server machines connected to a HTTP load balancer according to one embodiment.

FIG. 31 illustrates an exemplary scenario using three SOAP server machines connected to a HTTP load balancer according to one embodiment. One of the SOAP server machines has two instances of SOAP servers. Load balancers and/or switches may be used to balance the HTTP load for SOAP requests and responses. This may be applicable in building a SOAP server farm (with HTTP Load Balancer), when the Web Services network traffic increases.

SOAP RPC router (SOAP server) is primarily a servlet running on a Web container (for example, Apache Tomcat, Sun ONE Web Server, or WebSphere Application Server). Architects and developers may run multiple instances of SOAP RPC routers on a physical machine (for example, a multiple-domain machine such as Sun Fire 6800) for vertical scaling or run multiple instances on separate machines as a SOAP server farm for horizontal scaling. As in the HTTP load balancing design, HTTP traffic and SOAP RPC routing may be better managed by horizontal scaling because each instance of the server farm has a separate network adapter and if one is unavailable, the other instance can take over the processing.

Architecturally, the SOAP RPC router may be installed, for example, on a Sun ONE Web Server (Web Container) and a J2EE Application Server (Web container and EJB container) in the same operating environment. It may be preferably to decouple the Web Tier from the Application Tier for security and scalability reasons. It may be preferable to install the SOAP RPC router on the Web Tier (e.g., Sun ONE Web Server) because of the following considerations:

Security Considerations—There is typically no business logic in the Web Tier. SOAP RPC router is acting as the SOAP message router behind the DMZ (Demilitarized Zone) firewall. If there is any security attack such as Denial of Service, this will not affect the business logic.

Better Scalability—With the use of load balancers, architects and developers may scale up with horizontal scaling of the SOAP RPC routers (SOAP server farm) if the SOAP RPC routers reside on the same machine as the HTTP Server. If SOAP RPC routers reside on the same machine with the application server, this may allow only vertical scaling by creating multiple instances within a Unix machine (for example, multi-domain Solaris OE).

SOAP requests may be evenly spread out to different SOAP servers during the peak hours. Additional programming may not be required in the application or server side. In one embodiment, a SOAP server farm may be implemented by combining SOAP servers with the Web servers and HTTP load balancers as Web Services appliances (or edge devices).

State Management Design Pattern

Context

A complex business transaction may include a chain of remote business services, where each RPC-based Web Services call is dependent on one or more other calls. Architects may be tempted to persist the state of each RPC call, so that they can roll back to the previous state in case there is any exception in the midst of the chained RPC calls. Keeping track of numerous chained Web Services calls may create heavy resource overheads, especially when the Web Services call invokes an EJB via RMI/IIOP. In addition, the business rules for potential rollbacks tend to be complicated.

Keeping the session information is different from maintaining the state of each Web Services call. Session information (such as whether a JAX-RPC Web Service is successfully returned with a result) may be captured, for example, for tracking high-level Web Services calls, for security monitoring, and for Single Sign-on. In case the JAXRPC call fails, the client may resend the request based on the session information.

Figure 32:
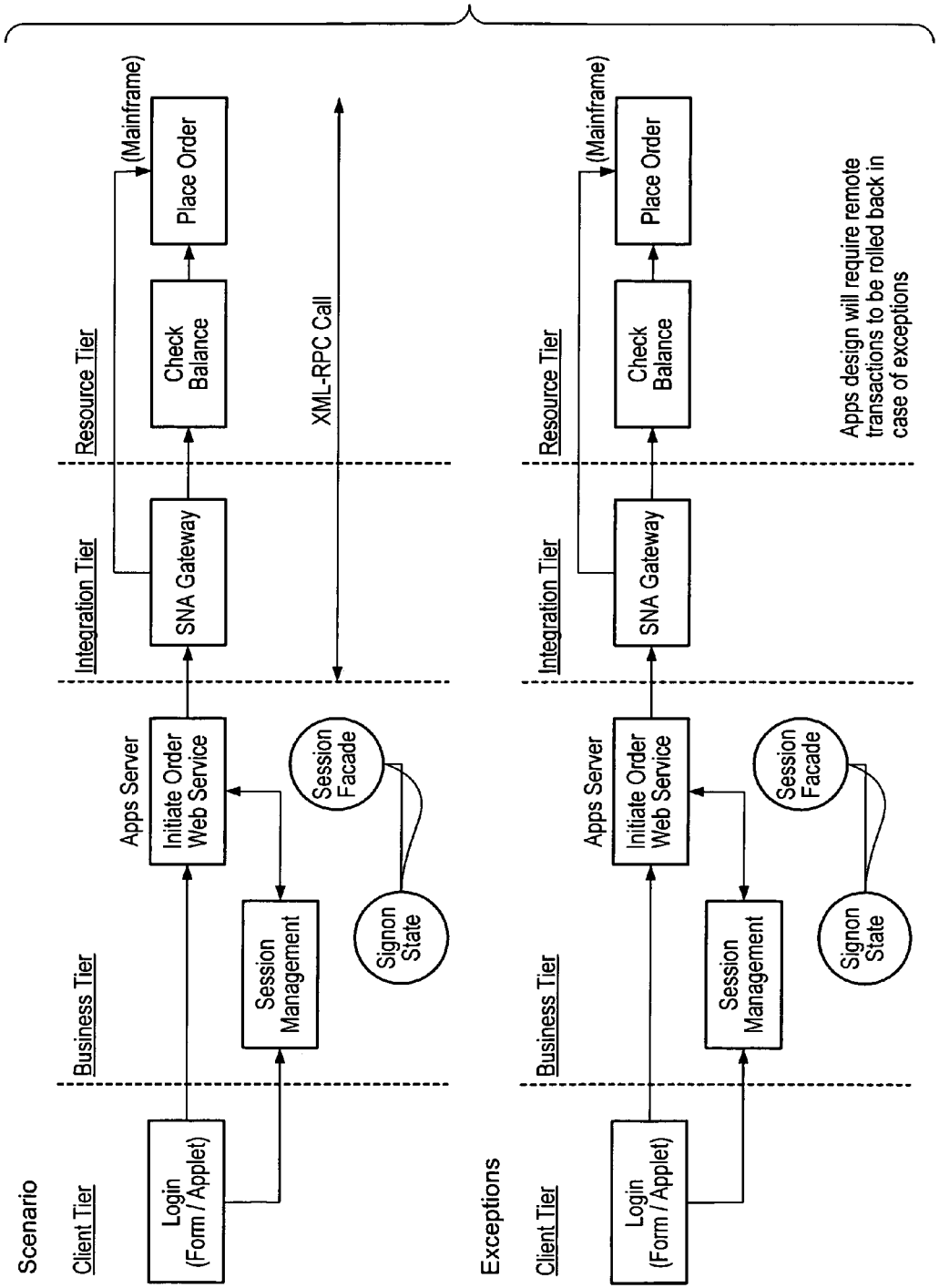
FIG. 32 illustrates exemplary State Management using RPC-based Web Services calls according to one embodiment.

This design pattern suggests a scenario of how states are handled using RPC-based Web Services calls. FIG. 32 illustrates exemplary State Management using RPC-based Web Services calls according to one embodiment. In this sample scenario, an investment manager wants to place a trader order of 10,000 stocks with the sales trader. The investment manager's SOAP client initiates a trade order Web Service that triggers a chain of Web Services calls. This includes authenticating the user credential for Single Sign-on, checking the access rights to place a trade order, checking the account balance for risk exposure, and placing the trade order. Most of the business functionality resides on the legacy mainframe system. Each Web Services call is dependent on the others.

In a stateless RPC-based Web Services call scenario, the session management module creates a login session, and authenticates the user credential. Upon successful log in, the system redirects the user to the order booking page. By filling in the trade order details, the SOAP client may be able to invoke the high-level trade order Web Services call. A session facade may be used to perform, for example: checking the access rights, checking the account balance, and placing the trade order. Each RPC call is dependent on another. In this normal scenario, the investment manager is a valid user with access rights to place a trade order. Each RPC-based Web Services call is successful, and the session facade confirms that the trade order is placed successfully. During the RPC-based Web Services calls to the mainframe system, no state information is captured. Only the return code of each call is logged and tracked.

If this is a stateful RPC-based Web Service, each of the Web Services calls may capture the state information. There may be code customized to handle all possible exceptions. In this sample scenario, if the Web Services call to place a trade order fails, the system may roll back to the previous Web Services call (check balance). Practically, the process "check balance" does not process any business transaction and is simply an inquiry. Capturing the business logic to handle roll back and exceptions may be redundant and resource-intensive. The design may be simpler to reinitiate the trade order Web Services, if there is any exception during the chain of Web Services calls.

Problem

Some architects maintain states for remote transactions because they can reinitiate the remote transactions if there are any exceptions. However, maintaining states incurs system overhead and heavy resources.

Force

RPC-based Web Services calls may be stateful or stateless. Stateful RPC-based Web Services calls denote persisting the states of every remote call, but tends to be resource expensive. A stateful EJB may be created to initiate a chain of Web Services calls. This is also called EJB Web Services, and it is preferable for developers to design what state information is captured and how to use it. Stateless RPC-based Web Services calls may be simply remote procedure calls implemented in a Java program or a servlet. They do not capture any state, and therefore there is no mechanism to roll back any transaction. In both cases, the return code of the Web Services calls may be captured and logged. The choice of stateful or stateless Web Services may be dependent on business requirements and operating environment constraints. Typically, if the remote business services are provided by legacy mainframe applications via RPC-based Web Services calls, it may be difficult to capture the states without changing the back-end mainframe applications.

The session information (for example, the user, date, and time) tracked during a session may be applicable for logging and exception handling. Architects preferably consider what session information is necessary to support security session control or event tracking. This is preferably separate from maintaining states.

Solution

Figure 33:
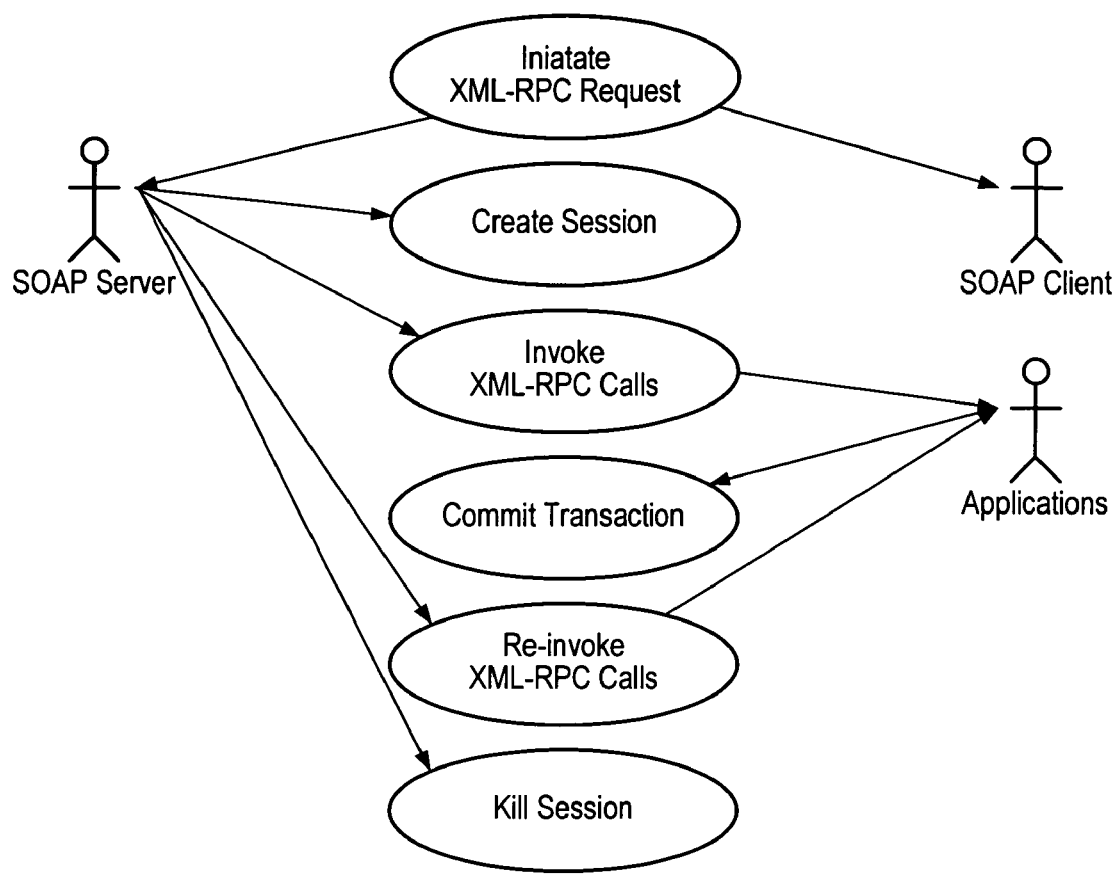
FIG. 33 illustrates six business scenarios or Use Cases according to one embodiment.
Figure 34:
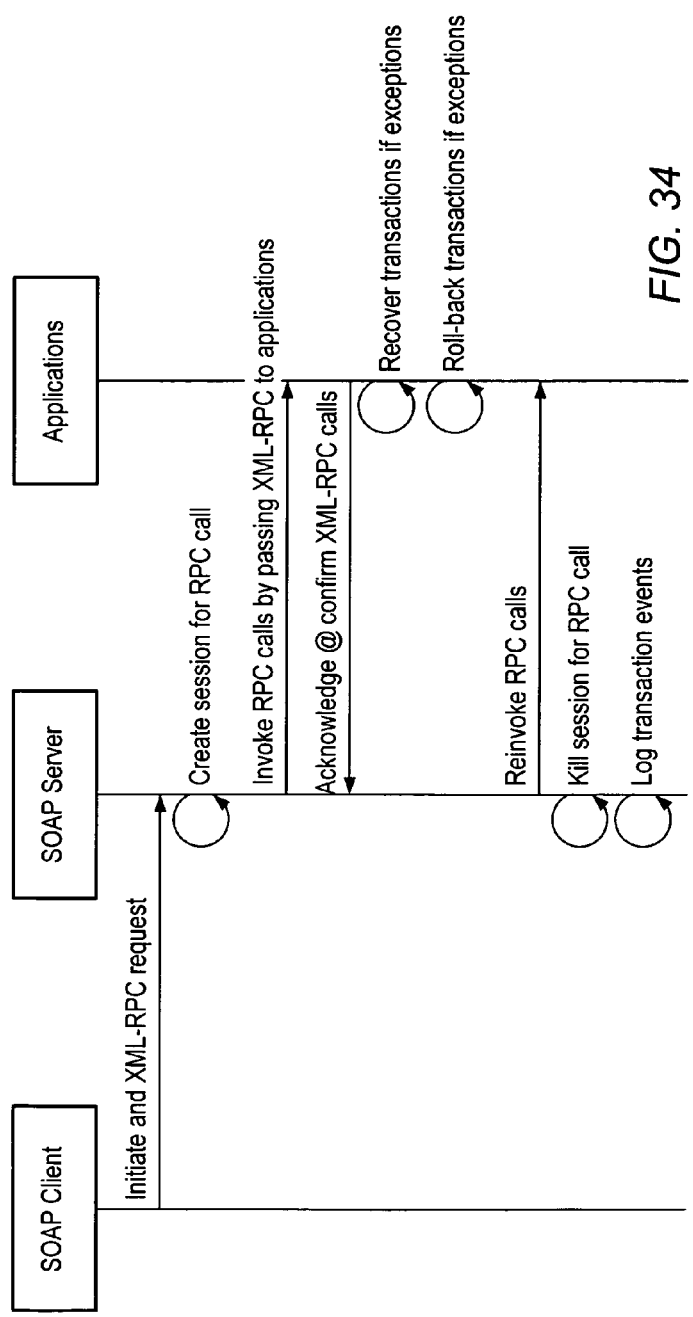
FIG. 34 is a State Management Sequence Diagram according to one embodiment.

FIGS. 33 and 34 illustrate the logical process with Use Cases and sequence diagrams for state management according to one embodiment. FIG. 33 illustrates six business scenarios or Use Cases according to one embodiment. A SOAP client initiates a chain of RPC-based Web Services calls. The SOAP server creates a session to track the Web Services calls. The Web Services calls invoke the remote business applications via XML-RPC. The remote business applications process requests from each RPC call. Upon completion of a current RPC call, the RPC call may return to the SOAP server (or the parent Web Services call), which may initiate the next Web Services call. After all RPC calls are completed, the application may commit transactions. The session may be killed. The SOAP server may also reinvoke the RPC call if any exception is encountered.

FIG. 34 is a State Management Sequence Diagram that elaborates on the Use Cases of FIG. 33 according to one embodiment. The SOAP client may initiate a stateless RPC-based Web Services call by passing an XML-RPC request to the SOAP server. The SOAP server uses a session facade, creates a sign-on session, and builds up a chain of RPC-based Web Services calls. For each RPC call, the session facade tracks the session information for the calls, and invokes the back-end mainframe applications. The back-end business application acknowledges the RPC call and processes the service request. If the service request is successful, then the application may return the requested business information. If there is any exception, the application may handle error recovery or roll back. The session facade may then reinvoke the RPC call. Upon successful completion of all RPC calls, the session facade may kill the session and log the transaction events to the logger.

Detailed Design

SOAP Client. XML-RPC from a SOAP client may create a session variable, but may not be able to track states remotely for several reasons which may include one or more of, but are not limited to:

State cannot be updated and tracked remotely.

Multiple phase commit may create many wait states and may be overly complex and therefore problematic.

Remote RPC is typically functionally like a black box and may not support state management.

Remote Applications. Remote Applications may be black box processes, which may or may not support state management or transaction roll-back/roll-forward. Upon completion of the Web Services call and success return code, the SOAP client may kill the session; otherwise, the SOAP client preferably assumes the RPC call fails and needs reinvocation.

In case of exception in the midst of the XML-RPC call, the SOAP client may not want to reinvoke automatically for various reasons; therefore, it is preferable to not make design assumptions to reinvoke automatically.

Using embodiments of a State Management design pattern, Session control is in place for XML-RPC Web Services, where remote transactions can be reinvoked if the session dies or fails over. There is also a clear demarcation of recovery. Remote applications are preferably responsible for transaction rollback or roll-forward for recovery, while Web Services preferably handle invocation only, not provide recovery. Architects may reuse the session facade pattern (use of session bean to encapsulate the complexity of interactions between the business subjects participating in a workflow) in designing state management. This pattern provides a uniform coarse-grained service access layer to clients without overloading the system performance by storing states for each tier.

SOAP Logger Design Pattern

Context

Transaction logging may be essential for troubleshooting, audit trail, and billing. Service providers may need transaction logging information for metering service levels or billing, if they provide a variety of Web Services calls to Service Requesters. High-level Web Services call information may be captured in the SOAP server level, using the logging infrastructure provided by the Web container (for example, Java logging API from J2SE version 1.3.x/1.4). This may preferably reduce application developers' efforts to capture Web Services calls.

Problem

SOAP request-reply does not support logging. Apache SOAP server does not provide sufficient logging capability for audit trail or for billing purposes. Developers may need to add customized Web Services call transaction logging functionality or to rely on the application server platform to provide logging.

Force

JAX-RPC-based Web Services may not support transaction logging if the remote business services cannot generate logging events. Thus, the support of transaction logging may depends on factors including, but not limited to: the logging infrastructure (as provided by the Web container or customized logging facilities) and the capability of remote business services to generate logging events.

Solution

Figure 35:
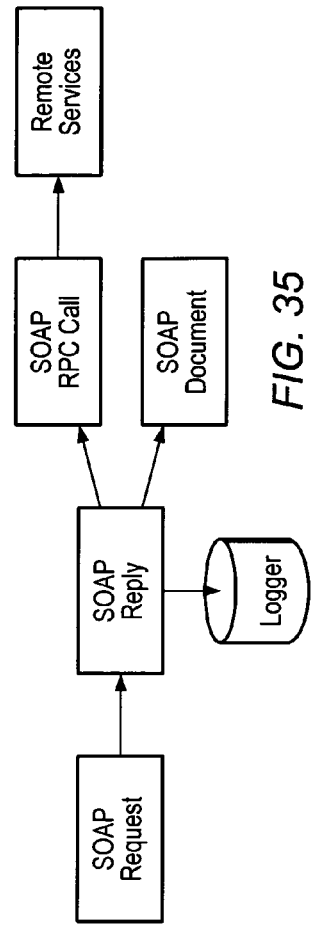
FIG. 35 illustrates an exemplary scenario where the SOAP server (SOAP reply) generates a logging event before it initiates a SOAP-RPC call or a document-based Web Services call according to one embodiment.
Figure 36:
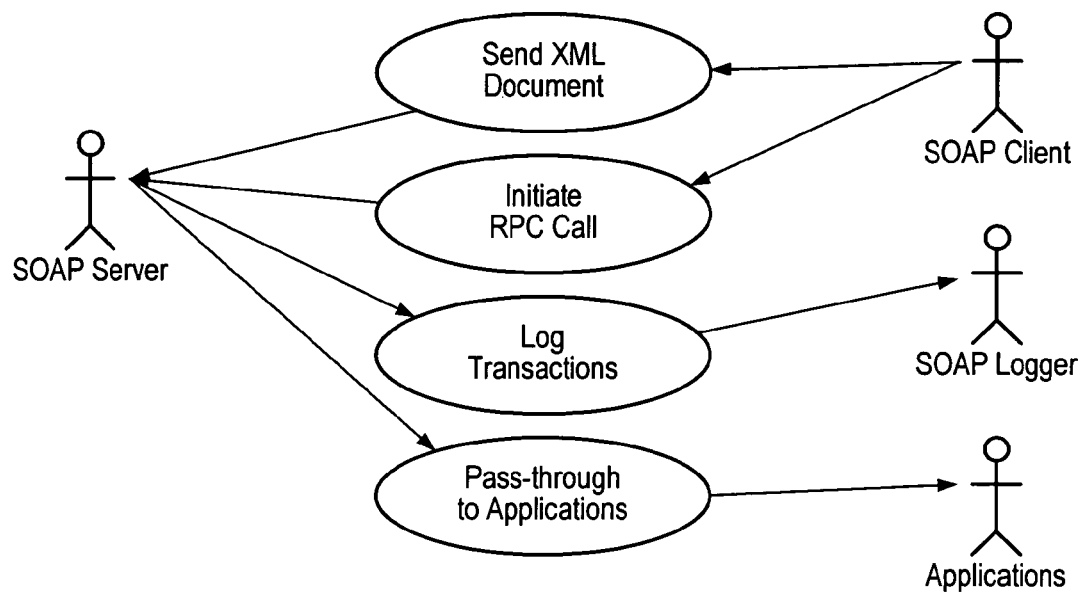
FIG. 36 illustrates four Use Cases for transaction logging according to one embodiment.

FIGS. 35, 36 and 37 illustrate the logical process with Use Cases and sequence diagrams for a SOAP logger according to one embodiment. FIG. 35 illustrates an exemplary scenario where the SOAP server (SOAP reply) generates a logging event before it initiates a SOAP-RPC call or a document-based Web Services call according to one embodiment. In one embodiment, this may be based on the logging provider class provided by J2SE 1.4, or alternatively on the logging facility in Apache AXIS. Other logging mechanisms may also be used.

FIG. 36 illustrates four business scenarios, or Use Cases, for transaction logging according to one embodiment. A SOAP client initiates a document-based or an RPC-based Web Services call by sending an XML document to the SOAP server. The SOAP server, using the logging provider class, logs the transaction events, and binds the service endpoint URL to the remote business applications.

FIG. 37 is a SOAP Logger Sequence Diagram according to one embodiment, and elaborates on the above Use Cases. Once the SOAP client initiates a SOAP service request, the SOAP server may unmarshal the sender information from the SOAP envelope and the session information. The SOAP server logs the sender and session information in the logger using the Java API for logging. The SOAP server may then invoke RPC calls with the remote business applications. The date/time and usage may also be logged in the logger. Upon successful invocation of the remote business services, the SOAP server may acknowledge with a return code or an exception. The information captured in the logger may be sufficient for basic usage analysis and per-call-based billing.

Detailed Design

Logger Design. J2SE 1.3.x or 1.4 has a logger API that may be used for logger design in one embodiment. The SOAP envelope may be unmarshaled to acquire the sender information and time stamp for logging.

Time Services. If time services are required for remote RPC calls, the start time and the end time for the RPC call invocation are preferably tracked for logging purpose.

Persistence and Storage. The choice of persistence and storage (for example, LDAP, RDBMS, XML Cache, or flat file) may determine the quality of data security of the logging information. Though the logging information may not contain sensitive financial information, it may be applicable for audit tracking, and perhaps for billing. Therefore, the logger is preferably protected in the server for access control (for example, file access restricted to server administrators only).

There is preferably a proper archive strategy, and backup/restore procedure for the logger (such as daily backup or archive every 30 days).

Logs of SOAP replies (requester, request time stamp, or service request) may be captured for audit trail or for billing purpose. The built-in features of Java logging may be leveraged.

High Availability of Service Registry Design Pattern

Context

Service Requesters that use dynamic service look-up for Web Services may be dependent on the availability of the Service Registry. High availability of the Service Registry denotes the Service Registry is always available, even though one of the instances may fail or be hacked.

Problem

Dynamic service look-up may require the Service Registry to always be available. If there is any downtime, no SOAP client (Service Requester) can access remote business services. Although the Service Registry functionality may be based on a standard such as the UDDI or ebXML standard, vendor implementations may vary, and there may be no standard mechanism to support high availability.

Force

The provision of a high availability Service Registry requires a resource cost (for example, redundant hardware platform or redundant network switch).

Solution

The Service Registry may be made resilient by clustering the hardware platform that runs the Service Registry. FIG. 38 illustrates an example of clustering the hardware platform of multiple Service Registries according to one embodiment. The contents of these Service Registries may be synchronized using the underlying database replication or proprietary Service Registry replication utilities (such as Systinet's UDDI registry).

Detailed Design

General. In one embodiment, it may be preferable to follow "the rule of three." This means that architects preferably have at least three instances of the Service Registry running in production. These instances may be clustered to provide a better level of service availability. With at least three instances, if one is down, then there are at least two other instances clustered as backup.

Hardware Level. Hardware level clustering of all UDDI servers may be applicable, for example, to provide machine-level availability. Hardware-level failover may have a short lead time to switch from one UDDI server to another (for example, 10 minutes); thus, this preferably goes hand in hand with the software level (see below).

Network Level. Network-level resilience may be important when UDDI service look-up becomes critical. Dual network link or cross-network switch is one possible option.

Software Level. Software-level availability of UDDI servers may depend on the physical implementation (e.g., RDBMS, LDAP, or proprietary). RDBMS may have a parallel database server (data synchronization); yet the I/O overhead to synchronize data in real time may be high; thus the machine resources and costs may be higher. Another RDBMS variation is to have standby database mode, where the secondary database is replicated. LDAP may be set up as master-slave replication; thus when one fails, the slave (secondary LDAP) takes over. Proprietary implementation may make use of mirrored disks and manual switch over; but the service level may be unpredictable.

A benefit of the High Availability of Service Registry design pattern is that it preferably provides 7×24×365 availability, and thus preferably enables service lookup running nonstop (not disruptable).

The Service Registry may be clustered on a redundant hardware platform such as Sun Fire mid-frame series, which has redundant power supply, redundant system boards, and network adapters. This preferably enables better availability.

UDDI Deployment Design Pattern

Context

The Service Registry enables service look-up and accessing remote business services. External or internal security attacks may intrude into the Service Registry and cause denial of service. The Service Registry (e.g., UDDI or ebXML Service Registry) are preferably deployed with appropriate firewall protection.

Problem

Determining in which tier (outer tier, DMZ, or inner tier) the UDDI Service Registry is placed. Public and private Service Registries may have different security requirements, and may not have the same deployment and security protection strategy.

Force

Potential security attacks on the Service Registry may be a threat to the discovery and invocation of Web Services, and may impact the service availability.

Solution

Figure 39:
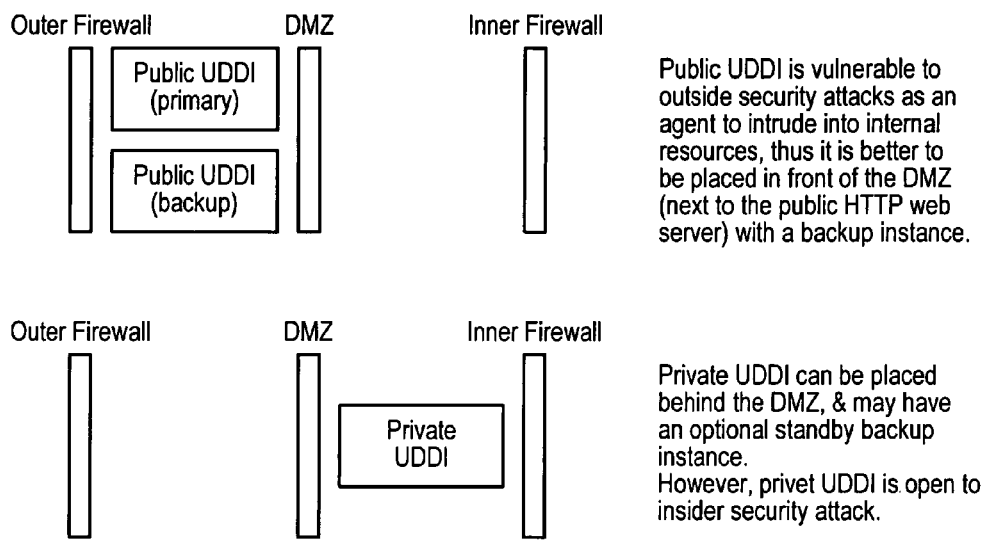
FIG. 39 illustrates deployment scenarios for both a public UDDI Service Registry and a private UDDI Service Registry according to one embodiment.

FIG. 39 illustrates deployment scenarios for both a public UDDI Service Registry and a private UDDI Service Registry according to one embodiment. Public UDDI Service Registries may be vulnerable to outside security attack. The security attack typically takes the form of a penetrating agent (e.g. a Trojan horse) and may intrude into internal resources once access to the internal network is gained. Thus, it is preferably to place the UDDI Service Registry in front of the Demilitarized one next to the Web server with a standby instance. This is similar to placing the DNS server in front of the DMZ.

Private UDDI Service Registries are primarily intended for internal use. Private UDDI Service Registries have different security risks when compared to public UDDI Service Registries. It is preferable that private UDDI Service Registries be placed behind the DMZ. An optional standby instance may be installed. However, private UDDI Service Registries may be open to insider security attacks.

Detailed Design

Deployment Architecture. There are many types of UDDI Service Registries, but there may be no need for an individual deployment architecture for each type. The UDDI deployment architecture typically varies for public UDDI and private UDDI. The UDDI Deployment design pattern preferably provides reduction of security risk for the UDDI Service Registry by placing the service registry in the appropriate tier. The UDDI port (port 8080) is preferably defined and opened in the firewall policy. A Public Service Registry is preferably deployed in the demilitarized zone behind the outer firewall. A private Service Registry is preferably deployed behind the DMZ.

Publish, Unpublish, and Discover Web Services Design Pattern Context

The Service Provider (developers and architects) registers, publishes, and unpublishes a business service to a Service Registry for consumers (end users and trading partners) to utilize. Each Service Registry vendor product typically has its own set of APIs and utilities to manage publishing and unpublishing business services and service information, though these products typically support a Service Registry standard. Thus, there may be a design and management issue for architects and developers who preferably determine the best strategy for managing different vendor product implementations.

Problem

Different Service Registry vendor products may have different APIs to publish and unpublish. Thus, if architects and developers have multiple Service Registry vendor products, they may need to maintain different sets of programs to register and publish Web Services.

Force

Different vendor implementations of Service Registries typically have their own set of APIs to publish or unpublish business service information. This may have an impact on developers if they decide to migrate from one vendor product to another. Developers may consider standardizing APIs (such as using JAXR, or creating an abstract layer on top of the vendor-specific Service Registry APIs) to publish and unpublish Web Services to the Service Registries for easy maintenance and high usability.

Solution

It is preferable to use JAXR (JAX Pack) to access UDDI. This enables developers to switch to other UDDI vendor products seamlessly without rewriting their code. Developers may replace the query.url and publish.url entries in the registry.properties file to denote the specific UDDI vendor product APIs. There is preferably no need to recompile or rewrite the code if a new Service Registry product is used.

The Java Web Services Developer Pack Tutorial includes a sample JAXR publisher that can be reused as a standard template. Developers may use a registry.properties file to specify the query.url and publish.url for the specific Service Registry. The same JAXR publisher and registry.properties may be customized as standard Web Services utilities that may be reused for implementation in a different country. Architects and developers may customize their JAXR Publisher utility in the Proof of Concept stage or future phases.

There are implementation and migration risks when migrating from one Service Registry to another because they use different publish and unpublish APIs. Switching from one Service Registry vendor to another may incur intensive testing and regression testing. To mitigate the risk, architects and developers may adopt the JAXR standard using the registry.properties file to work with any Service Registry vendor product. This approach preferably does not require retesting as JAXR can work with both UDDI and ebXML Service Registry vendor products without rewriting the APIs.

Some of the common and infrastructural services, even including authentication and authorization services, may be published in the Service Registry. JAXR provides a common and standardized mechanism to browse and invoke these services. If architects and developers determine to transition to a new Service Registry vendor product or to split the services to multiple Service Registries, this JAXR approach preferably does not require developers to migrate or redo any integration testing.

Alternatively, architects and developers may provide a standard set of B2B Web Services APIs using JAXR to their trading partners. With these standards-based APIs, trading partners preferably do not need to worry about the client platform or back-end integration with the invocation APIs, as the same invocation APIs (URIs) using JAXR will work with any platform.

Version Management of Deployment and Service Registry Design Pattern

Context

Many Service Providers (such as retail banks) have deployed legacy customer front ends and systems around the world. Once they adopt Web Services for customer integration, it may be necessary to integrate with these legacy customer front-ends and systems. However, these systems provide the same business service functionality, but they likely run on different platforms with multiple versions. A challenge is to standardize the software versions simultaneously in terms of management and upgrade cost. These Service Providers need to deploy and manage different versions of Web Services in a structured and manageable manner. The Service Registry may be used as an administration tool to centralize managing different versions of Web Services deployment.

Problem

There are different versions of business services available to support different platforms, different customers (customized for specific customers), and different countries. It is preferable to manage different versions when publishing (and even discovering) business services from the Service Registry.

Force

Different variants of clients or software versions of the interfaces may be deployed in parallel. Administering and managing different versions for the same client or trading partners may be complex.

Solution

Different versions of business services may be registered in the Service Registry under the same Service Provider as different service bindings (e.g., URLs) and service binding descriptions. This preferably enables running variants of the business services globally in parallel.

Publishing different versions of business services may require planning ahead of the versions (for example, creating a product version roadmap). The Service Registry may act as a tool to track all versions, and may be supplemented by Web Services network Service Providers such as Flamenco Network and Talking Block. These and other vendors provide services that can route the client request to different versions of the remote Web Services based on their profile.

There is preferably a synergy between the service versioning development best practice (for example, specifying the service version in the SOAP message header attribute) and this best practice. Practically, the service version preferably ties to (or equates to) the "Service Bindings" and their associated service end-points (or service bindings access URI). They collaborate to provide manageability of deployed Web Services.

Using URLs in the service bindings to manage versions may be a manual process, prone to careless human errors (for example, during staff changeover). Web Services network tools that provide an administrative tool to track versions and to deploy URLs may supplement this. Alternatively, architects and developers may develop some utilities to publish different versions of business services.

Registry Content Management Design Pattern

Context

Service Providers (developers) preferably manage the contents of Web Services globally to provide timely access and update of the service endpoint URLs. Being able to create, publish, and access timely information for a large user community is preferable. The timeliness of service information may affect the quality of Web Services.

A large user community may generate a large volume of service information. As the number of content providers or Service Providers increases, the process of updating the content of the Service Registry may become more complicated to manage. There is preferably a well-defined Service Registry content management process to manage the timeliness of the service information. If there are multiple Service Registries deployed, there is preferably a deployment strategy to synchronize them.

Problem

The Service Registry allows dynamic updates of the business services and related service information. As the service information size is typically small and the update may be essentially instantaneous, developers may assume that a Web Services client performing a dynamic service look-up is able to discover that the service has just been removed or upgraded. However, there is a risk of synchronization issues, as in the case of DNS management.

Forces

Factors affecting the content management strategy for Service Registries may include, but are not limited to, the business rules and the data volume. Local business rules of updating and replicating the business service information (for example, service endpoint URLs) are preferably established. The data volume (size of the business service information) and the number of Service Registry instances are preferably updated and managed.

Solution

Immediate Recommendation. It is not recommended to dynamically update the Service Registry on the production platform. Doing so exposes the risk of synchronization problems when any Web Services client is looking up the service end-point. In addition, there is no fallback if the production master Service Registry is updated directly. There are preferably operational processes defined and reinforced to ensure updates are accurate and timely. This can be addressed in future phases.

Figure 40:
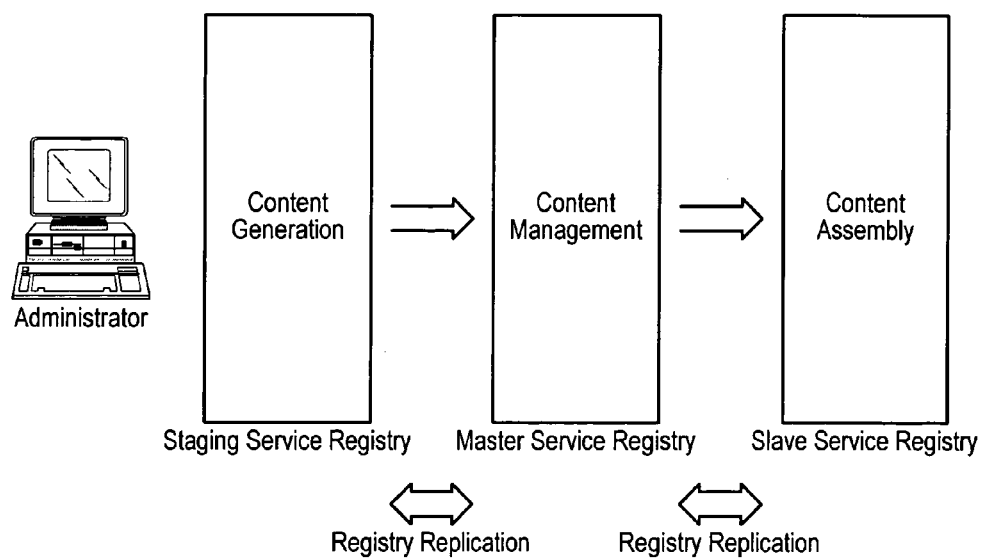
FIG. 40 is an example of a staging Service Registry according to one embodiment.

Short-Term Recommendation. A staging Service Registry is preferable, where administrators can perform updates. There are preferably scheduled replications (for example, every hour) to synchronize the master Service Registry with the staging Service Registry. Administrators may also push replication in real-time, if necessary. The replication implementation is preferably synchronizing the "delta." The replication schedule may be dependent on the number and volume of the changes, and may be increased as the volume goes up. There are preferably scheduled replications (such as every 8 hours or every 24 hours) to synchronize the master Service Registry with the slave Service Registries. FIG. 40 is an example of a staging Service Registry according to one embodiment.

For emergency (ad hoc with high priority) updates, it is preferable that administrators push the update to the master Service Registry (that is, nonscheduled), which pushes the updates to the next tier of the slave Service Registries in real-time.

Removing a business service may entail removing the entry instantaneously from the Service Registry. Typically, the deprecated or decommissioned business service is made unavailable before the update of the Service Registry. During service discovery, Web Services clients are preferably able to get a return code from the Service Registry indicating that the service is unavailable, and the client's exception handling routine is preferably able to display an error message.

Upgrading a business service entails removing the entry and adding a new entry in the Service Registry. However, customers may desire or need to run multiple versions in parallel, without decommissioning older versions immediately. As service discovery is designed to bind the business service at runtime, the chance of binding to the old business service during the update may be slim because the update is instantaneous. It may be helpful to check the version from the SOAP message header. If a different version is found, then the Web Services client can reinvoke the business service again for the upgraded business service.

Design Consideration

Design considerations may include, but are not limited to, the following.

JNDI Look-up vs. UDDI

In one embodiment, JNDI look-up may be performed in place of UDDI look-up. The benefits of doing this may include one or more of, but are not limited to:

There is no dependency on an additional UDDI server.

Established Java programs already use JNDI.

It alleviates the complexity involved implementing and tuning UDDI servers.

JNDI provides a better paradigm of dynamic discovery (Jini!).

Web Services Troubleshooting Approach

SOAP calls debugging tools (for example, XLVILSpy) may be used to trace each step invoked. SOAP load testing tools may also be used. A general troubleshooting approach is to identify the first-tier bottleneck (for example, memory, I/O, or network), and perform load testing with different transaction volumes and at different times see whether the problem is related to load or time.

Performance Tuning

Performance tuning of SOAP calls is similar to tuning and scaling up a servlet (SOAP is a servlet). Tuning an XML-RPC call may be difficult, as there may be multiple processes beneath it and the remote applications may be wrapped as a SOAP-based Web Service (black box processes). One approach is to trace the SOAP calls to narrow down the potential problem areas and isolate the problem by trial-and-error testing (for example, repeat the first-tier bottleneck testing or load testing).

Other Design Guidelines for Web Services

Other design guidelines for Web Services may include one or more of, but are not limited to, the following.

Coarse Grained

There is a general understanding among Web Services architects that Web Services calls need to be coarse grained, while leaving EJBs or Java beans fine grained. In other words, a customer may start with one single coarse-grained Web Service, where different services can be invoked by passing parameters in the Web Service call (either an XML-RPC or an XML message). Architects may also expose the business service using a coarse-grained uniform access point such as a business delegate or a session facade.

Performance

The notion of Web Services being slow because of transmitting or XML parsing may be a myth. A GeSC test shows that the response time for a simple transaction on an IBM F40 machine with no load yields 8 ms. The same transaction on an IBM F80 machine can yield over 300 transactions per second. XML, parsing may be addressed by using XML parsing library calls. The live implementation of Hewitt Associates' managed HR services using Web Services may yield similar results. Hewitt Associates' Web Services implementation can support up to 4 million transactions per day.

Distributed Events

Design patterns for managing distributed events using a Distributed Event-based Architecture (DEBA) have been identified. DEBA patterns make use of state machine concepts and callback design patterns (visitor and observer). This allows an easy implementation of a dynamic workflow model. DEBA patterns may include multiple observables (providers) and observers (requesters) as well as distributed state machine, router, workflow, and composite patterns.

Web Services Architecture Summary

In summary, Web Services products typically come with specific product architecture. For example, the UDDI Service Registry must run on a specific RDBMS vendor product. These Web Services vendors do not typically provide a framework or architecture methodology for defining, customizing, and implementing enterprise architecture solutions using a combination of Web Services products. Embodiments of a structured Web Services architecture framework as described herein may provide a structured methodology to define Web Services components. Embodiments may also help in selecting appropriate tools for meeting different Quality of Services ("ilities") during the development and deployment life cycle. Web Services design patterns may be accumulated as experience is gained from deployment. It is preferable to maintain a catalog of customized Web Services within an enterprise for future reuse.

It is preferable to keep a high-level session variable for each XML-RPC Web Services call to track who is making the call and when. This may help track the security session and Web Services performance monitoring. It is preferable to perform stress testing in different time periods before deploying Web Services. It is preferable to use fine-grained Web Services that attempt to expose all APIs as Web Services. It is preferable to use the same deployment architecture and support strategy for public and private UDDI registries. High availability for Web Services may be achieved by clustering all hardware machines. It is preferable to use one Web Service to embrace multiple back-end sources across different machines (difficult to troubleshoot and isolate the problem sources).

Mainframe (Legacy) Integration And Interoperability

The capability to reuse existing business functionality via Web Services technology, instead of system rewrite, may be attractive in terms of total implementation cost, integration effort, and risks. Business functionality developed on IBM legacy mainframe platforms may be integrated by exposing the business service (for example, from existing CICS screens, SNA LU 6.2 verbs, and COMMAREA) via SOAP client proxy and XML-RPC technology. Interoperability approaches to expose the business functionality of the legacy mainframe platform may include, but are not limited to: CICS Transaction Gateway, APPC adapter, EAI adapter for mainframe, Linux 390/z/OS, WebSphere/390, and SOAP proxy on z/OS. Each of these approaches may require additional software to be installed and thus may have different architecture impacts. These approaches assume a long-term commitment to using a legacy mainframe. Alternatives to interoperating with a legacy mainframe may assume a stop-gap measure to integrate with the mainframe systems using Web Services technology, while migrating the business functionality to the Open Standards in parallel. The migration may be done, for example, using transcode, recompile, rehost, and refront technology.

This section identifies mainframe interoperability approaches using Web Services technology and when to use them. This section also identifies the alternatives to mainframe-based interoperability approaches and their associated benefits.

Integration Technology for Legacy Mainframes

There are two different types of integration technology for legacy mainframe systems. The first type is asynchronous messaging, where all service requests and transactions are represented in business documents, and they can be sent via a message-oriented middleware such as WebSphere MQ or a JMS-compliant middleware product. The business documents may be then wrapped in a SOAP envelope and delivered via SOAP messaging over MQ or JMS. The second type is synchronous messaging, where all service requests and transactions are initiated using CICS ECI, EPI, or ESI calls. A server-side SOAP component (SOAP tier or skeleton) may be created to initiate the remote business transactions on the mainframe via these ECI, EPI, or ESI calls. Some available integration options are described below.

Asynchronous messaging for mainframe integration (such as WebSphere MQ or previously IBM MQ Series) is queue-based messaging, and it does not support real-time processing.

In one embodiment, the business functionality provided by legacy applications may be wrapped as Web Services using an XML-RPC approach.

Some customer environments may not support a message-oriented middleware infrastructure. In these environments, integrating with mainframe systems may be restricted to remote calls to CICS transactions. Thus, mainframe integration using synchronous messaging and RPC-based Web Services is described below.

CICS Transaction Gateway

The CICS Transaction Gateway (CTG), may include, but is not limited to, the following components:

Gateway Daemon—A gateway function that listens to a specified TCP/IP port using TCP, SSL, HTTP, or HTTPS, for Java clients to access CICS applications.

Client Daemon—Provides client-server connectivity to CICS applications via External Call Interface (ECI), the External Presentation Interface (EPI), and the External Security Interface (ESI) calls.

CTG Java Class Library—ctg.jar is a set of Java classes used to initiate ECI, EPI, and ESI calls and to access VSAM and IMS datasets.

Configuration Tool—Is a graphical user interface to configure the properties for the Gateway Daemon and Client Daemon in the CTG.INI file.

Terminal Servlet—A Java servlet that emulates the 3270 CICS application.

CTG may be deployed in different design configurations based on the application architecture (for example, whether the Web server, the application server, and back-end CICS systems are on the same machine), integration strategy (for example, direct connection to CICS with no intermediate component), and performance constraints (for example, whether multiple ports are required to connect to the target CICS applications). The deployment configuration may depend on whether an architects' long-term strategy is to extend the mainframe usage (for example, deploy all Web servers, application servers, and back-end applications on one single mainframe) or to use the mainframe as a Resource Tier (which may allow more technology options to scale up the application services and interoperate the mainframe applications with applications running on other platforms).

Same Platform

A servlet uses the underlying CICS-proprietary EXCI/MRO protocol, which utilizes a subset of ECI calls, to invoke a remote CICS application. CTG cannot make EPI or ESI calls. The communication between the EXCI program and the target CICS region is a typical SNA connection. The target CICS region s not aware that the client request comes from a Java application.

This design configuration may be applicable, for example, when the HTTP Web server, application server, and CICS region reside on the same machine (e.g. an IBM z/Series mainframe). This design configuration may also provide the benefit of invoking native business functions from the existing CICS applications with minimal impact on the back-end architecture design.

Figure 41:
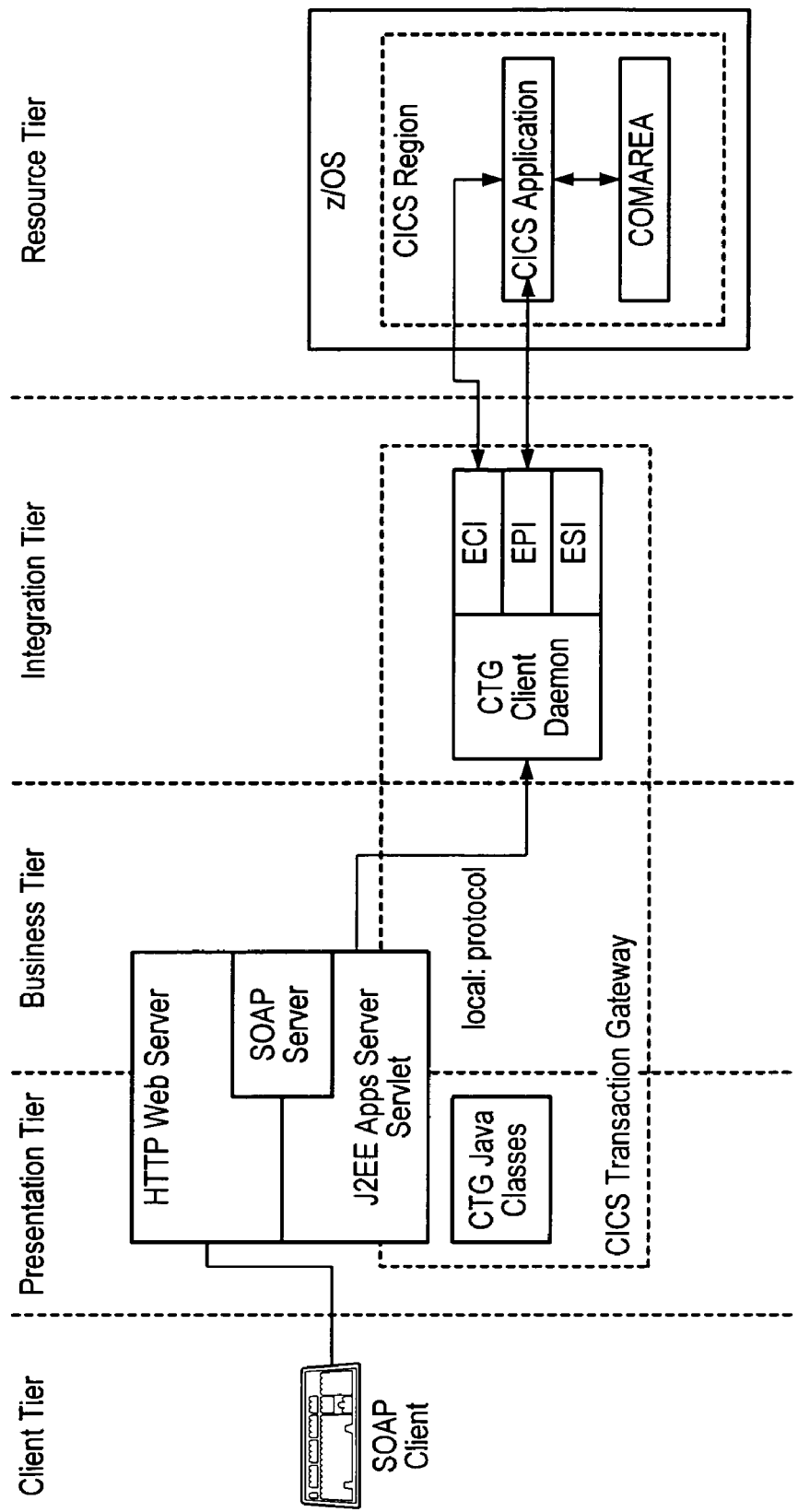
FIG. 41 illustrates an exemplary design of a CTG running on the same platform with CICS and the Web server according to one embodiment.

FIG. 41 illustrates an exemplary design of a CTG running on the same platform (in this example, an IBM z-series platform) with CICS and the Web server according to one embodiment. In this scenario, a SOAP client (using a browser) may initiate a Web Services functionality (such as an mortgage account balance inquiry) provided by the J2EE application server. The remote business service may be provided by the back-end CICS application via ECI calls. There is a Java class that exposes the ECI call as a service endpoint URL. The SOAP client may initiate an RPC call to the remote business service by looking up the service endpoint URL via a Service Registry and invoking it.

Under the same platform configuration, all architecture components residing in the Presentation Tier (such as HTTP Web Server), Business Tier (such as J2EE application server), Integration Tier (such as CTG), and Resource Tier (such as are within the same machine, e.g. IBM z/OS machine). The reliability, availability, and scalability for each component may be dependent on the platform (e.g. z/OS platform). For example, the flexibility of the z/OS platform configuration may have a major impact to administrators if they want to increase the physical memory for the J2EE application server only.

Distributed Platforms

A servlet may initiate an SNA APPC or LU 6.2 connection using the CTG Client Daemon with ECI, EPI, or ESI calls. The HTTP Web Server, Application Server, and CICS region may reside on different machines. The connection between CTG Client Daemon and the target CICS region may be SNA LU 6.2.

This design configuration may be applicable, for example, to integrate Web and application servers running on Unix platforms with legacy mainframe CICS. This design configuration may also be suitable for the design constraint where the legacy mainframe platform cannot be modified or enhanced. Benefit may include, but are not limited to, one or more of: better scalability for different applications in each tier, and developers may not need to build every component in the same mainframe platform.

Figure 42:
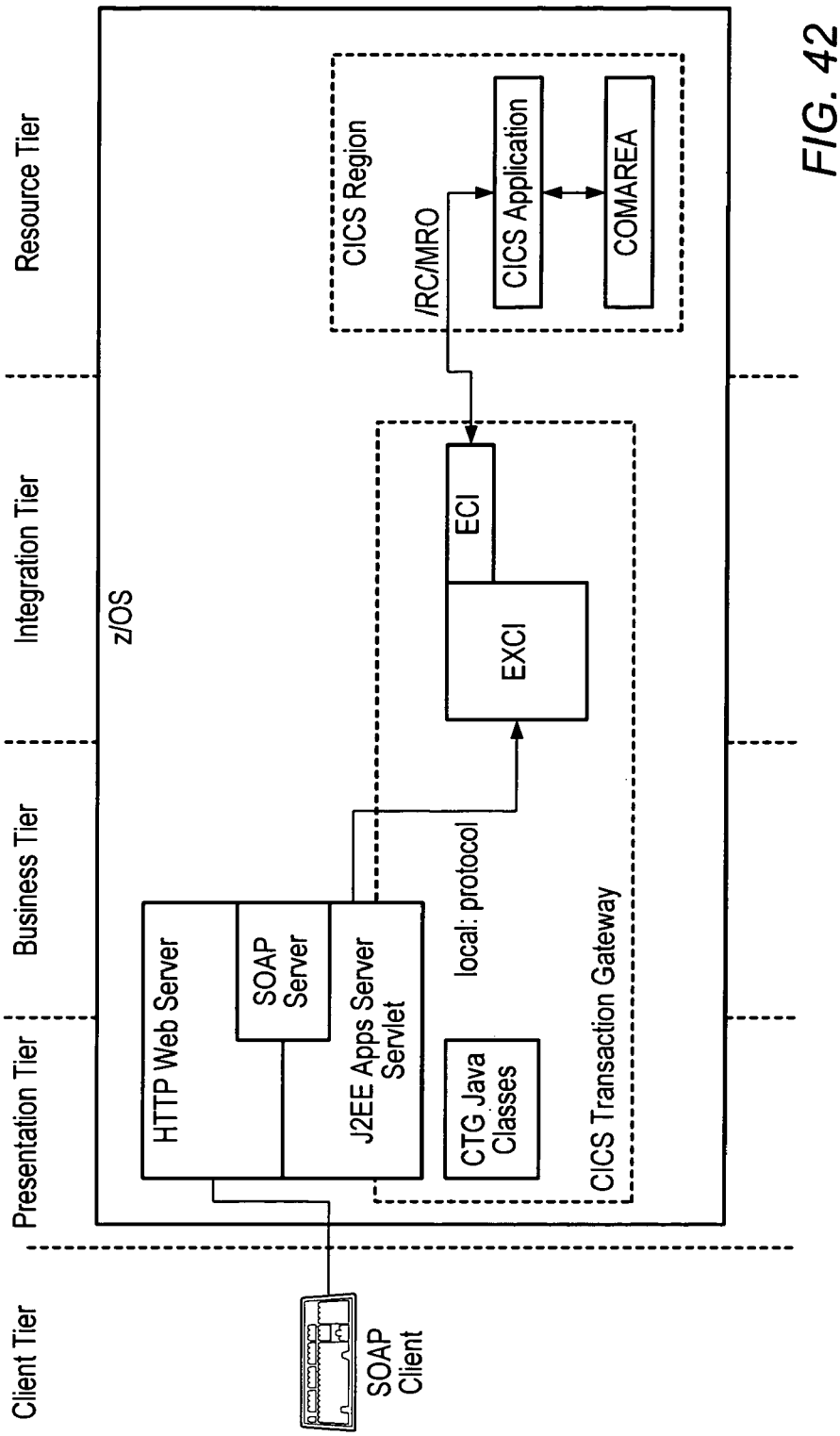
FIG. 42 illustrates an exemplary design of a CTG running on a different host that communicates with CICS applications on a z/OS host according to one embodiment.

FIG. 42 illustrates an exemplary design of a CTG running on a different host that communicates with CICS applications on a z/OS host according to one embodiment. In this scenario, a SOAP client (using a browser) may initiate a Web Services functionality (such as an mortgage account balance inquiry) provided by the J2EE application server under the Business Tier. The remote business service may be provided by the back-end CICS application via ECI, EPI, or ESI calls. There is a Java class that exposes the ECI/EPI/ESI call as a service endpoint URL. The SOAP client may initiate an RPC call to the remote business service by looking up the service endpoint URL via a Service Registry and invoking it.

In one embodiment, under the distributed platform configuration, HTTP Web server resides in the Presentation Tier, and J2EE application server resides in the Business Tier. If the data traffic increases, architects may scale up these components vertically (for example, by adding CPUs) or horizontally (for example, by adding other server instances). This preferably allows less complexity and more flexibility to manage scalability and performance tuning on individual server components, when compared to scaling multiple server components within the same mainframe platform.

In one embodiment, Java servlets (referred to as a Front Controller servlets) may initiate ECI calls or EPI calls. A Front Controller may handle presentation logic, and may be used to initiate Web Services calls. In one embodiment of a front controller that initiates ECI calls, an objective may be to invoke a CICS transaction ID, which will return the response. Developers may specify one or more of, but not limited to, the CTG gateway URL, SSL class name, SSL password, user ID, password, server name, and program. A command ECI Request may initiate the target CICS transaction D. The data and program response may be retrieved from a variable. The ECI front controller may be modified and wrapped as an RPC-based Web Services call.

In one embodiment of a front controller that initiates EPI calls, an objective may be to invoke a 3270-based CICS transaction ID. The flow events govern the manipulation of data fields and interaction. Developers may specify the 3270 terminal parameters. Then the target 3270 screens may be initiated. Because EPI calls require a series of screen actions and event manipulation, developers may customize the actions in one or more classes. The EPI front controller may be modified and wrapped as an RPC-based Web Services call. However, due to the nature of EPI calls, a change in the user interface (such as screen position or screen name) may break the RPC call.

Remote CTG

Remote CTG is a variant of the previously discussed distributed platforms configuration. The servlet may invoke CICS applications using, for example, TCP/IP, SSL, HTTP, or HTTPS protocol. The Gateway Daemon, which resides on the same machine as the target CICS region, processes and forwards client requests to the target CICS applications via EXCI. The Gateway Daemon reformats the client requests using the Java Native Interface (JNI).

This design configuration may be desirable for achieving a pure TCP/IP-based connectivity (using TCP/IP, SSL, HTTP, or HTTPS) between the client and the server. A benefit may be that CTG can configure to work with multiple TCP/IP ports and balance client requests across multiple CICS regions for better scalability if available.

Figure 43:
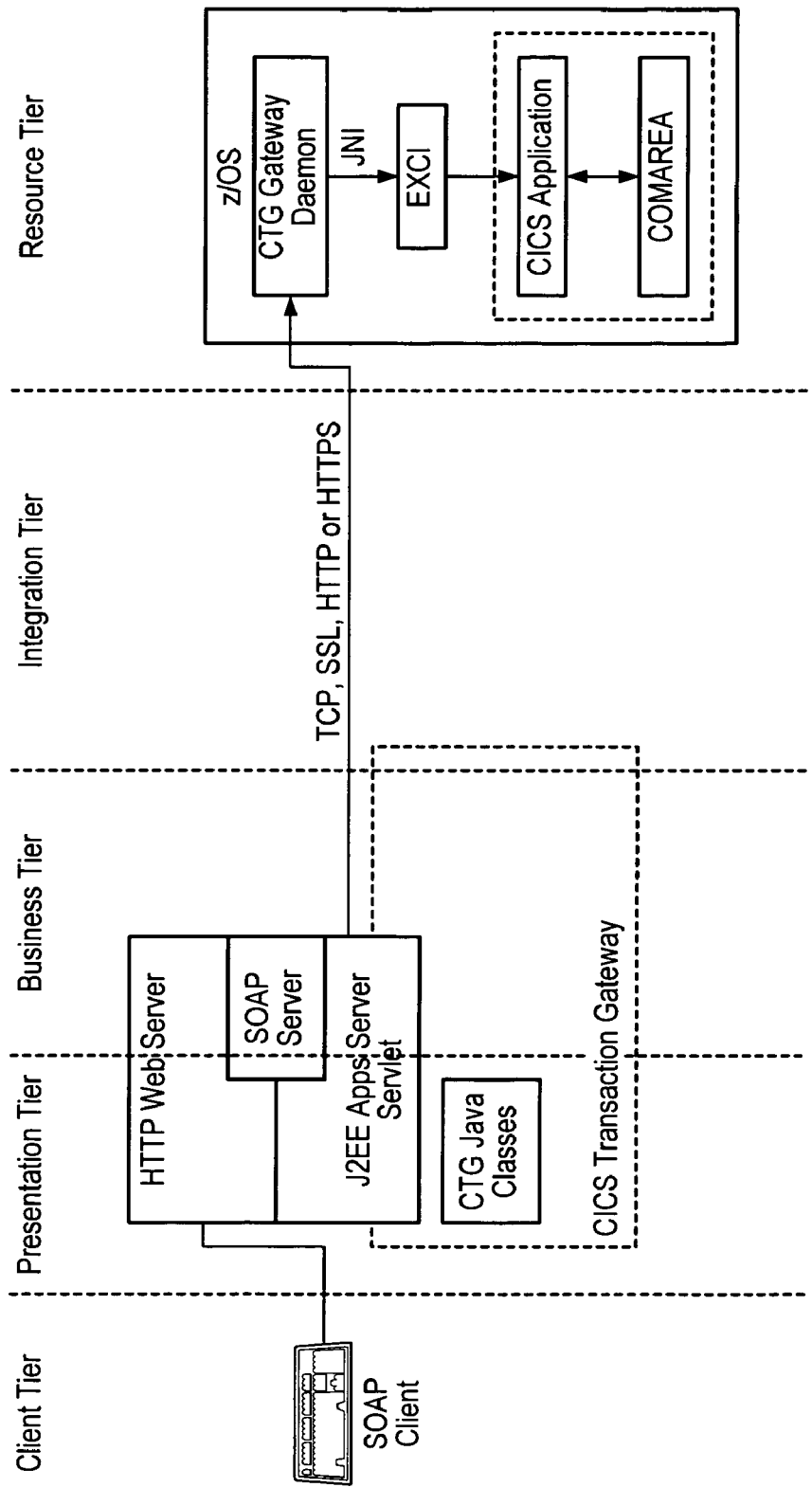
FIG. 43 illustrates an exemplary design of a remote CTG according to one embodiment.

FIG. 43 illustrates an exemplary design of a remote CTG according to one embodiment. In this example, the CTG Gateway Daemon resides in the remote platform (e.g. IBM z/OS platform). In this scenario, a Java server-side program invokes the remote CICS applications in the mainframe via CTG Java classes. The Java server-side program uses an HTTP (or HTTPS) connection to the CTG Gateway Daemon. The CTG Gateway Daemon looks up the configuration context via JNI and invokes the CICS executable EXCI. EXCI routes ECI, EPI, or ESI calls to the relevant CICS applications. The data parameters for the CICS calls, or the transaction result fetched after the CICS calls, may be placed in the common area region COMAREA.

CTG preferably provides wider integration options for architects that may not need the Web-based functionality tightly coupled with the legacy CICS platform. Architects can deploy CTG on Unix or Windows platforms with a distributed server topology (n-tier architecture). This preferably enables more options to scale up the capacity. Invoking legacy CICS applications using ECI calls with CTG may preferably shield off complex SNA LU 6.2 protocols from developers. This preferably does not require architects and developers to have an in-depth knowledge of the legacy mainframe systems.

The choice of CTG configuration may depend on the server topology (same platform, distributed platforms, or remote CTG). Architects preferably make conscious design decisions up front when choosing which CTG configuration to use, as switching to other configuration in the midst of or after deployment may be difficult.

To enable Web Services using CTG, architects and developers preferably generate an XML-RPC call (for example, using Java Web Services Developer Pack's wscompile or Apache Axis's org.apache.axis.wsdl.wsdl2java utility) from a Java client that initiates ECI, EPI, or ESI calls. If ECI calls are being used, the target CICS transaction ID is preferably identified, and any required modification to the existing CICS applications or COMAREA are preferably determined. If EPI calls are being used, it is desirable to ensure the data fields in the legacy 3270 screens have not changed; otherwise the EPI calls may need to be updated. If the legacy mainframe functionality may be reused by multiple parties, it may be more scalable and reusable to use Java technology approach (such as EJB or JCA) to enable them as Web Services.

CICS Web Support

Figure 44:
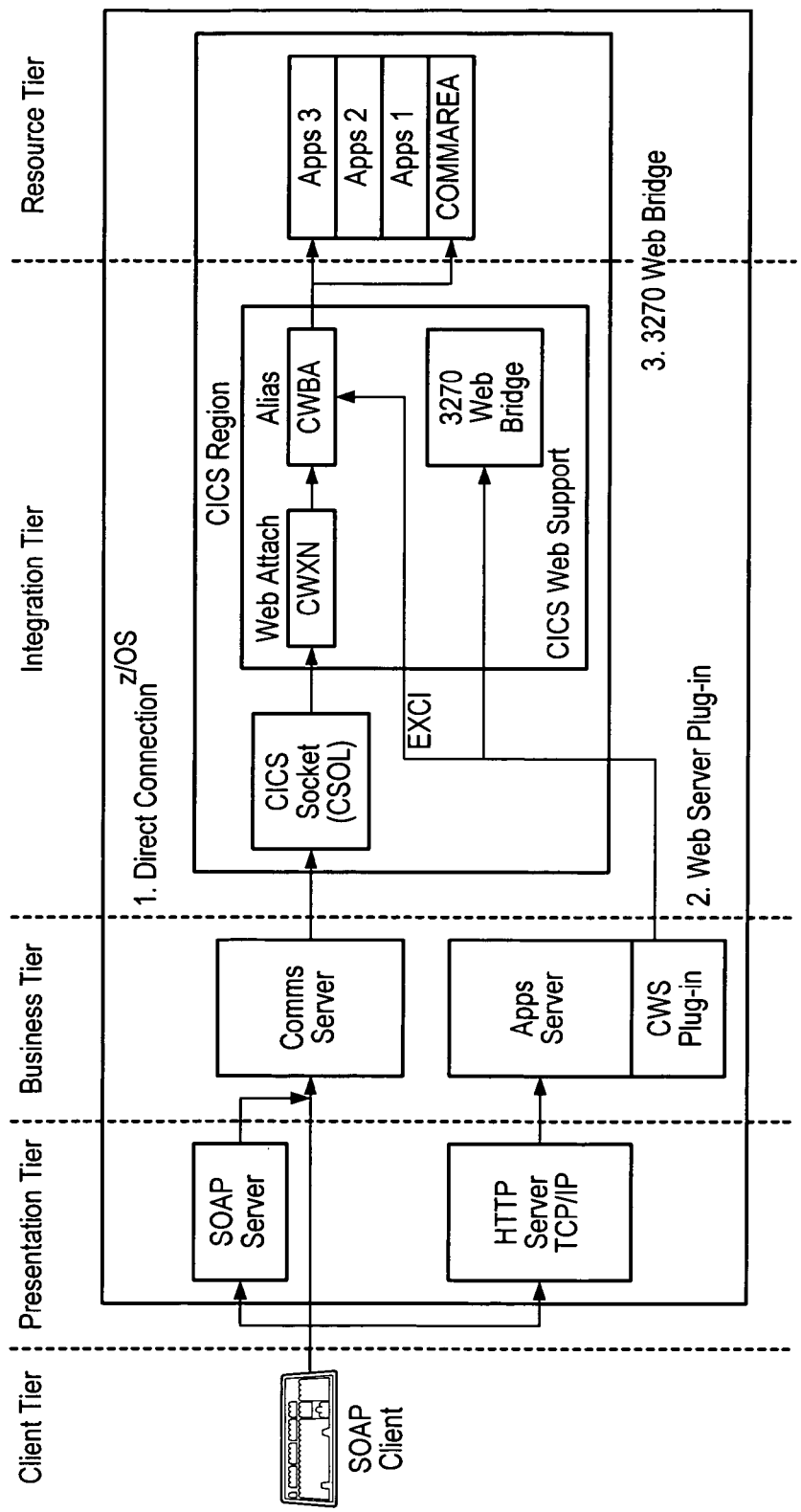
FIG. 44 illustrates some design configurations that may be used when using CWS according to one embodiment.

CICS Web Support (CWS) comes with CICS Transaction Server for OS/390 or VSE version 1.3. These are CICS-supplied programs, which provide ASCII-to-EBCDIC code page conversion (e.g. Web Attach Processing programs CWXN, DFHCNV, and Analyzer), conversion between 3270-based screens and HTML pages (e.g. 3270 Web Bridge), decode/encode for Web page presentation logic (e.g. Alias Transaction program including CWBA), and analysis of HTTP requests to invoke CICS applications (e.g. Alias Transaction program or Business Logic Interface). FIG. 44 illustrates some design configurations that may be used when using CWS according to one embodiment. As illustrated in FIG. 44, these design configurations may include, but are not limited to: Direct Connection, Web Server Plug-in, and 3270 Web Bridge.

Direct Connection

Figure 45:
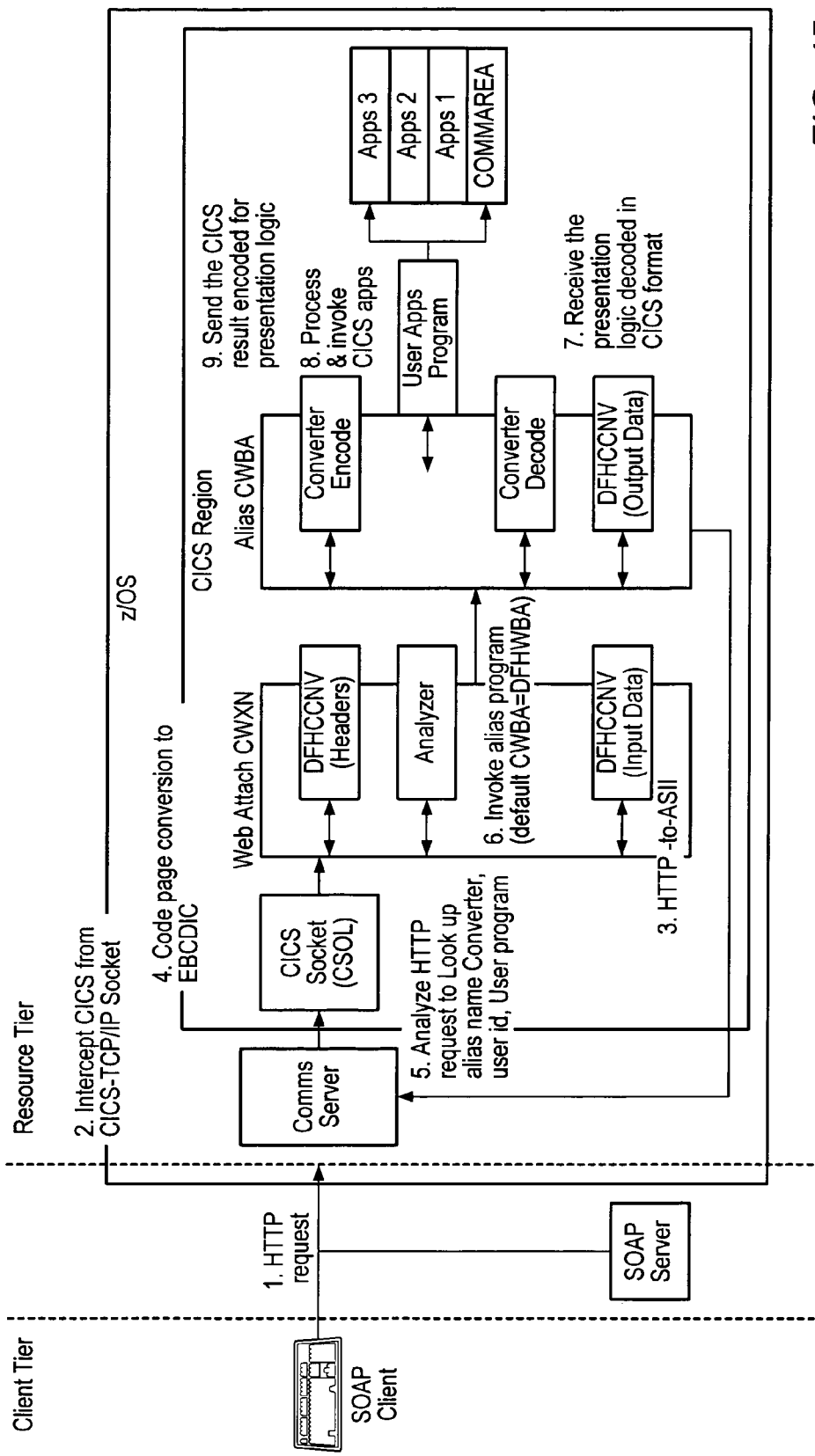
FIG. 45 illustrates CWS Direct Connection according to one embodiment.

FIG. 45 illustrates CWS Direct Connection according to one embodiment. A client browser may directly connect to CICS applications via the CICS Web Support programs CWXN (Web Attach Transaction) and CWBA (Alias Transaction). This requires the installation of an OS/390 Communications Server and assumes the use of the CICS TCP/IP Listener (CSOL) to be running under the CICS region, which intercepts HTTP requests over TCP/IP via a CICS Socket. The HTTP request header and input data need to be converted to EBCDIC using the DFHCNV conversion program. The Analyzer program will then process the incoming HTTP request to look up the alias name (the default CWBA transaction code is DFHWBA), the converter program, the user ID, and the user program of the target CICS region.

This design configuration may be appropriate, for example, when developers do not require an HTTP Web Server but use the CICS TCP/IP Listener to process HTTP requests. A possible benefit is that there may be no architecture change in the legacy CICS applications on the VSE platform in order to invoke legacy CICS applications from a client browser. A limitation may be that CICS Web Support only allows a maximum of 32 KB of data to be received and utilized by the application. With direct connection to CICS without a Web Server, compliance with Open Standards and subsequent integration may be difficult.

In FIG. 45, the browser client issues an HTTP request to access a Web server, which may route the HTTP request to the communications server. The communications server may determine that this is a request to access CICS resources in the Resource Tier. The communications server may intercept the CICS resource requests from the CICS Socket (CSOL). The Web Attach program CWXN and the Alias program CWBA (these are CICS programs running in the same CICS region) handle the conversion of the code page from ANSI to EBCDIC (which the mainframe can understand). The DFH-CNV process converts input data from the HTTP request to ASCII, which may then be converted to EBCDIC. The CWXN analyzer may look up the alias name, converter, user ID, and user program before passing the CICS request to the Alias program CWBA (default is DFHWBA, and the alias program can be customized). The Alias program CWBA functions as a converter, which encodes and decodes CICS data. The Alias program then invokes the appropriate user application program to process the CICS requests. The Alias program receives the presentation logic decoded in CICS format. The Alias program sends the CICS results in encoded data that can be handled by the presentation logic (such as HTML Web pages).

A SOAP server-side component (also called the SOAP tier or SOAP skeleton) may be created to wrap the CICS request using a CICS Socket and the CICS Web Support programs. This approach may be suitable, for example, if there are browser-based programs currently accessing the back-end CICS resources via a CICS Socket. The SOAP server-side component may also create a new information aggregation Web Service (such as aggregating my personal wealth portfolio from different bank accounts) by collaborating with Web Services information aggregation tools (such as bowstreet). Note that the CICS Web Support technology may rely on 3270 screens (via 3270-to-HTML conversion), and thus may not be a scalable approach to extend new functionality.
CICS Web Server Plug-in.

Figure 46:
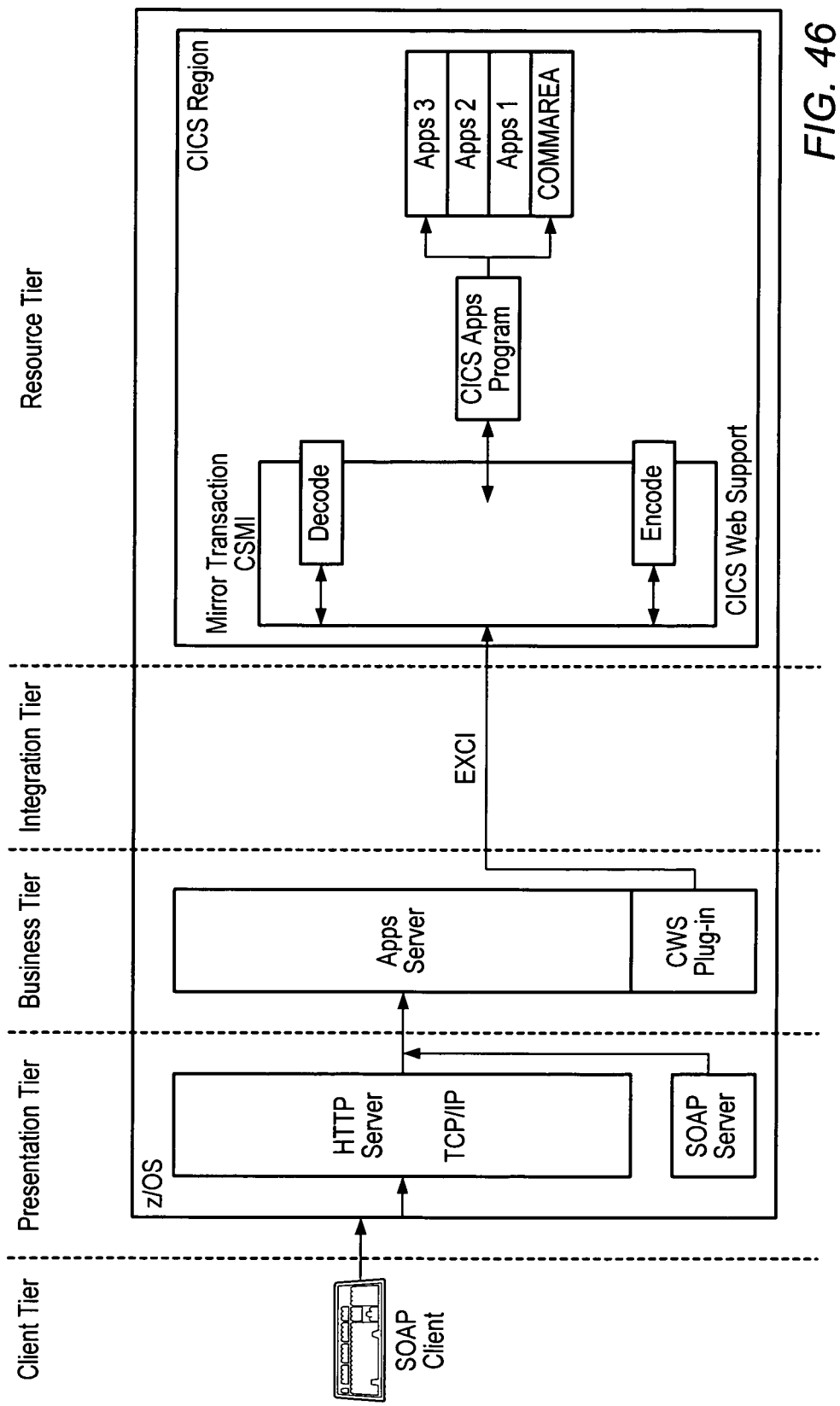
FIG. 46 illustrates the interaction process between components using the CICS Web Server Plug-in according to one embodiment.

FIG. 46 illustrates the interaction process between components using the CICS Web Server Plug-in according to one embodiment. In this example, a CWS Plug-in (in one embodiment, the CWS Plug-in is the proprietary DFHWBAPI) runs on top of the IBM HTTP Server. The CWS Plug-in performs the same functionality as the previously mentioned Web Attach Transaction, which invokes the ASCII-to-EBCDIC code page conversion routine. The CWS Plug-in also builds an EXCI request, decodes the HTTP requests into CICS transactions, and passes the HTTP data stream to the Business Logic Interface for CICS applications in the COMMAREA.

This design configuration may be applicable, for example, when the HTTP Web Server and the target CICS region reside on the same machine and the same sysplex, and developers do not want to add middleware such as the CICS Transaction Gateway.

A server-side Web Services component may be created to invoke remote business functionality residing in the back-end CICS region via DFHWBAPI. The SOAP server tier (or SOAP skeleton) may initiate the EXCI call. This may be a simpler architecture to access CICS resources compared with the previous direct connection or the 3270 Web Bridge described below.
3270 Web Bridge.

Figure 47:
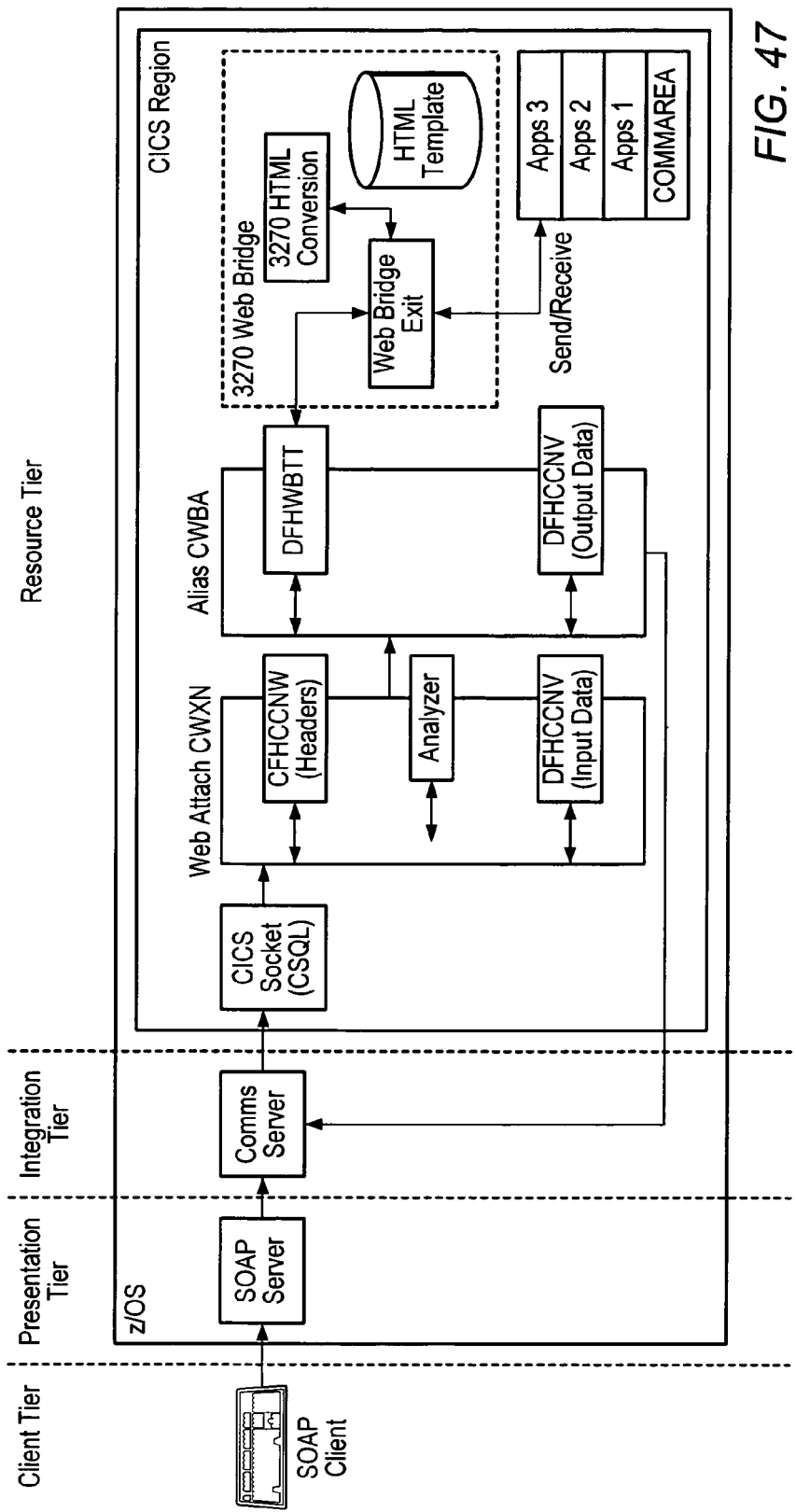
FIG. 47 illustrates the interaction process between components using the 3270 Web Bridge according to one embodiment.

FIG. 47 illustrates the interaction process between components using the 3270 Web Bridge according to one embodiment. In this example, HTTP requests from the client browser may be processed via the Web Attach Transaction and Alias Transaction (that is, Direct Connection design configuration), or alternatively via the CICS Web Server Plug-in. If these requests and responses need to be formatted and presented in 3270 screen maps or HTML, then 3270 Web Bridge may be a flexible solution for 3270-to-HTML conversion using a 3270 HTML conversion program and an HTML template rule database. 3270-based CICS applications (in this example, myapps1) may then be invoked by a URL directly from a host using port 8080.

This design configuration may be applicable, for example, to facilitate easy mapping between 3270 screen maps to HTML conversion using an HTML template rule engine. Note that the screen mapping may be tedious and labor-intensive.

A server-side Web Services component may be created to wrap the CICS request using a CICS Socket and the 3270 Web Bridge. This approach may be suitable, for example, if there are browser-based programs currently accessing the back-end CICS resources via a CICS Socket and a 3270 Web Bridge. This approach may also create a new information aggregation Web Service (such as aggregating my home and utility phone bills from different service providers) by collaborating with Web Services information aggregation tools (such as Bowstreet). Note that the 3270 Web Bridge technology may rely on 3270 screens (via 3270-to-HTML conversion), and thus may not be an easily scalable approach to extend new functionality.

To use the 3270 Web Bridge, developers preferably configure some specific parameters during the CICS Transaction Server system setup (for example, TCPIP_YES, WEBDELAY_(terminal-wait-time, state-data-keep-time)) and increase EDSA storage.

CWS provides a pan-CICS design approach to Web-enabling legacy CICS applications from a URL. This technology may not require installing additional application servers or gateway components, and thus it is lightweight. The integration capability may be constrained by 3270 screen-based or EPI-based technologies. In other words, if developers want to manipulate any data or to invoke a specific business function where there is no CICS screen available, then the developers may have to modify the back-end applications or perhaps create a new CICS screen.

With CWS and SNA gateway technology, it may be possible to access mainframe applications from a browser. CWS technology handles the conversion from CICS to HTML Web pages. This is not a real Web Services solution because CWS does not generate an XML message containing the data contents required from the legacy systems. Architects and developers may need to wrap the HTML data fields in a SOAP message or create another XML-RPC to wrap the data contents generated from CWS. Thus, it may be more flexible to use Java technology to enable Web Services.
Java Technology IBM has implemented the Enterprise Java Bean (EJB) Server in the CICS Transaction Server. The EJB environment may include, but is not limited to, TCP/IP Listener, request receiver (DFHIRRS), request models, request stream directory (DFHEJDIR), request processor, EJB container, object store (DFHEJOS), Java Virtual Machine, CORBA server, and deployed JAR files. The following describes wrapping Java technology as Web Services.
EJB Support.

Figure 48:
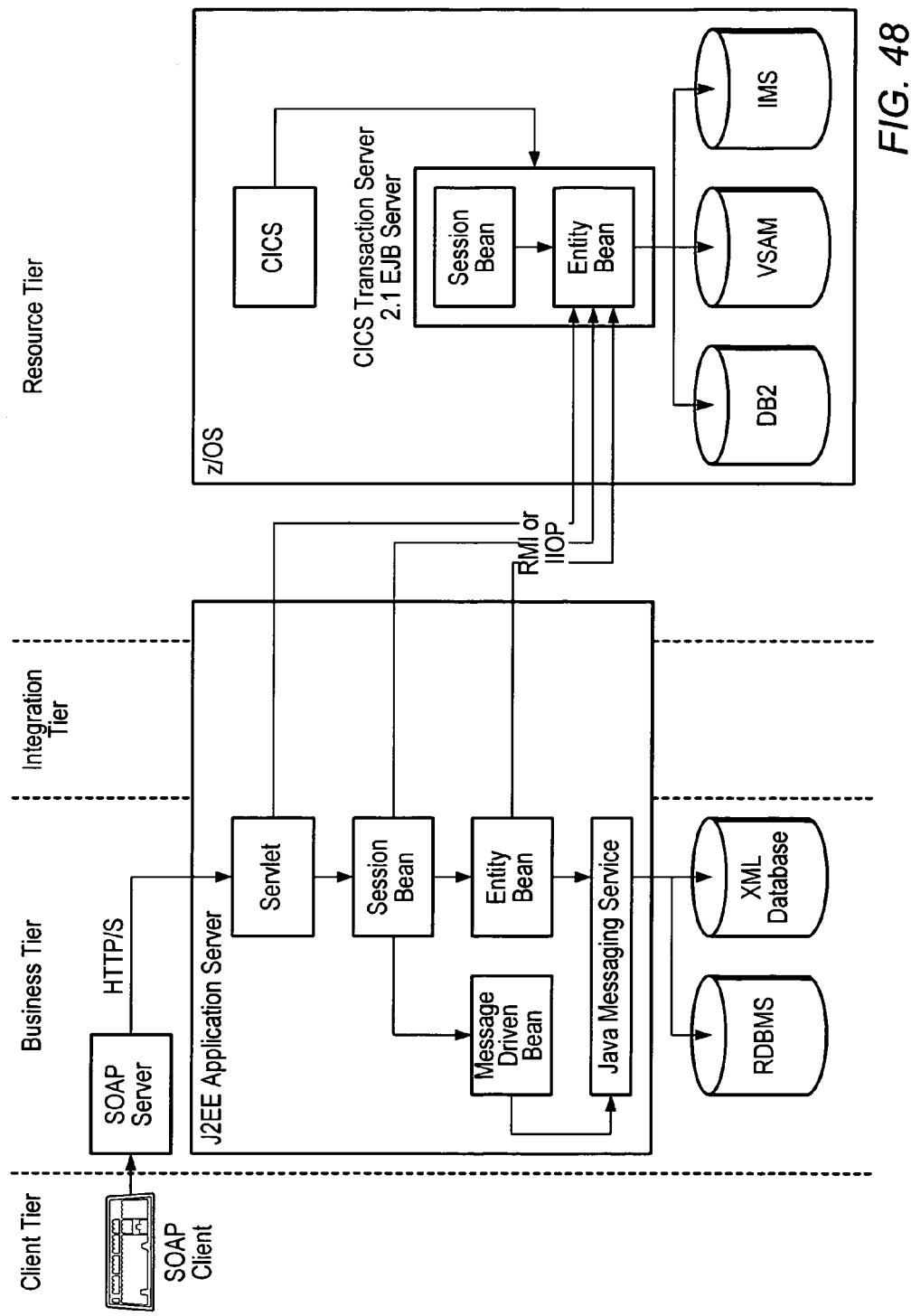
FIG. 48 illustrates CICS EJB Support according to one embodiment.

FIG. 48 illustrates CICS EJB Support according to one embodiment. The use of EJB may enable a legacy CICS application to be delivered as a session bean and legacy data to be accessed or updated as an entity bean. The EJB container manages the life cycle of the beans. In other words, the EJB container provides session management, ensures data integrity, and enables database connection pooling for better performance and scalability. With the support of EJB, a client browser may invoke a servlet (usually presentation logic), which in turn initiates session beans from the local server or a remote CICS region (CICS Transaction Server EJB Server).

The example in FIG. 48 shows that architects may create an EJB Web Service, which may be a stateless EJB (e.g., a session bean or an entity bean) invoking RPC calls to CICS resources via CICS Transaction Server version 2.1 EJB Server (or other versions). The EJB handles the session information using session beans, manages business data residing in the back-end database (such as DB2) using entity beans, and communicates with other service components using a Message Driven Bean (MDB) and Java Messaging Service (JMS). Entity beans from the J2EE application server may exchange business data with another entity bean residing on the EJB server of the back-end mainframe via the RMI/IIOP protocol. A benefit of using EJB Web Services may be that EJB has built-in functionality to manage the life cycle of the session, business data with connection pooling, and session failover. This may be appropriate for handling business transactions.

Java Connector for CICS

The Java Connector Architecture (JCA) is a structured way to provide Open Standards-based connectivity to legacy systems and database resources. For each connection, the Java connector establishes a "service contract" with the target legacy systems. This preferably standardizes the effort to customize different legacy systems, as well as preferably reducing the development effort for proprietary interfaces.

Legacy mainframe systems may be wrapped as Web Services by using Java Connectors. For instance, a SOAP client (or an EJB Web Service) may invoke a stateless EJB that handles online bill payment for telephone services and utilities. The stateless EJB may be connected to a back-end mainframe. CICS application using a Java Connector. Possible benefits may include that Java Connector is a standards-based connectivity with legacy back-end systems, and developers may not need to build proprietary extensions to integrate with legacy technologies such as CICS applications.

Web Services Support

Legacy CICS applications using CTG and/or CICS EJB Server may be enabled as Web Services. Developers may need to identify the business functionality as coarse-grained Web Services. In other words, not all methods or APIs may need to be exposed as XML-RPC. It may be preferable to not define each CICS transaction ID or program name as an individual Web Service call. It may be preferable to define a few Web Services, where different methods or APIs can be invoked by passing parameters to the Web Services call. The same principle may hold when creating EJBs—it may not be necessary to map each EJB to an individual Web Services call.

Wrapping Java beans or methods using CTG and/or CICS EJB Server on a mainframe platform as XML-RPC Web Services calls may be similar to doing so on a Unix or a Windows platform. Examples of the tools that may be used may include, but are not limited to, the Java Web Services Developer Pack's xrpcc and Apache Axis's wsdl2java.

SOAP Proxy on Mainframe

It may be possible to enable legacy CICS applications as Web Services without using any of the three technology options described above. The Sun ONE Integration Server EAI edition utilizes Apache SOAP and a customized transaction adapter to provide SOAP messaging.

FIG. 49 illustrates an exemplary high-level application architecture for a SOAP Proxy on a Mainframe according to one embodiment. Apache SOAP (SOAP proxy) is preferably installed under the Unix Services of the system (e.g., OS/390). For example, the Sun ONE Integration Server has a customizable adapter (known as the Forte Transaction Adapter), which runs under the MVS of the OS/390, and communicates with local or remote CICS, VSAM, and IMS resources using the LU 6.2 protocol. There is a server portion of the adapter (the application proxy with a transaction adapter) running under the OS/390 Unix Services partition, which acts as an APPC client to the CICS applications of the local or remote CICS. The Forte Transaction Adapter (acting as an APPC client) receives data in a data buffer (e.g. COMMAREA) from the APPC conversation and provides a proxy function that may be accessed from the client browser. The proxy may be exposed as a SOAP proxy, for example using Apache SOAP or Apache Axis, to support XML and SOAP messaging.

In one embodiment, the Forte Transaction Adapter establishes an APPC conversation with a remote CICS application. Upon successful connection, it initiates an APPC conversation verb or data request in the data buffer. Under the synchronous APPC conversational programming, the remote CICS application may respond by placing the response or data contents in the data buffer. The transaction adapter may then retrieve the data and close the conversation.

IBM has been dominant in providing mainframe integration and interoperability technology tools. The Sun ONE Integration Server provides an alternative approach to using Apache SOAP and APPC technology. Architecturally, Forte 4GL and its Application Proxy are similar to the SOAP proxy concept, and the Forte Application Proxy can be exposed as a SOAP proxy using Apache SOAP (or Axis). This may provide an open platform approach to addressing the mainframe interoperability challenge.

Integration Points

Different mainframe integration designs may have different integration points, which may span multiple tiers and layers. This allows flexibility and options in choosing the integration point that can accommodate local technical requirements and constraints. FIG. 50 is a table of some possible Integration Points for Mainframe Interoperability, and shows technology approaches that may be used to wrap back-end mainframe applications as Web Services, according to one embodiment. FIG. 50 also identifies what architecture components may need to be installed in the Business Tier (on top of the application server), Integration Tier (middleware), and Resource Tier (in the back-end legacy system). These architecture components may act as an integration point where Java servlets or EJBs may be a "delegate" or a broker that initiates a SOAP service request for the back-end business services running on the mainframe platform.

CICS Transaction Gateway provides a middleware solution in the Integration Tier, where the server-side SOAP component can invoke a remote Web Service via ECI, EPI, or ESI calls to the back-end CICS applications. There may be no additional component to be added to the application server (Business Tier), or the back-end legacy system (Resource Tier). The integration point with the mainframe is via the Integration Tier.

CICS Web Support is a technology solution residing in the back-end CICS region to Web-enable 3270-based CICS applications. A server-side SOAP component may invoke a remote Web Service that accesses 3270-based CICS screens.

There may be no additional component needed in the Business Tier or the Integration Tier. The integration point is via the Resource Tier.

Java technology is a multi-tier architecture approach to integrate with the back-end legacy system. A server-side SOAP component (such as EJB Web Service) may be created to integrate with the back-end via the Business Tier, the Integration Tier (using Java Connector), or the Resource Tier (using RMI/IIOP to invoke another EJB).

The SOAP proxy on mainframe approach may use an application proxy with a transaction adapter to enable SOAP messaging. Forte Transaction Adapter may be installed and configured in the Integration Tier and the Resource Tier. The integration point is with the Forte Transaction Adapter.

Figure 51:
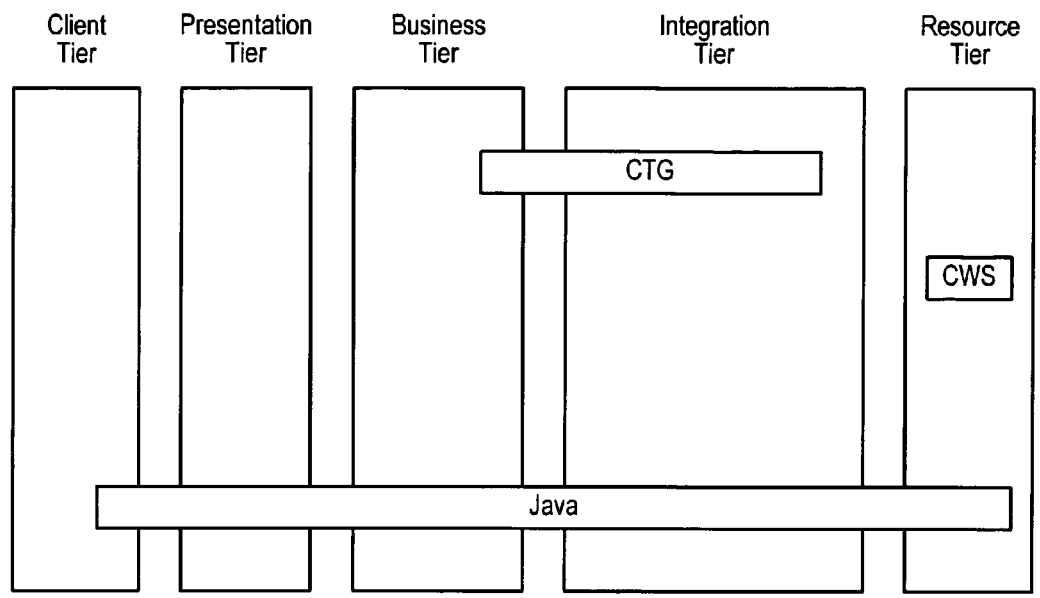
FIG. 51 illustrates the integration points from the table of FIG. 50 under different tiers according to one embodiment.

FIG. 51 illustrates the integration points from the table of FIG. 50 under different tiers according to one embodiment. CICS Transaction Gateway resides in both the Business Tier and the Integration Tier. CICS Web Support resides in the Resource Tier. Java technology supports multi-tier architecture design, and thus Java components span different tiers.

A design decision to pick an appropriate integration point preferably includes consideration for future extension and scalability. Some integration points may be difficult to scale up or may incur higher integration costs.

Functional Perspectives

Figure 52:
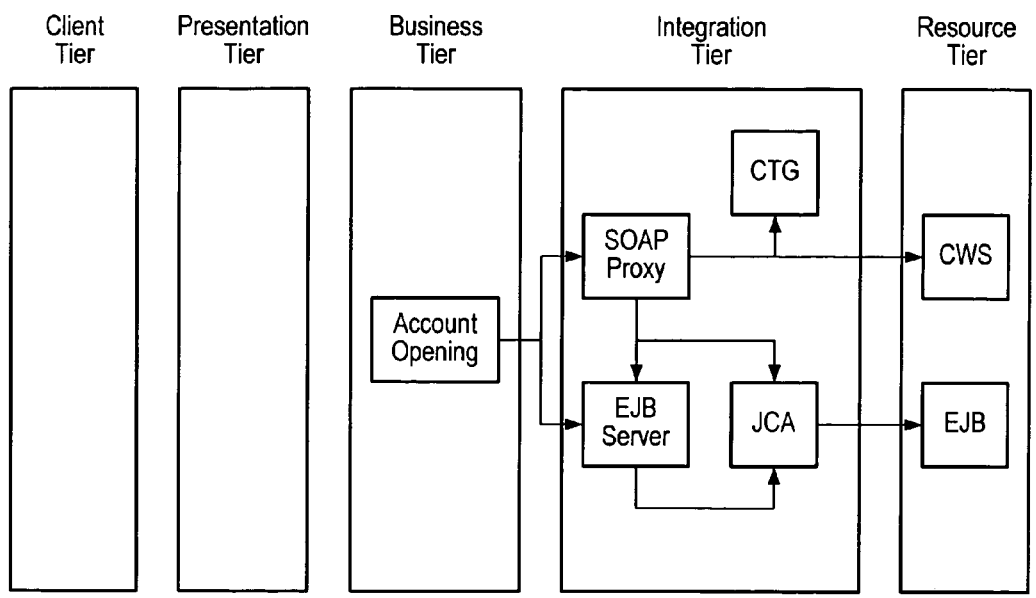
FIG. 52 illustrates integration points by functions using an example of opening a private banking account according to one embodiment.

Web Services integration may be initiated from a business function. In other words, a Web Service call may embed multiple function calls that come from different sources. These function calls may be, for example, Ems or CICS transaction IDs. FIG. 52 illustrates integration points by functions using an example of opening a private banking account according to one embodiment. A Web Service call may be created (Account Opening Web Service under the Business Tier) that may include three Web Services calls, including credit checking, account opening in the Customer Master, and linking to existing bank products if available. In some instances, these Web Services calls may span different tiers and may require more than one integration technology. One Web Services call (such as credit checking) may be using a SOAP proxy in the Integration Tier, which invokes a CICS transaction using CTG. Another Web Services call (such as account opening in the Customer Master) may be using a SOAP proxy to invoke a CICS transaction via CICS Web Support. The last Web Services call may be using an EJB Web Service that invokes the back-end CICS transaction wrapped as an EJB in the Resource Tier. These examples show that there may be multiple integration points where developers can create Web Services to integrate with the back-end mainframe system. The design consideration may be based on the specific business functionality, which may reside in a specific tier (such as in the Business Tier or the Integration Tier).

Mainframe Integration and Interoperability Design Patterns

Mainframe integration and interoperability design patterns may include, but are not limited to, a Synchronous Mainframe Web Services design pattern and an Asynchronous Mainframe Web Services design pattern. Synchronous or RPC-based Web Services may be designed by creating a server-side component that invokes CICS transactions via any of the integration components discussed earlier (such as CICS Transaction Gateway and CICS Web Support). Asynchronous or document-based Web Services may be designed by encapsulating existing WebSphere MQ or JMS messages in a SOAP envelope. The data content may then be sent using SOAP messaging over WebSphere MQ or JMS. The following describes these mainframe integration and interoperability patterns based on the mainframe technology options discussed earlier.

Synchronous Mainframe Web Services Design Pattern

Context

Many mainframe applications are developed in COBOL running under CICS. As these applications are running in a proprietary operating environment, it may be difficult for developers to reuse them or to interoperate with them from other front-ends or systems. The COBOL programs, after compilation, may be accessed via CICS ECI, EPI, or ESI calls. There are Web-enabling tools, such as CICS Web Support, that may allow these CICS transactions and resources to be accessible from a browser. If combined with SOAP messaging, these tools may help create reusable Web Services that can invoke remote CICS transactions.

For many financial institutions and service providers, legacy mainframe systems have been processing business transactions for many years, and there may be few system changes. However, the business functionality may not be easily accessible from, or integratable with, the Java platform. Synchronous mainframe Web Services may be created to expose these business functionalities as a remote procedural call, which may not require any application rewrite. Thus, business functionality may be reused and made available to different client devices (such as a mobile phone) and platforms (such as the Unix platform).

Problem

Online transactions developed in COBOL running in CICS may be proprietary and may not be easily integrated and interoperated with other platforms. To provide the same functionality on open systems to ease integration and interoperability with other systems, developers may need to migrate to other platforms or perhaps rewrite the applications in other programming languages. This may have a long lead-time in order to rebuild the same functionality. It may also be risky to the implementation, because many legacy applications do not have any technical documentation for the rewrite design.

Force

The technical considerations that affect the use of synchronous mainframe Web Services may include, but are not limited to, the existing mainframe configuration and legacy system infrastructure. If an operating environment does not support the use of any mainframe integration component such as CICS Transaction Gateway and CICS Web Support, it may not be viable to implement synchronous mainframe Web Services. For instance, older versions of the IBM mainframe (such as VSE) do not support CICS Transaction Gateway. If developers want to expose CICS transactions as Web Services, they may need to upgrade their mainframe, for example to z/OS, from older operating systems.

Solution

There are mainframe integration products available, for example from IBM and other mainframe vendors such as Jacada. These products may help to build synchronous mainframe Web Services without rewriting the back-end CICS applications. They are like middleware that can expose CICS transactions via ECI, EPI, or ESI calls, which can then be wrapped as Web Services calls. These products may address concerns such as long lead-time in migrating the legacy applications to open systems or rewriting the applications on open systems.

Figure 53:
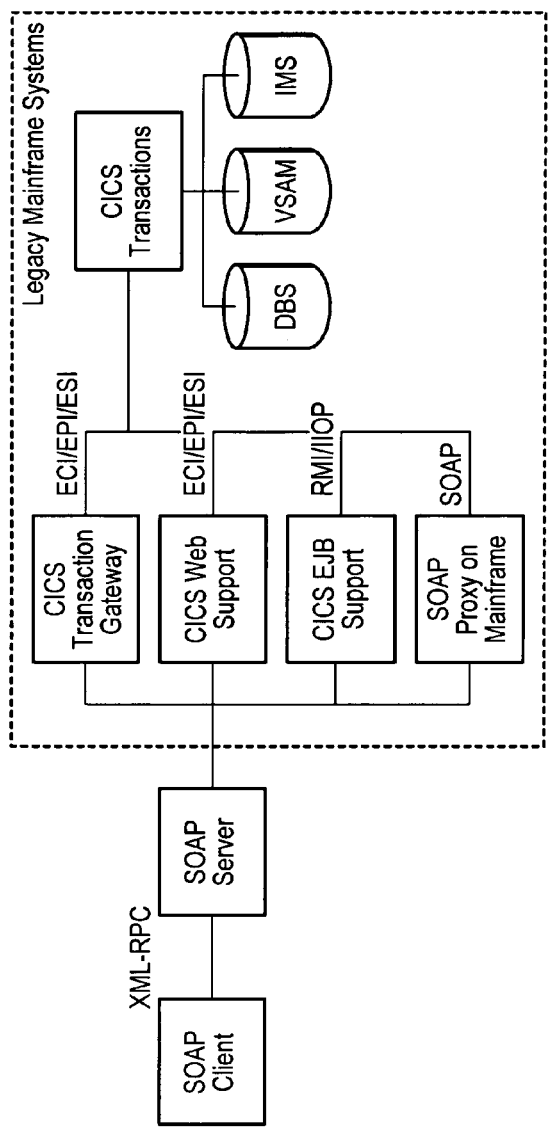
FIG. 53 illustrates synchronous messaging for mainframe interoperability and summarizes the different mainframe integration and interoperability options according to one embodiment.

FIG. 53 illustrates synchronous messaging for mainframe interoperability and summarizes the different mainframe integration and interoperability options according to one embodiment. A SOAP client invokes the remote business service by binding to a service endpoint URL (via XML-RPC). The service endpoint may be processed by the SOAP server-side component (SOAP tier or skeleton), which may initiate an ECI/EPI/ESI call. If an EJB component is used, the CICS EJB server may initiate an RMI/IIOP call to invoke another EJB residing in the target CICS region. If a SOAP proxy is used, the application proxy may initiate an APPC program call to the remote CICS resources. The architecture and the technical processes for each technology option were previously described herein.

This design pattern may be applicable, for example, when there is a business requirement to access and process online CICS transactions by wrapping them as Web Services. In addition, this design pattern may be appropriate when the current IT operating environment does not allow building a messaging or middleware infrastructure (such as JMS-compliant middleware) due to time and cost constraints.

Configuring the mainframe integration components and exposing legacy applications as Web Services may require some knowledge and experience of the IBM mainframe platform. The technologies behind these components may be proprietary in nature. Implementation may require a high level of technical skills and support experience in mainframe integration and Web Services technology.

Asynchronous Mainframe Web Services Design Pattern
Context

Some customers who operate many business applications on legacy mainframe systems may also have a message-oriented middleware infrastructure (such as Web-Sphere MQ). Such messaging infrastructure may enable business information to be encapsulated in a business document and routed to different applications for sharing and for further data processing. However, to be able to make use of common business information, developers may need to build a custom adapter for each front-end or application system, because each front-end or application system may only support its own data format. Thus, the custom adapter preferably translates the data content into a format that can be understandable by the front-end or application system.

Another issue may be that, if the common business information needs to be exchanged with external trading partners (that is, Business-to-Business integration), there may be no common middleware or messaging mechanism that can be easily agreed upon between two trading partners. A similar business scenario may occur when exchanging business data between two internal systems within an enterprise, where each system runs on different application platforms and the systems do not share a common middleware infrastructure.

Asynchronous mainframe Web Services may be a solution here, because an Asynchronous mainframe Web Service can wrap an existing business message in a SOAP envelope and exchange with multiple trading partners over different data transport or middleware (such as SOAP over MQ, and SOAP over JMS). SOAP messaging accommodates the issue of different connectivity requirements (using SOAP over different data transports) and different data format requirements (using XML parsers for easier data transformation). This becomes a time-to-market solution to expose business data messages as reusable Web Services that are encapsulated in proprietary mainframe systems and middleware infrastructures.

Problem

Common business data from the back-end mainframe systems that are encapsulated in existing message-oriented middleware may be shared between multiple application systems in the mainframe. Architects and developers may need to expose the business data in a Web Service that can be accessible to other systems or external trading partners.

Force

Dependencies to support asynchronous mainframe Web Services may include, but are not limited to: the availability of a common business data message used by the back-end mainframe systems and the availability of a message-oriented middleware infrastructure that connects to the back-end mainframe systems.

The common data message is typically shared by multiple back-end mainframe applications or different software versions of the same business functionality. The common data message may be used as an input service request or output business transaction data. For instance, an account balance inquiry data message may be shared by multiple versions of retail banking systems.

The availability of an existing message-oriented middleware infrastructure may be important, for example, because Web Services technology may leverage on the current infrastructure to integrate and interoperate with the back-end mainframe systems. Building a huge middleware infrastructure that can connect to the back-end mainframe systems from scratch may be very expensive and time consuming.

Solution

Message-oriented middleware vendors may support SOAP messaging, with additional provider classes that enable SOAP messaging over different data transports including WebSphere MQ and JMS. This may not require building customized adapters or programs in the legacy mainframe systems to wrap the business data in a SOAP envelope. By enabling the WebSphere MQ or JMS queue manager to support SOAP messaging, business data encapsulated in the back-end mainframe systems and in the message-oriented middleware may be reused for data interchange between trading partners and systems. This is preferably a cost-effective solution approach to Business-to-Business integration and internal system integration.

Figure 54:
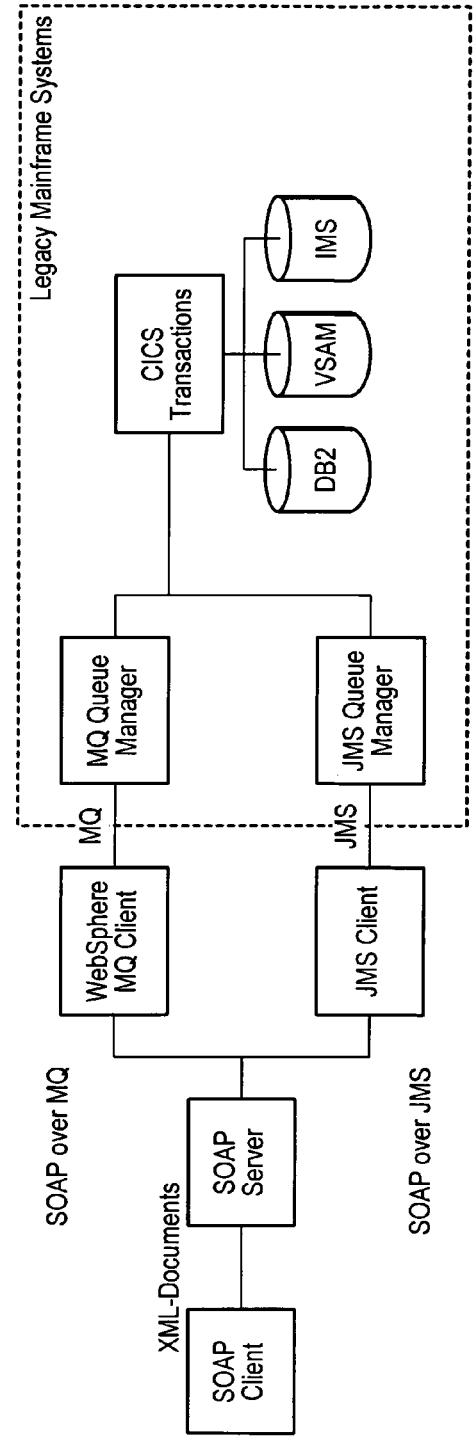
FIG. 54 illustrates Asynchronous Messaging for Mainframe Interoperability according to one embodiment.

FIG. 54 illustrates Asynchronous Messaging for Mainframe Interoperability according to one embodiment. FIG. 54 shows an exemplary scenario where service requests may be encapsulated in a WebSphere MQ format, wrapped in a SOAP envelope, and written to a MQ queue or JMS queue that may be processed by the back-end mainframe systems. A SOAP client sends a service request in a SOAP message to the SOAP server-side component. The SOAP server-side component (SOAP tier or skeleton) may then bind the messaging to the underlying data transport layer using WebSphere MQ or JMS. The WebSphere MQ or JMS queue manager preferably supports SOAP messaging. There are also some JMS vendor products (such as Progress SonicXQ) that support SOAP messaging over JMS. Upon receiving the SOAP message, the queue manager may then unmarshal the SOAP envelope and retrieve the message payload in native MQ or JMS format. The queue manager may then route the message to the target queue residing in the mainframe CICS region. The same process may apply to both WebSphere MQ and JMS technologies.

This pattern is a solution to Web Services that preferably enables an existing messaging infrastructure using WebSphere MQ or JMS. This pattern may be applicable, for example, when there are different CICS transactions that need to be accessed and there is no standard way to invoke them (for instance, one CICS transaction may require an ECI call and another an EPI call). By consolidating these heterogeneous CICS transactions and online interfaces into a single message, developers preferably do not need to build different program invocation or data access methods for each CICS transaction. Future enhancement to the application functionality is preferably more flexible and dynamic (for instance, it may be easier to add or aggregate new information elements to the remote CICS transactions without changing the back-end applications.) In addition, this pattern preferably does not require installing additional components to support asynchronous or document-based Web Services.

There may be a high design complexity in normalizing a common data message for multiple back-end mainframe applications. There may be a temptation for architects to simply use all existing data interfaces as the SOAP message payload. A risk is that irrelevant data in the SOAP message payload may increase data processing and XML data parsing time, which may impact performance.

Design Considerations

Design considerations may include, but are not limited to, one or more of the following.

Security

Typically, either user ID/password or SSL is used for authentication. Nevertheless, form-based or HTTP-based authentication may not be sufficient for Web security. Architects and developers preferably understand that security should not be viewed as user ID authentication only.

Authentication Design

RACF is a legacy mainframe security infrastructure for authentication of user identity and credentials for mainframe resources. It is now enhanced to register SSL certificates (which requires some specific APARs or service packs) and can integrate with LDAP/390. To use SSL certificates, architects may need to configure the AUTHENTICATE parameter in the TCPIPSERVICE resource definition of the CICS. This is a feature in CWS called CWS Certificate Auto-registration. Upon successful registration of SSL certificates in RACF, CICS can retrieve the user ID from the EXEC CICS EXTRACT CERTIFICATE USERID command. This design approach may leverage on and integrate with the existing security infrastructure of the legacy mainframe environment.

A potential design dilemma is whether architects should use a Directory Server on Open Platform (Unix) rather than a legacy mainframe platform. One argument is that architects can scale up multiple Directory Servers on the Unix platform for better scalability. This can support federated Directory Servers (also known as Network Identity). Factors to consider may include one or more of, but are not limited to: total cost of ownership, scalability and extensibility of the platform, and whether any proprietary extended security features are used. A misconception is that the total cost of ownership is usually the cost of obtaining the software license. In reality, the total cost of ownership may also include, but is not limited to, the cost of upgrading hardware, the one-off and ongoing support or maintenance costs, additional hardware and software costs to install and customize the authentication features, one-off and ongoing implementation costs for SSL- or PKI-based authentication and authorization, and integration costs. In addition, the business constraints and IT strategy for integrating with the legacy mainframe platform may be considerations. Thus, there may be no easy answer to the design dilemma.

EBCDIC Conversion

The mainframe interprets EBCDIC code pages but not ASCII. Java uses Unicode. Thus, it may be important to ensure that the mainframe integration technology includes EBCDIC conversion. For example, the CICS Transaction Gateway translates EBCDIC and ASCII into Unicode.

Alternatives to Mainframe Interoperability

Architects may want to consider alternatives to mainframe interoperability other than building on top of the mainframe architecture. This interest may be driven by one or more of, but not limited to: lower total cost of ownership (such as operating cost and service support cost for legacy COBOL applications), transition strategy to move away from obsolete COBOL technology to Open Standards and J2EE technology, and easier integration and interoperability using Java technology.

By migrating legacy application code to Java, architects and developers may then determine whether they would like to use document-based (asynchronous) or RPC-based (synchronous) Java Web Services. This may preferably allow more flexibility in customizing the business functionality to accommodate local requirements of synchronous or asynchronous transactional processing.

Technology Options

Technology options may include, but are not limited to, one or more of the following.

Transcode

Figure 55:
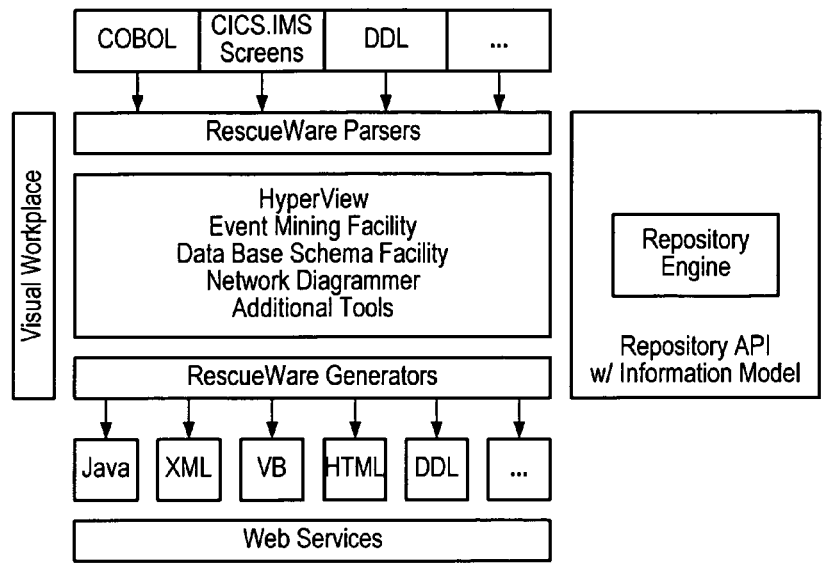
FIG. 55 shows an exemplary transcoder product.

The term transcode refers to translating and converting from one program language structure to another using intelligent rule engines, without rewriting from scratch. There are available COBOL-to-Java transcoder products. FIG. 55 shows an exemplary transcoder product, Relativity's RescueWare Architecture. Relativity's RescueWare, a developer tool, provides a comprehensive developer workbench, COBOL program analyzer, COBOL transcoding utilities, and data migration utilities. Relativity's RescueWare includes intelligent parsers that can parse COBOL programs and CICS/IMS screens into Java objects (including classes, methods, or even Java beans). This provides a mechanism to turn legacy COBOL programs into reusable objects. Java objects can then be exposed as Web Services.

Functionality that COBOL-to-Java transcoding tools preferably provide may include, but is not limited to:

- The automated migration tool set preferably provides tools to analyze the dependency and components hierarchy of the COBOL programs, and support automated (unattended or non-manual) code conversion, preferably with some "conversion patterns." It should also preferably allow platform environment parameters (for example, JCL parameters or dataset names on the mainframe) to be changed "intelligently" to the new target environment.
- Some tools may have better integration with software version control tools (such as ClearCase, CVS). MIS reporting is preferably available for code changes, version changes, and audit logging.
- There is preferably intelligent screen display code migration from 3270-like screen to SWING. There may be usability anomalies that need to be resolved or supported.

After the COBOL codes are transcoded into Java classes or EJBs, developers may create a server-side SOAP component to invoke these Java classes or EJBs. This approach preferably provides a flexible solution architecture for integrating with other systems and for extending the system functionality.

The developer's platform may reside on a PC. The deployment hardware may depend, for example, on the processing capacity requirements of the applications. In one embodiment, the deployment hardware may range from Sun Fire mid-frame series (e.g. model 3800 to 6800) to the high-end Sun Fire 15K series.

Automated and intelligent transcoding from COBOL to Java preferably expedites the migration effort. The COBOL program analyzer may help developers to identify dead code and to factor legacy business logic into reusable EJBs components.

Recompile

The term recompile refers to cross-compiling the source program language structure (such as COBOL) to a target program language structure (such as Java byte-code) using an intelligent language cross-compiler without changing the application program logic.

Figure 56:
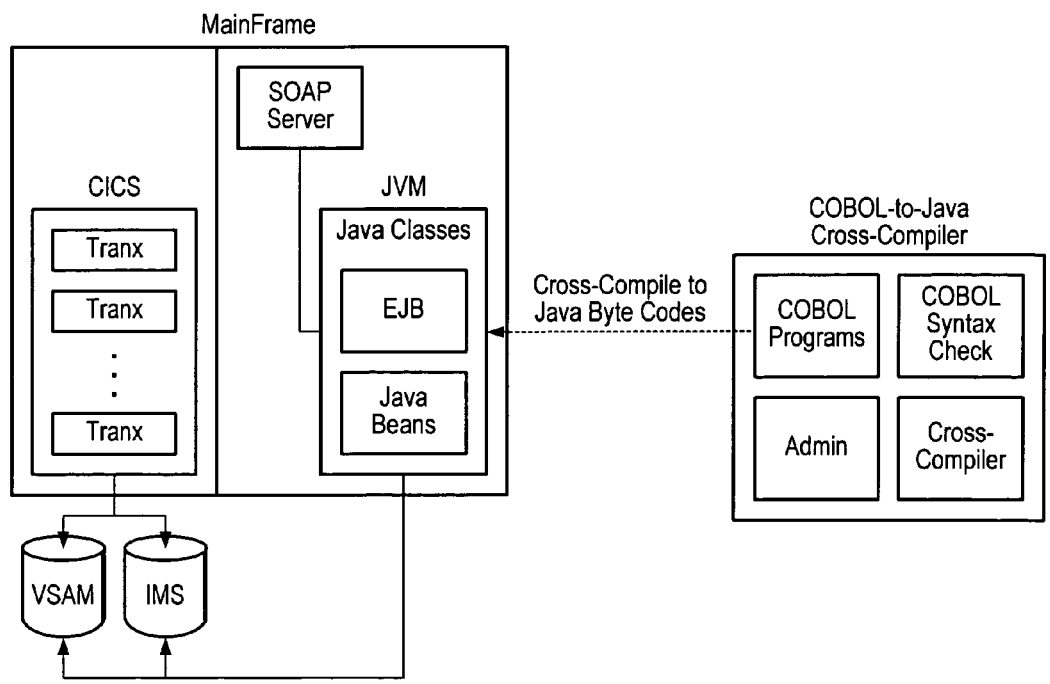
FIG. 56 illustrates an exemplary architecture of cross-compiling COBOL programs to Java byte-codes.

FIG. 56 illustrates an exemplary architecture of cross-compiling COBOL programs to Java byte-codes using an exemplary LegacyJ product. LegacyJ's PerCOBOL is a developer tool built on top of Eclipse open source that provides a COBOL-to-Java byte code cross-compilation functionality. Several COBOL variants are supported. When the COBOL code is being compiled, a syntax check is also performed. Developers preferably ensure the original COBOL source code is tested and deployed on the legacy system first, and then copied to the workbench for cross-compilation. Upon successful compilation, the code needs to be copied to the target platform for running.

Legacy COBOL programs may be refactored and cross-compiled to Java byte code using intelligent COBOL business rules. Structured procedures may then be transcoded into Java beans or EJBs. Data access routines to a legacy database such as VSAM or IMS may be also translated into the Java Naming Convention, for example using the CICS Transaction Gateway Java classes. A constraint may be that both the Java Virtual Machine and the original CICS need to reside on the same physical machine.

Once the COBOL programs are cross-compiled as Java classes, beans, or EJBs on the mainframe, developers may expose them as Web Services using tools such as Java Web Services Developer Pack or Apache Axis. This approach may not require vendor-specific middleware components (such as CICS Web Support) in the mainframe.

The developer's platform may reside on a PC, for example a Windows NT/2000 Pentium-based PC, typically of 256 MB RAM and at least 40 GB of storage. The deployment hardware may be the legacy platform such as IBM mainframe OS/390 R1.x or OS/400 R4.x. On the OS/390 platform, IBM Java Virtual Machine (or Java Run time version) needs to be installed and configured on the OS/390 Unix Service partition. Similarly, IBM JVM needs to be installed and configured on the OS/400 platform.

IBM requires installing and loading relevant VSAM or IMS Java classes in order to access VSAM/IMS datasets. These files come with the OS or may be downloadable from IBM's Web site.

Using recompile, legacy COBOL programs can be cross-compiled to run on a Unix Service partition of the legacy system and can be called like Java. The cross-compilation capability preferably enables external systems to access legacy system functionality via Java calls. These Java calls may be wrapped as SOAP Web Services (XML-RPC) without changing the system infrastructure. This preferably provides fast system interoperability, while leaving more room to re-engineer or migrate the legacy systems to an open platform in the long run.

Rehost

The term rehost refers to migrating the original program code from one platform to another without rewriting the program business logic. This may require some minor modifications to the language syntax owing to platform variance.

Rehosting legacy COBOL applications on a mainframe may result in porting the original COBOL source code to a Unix platform. This may require the use of a flexible COBOL environment that can accommodate variants of ANSI COBOL that run on the legacy mainframe, such as COBOL II and HOGAN COBOL. Apart from legacy COBOL programs, the rehosting environment may also support porting JCL (Job Control Language) or REXX, which are batch or scripting languages for both online and batch transaction processing.

Figure 57:
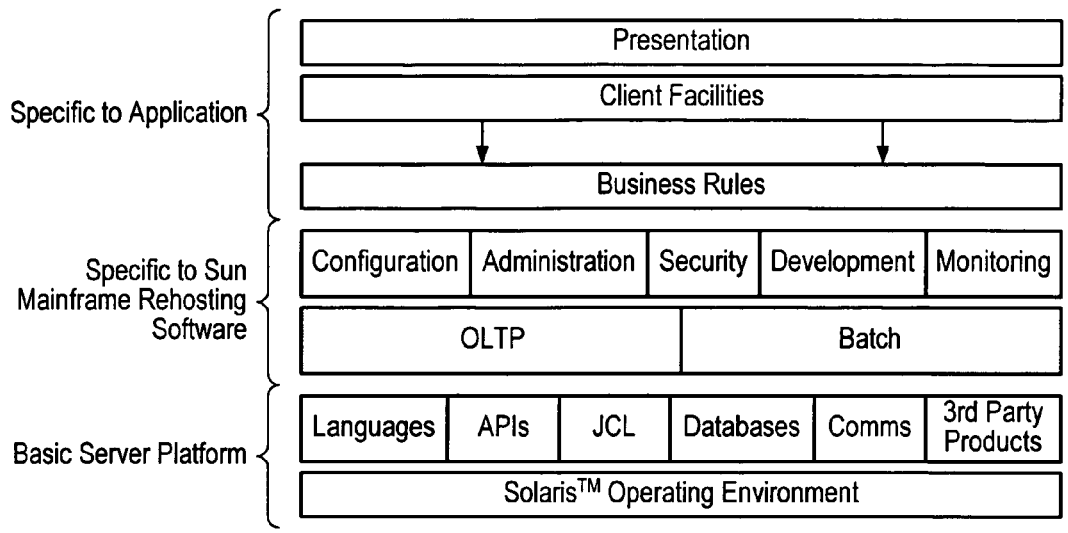
FIG. 57 illustrates Sun's Mainframe Transaction Processing Architecture as an exemplary, logical multi-tier architecture that corresponds to different components of a typical mainframe environment.

FIG. 57 illustrates Sun's Mainframe Transaction Processing Architecture as an exemplary, logical multi-tier architecture that corresponds to different components of a typical mainframe environment.

The hardware may depend on the processing capacity requirements of the applications. In one embodiment, this may range from the Sun Fire 3800-6800 series to the high-end Sun Fire 15K series.

Sun's Mainframe Transaction Processing Software (MTP) provides a CICS-like environment for processing COBOL applications. MTP supports, for example, MicroFocus COBOL applications. Some COBOL variants may need to be modified to run on MicroFocus COBOL applications under the MTP environment. There is a VSAM-compatible database for COBOL-VSAM implementation.

Sun's Mainframe Batch Manager (MBM) provides a batch-oriented environment similar to MVS/JCL. This will supplement COBOL applications with any batch job control language in the operating environment.

In one embodiment, it may be possible to use Sun ONE Integration Manager EAI edition to expose COBOL programs as Web Services. This is similar to building a SOAP proxy on the mainframe as previously described. However, it may not be cost-effective if the primary goal is to expose legacy COBOL programs as Web Services, because the total cost and effort of migrating COBOL programs from a mainframe to a Unix system may be higher than using other mainframe integration technologies.

Using rehost, legacy COBOL applications may be ported to a Unix environment with preferably minor modifications to the MicroFocus COBOL syntax. This preferably provides a low-risk, low-impact, minimal-change alternative to rehost COBOL applications on Unix, with potential for integration with open platform using Java or another open technology. This solution approach preferably does not need to re-engineer dead code from legacy COBOL applications.

Refront

The term refront refers to rewriting the legacy program code in the Java language. This usually results in redeveloping or redesigning the front-end and perhaps refactoring the business logic into reusable components.

Figure 58:
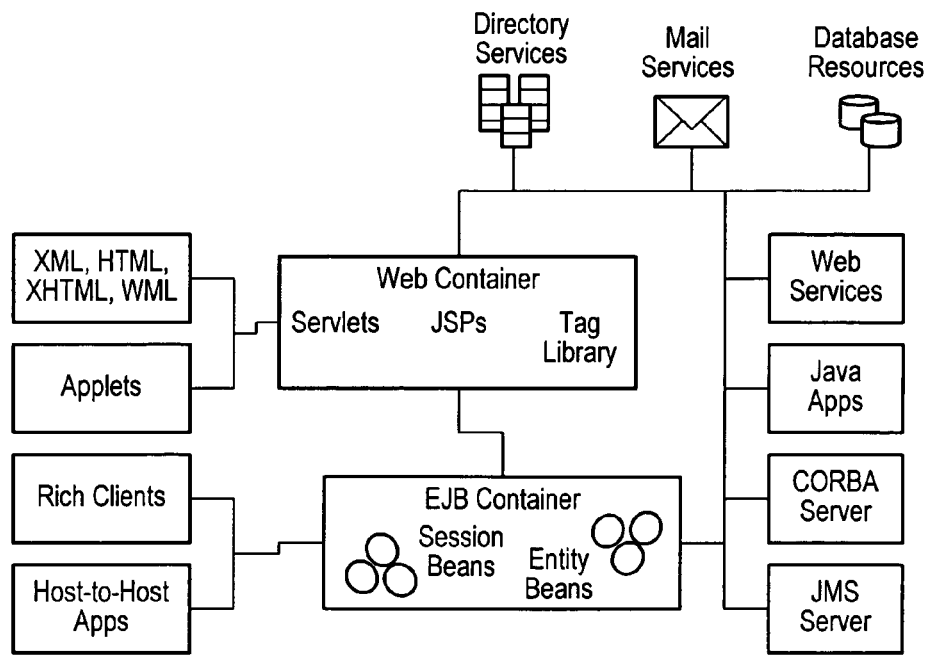
FIG. 58 illustrates refronting legacy systems using an exemplary J2EE architecture according to one embodiment.

Refronting legacy COBOL applications denotes rewriting and rebuilding the business logic. This may require re-engineering the business logic as well as the application architecture, for example using Java and Web Services. FIG. 58 illustrates refronting legacy systems using an exemplary J2EE architecture according to one embodiment. J2EE is an Open Standard that enables system interoperability and reusability. J2EE provides a flexible framework and application architecture that may be scalable in an n-tier architecture. Developers can design JSPs, servlets, or EJBs to invoke Web Services. This may be a long-term architecture solution and may not be constrained by any legacy system components.

The developer's environment may run, for example, on Solaris OE™ version 8 or higher (for example, on Ultra-10 workstation), Windows 2000, or XP Pentium-based PC, typically of 256 MB RAM and at least 20 GB of storage. The deployment hardware may depend on the processing capacity requirements of the applications. In one embodiment, they may range from the Sun Fire midframe (such as Sun Fire 3800 or Sun Fire 6800) to the high-end Sun Fire 15K series.

Sun ONE Studio, a developer tool, provides a developer workbench to develop, test, and deploy Java programs. There are libraries (such as NetBeans) and J2EE patterns available for software reuse. Sun ONE Application Server is a J2EE-compliant application server that provides Web and EJB containers to develop and execute Java servlets and EJBs. It also supports session, state, and connection pooling for transaction processing. JAX (Java API for XML Pack) is a publicly available bundle of XML-related Java APIs to develop XML-based transforming and Web Services. It includes JAXP, JAXB, JAXM, JAXR, and JAX-RPC modules. Java Web Services Developer Pack is an all-in-one Web Services developer kit available to the public that includes JAX, Tomcat, ANT, SOAP, and an application deployment tool.

When refronting, the legacy system and any dead code (legacy program codes that are inefficient or poorly designed) may be re-engineered. Refronting may also provide an opportunity to refactor inefficient code into reusable components and to tune up the performance of some bottleneck modules. This results in better application Quality of Services, such as better performance, throughput, and reusability of program modules, after re-engineering the inefficient code.

Design and Implementation Considerations

FIG. 59 is a table that illustrates some possible considerations for determining when to use legacy code migration tools according to one embodiment. The table outlines some pros, cons, and when-to-use guidelines for legacy code migration implementation. These may not be applicable to all scenarios, as real-life customer scenarios may be complex. For example, there may be batch and off-line programs that do not require interactive response. In one embodiment, there may be no mixture of asynchronous or synchronous modes of messaging or communication. In addition to providing sound architecture strategy and appropriate tools, a structured migration framework may be critical to migrating legacy applications to Java and Web Services.

The following describes an exemplary migration framework for migrating legacy COBOL applications to Java for a commercial bank scenario. An example is provided of using Web Services to integrate with mainframe systems and transition to a J2EE platform in the long term. The migration framework is preferably reusable for many if not all applications.

In this example, the bulk of customer information is stored in the current Customer Master (also referred to as the Customer Information File or CIF) on the mainframe. Different delivery channels or touch points (such as the call center/Internet banking, securities products, credit card application, or loan processing application) may also capture some customer information and preferences, but there may be no single customer information repository to aggregate them in real-time for customer analysis and business intelligence. One embodiment may use a multiphase approach to migrating the existing OF and various customer information sources to a new customer database to support Customer Relationship Management (CRM).

Figure 60:
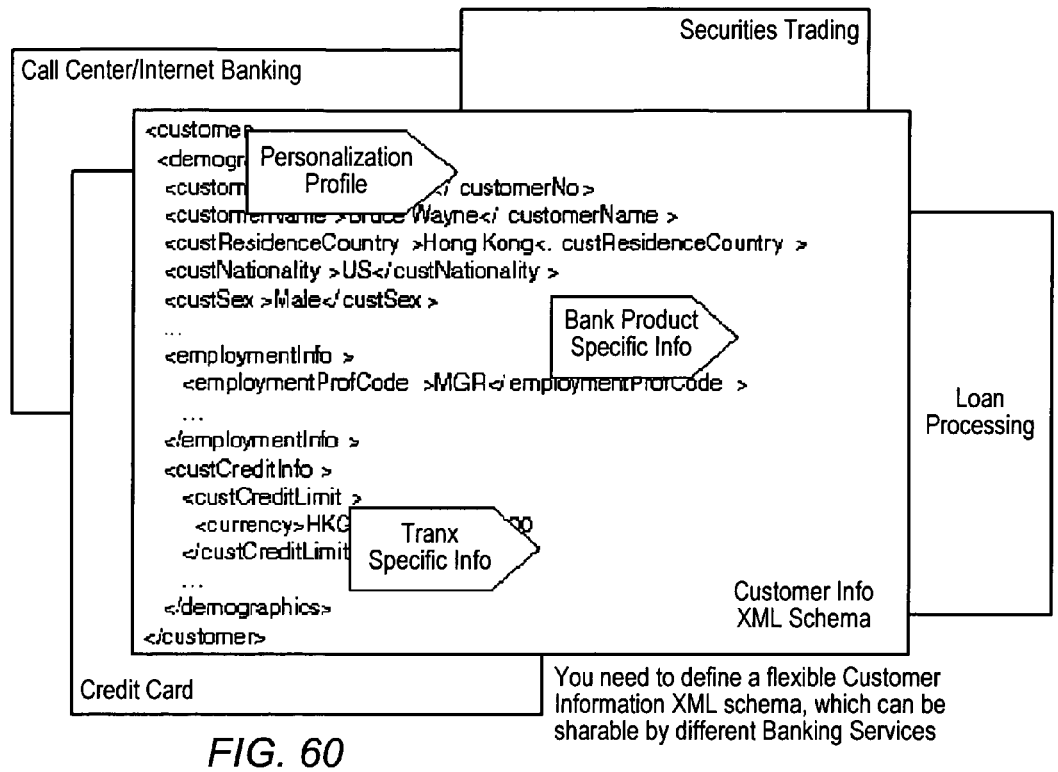
FIG. 60 illustrates a first stage in a multiphase approach to migrating the existing CIF and various customer information sources to a new customer database to support CRM according to one embodiment.

FIG. 60 illustrates a first stage in a multiphase approach to migrating the existing CIF and various customer information sources to a new customer database to support CRM according to one embodiment. In this stage, a new CRM business data model is preferably defined and customized. Customer information may be extracted from existing CIF and delivery channels (such as ATM channel and teller platform). The data extraction may be one-way data synchronization using the existing middleware or messaging infrastructure. Non-intrusive adapters or Web services are preferably implemented.

Figure 61:
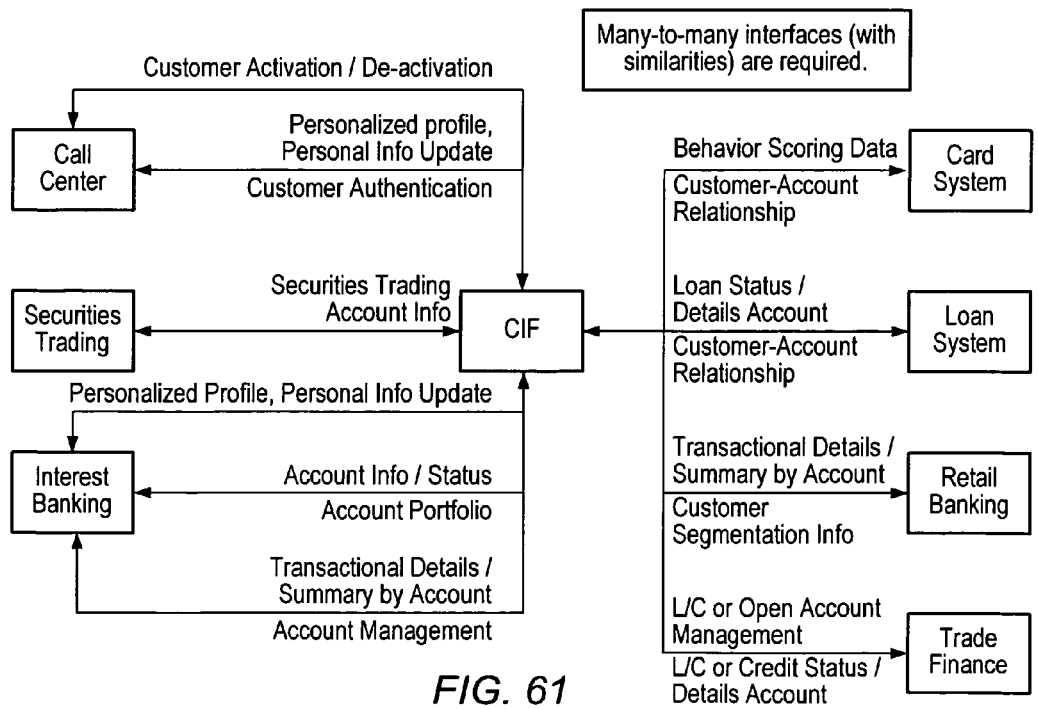
FIG. 61 illustrates a second stage in a multiphase approach to migrating the existing CIF and various customer information sources to a new customer database to support CRM according to one embodiment.

FIG. 61 illustrates a second stage in a multiphase approach to migrating the existing CIF and various customer information sources to a new customer database to support CRM according to one embodiment. In this stage, a two-way simultaneous data synchronization between the new customer database and various data sources is preferably implemented.

Figure 62:
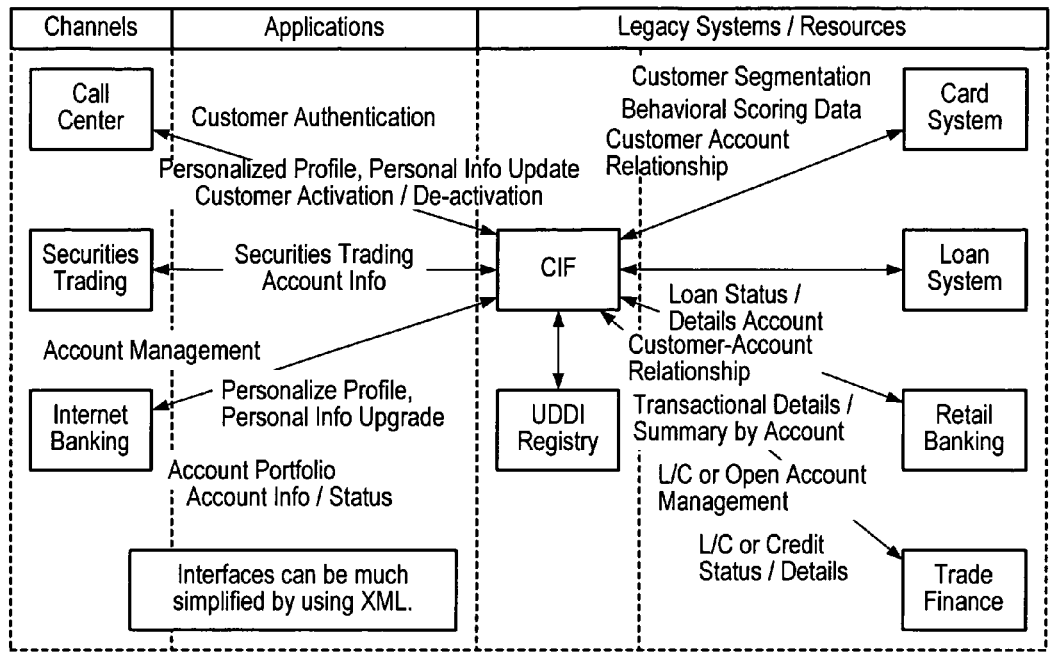
FIG. 62 illustrates a third stage in a multiphase approach to migrating the existing CIF and various customer information sources to a new customer database to support CRM according to one embodiment.

FIG. 62 illustrates a third stage in a multiphase approach to migrating the existing CIF and various customer information sources to a new customer database to support CRM according to one embodiment. In this stage, the legacy CIF and old CIF interfaces may be decommissioned and dynamic customer analysis, segmentation, and cross-selling/up-selling may be supported, for example using OLAP (Online Analytical Processing) and a data warehouse/business intelligence infrastructure. A single customer view may be consolidated.

Data Migration

Similar to multiphase CRM, legacy data files or databases (VSAM or DB2) may be migrated from the mainframe to an Open Platform in the second and third stages described above, in conjunction with the initiatives to off-load mainframe loading. There are utilities that can rehost VSAM files to a Unix platform (for example, Sun's MTP). Alternatively, data may be extracted to flat files and reimported into an RDBMS.

Data migration may depend on one or more of, but not limited to, a business data model, data extraction, data cleansing, data transformation, and the subsequent administration (for example, backup, archive, and restore). A middleware or messaging infrastructure may provide a core infrastructure for the data migration processes.

Legacy COBOL applications may be off-loaded from the mainframe by migration approaches which may include one or more of, but are not limited to: rehosting on Unix with COBOL, recompile COBOL to Java byte codes, transcode COBOL to Java, and rewrite in J2EE.

Approaches to COBOL-to-Java Migration may include a big bang approach with complete code-level conversion. All code will run on Java with a new database platform running on Unix. This is a complete detachment and cut-off from the mainframe. This is the ideal case.

Another approach is a parallel run, which is a transition strategy where the new Java code/database will be run in parallel with the legacy system. In this approach, how the data synchronization operates needs to be determined. For example, if the Java code will retrieve historic data from the legacy system via JDBC, how would it handle mainframe integration online (or off-line)?

Partial migration, where legacy code coexists with Java, may be the most complicated approach, as the majority of the code may be converted to Java, while some of it may need to access historical data or legacy resources (such as QSAM files on mainframe or DB2 via JDBC). The migration tool is preferably able to support direct access to legacy resources via JDBC or some other mainframe integration means (for example, translate database access codes to JDBC).

Code Conversion Methodology

A systematic methodology for handling code conversion may be preferable for the delivery. This may include one or more of, but is not limited to, packaging all JCL/COBOL programs in the source directory, scanning the original programs to analyze the program hierarchy or dependency, and scanning the programs for the appropriate programming models or conversion patterns. There may be a need to refactor the business logic into reusable components such as EJBs.

Developers may then start converting the code to Java, start manually fixing the dead code, or re-engineering some code. This may be followed by retrofitting the new EJBs or components into a design pattern or Java library for future use and testing the code with GUI or test data feeds.

Integration with Development Life Cycle

The migration is preferably integrated with the development platform management. The tool is preferably able to migrate converted code to a virtual or temporary development platform for code testing (for example, automated software migration to a "partitioned" or logical development platform where developers can modify their code with their IDE front-end).

The migration preferably integrates with the back-end resources management. The migration tool is preferably able to handle changes in the system environment parameters in the original COBOL code, MVS/JCL, embedded SQL code, or EXEC CICS code easily, without manually changing these parameters in many places. The migration also preferably includes potential simulation of legacy systems or transient storage devices (for example, the devices DB2, COMMAREA, and the temporary DD units used in the SORT utilities need to be simulated).

For testing platform management, the finished Java code is preferably "packaged" (for example, recompiling a set of J2EE .ear files) and tested in a "partitioned" or logical testing platform for unit testing or integration testing. The tool preferably allows test feeds to be input for testing. This may entail another software migration process (via scripting, if necessary) to a testing platform, which may be on the same physical machine with a logical partition or alternatively on a separate machine.

Production platform management may be similar to the testing environment platform management. There is preferably a fire-fighting production mirror platform where high severity production bugs can be fixed right away, before migrating to production.

Banking customers tend to be risk-averse to migrating their legacy systems to an open platform, as banking services are highly critical to customer services and financial risks. As a result, it may be preferable to adopt a low-risk approach to mitigate technology and implementation risks.

Success factors for migrating core banking systems may include one or more of, but are not limited to, expertise, process, and technology skills. Therefore, getting people with the right experience to customize the appropriate migration methodology may be worthwhile and risk-aversive. In addition, doing a Proof of Concept or pilot may be preferable.

Architecture Implications and Design Considerations

Different migration design options may impose certain architectures. For example, a rehosting architecture may require porting the entire application to a new open platform, which may require a different technology skill set than the mainframe skill set. This is in addition to the migration hardware and software cost. Architects and developers are preferably conscious of each design decision made.

On the other hand, transcoding technology may render different Java code designs. For instance, some transcoding tools may render the same COBOL procedure into a lengthy if—then statement or a structured case loop. This may impact the maintainability and performance tuning of the Java source code. Some intelligent transcoding tools can refactor dead code into EJBs. This may make the design more flexible and extensible if developers want to add more service components to the EJBs.

Risks and Risk Mitigation

In migrating COBOL applications to Java, technical risks may impose constraints to the implementation. It may be preferable to apply a mixture of software solution sets and migration processes to mitigate these risks. This section introduces some exemplary migration models that may mitigate risks in specific technology risks.

Legacy systems may be built from years of experience and testing. It may be unrealistic to wait for years for the new system to be rebuilt. In order to meet changing market needs, it may be preferable to build systems using automated migration tools (for example, recompile COBOL to Java byte codes) with shorter development life cycles and faster to-market times.

COBOL programs tend to have a relatively longer development life cycle (for example, long program construct and longer testing cycle) and many variants (such as ANSI COBOL and COBOL II, for example). COBOL programs may not be designed to handle memory management, message processing, and system interoperability. Rewriting the applications in Java may address these language constraints.

COBOL-based applications may include dead code or proprietary extensions. Some COBOL-based applications may not have design documentation, which makes re-engineering difficult. Some COBOL-based applications may require some form of re-engineering. Transcoding tools may provide a mechanism for analyzing and rebuilding business logic based on COBOL source code. COBOL programs may rely on system-specific interface methods (such as EXEC CICS on an IBM mainframe) to interoperate with external systems. This may impose a constraint to application migration, as this is platform-dependent and may require some re-engineering. However, this may open up the opportunity to re-engineer the legacy system interface as an asynchronous message interface or alternatively to expose the system interface as reusable Web Services.

New integration technologies have enabled exposing legacy system functionality on a mainframe to be reusable as Web Services. Architects and developers may realize faster implementation and easier interoperability using Open Standards. This may be attractive to many customers because Web Services can leverage on legacy systems without rewriting them.

Mainframe integration design approaches may include, but are not limited to, using CICS Transaction Gateway, CICS Web Support, Java technology (such as EJB Server for CICS), and SOAP proxy to enable legacy CICS applications as Web Services. A server-side SOAP component may be created to invoke the remote CICS transactions via any of these mainframe integration components. Different design approaches may have architecture implications, and architects preferably make conscious design decisions based on the cost-benefits.

An alternative to wrapping legacy system functionality as Web Services is to migrate legacy code to Java and enable them as Web Services later. This may be a more flexible strategy and may provide long-term benefits. Architects and developers may, for example, transcode, recompile, rehost, or refront legacy application code.

Best Practices and pitfalls may include one or more of, but are not limited to:

Prerequisites of Enabling Web Services on Legacy Mainframe. Implementing Web Services on a legacy mainframe platform may require hardware and software upgrades on the legacy mainframe to z/OS, which may be expensive. Architects and developers preferably check out the prerequisites of each integration option to the hardware and software, as well as the architecture implications.

Coarse-Grained Web Services. It may be preferable to not create a Web Services call for each individual legacy system functionality. This is because there may be scalability and maintainability issues in supporting too many Web Services calls on the legacy mainframe systems. Architects and developers may also consider passing parameters to coarse-grained Web Services.

Mainframe Interoperability When to Use. Architects and developers may not need to integrate with all legacy mainframe functionality. Some of the legacy functionality may be available via existing messaging. Some may be dead code and thus may need reengineering. Therefore, it may not be practical to wrap them as Web Services. Architects and developers may wish to consider the cost/benefits of building Web Services, such as the costs associated with internal implementation, external consultancy, or mentoring service.

Using Web Services Mentoring Service. Architects and developers may jumpstart a Web Services implementation if experienced Web Services consultants are brought in. Architects and developers may consider piloting a Web Services architecture workshop to define a pilot scenario, develop a Proof of Concept, and pilot a small system. This may enable the transfer of skills and lessons learned about implementation pitfalls.

Enterprise and Cross-Enterprise Integration

Enterprise Application Interface (EAI) and Web Services technology may have similarities. Rather than either-or, Web Services technology may be a complementary approach to integrating business functionality and legacy systems between business partners. Enterprise and cross-enterprise integration may require integration at different tiers—from security, data transport, middleware, and data to business processes.

This section describes some Business-to-Business integration patterns that illustrate how Java Web Services and EAI technology may be collaborated. Web Services technologies which may be appropriate for enterprise integration and to differentiate Enterprise Application Integration from Web Services are described. In addition, how Web Services technology may ease enterprise and cross-enterprise integration using integration design patterns is described.

Business-to-Business integration (B2Bi) may involve one or more of, but not limited to, host-to-host interfaces, personalized commerce services, and business process collaboration. Private labeling may be used to leverage the infrastructure of the service provider for low-cost B2Bi. Time-to-market and personalized service information may be key business drivers. With increasing organizational restructuring, consolidation, and mergers, many corporations are looking into B2Bi technology options that can deliver results speedily.

The ability to provide personalized service information and Single Sign-on to private labeling clients is preferable. This may enable clients to enjoy the same business functionality provided by the private labeling Service Provider, while keeping their own branding and integrating with their existing back-office systems. This may be a key service differentiation factor.

For risk mitigation, architects and developers preferably adopt a mature technology and adhere to a technology standard to integrate and interoperate with other business partners. Integration technology options for architects and developers may include one or more of, but are not limited to, deploying proprietary interfaces, adapting an Enterprise Resource Planning (ERP) product as their integration infrastructure, using a specific Enterprise Application Integration (EAI) product, and adopting Web Services technology for integration. These options may be considered a spectrum with two polarity ends—proprietary and open technology. The following outlines a high-level comparison of these B2Bi integration technology options.

Proprietary Interfaces
- Pros: Proprietary interfaces tend to be highly customized to meet local business and technology requirements. Interfaces and message formats may be standardized across the enterprise without depending on external parties.
- Cons: Proprietary interfaces may not be easily reusable and extended for other similar requirements. They may require complex changes or reengineering in order to integrate and interoperate with external business partners.
- Risks: Proprietary interfaces may work like a black box, and thus the technology may have high maintenance issues.

Enterprise Resource Planning (ERP)
- Pros: Companies that deploy an ERP system may leverage the ERP infrastructure to integrate with their front-end systems. ERP systems typically have J2EE and XML connectors and interfaces that can communicate with other systems.
- Cons: Some versions of ERP systems may not support J2EE and XML connectors. It may be complicated and expensive to develop a new connector for the ERP system. The required ERP integration expertise may be scarce.
- Risks: There is a risk of vendor lock-in with the ERP infrastructure. The scalability and extensibility of the integration architecture may be impacted by the legacy architecture of the ERP system. In some cases, any change may be dependent on the availability and capability of the ERP system.

Enterprise Application Integration (EAT)
- Pros: EAI adapters (connectors) can be customized to accommodate different requirements of each system. Complex business process and workflow requirements can be integrated using Message-Oriented Middleware (MOM) and Integration Manager. This allows more flexibility and extensibility.
- Cons: EAI is usually expensive to implement. Workflow changes may require business process re-engineering, which may complicate the implementation. Different EAI products are not interoperable.
- Risks: Adopting a specific middleware to implement EAI may lock in with a specific vendor architecture and technology. It may be difficult to switch to another vendor technology.

Web Services
- Pros: Web Services technology is an Open Standard technology option for B2Bi. It is a lightweight technology option and may be used without EAI. Java Web Services technology collaborates with and complements J2EE-based EAI to provide B2Bi.
- Cons: WSDL-UDDI-SOAP Web Services does not support business process and workflow integration. (ebXML Web Services technology does, however, through BPSS, the Business Process Spec Schema)
- Risks: The business process and workflow integration capability of WSDL-UDDI-SOAP technology is still evolving. EbXML technology offers a more sophisticated Web Services alternative to address the B2Bi requirements.

Enterprise Application Integration (EAI) is a technology used to integrate different business processes. It can link one application to another sequentially or, based on a predefined pattern (workflow), perform certain business functionality. Thus, different chains of events can be related together seamlessly without manual intervention or disruption. These events can also be programmed to handle different conditions with a rule engine (that is, Business Process), instead of hard coding with specific conditions.

Another feature of EAI is its potential for integration with existing applications and legacy back-end systems, including mainframe and ERP systems. EAI technology may provide seamless interoperability between systems across different platforms without rebuilding the business functionality. Many legacy back-end systems run on an IBM mainframe, a Tandem mainframe, a DEC platform, and a PC platform. Most of these systems store data in legacy databases and do not have interfaces or APIs for integration with external systems. To standardize a single interface or API on all these platforms may not be pragmatic. Architects and developers may opt to utilize an EAI product to accommodate different data formats in each system and to convolute into a single data format centrally.

EAI technology may be implemented, for example, using middleware products. Middleware may be point-to-point, queue-based, or a publish-subscribe model. Typically, middleware products require building customized adapters for each system. An adapter is typically platform-specific. An adapter may be designed to transform data from a proprietary format to another for a specific application (Data Transformation). Data from one system may be transformed and exchanged with another system via the customized adapters (Messaging).

If using EAI and CORBA technology together, customized EAI adapters can expose legacy business functionality by wrapping existing interfaces with an Interface Definition Language (IDL). IDLs provide a self-describing structure for the data and service provided (Service Definition). Client stubs may be generated from IDLs in order to access remote business functionality. A client stub may look up a naming server in order to locate and bind the local or remote business service (Service Discovery). The physical business service may reside, for example, on another machine or at a remote data center in another country. This preferably provides a more dynamic environment to bring together different business functionality within the enterprise. However, only CORBA-based EAI technology products require IDLs and naming servers.

EAI technology using Message-Oriented Middleware (MOM) is able to scale up with the use of a hierarchy of topics or queues (Manageability). Different topics or queues (hierarchical subject namespace that indicates the message category or application areas, such as PROD.TREASURY.FX, PROD.TREASURY.OPTION, and DEV.TREASURY.FX) may be managed and segregated to specialize in processing specific categories of transactions. Queues may be clustered to provide message-level load balancing and resilience. In other words, the workload may be shared between queues under the same cluster. When the transaction volume goes up, architects and developers may add more queues in the same machine or in another machine (that is, a choice of vertical and horizontal scaling). A queue may fail over to another queue under the same cluster automatically, if there is any message level anomaly. This may be preferable to using proprietary interfaces or APIs.

Web Services technology may be an enabling technology for B2Bi. Taking a broader meaning of EAI, Web Services and J2EE technology may be categorized as part of EAI technology, as they provide different technology implementations for enterprise integration. Taking a narrower meaning of EAI, where EAI is often associated with MOM middleware, then many similarities between EAI and Web Services may be identified.

Web Services technology may have a self-describing service definition (WSDL). Clients may discover different business services from a Service Registry, whether a UDDI or an ebXML Service Registry. Once the business service is found, clients may send service requests to the Service Provider using SOAP messaging. Java technology extends the WSDL-UDDI-SOAP-based Web Services technology to provide XML data transformation using JAXP and XSLT. To address guaranteed message delivery and manageability, architects and developers may leverage the Java Messaging Service (for example, SOAP-JMS) to collaborate with SOAP messaging. Java technology may also ease legacy mainframe or ERP system integration with Java Connector Architecture, which provides a service contract for better Quality of Service and transactional integrity. Web Services technology extensions that may provide enterprise and cross-enterprise integration may include one or more of, but are not limited to: ebXML's Business Process Specification Schema (BPSS), Web Services Choreography Interface (WSCI), Business Process Execution Service Definition Language for Web Services (BPEL4WS), XML Processing Description Language (XPDL), and Enterprise Distributed Object Computing (EDOC). Web Services technology extensions may collaborate with existing EAI vendor products for cross-enterprise or B2B integration. This preferably addresses the issue of interoperability between multiple EAI products.

Both EAI and Web Services technology may provide service definition, service discovery, and messaging capability to support exposing remote system functionality as reusable services components. Web Services technology may cover data transformation, Business Process Management, and manageability. Web Services technology may provide a lightweight integration option and may collaborate with and/or complement EAI products.

The ebXML Message Service may be tied to business processing through BPSS and Collaboration Protocol Profile/Agreement. There may be other initiatives that address business processes in BPEL4WS and other similar ways.

Enterprise and Cross-Enterprise Integration Framework

In one embodiment, an enterprise and cross-enterprise integration framework may be used to define different integration tiers and basic components and/or enabling technology for enterprise and cross-enterprise integration. An enterprise and cross-enterprise integration framework may also outline how each integration tier communicates with other tiers. An enterprise and cross-enterprise integration framework preferably does not build on top of existing EAI vendor products. An enterprise and cross-enterprise integration framework may mix-and-match implementing any EAI vendor products with Web Services technology.

Figure 63:
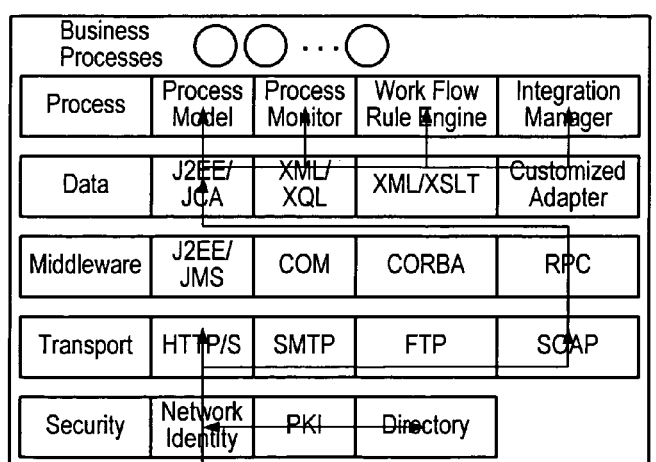
FIG. 63 illustrates an exemplary scenario where a user accesses Web Services functionality provided by a series of legacy back-end systems to perform a fund transfer according to one embodiment.

FIG. 63 illustrates an exemplary scenario where a user accesses Web Services functionality provided by a series of legacy back-end systems to perform a fund transfer according to one embodiment. A client user has a unique network identity using a digital certificate with a user ID and password to access business services from a number of Service Providers. The client user performs a Single Sign-on using his Network Identity (see 1 in FIG. 63), where the client user's credential is authenticated against a series of PKI infrastructure and Directory Servers under a federated identity management environment. This process may invoke the authentication and the associated entitlement services to determine whether the client is a valid user, and whether the client is authorized to access the fund transfer service (see 2 in FIG. 63). All client requests for the fund transfer Web Services may be represented in SOAP messages, which are carried over HTTPS in this scenario (see 3 in FIG. 63). SOAP messages may also be carried over other data transport, such as SMTP or FTP.

The legacy back-end systems are wrapped as XML-RPC Web Services using Java Connector Architecture. Upon receipt of the SOAP service request, the server-side SOAP component (SOAP tier or skeleton) may then invoke the remote back-end mainframe system functionality via XML- RPC (see 4 in FIG. 63). The Java Connector is a J2EE-based integration technology to connect the Web Services client request to the back-end legacy mainframe systems (see 5 in FIG. 63). The client user may use a synchronous Web Services session to retrieve account profile, perform account balance enquiry, and transfer cash from one account to another account. There may be one or more back-end business processes that require sophisticated business process collaboration and monitoring. The "fund transfer" processes may be managed by a workflow rule engine and an Integration Manager hosted by the financial portal Service Provider (see 6 in FIG. 63). Workflow processes may be monitored with transactions logged for audit purposes.

The notion of Network Identity is to provide a unique identity for accessing business services over the Internet, where users just need to sign on once for multiple Service Providers. This may also be associated with Single Sign-on (SSO) technology. Network Identity may assume the use of security tokens such as X.509v3 digital certificates or a Kerberos ticket with Public Key Infrastructure. The Network Identity process may also retrieve the user profile and access rights from federated Directory Servers and validate against the credentials. Security Access Markup Language (SAML), (and its extension), under the Project Liberty specification, may be used as the underlying security messaging specification. The client requester may initiate a SAML access right assertion to the federated Directory Servers. Upon successful validation, the client requester may be granted access to the authorized business services stored in the user profile.

SOAP over TCP/IP may be the underlying messaging transport. SOAP over TCP/IP may be carried over HTTP, HTTPS, SMTP, or FTP. The SOAP 1.1 specification defines SOAP over HTTP. For SOAP-SMTP and SOAP-FTP binding, developers may need to write their own provider class for the SOAP bindings.

The integration framework may allow multiple middleware integration options with the back-end systems. Typically, middleware products can communicate with the back-end systems using Java Message Service (JMS). If there is a need to communicate between the client and the back-end systems using two middleware products, even though they may be using JMS, a JMS bridge that binds JMS to the underlying data transport such as SOAP may be required. This may be referred to as SOAP-JMS binding.

With Java technology, developers may, for example, also use COM (for example, using a Java-COM bridge), CORBA (for example, using RMI-IIOP or a Java-CORBA bridge), and Remote Procedure Call (or RPC, such as XML-RPC). Using Web Services technology, these middleware integration options may use SOAP over HTTPS as the transport. This decouples the middleware from the data transport integration, preferably making interoperability easier.

At the data level, business data objects that are encapsulated in existing relational databases may be accessed and retrieved by XQL (XML Query Language or SQL-like XML notation). If the data are persisted in proprietary format and a customized adapter has been built, then developers may wrap the customized adapter as Web Services functionality.

At the presentation level, if data need to be transformed, developers may use the XML Style Sheet Processor (XSLT) to translate and render data into another format, such as delimited text, proprietary text format, or PDF.

Legacy systems data may be also accessed using the Java Connector Architecture (JCA). Developers may also build custom JCA connectors using an off-the-shelf JCA connector software development kit or Java class library.

Using an EAI product, complex business processes may be modeled as Process Models with a Workflow Rule Engine and an Integration Manager. Process Models are an encapsulation of a series of actions, where specific actions are preferably taken if certain events take place. The Workflow Rule Engine manages a list of business rules defined to describe and execute predefined Process Models when different events take place. The current or historic events, Process Model actions, and/or which business rules are fired, may be monitored and administered by a Process Monitor for performance and audit purpose.

FIG. 64 is a table that summarizes the integration components and enabling technology by tiers versus layers according to one embodiment. In one embodiment, there may be five different tiers of integration. In one embodiment, integration tiers may include one or more of, but are not limited to: a client tier, a presentation tier, a business tier, an integration tier, and a resources tier. In one embodiment, layers may include one or more of, but are not limited to: a lower layer, an upper layer, a virtual layer, and an application layer. Some components may span different tiers and platforms. Therefore, enterprise and cross-enterprise integration covers components by components, across tiers and layers. This may not stop at any component level.

In order to utilize the integration framework, architects and developers may define their integration requirements and map to the tiers (e.g. a client tier, a presentation tier, a business tier, an integration tier, and a resources tier) of the integration framework. The architects and developers preferably identify their integration approach and model and consider reusing any existing B2Bi integration design patterns (described below). Preferably, integration methodology is customized and adapted for each business case.

To customize the integration architecture, architects and developers may start with Use Case modeling. It is preferable to be customer-centric and to consider reusability (for example, build a library of repeatable services, codes, and integration tools) and how to lower Total Cost of Ownership (TCO). It is preferable to place the big picture first, and to not initially focus on the interfaces or APIs. Integration design also preferably covers many aspects of security, processes, data, and business services. It is preferable to decouple transport from the message contents or structure.

With a comprehensive integration framework, architects and developers may customize their own structured processes and methodology, which may preferably reduce technology and implementation risks. Architects and developers may preferably focus on their success, as they may find it easier to set their priorities on the critical integration areas.

The integration framework may provide a reusable structure to customize and fine-tune the customer's integration architecture. This preferably sets the big picture or blueprint for its target architecture. The technology options are preferably Open Standards compliant, which eases future extension and interoperability. The integration framework may also provide best practices that describe when to use specific integration design patterns.

Integration Technologies

Figure 65:
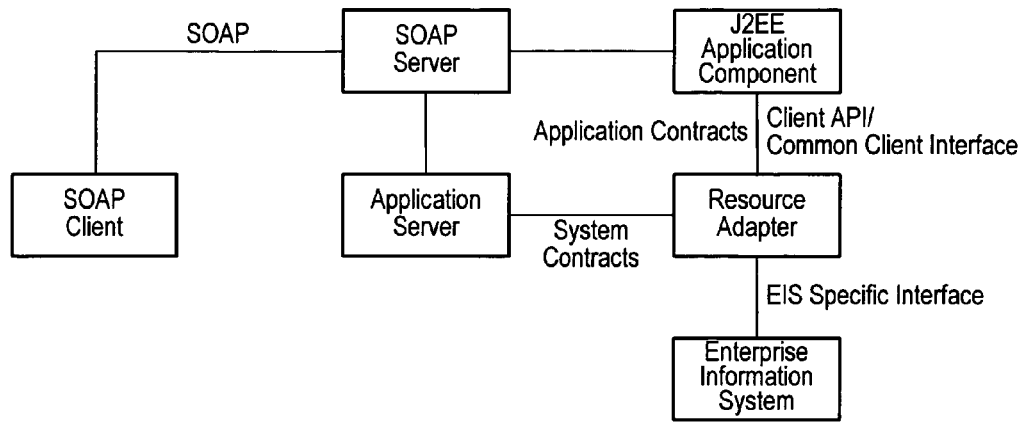
FIG. 65 illustrates a high-level Java Connector Architecture overview according to one embodiment.

Java Connector Architecture (JCA) provides a standard architecture for connecting to Enterprise Information Systems such as mainframe legacy systems and Enterprise Resource Planning systems. FIG. 65 illustrates a high-level Java Connector Architecture overview according to one embodiment. Java Connector provides a Resource Adapter that enables J2EE application components to connect to Enterprise Information Systems (EIS) or legacy mainframe systems. J2EE application component may establish application contracts with the Resource Adapter. The Resource Adapter provides Common Client Interface (CCI) to connect the EIS. When an established system contracts with the J2EE application server and the application contracts with the J2EE application components, the Resource Adapter may ensure reliable data connectivity and messaging with the EIS.

A server-side SOAP component (SOAP tier or skeleton) may initiate service requests to the EIS via the relevant J2EE application component, which may create a connection with the EIS via the Resource Adapter. The Resource Adapter may also handle connection pooling and session failover. The business transaction result may be returned in a SOAP message to the SOAP client via the SOAP server. The JCA design may support both synchronous and asynchronous Web Services.

JCA 2.0 may provide features including one or more of, but not limited to: asynchronous resource adapters (for example, supporting inbound and outbound directions for complex integration scenarios), Java Message Service API provider pluggability (that is, treating JMS API as a resource adapter), XIVIL support in CCI (for example, JAXP and JAXB support), and CCI metadata support (for example, providing meta information such as input and output record types).

A core component in JCA is the Resource Adapter. A Resource Adapter provides connectivity to the Enterprise Information Systems where the client (J2EE application components) uses a Common Client Interface (CCI) to invoke enterprise system functionality and/or to retrieve customer information (using Enterprise Information System's input and output record types). Benefits of the JCA Resource Adapter may include, but are not limited to: addressing previous integration issues of scalability, asynchronous communication between the client and Enterprise Information Systems, pluggability with a standard J2EE container, and transactions and security integration issues. An implication is that the JCA Resource Adapter provides a "system contract" with the J2EE application server and an "application contract" with the J2EE application components. The contract denotes connection management, transaction management, and security management (Resource Adapter Architecture is described below). This preferably allows a better quality of service and transaction integrity.

Resource Adapter Architecture

Figure 66:
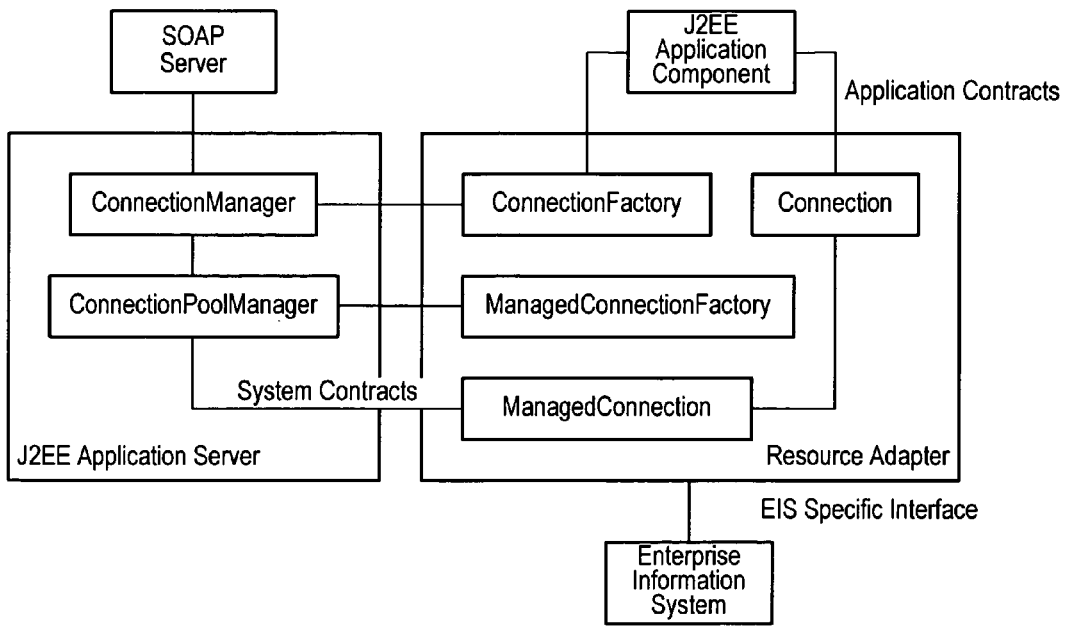
FIG. 66 illustrates the JCA connection management process in a Resource Adapter according to one embodiment.
Figure 67:
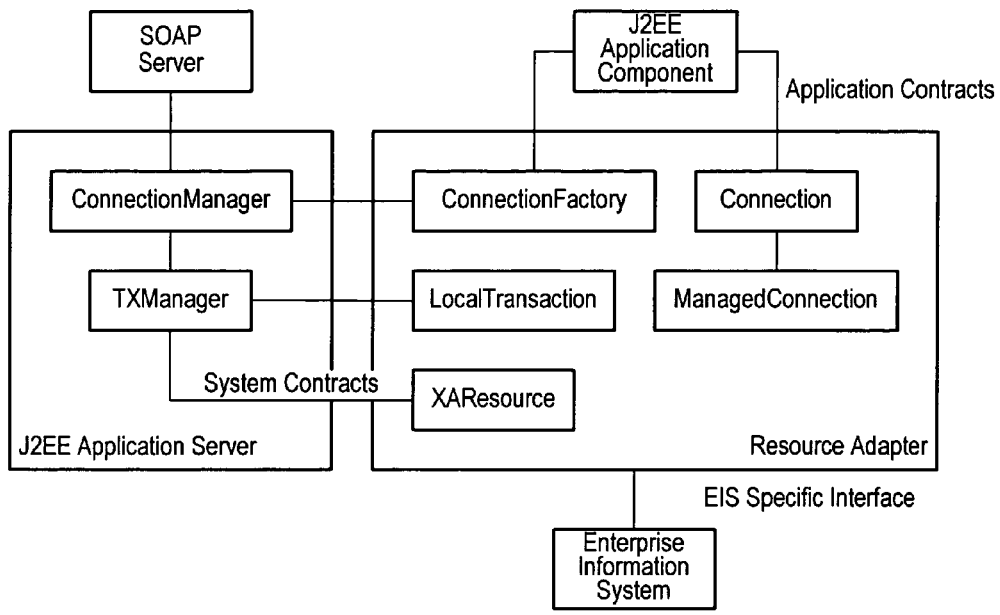
FIG. 67 illustrates JCA transaction management processes according to one embodiment.

A benefit of the Resource Adapter is the system contract between the J2EE application server and the Resource Adapter, which provides reliable connection management, transaction management, and security management. FIG. 66 illustrates the JCA connection management process in a Resource Adapter according to one embodiment. The boxes denote the Java class objects (such as ConnectionFactory and ConnectionManager) that need to be used for connection management. FIG. 67 illustrates the JCA transaction management processes, where the TXManager object manages the business transactions using the LocalTransaction class as per the system contracts in the XAResource object, according to one embodiment.

Common Client Interface

Figure 68:
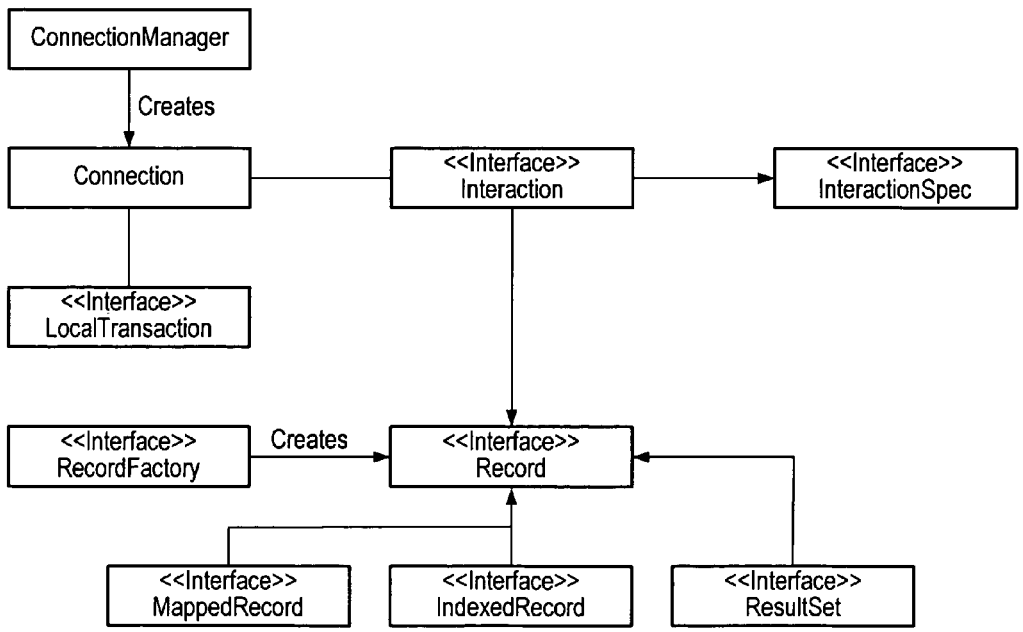
FIG. 68 illustrates JCA Common Client Interface creation for a legacy Enterprise Information System according to one embodiment.

FIG. 68 illustrates JCA Common Client Interface creation for a legacy Enterprise Information System (e.g., CICS application) according to one embodiment. The ConnectionManager object initializes the connection, specifies the user ID and password for security, sets the remote application ID (in this case, CICS transaction ID), and invokes the remote functionality. The InteractionSpec object denotes the remote CICS transaction ID. The result is then returned at the end in the ResultSet object.

Commercial Implementation of Resource Adapter

Figure 69:
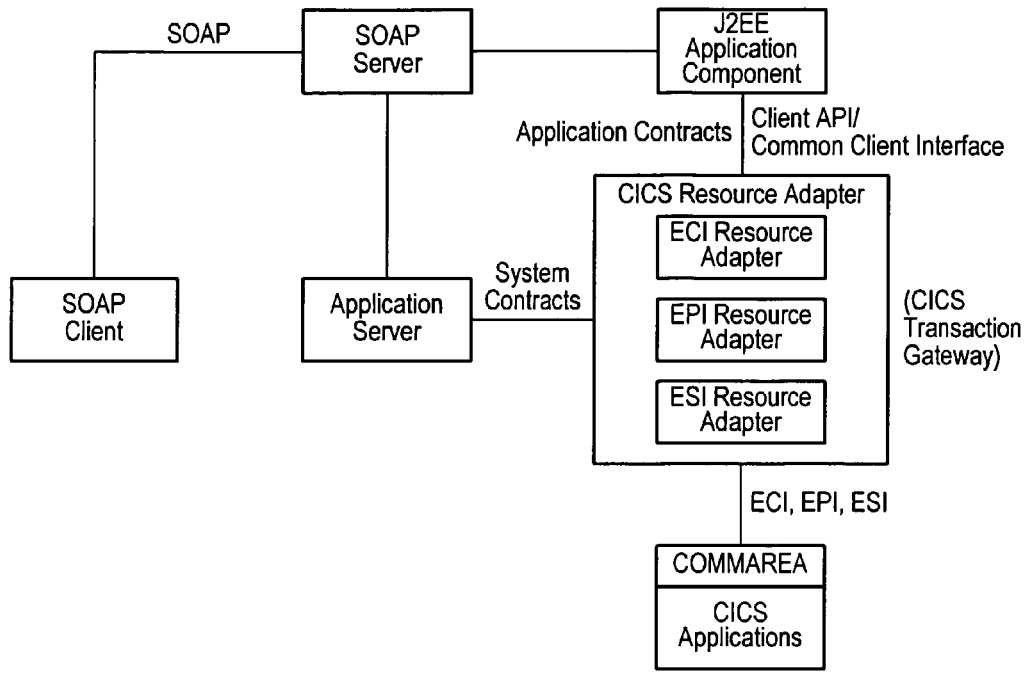
FIG. 69 illustrates the components of a CICS Resource Adapter, according to one embodiment.
Figure 70:
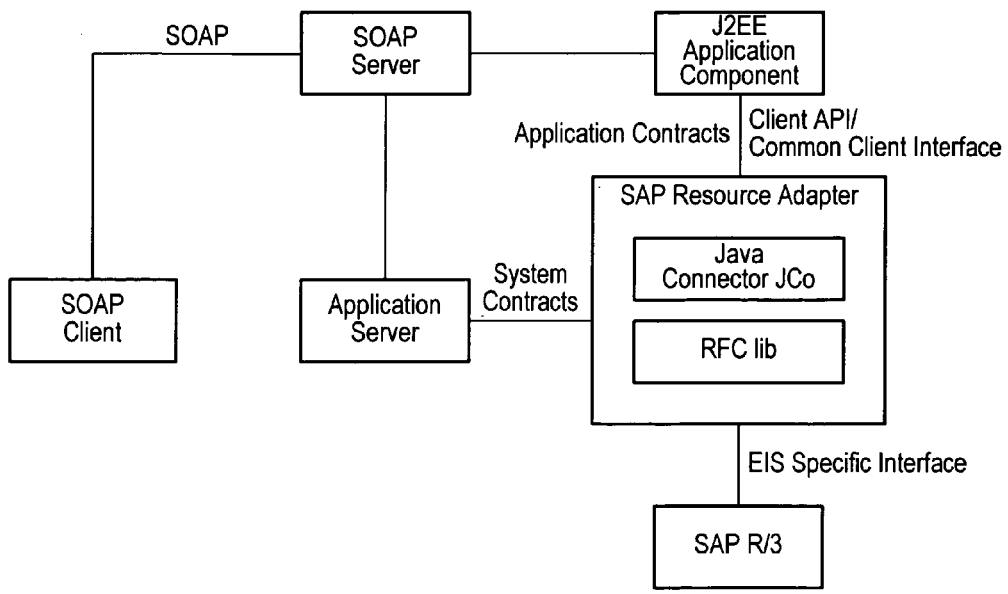
FIG. 70 illustrates the components of an SAP Resource Adapter according to one embodiment.

There are commercial implementations of Resource Adapter for legacy mainframe systems and Enterprise Resource Planning. FIGS. 69 and 70 depict exemplary Resource Adapter implementations for CICS and SAP R/3, respectively, according to embodiments.

FIG. 69 illustrates the components of a CICS Resource Adapter, which may include, but are not limited to, an ECI Resource Adapter, an EPI Resource Adapter, and an ESI Resource Adapter, according to one embodiment. These adapters may accommodate different types of CICS communication calls (e.g., ECI, EPI, and ESI calls), depending on how the client invokes the back-end CICS transactions. The data result may be placed in the common area COMMAREA. The CICS Resource Adapter may be provided with the CICS Transaction Gateway software package.

FIG. 70 illustrates the components of an SAP Resource Adapter according to one embodiment. The back-end SAP resources and business functionality may be accessible by a proprietary RFC library (RFC Lib). The SAP Resource Adapter provides an abstraction layer called JCo (Java Connector) to invoke RFC lib calls.

ebXML Business Process Management

Business Process Management is an element in enterprise and cross-enterprise integration. Business Process Management entails unified process automation and workflow models. Business Process Management may require a direct model execution and manipulation. Business Process Management preferably supports one or more of, but not limited to: state management, time-based exception handling, robust process monitoring and analysis, nested model support, and concurrent model support. Architecturally, systems supporting Business Process Management are preferably highly reliable, highly available, scalable, and Open Standards compliant.

ebXML Web Services technology provides an integration option to managing business processes. An example of Business Process Management using ebXML Web Services technology is Progress eXcelon's Business Process Manager (BPKI), which is designed to support B2Bi using ebXML's Business Process Management.

SOAP-JMS Integration

Although Java Message Service (JMS) is a messaging standard for middleware products, developers cannot exchange data from one JMS to another because JMS depends on the underlying physical data transport. For example, data objects encapsulated by TIBCO JMS implementation will not be able to be exchanged with an IBM MQ JMS implementation. This may be significant for cross-enterprise integration when both trading partners claim to support JMS but technically cannot exchange data using a JMS implementation.

Alternatives may include using a proprietary middleware bridge (such as TEBCO's TIB2MQ) and a JMS bridge. The JMS bridge is a generic term for integrating JMS using a XML cache solution (for example, Progress eXcelon's XIS) or implementing a SOAP-JMS bridge to utilize SOAP messaging over different JMS implementations. The SOAP-JMS bridge refers to extending the SOAPTransport class to customize a SOAP-to-JMS Transport class that can create a JMS queue session, create a queue message from the SOAP header, and extract and decode the SOAP message.

Integrating Different Data Sources

Without XML support in a database, architects and developers preferably write JDBC calls to encapsulate business data objects and extract and transform them into XML messages. The architects and developers may end up writing lengthy entity beans and complex data handling methods. An alternative may be using legacy database warehousing techniques to extract data into a data mart for processing. However, this may require off-line processing for data extraction, transformation, and database loading.

Database vendors may include SQL-to-XML mapping and native XML format storage support in their database technology. For example, developers may use an add-on utility (such as XML extender or servlet) to extract a relational database and transform into XML messages from DB2 or Oracle 8i. This has eased accessing and updating data from a real-time Web Services calls and reduced the development effort.

XML-related database initiatives such as XQL (SQL-like XML query language) and DADX Web Services (Mapping SQL to DTD or XML Schema) may be available. XQL is designed for use as a query language in XML syntax. This reduces the development effort to parse relational database data results to XML and vice versa. DADX is a proprietary implementation to combine a SOAP service request with SQL calls. DADX may be generated and managed from WebSphere Application Developer and may work with DB2. Some technologies may be implemented with proprietary databases.

Integration Design Patterns

This section describes some B2B integration design patterns for Web Services technologies. For each of the integration design patterns, a scenario is presented where the design pattern may be applied, as well as a sequence diagram to depict how Web Services technology may be implemented. For each integration design pattern, the context (background or requirements) may be defined, a problem or problems (problem statement) may be described, a force or forces (design factors to be considered or when to use the pattern) may be described, a solution (proposed solution depicted in Use Cases and sequence diagrams) may be provided, and risk (design or implementation risks, and the risk mitigation) may be described.

Application-to-Application Design Pattern

Context

Figure 71:
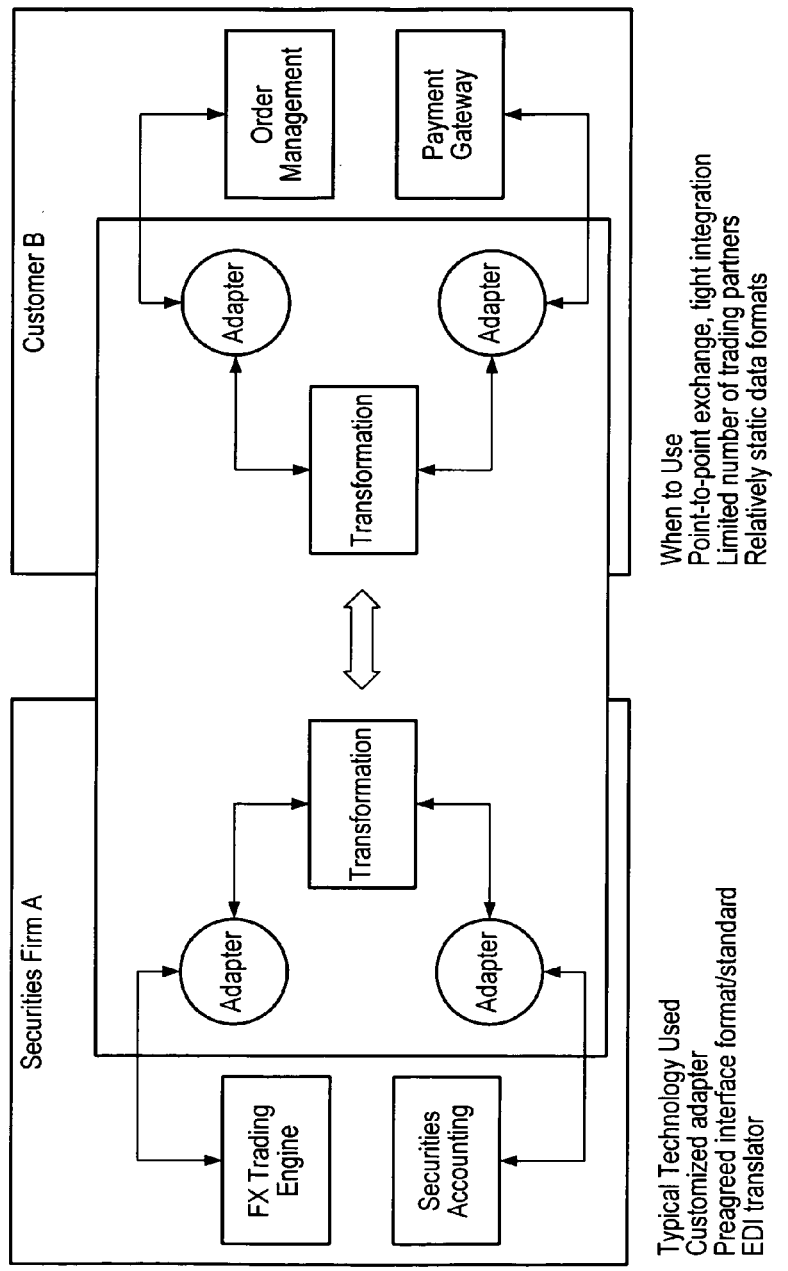
FIG. 71 illustrates an exemplary scenario where a corporate institution wants to automate a Foreign Exchange trade order process by sending an electronic interface to a broker according to one embodiment.

An enterprise may have ad hoc requirements for a point-to-point interface with another trading partner. FIG. 71 illustrates an exemplary scenario where a corporate institution (Customer B) wants to automate the Foreign Exchange trade order process by sending an electronic interface to the broker (Securities Firm A) according to one embodiment. Customer B is a large corporate customer, and prefers to use a mutually agreed interface format or perhaps a standard data exchange format. Trading partners may use a customized adapter to transform business data from existing back-end systems to exchange with the trading partner (either synchronous or asynchronous).

Problem

Different trading partners' applications may have local and proprietary data formats. These applications may not share a common data format, and thus may require customized data transformation. If a trading partner (such as Customer B of FIG. 71) needs to send transaction data to another trading partner (such as Securities Firm A of FIG. 71), the trading partner may customize the data mapping and transformation or send in a pre-agreed format before exchanging data. If the number of application interfaces increases, the customization effort for the data transformation or customization may become expensive and inefficient.

Force

Different trading partners may have different data formats that may require customized data transformation. It may not be viable to standardize a single data format that can be used to exchange data with all trading partners. Thus, the use of a flexible data format (such as XML) and a standards-based messaging (such as SOAP messaging) may be preferable for facilitating application-to-application integration.

Solution

In the exemplary scenario illustrated in FIG. 71, Customer B wants to send a Foreign Exchange trade order directly from its back-end Order Management system in an fpML message format. Its current Order Management system does not process fpML message types. A custom adapter may be used to extract and transform trade orders in fpML (for example, using JAXP). It then exchanges the fpML messages with the trading partner. The trading partner, Firm A, may have a legacy FX trading engine and securities accounting back-office systems and may not support fpML. However, Firm A uses a custom adapter to receive the fpML message from Customer B and passes it to its Message Broker (aka EDI translator) to transform the data contents to a proprietary format that its back-office systems can understand. fpML is a market message standard, which is initially agreed upon between the two trading partners.

Figure 72:
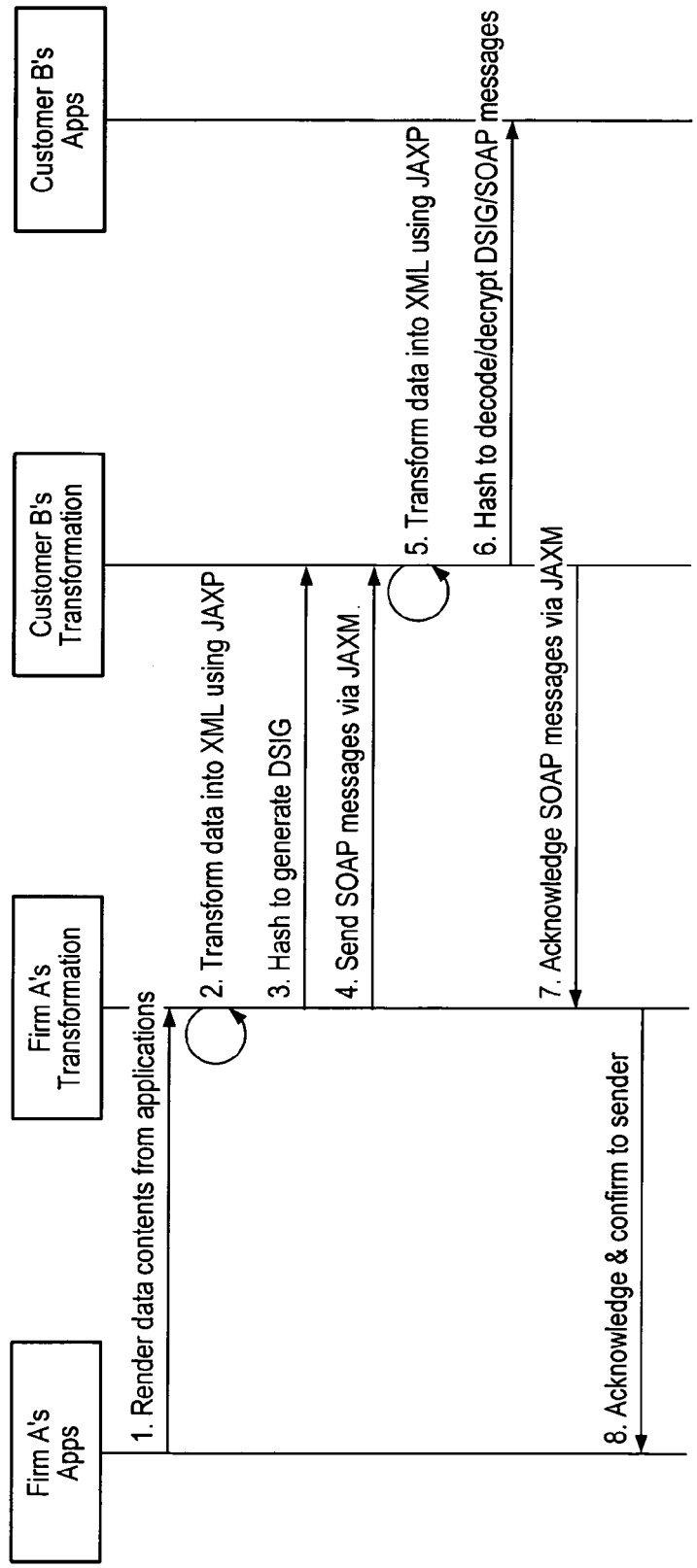
FIG. 72 illustrates an Application-to-Application Pattern Sequence Diagram according to one embodiment.

FIG. 72 illustrates an Application-to-Application Pattern Sequence Diagram according to one embodiment, and elaborates on the details of the data exchange using Web Services. Firm A extracts and renders the data contents from the back-end applications. The Message Broker (the data transformation engine) then transforms the data into XML using JAXP. It uses a hashing algorithm to generate the digital signature (DSIG), attaches to the SOAP envelope, and sends the SOAP message using JAXM. Upon receipt of the SOAP message, Customer B's Message Broker (the data transformation engine) unmarshals the SOAP envelope and retrieves the message content. Customer B's Message Broker may also use the public key pair to decode the message content and transform the XML using JAXP into a format that is understandable by the back-end applications. Once the message processing is done, Customer B's Message Broker may then prepare an acknowledgement message (SOAP reply message), encode and sign with a digital signature, and return to Firm A's Message Broker. Upon receipt of the acknowledgement message, Firm A's Message Broker may notify the back-end application that a message reply has been received.

This Web Services integration pattern makes use of JAXP for flexible data transformation and JAXM for heterogeneous platform connectivity. It addresses the issues of proprietary data format and connectivity for point-to-point application interfaces discussed earlier. The "adapter" becomes a standards-based implementation and may be reusable for other trading partners.

This Application-to-Application integration pattern is suitable for point-to-point exchanges where tight integration is required. There are limited numbers of trading partners. The message format is relatively stable.

With an EAI implementation, architects and developers may use an EDI translator (Message Broker) together with customized adapters. With a Web Services implementation, they may use JAXP to transform data from the back-end systems and JAXM to exchange fpML messages between the trading partners.

Risk

Not all trading partners may be technologically ready to customize the data transformation engine to support SOAP messaging. Many customers may use proprietary EAI products for data transformation. A long-term strategy to migrate all interfaces to support SOAP messaging may be required.

This pattern may be useful, for example, to streamline the order management process to support Straight-through Processing. SOAP messaging using JAXM is one way to encapsulate business data in a SOAP envelope and send message acknowledgements to the trading partner.

Standard Build Design Pattern

Context

A challenge of a rollout of business applications is the complexity of software service versions to support the heterogeneous platforms used by different users or trading partners. For instance, in the banking industry, home banking and cash management systems are two typical examples in which different versions of user front-ends are deployed to the market. Supporting different software versions that run on heterogeneous platforms (such as Windows 95 and Windows 98) may be problematic.

Architects and developers may design and deploy a standard build gateway for both trading partners to exchange business data (either synchronous or asynchronous). Data formats and APIs may be standardized on the same platform.

Problem

There are many variants (or versions) of application interfaces for different trading partners, even though these interfaces may share similarities. As the number of application interface variants increase, the maintenance and support effort may be large and difficult to manage.

Force

Standardizing all data interfaces and gateways that handle data exchange may ease software deployment and management. However, customers' business operating or deployment environments may require localized requirements, thus deploying standard builds may not be easy or feasible in some cases.

Solution

Figure 73:
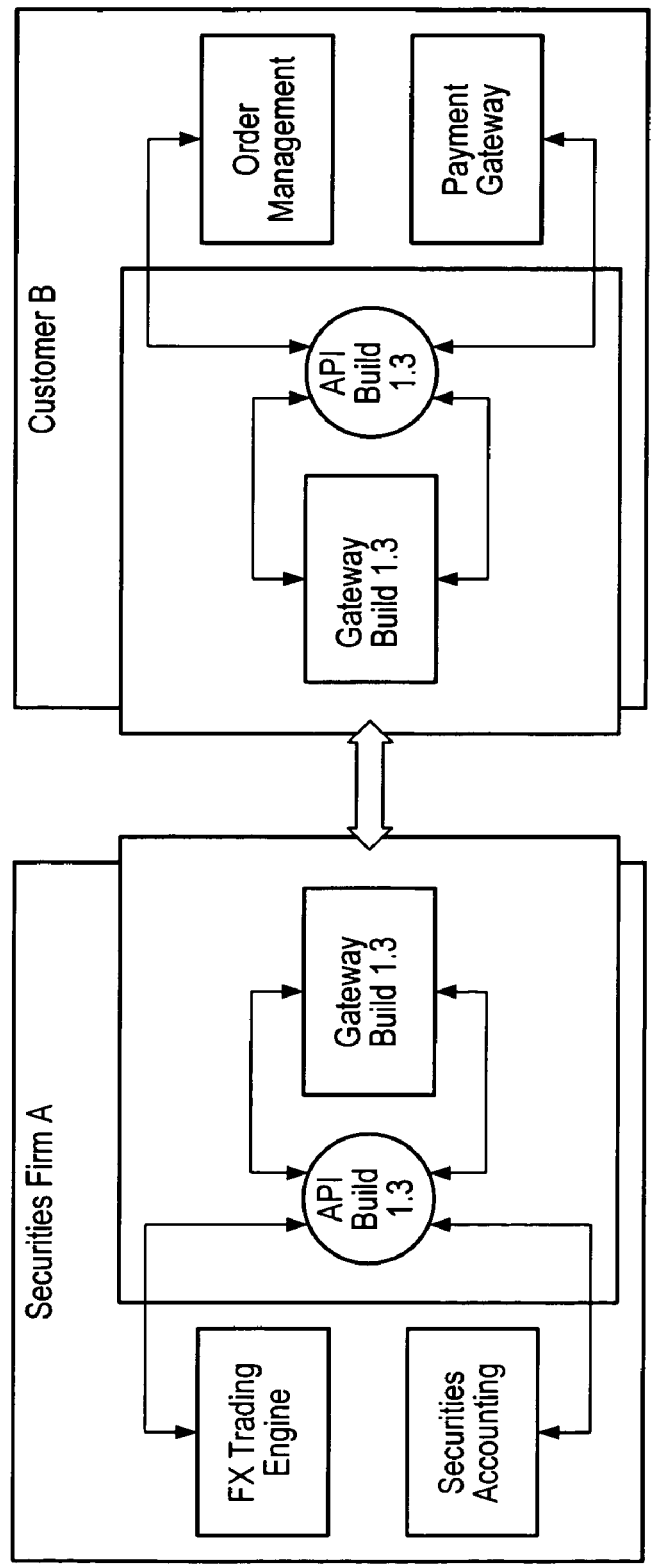
FIG. 73 illustrates an exemplary application of a Standard Build Design Pattern according to one embodiment.

FIG. 73 illustrates an exemplary application of the Standard Build Design Pattern according to one embodiment. FIG. 73 presents a scenario where both trading partners have agreed on a common interface with a standard API library build version 1.3. Securities Firm A has managed the deployment of a Standard Build Gateway product that can handle the data exchange using the standard API library build version 1.3. In this sample scenario, Customer B uses the APIs provided by the Standard Build Gateway, say version 1.3, to extract business data and transform the data in a standard message format. Then the Standard Build Gateway may exchange with the trading partner, who is also using the same Standard Build software with the same message format.

The Standard Build Gateway may be built in any arbitrary programming language and platform. Each of the back-end systems makes use of the common API library to extract data and send it to the Standard Build Gateway.

Figure 74:
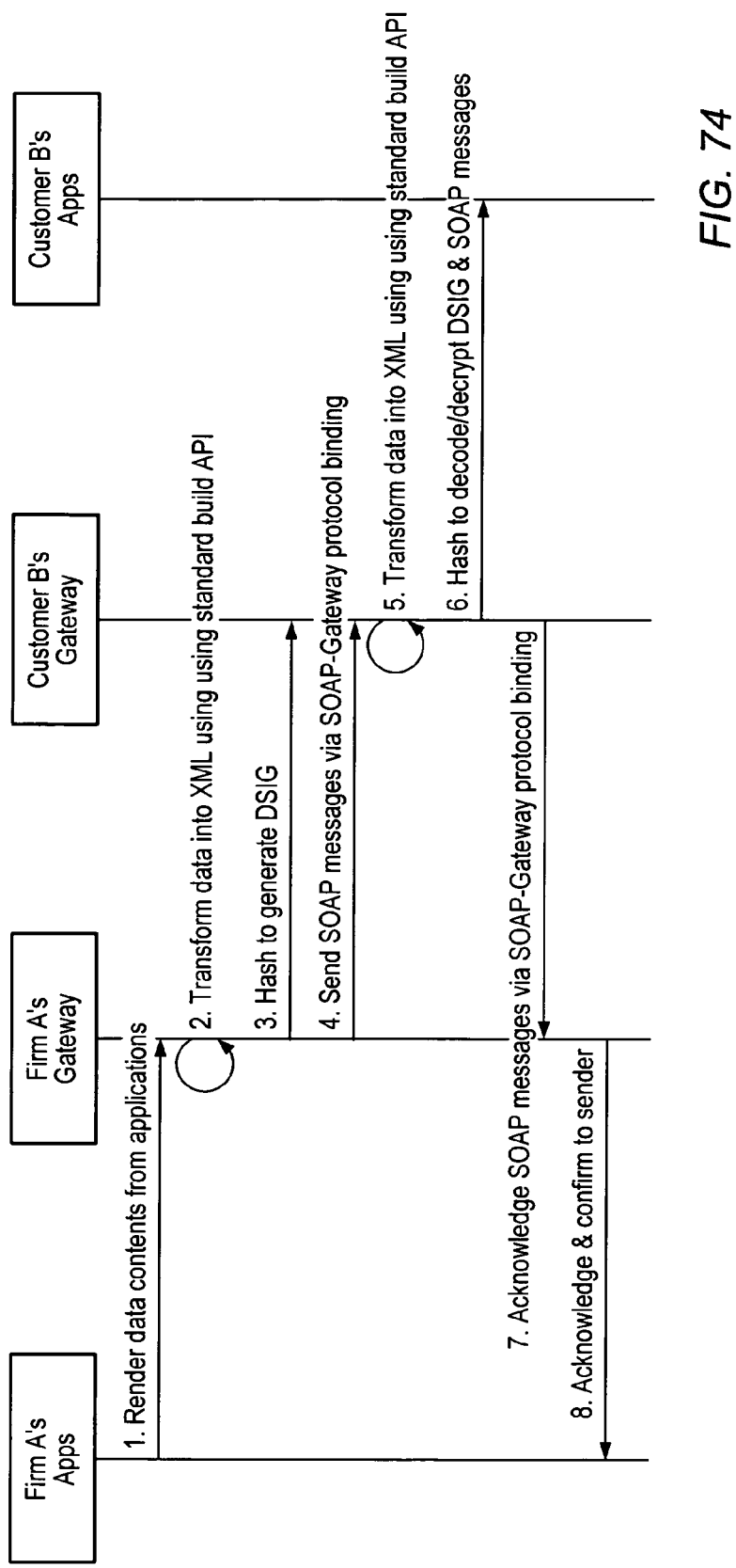
FIG. 74 illustrates a Standard Build Pattern Sequence Diagram according to one embodiment.

FIG. 74 illustrates a Standard Build Pattern Sequence Diagram according to one embodiment, and elaborates the details of the previous process of the standard build using Web Services. Firm A extracts and renders the data contents from the back-end applications. The Message Broker (the data transformation engine) then transforms the data into XML using standard build APIs. It uses a hashing algorithm to generate the digital signature (DSIG), attach it to the SOAP envelope, and send it the SOAP message using a customized SOAP-to-Standard-Build-Gateway protocol binding. Upon receipt of the SOAP message, Customer B's Message Broker (the data transformation engine) may unmarshal the SOAP envelope and retrieve the message content. Customer B's Message Broker may also use the public key pair to decode the message content and transform the XML using standard build APIs into a format that is understandable by the back-end applications.

Once the message processing is done, Customer B's Message Broker may prepare an acknowledgement message (SOAP reply message), encode and sign it with a digital signature, and return it to Firm A's Message Broker. Upon receipt of the acknowledgement message, Firm A's Message Broker may notify the back-end application that a message reply has been received.

The Standard Build Gateway may be a customized version of a communications gateway or a SOAP server with a customized set of APIs for data transformation, authentication, or exception handling. It may not be necessary to build a proprietary implementation from scratch. The customized SOAP-to-Standard-Build-Gateway protocol binding refers to the binding of SOAP messages to the underlying data transport of the Standard Build Gateway. If the Standard Build Gateway uses a JMS server, the SOAP-to-Standard-Build-Gateway protocol binding may denote SOAP messaging over JMS data transport. If the Standard Build Gateway uses a proprietary data transport implementation, then developers preferably write their own data transport provider classes for the SOAP server to perform the SOAP-to-Standard-Build-Gateway protocol binding.

This Web Services integration pattern provides a standard build approach to address heterogeneous platform deployment issues. It may be useful, for example, for a business scenario where the trading partners and their underlying applications are tightly coupled.

This Standard Build Integration pattern may be suitable, for example for trading partners who desire to standardize message formats and interface programs on the same platform. The Standard Build Gateway may also be deployed in a large number of sites. This preferably allows tight integration between the trading partners and their underlying applications.

With an EAI implementation, architects and developers may develop proprietary APIs and the Standard Build Gateway using the underlying EAI infrastructure. With a Web Services implementation, they may expose the common library as Web Services calls for the back-end systems to invoke. Similar to the Application-to-Application pattern, the Standard Build pattern may use JAXP to transform data from the back-end systems and may use JAXM to exchange fpML messages between the trading partners.

Risk

Although Standard Build deployment may standardize data format and interfaces, it may also require versioning management. The versioning of Web Services may be implemented, for example, by adding a version attribute in the XML message header and registering different software versions as different service bindings under the same business service in the Service Registry.

EAI Design Patterns may provide some best practices that may be reusable for integrating with multiple systems within an enterprise. Variants of EAI Patterns may include, but are not limited to: Hub-Spoke Replication Pattern, Federated Replication Pattern, and Multi-Step Application Integration Pattern. These patterns may have similarities in their approaches to resolving application integration issues. Using these patterns, a solution may be implemented using a message-oriented middleware product.

Hub-Spoke Replication Design Pattern

Context

Figure 75:
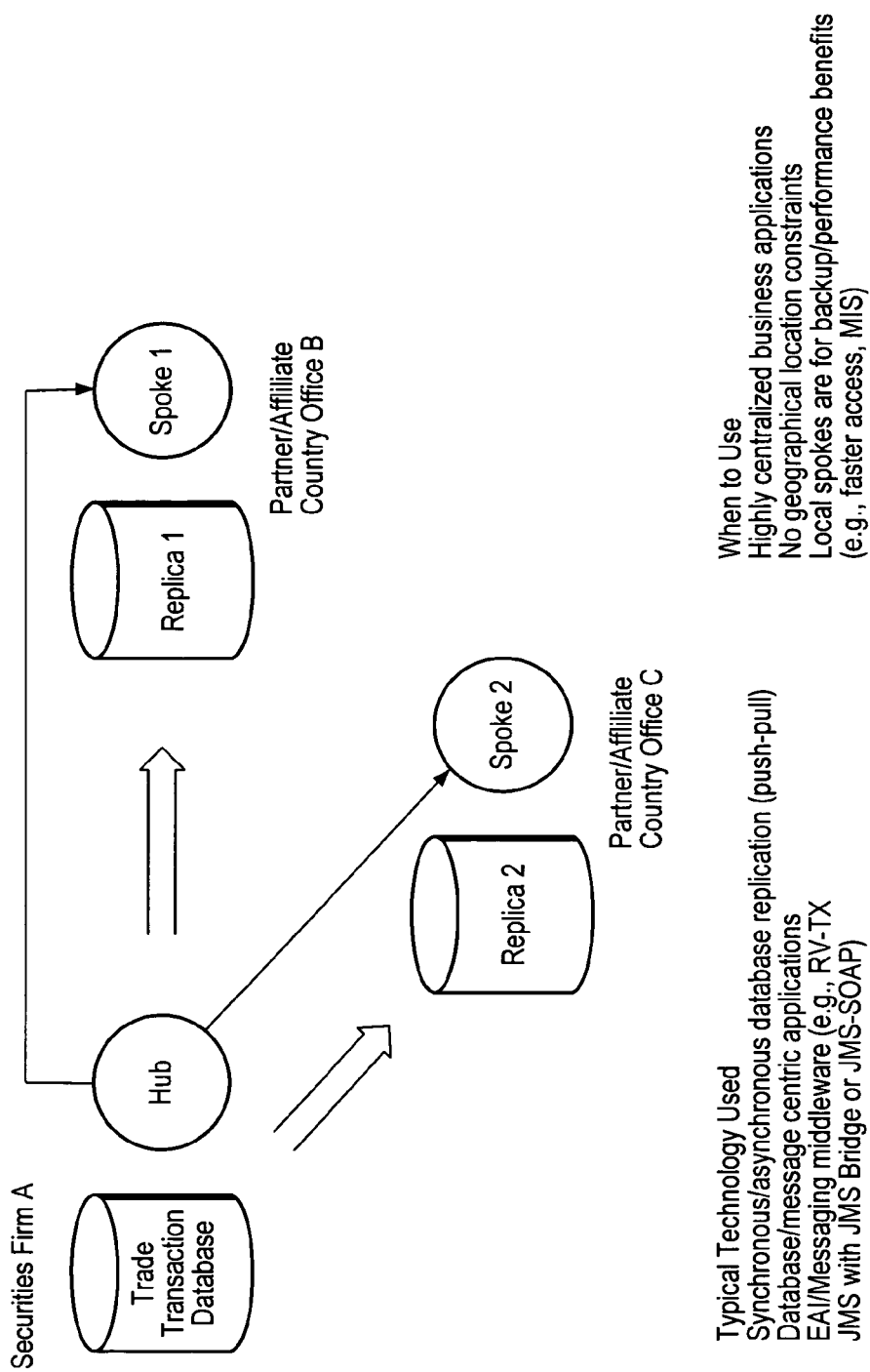
FIG. 75 illustrates an exemplary business scenario where common reference data and business transactions are replicated using a Hub-Spoke Replication Pattern according to one embodiment.

Large international firms or Application Service Providers may have numerous offices around the world, each running an instance of the back-office systems. Typically, common reference data and business logic residing in these back-office systems need timely replication. The head office typically has all the customer and trade data as the master copy, and the local country offices may act as spokes where the customer and trade data may be replicated. FIG. 75 illustrates an exemplary business scenario where common reference data and business transactions are replicated using a Hub-Spoke Replication Pattern according to one embodiment.

Architects and developers may replicate business transactions to a remote trading partner or an affiliate's Web site (usually, but not necessarily asynchronous). This assumes that the Service Provider hosts the business transactions centrally on behalf of its trading partners, affiliates, or remote country office, as in an Application Service Provider scenario. The replicated data is for local retrieval or convenience purposes.

Problem

Architects and developers may need to extend the Business-to-Business integration to a larger number of trading partners and/or remote country offices. Different trading partners and/or remote country offices may run different systems on heterogeneous platforms. The Web Services deployment is preferably highly available to different users and preferably caters to the heterogeneous connectivity between the systems.

Force

Large-scale deployment of Web Services to a number of different trading partners (or remote country offices) may require a scalable Hub-Spoke Replication model. If all the customer and trade data reside in a relational database, then a database replication technology may be used to replicate and synchronize all hub-spoke instances. However, if the customer and trade data reside in different systems and none of them is sharing the same underlying storage platform, then Web Services technology may be a solution to replicate and synchronize them from the hub to all the spoke instances.

Solution

In the exemplary scenario illustrated in FIG. 75, Firm A receives a business transaction. It processes the transaction and stores it centrally in the master repository. It then publishes the transaction in messages to the remote spokes.

Figure 76:
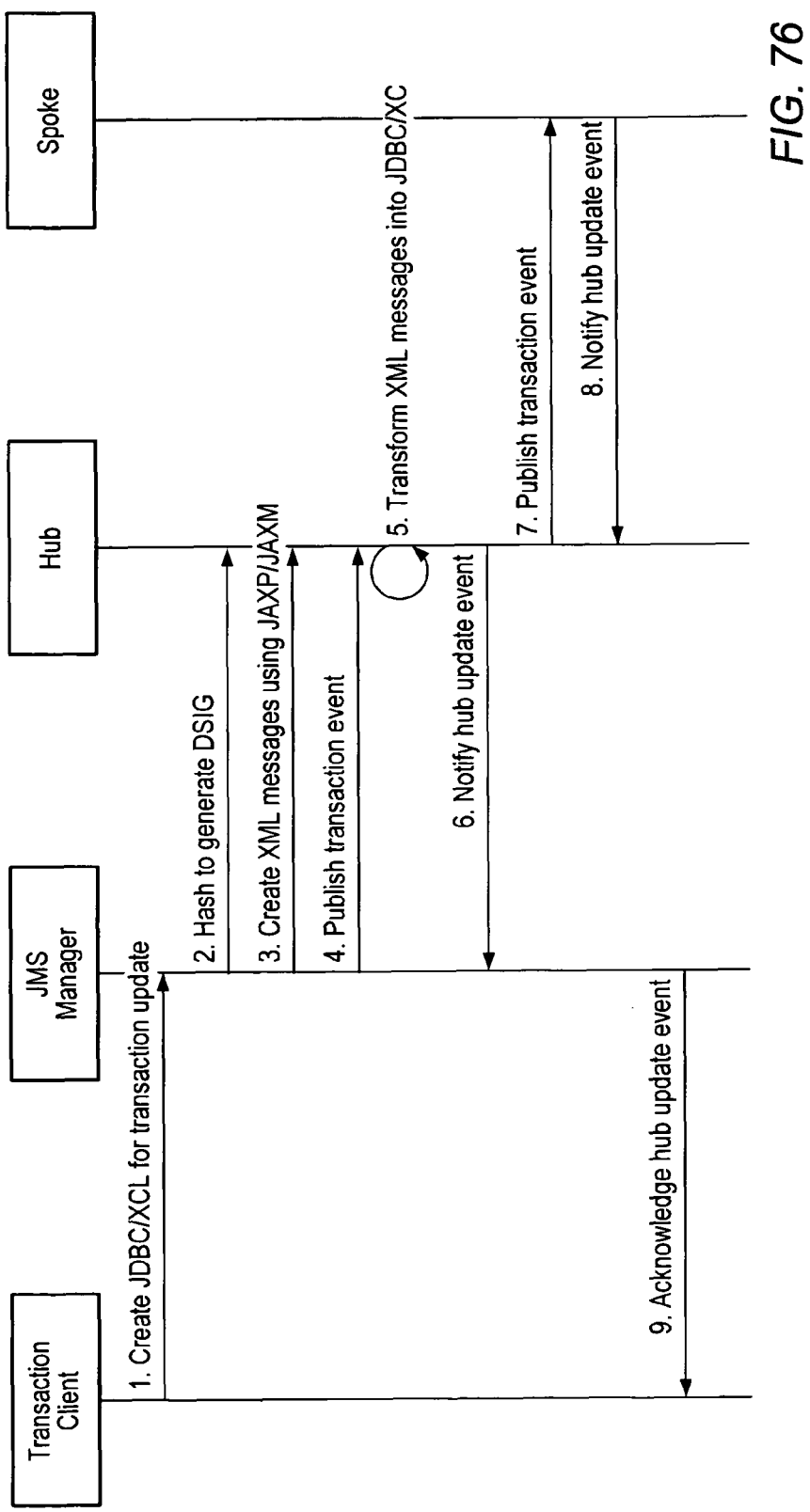
FIG. 76 is an exemplary Hub-Spoke Replication Pattern Sequence Diagram according to one embodiment.

FIG. 76 is an exemplary Hub-Spoke Replication Pattern Sequence Diagram according to one embodiment, and elaborates on the details of using Web Services to replicate the business and trade data from the hub to the spokes. A SOAP client (also acting as the transaction client) may desire to update certain customer and account data to the hub. In this example, it is assumed that the SOAP client sends a SOAP service request with XQL calls to the hub and the hub replicates the business data with the spokes using SOAP messaging. The SOAP client sends a service request to update some account information to the hub using an XQL (or JDBC) call wrapped in a SOAP message. The SOAP client establishes a messaging connection with the JMS queue manager and writes the business data to the predefined queues. The SOAP client may also use a hashing algorithm to generate a digital signature (DSIG) with a pair of public and private keys and wraps the business data contents in a SOAP envelope using JAXM and/or JAXP. The business data (business transactions in SOAP messages) are then published to the hub using SOAP messaging over JMS. The publishing event may be logged for tracking purposes.

Upon receipt of the business data in SOAP messages, the hub unmarshals the SOAP envelope and extracts the data contents. The hub may verify the digital signature for authenticity of the sender's credentials using the public key. The hub may also notify the JMS queue manager that the hub is ready to update the business transaction. The hub transforms the data contents into its local repository or database. Now the customer and account data are updated in the hub, and the hub can start replicating the contents to the spokes.

The hub starts publishing the business data to the associated spokes. If the hub-spoke connectivity is done via a relational database, then the hub may initiate a database replication process. If the hub-spoke connectivity is done via an LDAP Directory Server, then the hub may initiate LDAP-based replication based on the current LDAP configuration settings. If the hub-spoke connectivity is heterogeneous (the spokes do not operate on the same platform), then the hub may send a SOAP message to all spokes that includes the new business data. Each spoke may then update its back-end database with the new business data. Upon completion, the spokes may return an acknowledgement SOAP message to the hub. The hub may also optionally send an alert notifying the SOAP client that the hub-spoke replication is completed.

This Web Services integration pattern may provide a flexible replication solution to synchronize the hub and the spokes. This pattern may address the complexity of hub-spoke connectivity and the underlying platform interoperability. This pattern may be useful, for example, for central management of resources and business information.

The Hub-Spoke Replication Pattern may be suitable, for example for highly centralized business applications under no geographical location constraints. The local spokes may be set up for backup, faster access, or MIS for better performance.

With an EAI implementation, architects and developers may use a multicast publish-subscribe model to simultaneously publish the transactions for all remote spokes to persist locally. Alternatively, they may use a database replication approach where remote spokes can pull from the centralized hub. With a Web Services implementation, architects and developers may use SOAP-JMS binding (for example, client initiating a SOAP message that contains the transaction, which is bound to a JMS client to publish or subscribe for the remote spokes or the ebXML Web Services technology (for example, Business Process Management).

Risk

The Hub-Spoke Replication Pattern may not easily accommodate differences or variants in localized requirements.

Federated Replication Design Pattern

Context

Figure 77:
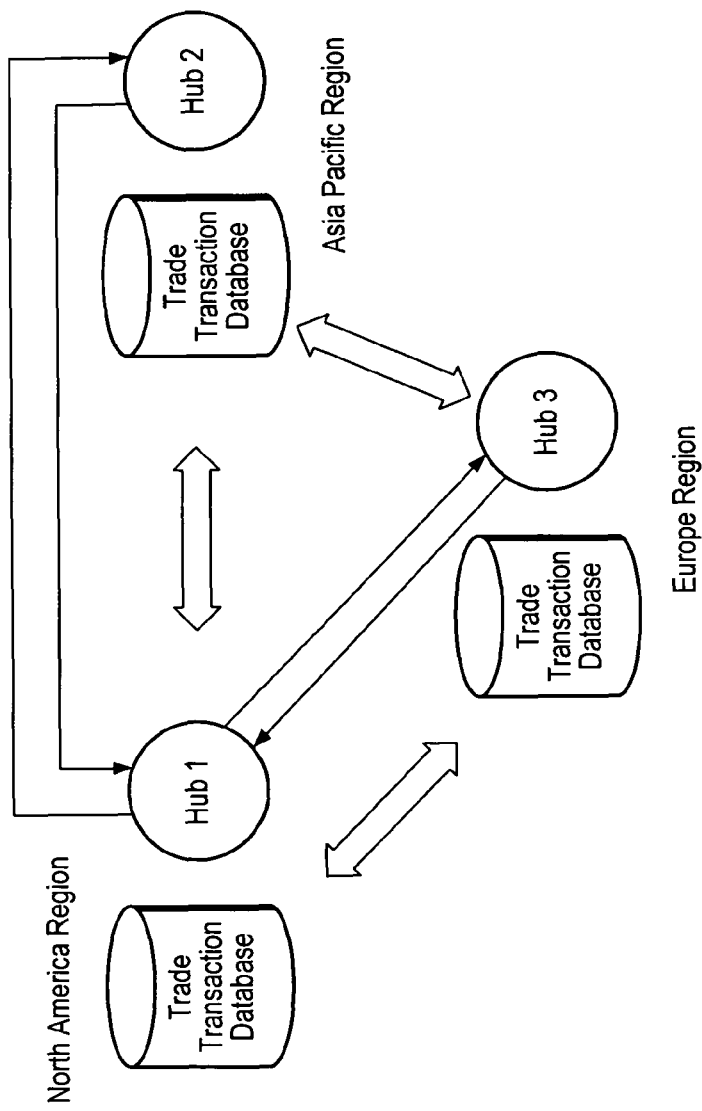
FIG. 77 illustrates an exemplary business scenario where shared customer and trade data are synchronized using a Federated Replication Pattern according to one embodiment.

Large international firms or Application Service Providers may have numerous country offices around the world, with each of them running similar back-end systems on different platforms. Typically, shared customer and account information in these back-office systems need to be synchronized in a timely manner to support CRM and cross-border trading. FIG. 77 illustrates an exemplary business scenario where shared customer and trade data are synchronized using a Federated Replication Pattern according to one embodiment.

Architects and developers may replicate business transactions to peer hubs (usually asynchronous) hosted by the trading partner or affiliate's Web site. This assumes that the Service Providers and the trading partners are both hosting the business transactions.

Problem

Local market requirements may not be easily accommodated by a highly centralized deployment strategy. Local offices and trading partners may have different requirements that need flexibility.

Force

Time to market and the need to meet local requirements are examples of business drivers for the Federated Replication Pattern.

Solution

FIG. 77 illustrates an exemplary scenario where there are distributed hubs in different countries. The customer and account data are preferably synchronized across the hubs. In this sample scenario, Firm A receives a business transaction. It processes the transaction and stores it centrally in its local repository. Then it publishes the transaction in messages to the peer hub for synchronization or backup.

Figure 78:
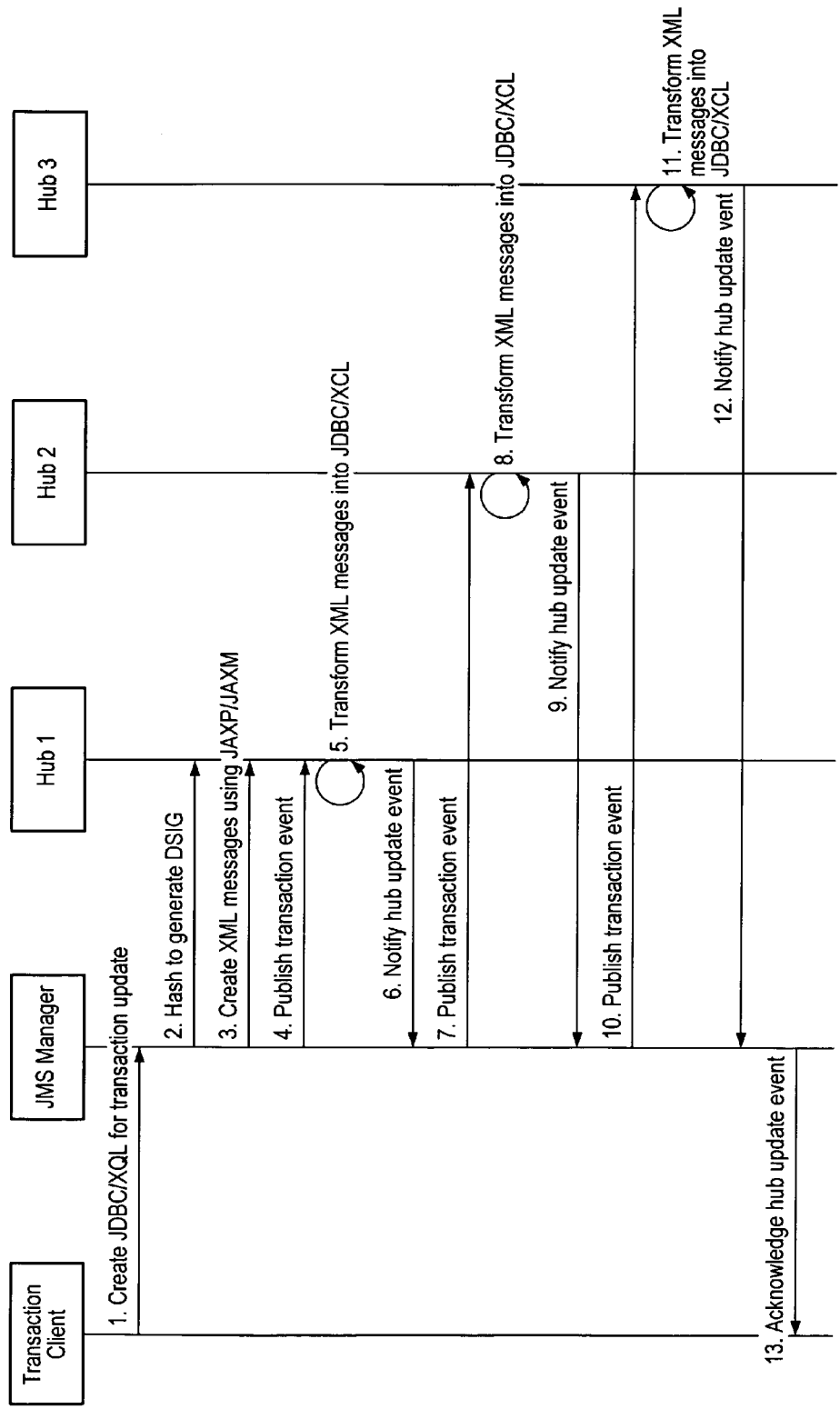
FIG. 78 is an exemplary Federated Replication Pattern Sequence Diagram according to one embodiment.

FIG. 78 is an exemplary Federated Replication Pattern Sequence Diagram according to one embodiment, and elaborates on the process with more details using Web Services to replicate the business and trade data between the hubs. The assumptions are similar to those of the exemplary scenario depicted in FIG. 76, except that in this example the JMS queue manager may publish the business data to each hub in order to synchronize all hubs. A SOAP client (also acting as the transaction client) may desire to update certain customer and account data to the federated hubs. In this example, it is assumed that the SOAP client sends a SOAP service request with XQL calls to each hub via the JMS queue manager and that the hub synchronizes the business data using SOAP messaging over JMS.

The SOAP client sends a service request to update some account information to the first hub using an XQL or JDBC call wrapped in a SOAP message. The SOAP client establishes a messaging connection with the JMS queue manager and writes the business data to the predefined queues. The SOAP client also uses a hashing algorithm to generate a digital signature (DSIG) with a pair of public and private keys and wraps the business data contents in a SOAP envelope using JAXM and/or JAXP. The business data (business transactions in SOAP messages) are then published to the hub using SOAP messaging over JMS. The publishing event may be logged for tracking purposes.

Upon receipt of the business data in SOAP messages, the first hub unmarshals the SOAP envelope and extracts the data contents. The first hub preferably validates the digital signature for authenticity of the sender's credentials, using the public key. The first hub may also notify the JMS queue manager that the first hub is now updated. The first hub may then transform the data contents into its local repository or database.

The customer and account data are updated in the first hub, and the JMS queue manager can start publishing the business data to the other hubs. Each hub may perform similar hub processing. Upon completion of updating the business data content in the local hub, each hub may notify the JMS queue manager. When all hubs are synchronized, the SOAP client (the transaction client, or the client that initiates the transaction) may be notified.

This Web Services integration pattern preferably provides a flexible replication solution to synchronize the federated hubs. This pattern preferably addresses the complexity of synchronizing different systems where customer and account data are updated in different times locally. This pattern may be useful, for example, for decentralized management of resources and business information, where a centralized hub may not be viable for various business reasons.

A Federated Replication Pattern may be suitable, for example, for highly distributed business applications. There may be geographical constraints for the distributed applications, and architects may prefer to partition different hubs for different transaction types. The federated hubs may have autonomy of their own data. However, the originating hub owns the transaction while the other hubs are replicated with a copy.

With an EAI implementation, architects and developers may use a multicast publish-subscribe model to simultaneously publish the transactions for all hubs to persist locally. Alternatively, they may use a database replication approach where remote hubs can pull from the originating hub. With a Web Services implementation, architects and developers may use SOAP-JMS binding (for example, a client initiates a SOAP message that contains the transaction, which is bound to a JMS client to publish or subscribe for the remote hubs) or ebXML Web Services technology (for example, Business Process Management).

Risk

A highly federated operating environment may result in many variants and software versions. This may make manageability of Web Services applications challenging. Versioning of Web Services may be useful, for example, in a federated operating environment.

Multi-Step Application Integration Design Pattern

Context

For complicated application processing (such as trade financing or order fulfillment with logistics management), there may be multiple steps or processes to be done in order to complete a business transaction. Each process may be performed by one application. These applications may also be sharing common business data and processing partial content at different stages of the life cycle. There may be dependencies between each application, so an Integration Manager may be useful to manage these processes and enable some common processes and customer data that may be reusable by these processes. Web Services technology may be used as the lynchpin to bind these processes together and share common customer data.

Figure 79:
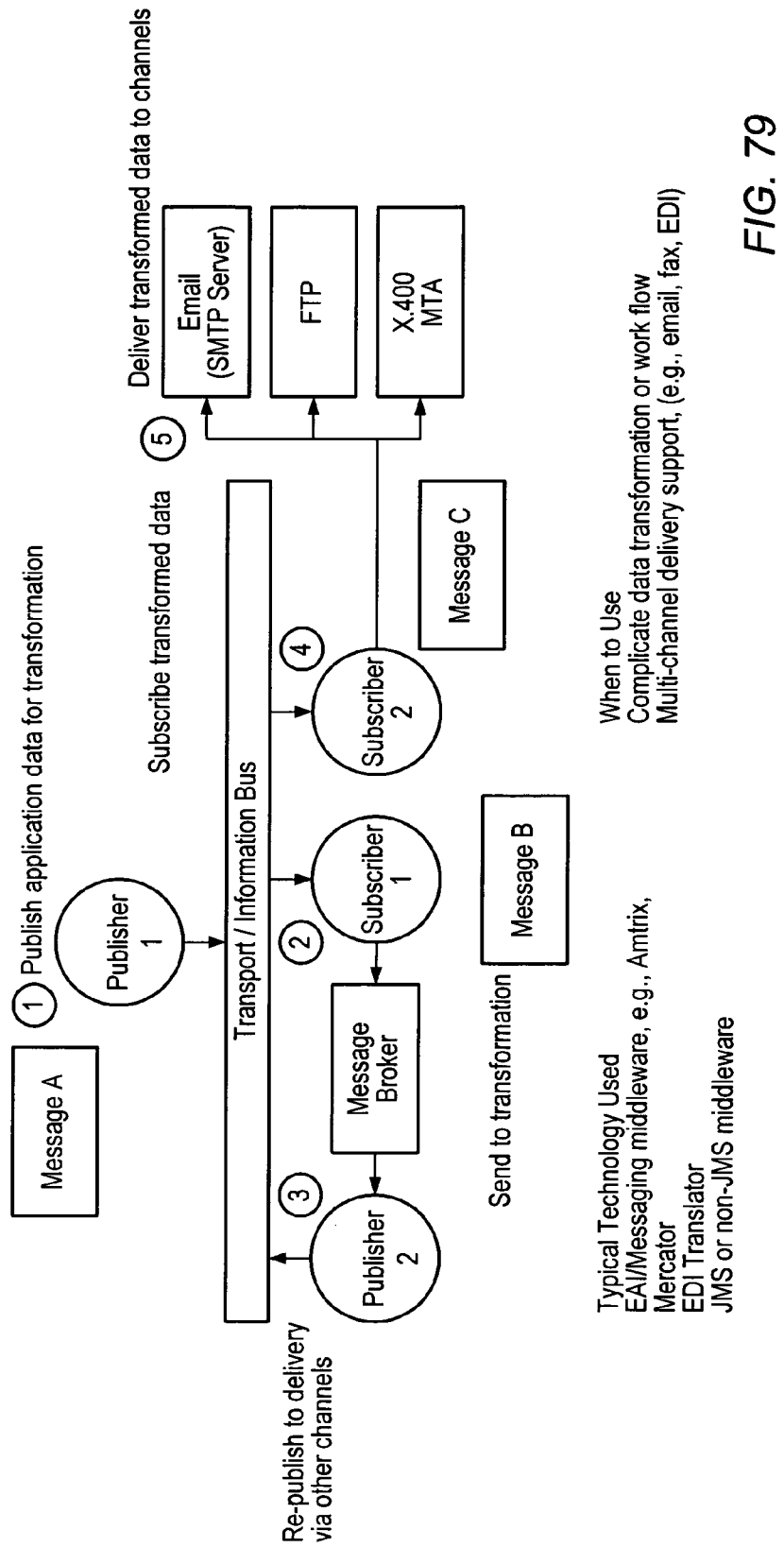
FIG. 79 illustrates a Multi-Step Application Integration Pattern according to one embodiment.

FIG. 79 illustrates a Multi-Step Application Integration Pattern according to one embodiment, and presents an example of a trade-financing scenario where there are multiple steps to process a Purchase Order and a Letter of Credit. In step 1, Publisher 1 begins to publish a Purchase Order document (Message A) to the Information Bus (the messaging infrastructure). Subscriber 1 subscribes the trade data and sends to the Message Broker (step 2) to transform the content into a format (Message B) that can be understandable by the target recipient (for example, the seller who supplies the merchandise to the buyer). In step 3, Publisher 2 is responsible for sending the business document to the target recipient via the appropriate delivery channel. Subscriber 2 subscribes to the newly transformed data in Message C (in step 4). The process in step 5 renders and transforms the business data into the email delivery channel.

Architects and developers may implement a Multi-Step Application Integration scenario (usually asynchronous) where there are dependencies between processes, and applications may be distributed in different locations.

Problem

Web Services applications may have dependencies, which are complex transaction workflows, and may have multi-step routing rules for message processing. Similar processes (such as data transformation) may need to be abstracted and made sharable to reduce duplicating efforts.

Force

There may be complex processing rules or routing rules for different types of XML messages. Some of the similar processing rules may be refactored. Web Services technology may be used to expose the common processing rules so that different applications can apply during the life cycle of the business transaction.

The Multi-Step Application Integration pattern may be useful, for example, for complicated data transformation or workflow and for multichannel delivery support, which may require a chain of Web Services to be invoked.

Solution

Figure 80:
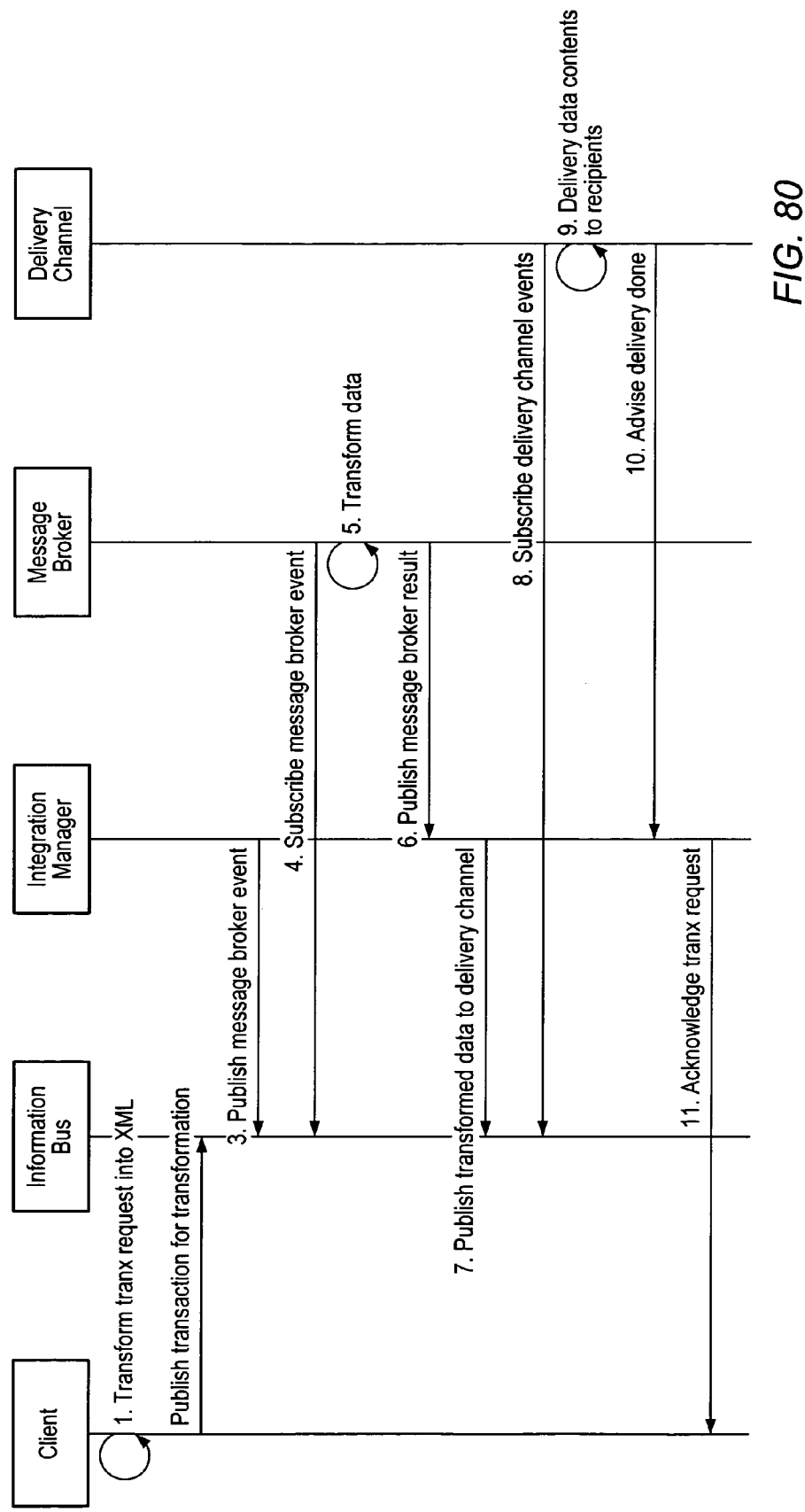
FIG. 80 illustrates an exemplary Multi-Step Application Integration Pattern Sequence Diagram according to one embodiment.

FIG. 80 illustrates an exemplary Multi-Step Application Integration Pattern Sequence Diagram according to one embodiment, and elaborates on the details of the processes to manage Multi-Step Application Integration using Web Services. In this example, the seller has delivered the goods to the buyer and is ready to collect money from the sale with a Letter of Credit collection letter. A SOAP client (the seller) initiates a service request to apply for a Letter of Credit collection and invokes a trade finance collection Web Service that triggers a chain of business services. The trade finance collection Web Service may transform the collection letter into a financial EDI message and send to the remitting bank (the seller's bank) about the receipt of a collection letter. This may allow the remitting bank to validate the relevant trade and shipping documents, confirm release of the Letter of Credit documents, and may enable the applicant (the seller) to collect the money via remittance.

In this example, the SOAP client submits a transaction message (for example, a Letter of Credit collection letter document) to the Service Provider. The transaction request may be transformed into XML and the transaction request may be published to the Integration Manager. The Integration Manager manages multiple processes needed to handle the entire business transaction (in this case, processing the Letter of Credit collection). The Integration Manager may then publish a service request to the Message Broker via the information bus to transform the business data (Letter of Credit collection letter document) into an email format that can be sent to the trading partner (in this case, the corresponding bank that handles the Letter of Credit collection letter).

The Message Broker is a business application that transforms business documents from one format to another. The Message Broker subscribes to any data transformation service request from the Information Bus. If there is a data transformation service request event from the Information Bus, the Information Bus may extract the business document and transform it into the format requested. Upon successful data transformation, the Message Broker may publish the transformed business document to the Integration Manager, who may relay it to the target delivery channel (in this case, it is an EDI message to notify the corresponding bank about the Letter of Credit collection letter).

The Multi-Step Application Integration Design Pattern preferably eases the workflow management of complicated multi-step processes by using flexible messaging and data transformation. This Web Services integration pattern may reuse existing similar processes and turn them into Web Service components. This Web Services integration pattern may be useful, for example, for complicated data transformation and for multichannel delivery support. The Multi-step Application Integration pattern may be suitable, for example, for complicated data transformation with simple workflow requirements. There may be requirements for multichannel support to render the data contents to different formats simultaneously.

With an EAI implementation, architects and developers may build custom adapters for the Message Broker component to subscribe to data transformation job orders and publish the transformed data contents back to the Information Bus. Adapters for each of the different delivery channel components may be needed to subscribe to the transformed data contents. These delivery channel components may include one or more of, but are not limited to: SMS gateways, WAP gateways, and EDI mailboxes. With a Web Services implementation, architects and developers may use SOAP-JMS integration similar to the previous EAI Integration design patterns.

Data Exchange Design Pattern

Context

Regional or international customers who open up their application platform to exchange trade data with other trading partners may require flexibility and scalability in handling multiple data formats and in interoperating with heterogeneous interface requirements from the trading partners. They also may have to cater to high volumes of business transactions. This may be especially complex and challenging if the customers want to provide white labeling services (i.e. act as an Application Service Provider for other customers), where they need to have a standards-based data exchange standard and an agile data connectivity or exchange gateway.

FIG. 81 illustrates a Data Exchange Design Pattern according to one embodiment, and shows an exemplary scenario where Securities Firm A has deployed a variety of order management systems (such as TIBMercury for Foreign Exchange trading) and a settlement system (such as SunGard STN). Customer B is a corporate customer of Firm A. Customer B places a Foreign Exchange trade order with Firm A. Firm A executes the trade order on behalf of Customer B. Upon successful execution, Customer B pays and settles with Firm A. At the end of the day, Firm A may send an electronic file to reflect the daily trading activities, so that it can update its back-end account system (SAP/FT module).

These may be a series of data exchange activities between the two trading partners. Each data exchange requires a different data format. It may be preferable to use a common Exchange Gateway to handle all required data formats and various connectivity requirements. One way to achieve the goal of interoperability is to encapsulate the business data in XML and wrap them in SOAP messages. In other words, architects and developers may preferably normalize all data from the back-end applications to XML and exchange the business transaction with the trading partner in XML (either synchronous or asynchronous).

Problem

Different trading partners and back-end systems may require specific data format and database connectivity. The more trading partners a customer has, the more complex the data format and the connectivity tend to be. Thus, it may be preferable to simplify the development and management of the data format and connectivity between the trading partners. A high volume of transactions using asynchronous Web Services may need to be handled during peak hours. Thus, the scalability and throughput of the data exchange may be a challenge.

Force

The Data Exchange Integration design pattern may be desirable for loosely coupled processes where multiple systems may need to be integrated. This pattern may be applicable, for example, where there are a large number of trading partners, and where system interfaces and service components can be reusable.

XML data format provides a flexible data format where proprietary data formats can be converted. Together with an XML parser, many systems may extract and transform their proprietary data into XML, which can facilitate data exchange with other trading partners. Scalability and reliability of SOAP messaging using asynchronous Web Services may be critical to the service level.

Solution

Figure 82:
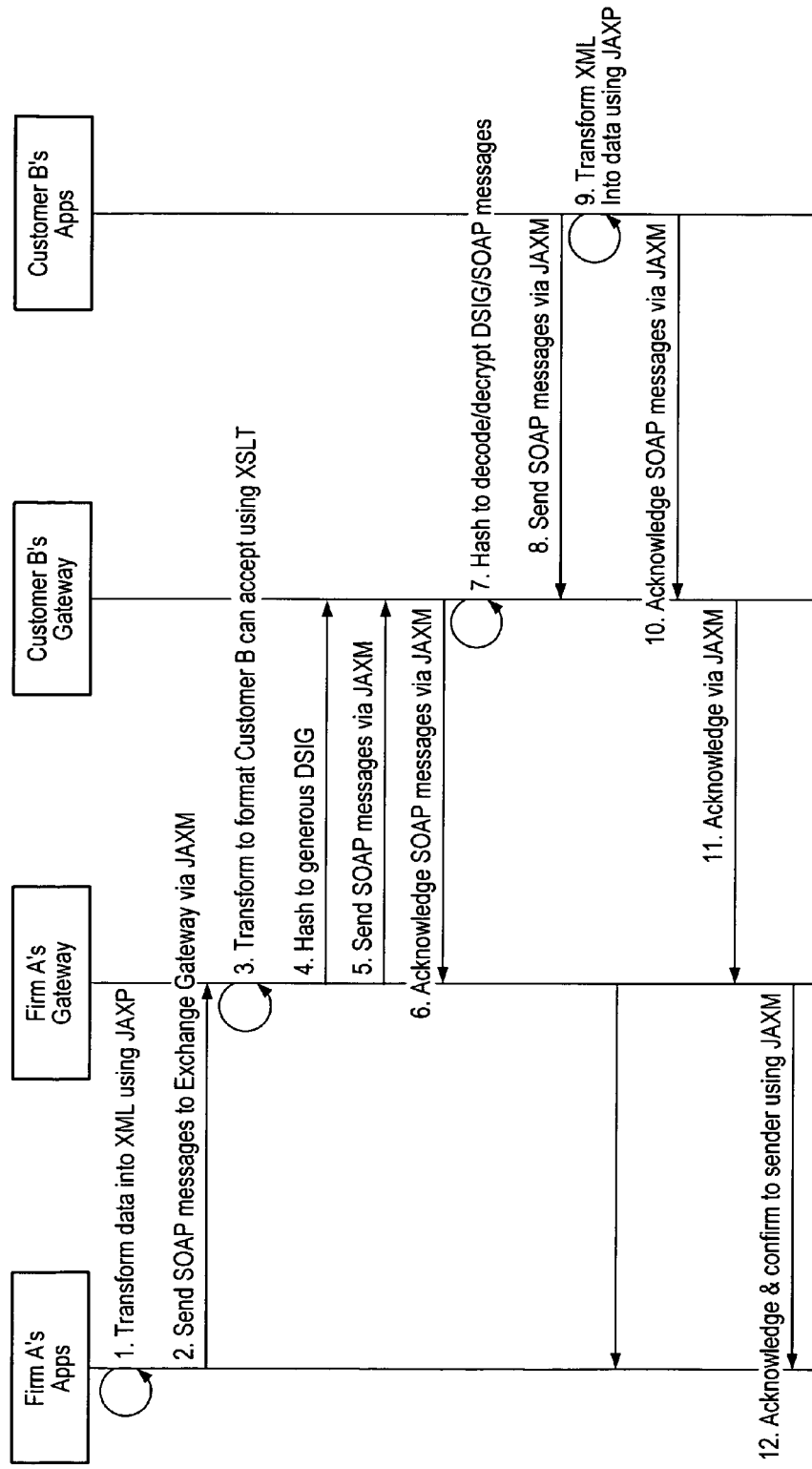
FIG. 82 illustrates an exemplary Data Exchange Design Pattern Sequence Diagram according to one embodiment.

FIG. 82 illustrates an exemplary Data Exchange Design Pattern Sequence Diagram according to one embodiment, and elaborates on the details of business processes to support the Data Exchange pattern using Web Services. In this exemplary scenario, Customer B extracts and normalizes business transactions (for example, an FX trade order) in XML, transforms the business transactions into XML using JAXP, wraps the data content with a SOAP envelope, and then sends the data content in SOAP messages to Firm A's Exchange Gateway. Firm A's Exchange Gateway handles the network connectivity and the message exchange functions. It transforms the data content, using JAXP and XSLT, to a format that Customer B's applications can understand. Upon successful data transformation, Firm A's gateway may use a hashing algorithm to generate a digital signature (DSIG), attach it to the SOAP envelope, and send the data content in SOAP messages to Customer B's gateway using JAXM. When Customer B's gateway receives the SOAP messages, it may return with an acknowledgement.

Customer B's gateway may verify the digital signature with a public key and use a hashing algorithm to decode the data content. Upon successful verification, it may send the data content to the back-end applications in SOAP messages using JAXM. Customer B's back-end applications may perform any necessary data transformation using JAXP. Then it may return acknowledgement to Customer B's gateway, which may also return acknowledgement to Firm A's gateway and Firm A's applications.

This Web Services integration design pattern preferably allows a flexible data transformation and connectivity for a large number of trading partners who operate on heterogeneous applications and platforms. This Data Exchange design pattern may be suitable, for example, for loosely coupled systems where there are large numbers of trading partners, and multiple applications need to be integrated simultaneously.

With an EAI implementation, architects and developers may build custom adapters for each of the back-end applications to handle message transformation. As the trading partners may be using different network connectivity, architects and developers may wish to use different Exchange Gateways that handle different network connectivity, such as SMTP, EDI, or proprietary network connectivity (as in existing stock exchanges). With a Web Services implementation, the XML data transformation may be implemented by JAXP and XSLT, and the Exchange Gateway is implemented using SOAP messaging and/or SOAP-JMS integration.

Equities stock trading applications and stock exchanges are candidates for implementing this Data Exchange pattern. With the increasing interest in achieving Straight-through Processing in the capital market, many brokerage firms may desire to adopt a standards-based data exchange mechanism, such as using XML to exchange trade order and settlement information. ISO 15022 XML is an example of trade data that are represented in XML and exchanged between trading partners using a private network (such as SWIFT) or the Internet. Web Services technology using the Data Exchange Integration design pattern may provide a standards-based data exchanging mechanism and may not require both ends of the trading partners to adopt any proprietary infrastructure.

Process Integration Design Patterns

Process Integration design patterns may include, but are not limited to: a Closed Process Integration design pattern and an Open Process Integration design pattern.

Closed Process Integration Design Pattern

Context

Business-to-Business integration may involve managing business workflow processes between trading partners. Some business processes may not need to depend on another. These are often called closed processes.

Figure 83:
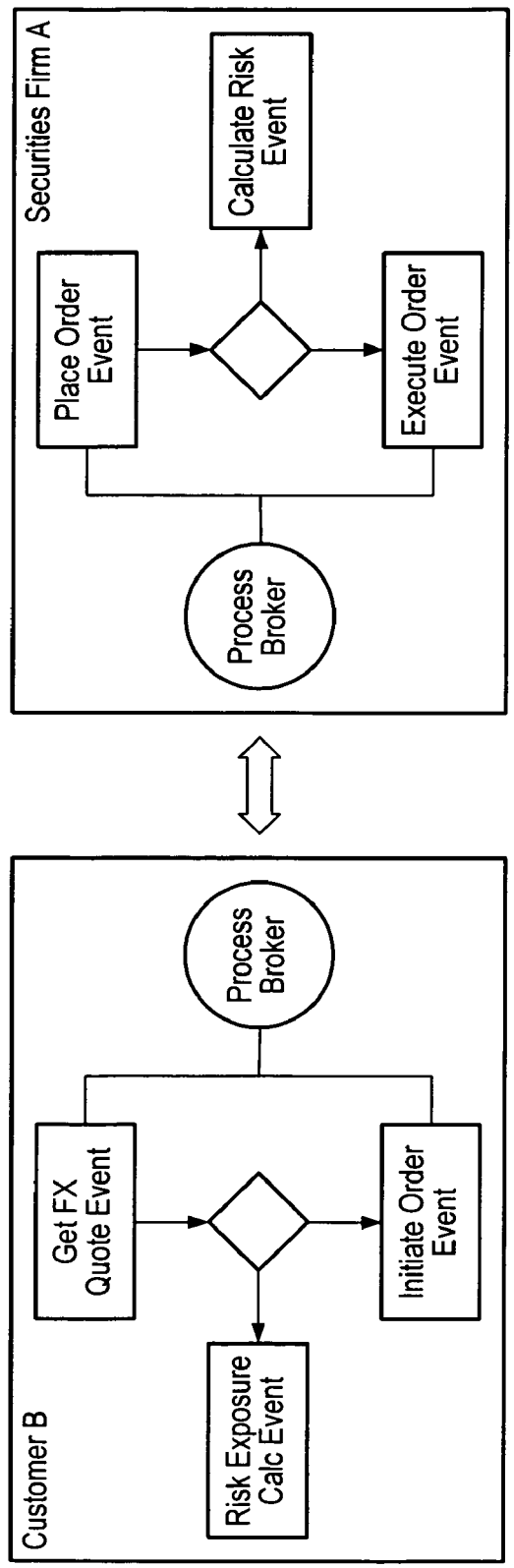
FIG. 83 illustrates an exemplary Closed Process Integration Pattern according to one embodiment.

FIG. 83 illustrates an exemplary Closed Process Integration Pattern according to one embodiment, and depicts a business scenario where each trading partner has a number of workflow processes to process the business transactions, prior to sending or receiving the business documents. Each trading partner may use a local workflow engine (Process Broker) to manage workflow and process integration. In this example, Customer B wants to get a Foreign Exchange rate quote from Securities Firm A. Upon receiving a rate quote from Firm A, Customer B calculates the risk in its portfolio management system and initiates a trade order. Firm A receives the trade order and calculates the risk based on Customer B's credit risk profile. Upon approval of Customer B's risk exposure, Firm A may execute the trade order. There may be no dependency of Customer B's workflow events for Firm A's workflow events.

Business process collaboration may use both SOAP messaging and workflow-enabled processing tools. It may also use reliable messaging between trading partners. ebXML, using JAXM, provides more reliable messaging than SOAP messaging. ebXML may help closed process workflow process because it has message provider classes that may provide message acknowledgement and resend messages later if the recipient is not available online.

Problem

There may be complex workflow events within closed business processes. Simple SOAP messages may not be sufficient to handle workflow processing.

Force

Closed Process Integration refers to workflow processes that may not need to depend on one another. It may be useful, for example, when there is tightly coupled integration between trading partners and there is a need for business service integration. Such Closed Process Integration may also be useful for a small number of trading partners creating some tightly coupled business services.

Solution

In this sample scenario, Customer B requests an FX quote from Firm A. Firm A responds with an FX quote. Upon Customer B's acceptance of the FX quote, Firm A may initiate a series of workflow events for account profile retrieval, risk exposure calculation, and credit checking. There may be no dependency between two different sets of processes of each trading partner. The Process Broker denotes intelligent business processes that can handle different workflow events and actions, as well as network connectivity and messaging with the corresponding Process Broker of the trading partner.

Figure 84:
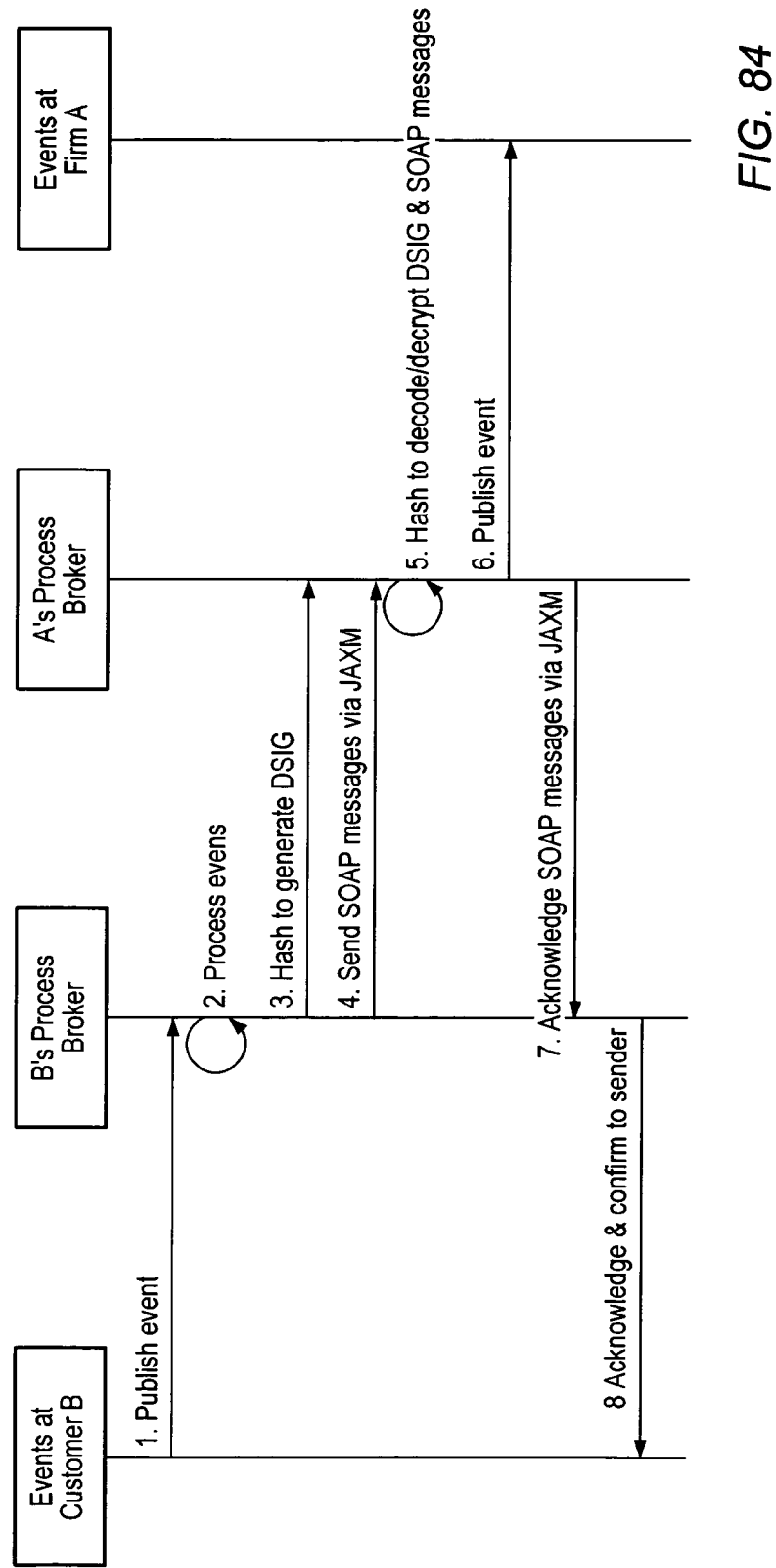
FIG. 84 illustrates an exemplary Closed Process Integration Design Pattern Sequence Diagram according to one embodiment.

FIG. 84 illustrates an exemplary Closed Process Integration Design Pattern Sequence Diagram according to one embodiment, and elaborates the details of the Closed Process Integration design pattern using Web Services. Customer B publishes a workflow event (e.g., getting a Foreign Exchange rate quote) to its Process Broker. The Process Broker begins to process the workflow events and creates a service request using SOAP messaging. The Process Broker may use a hashing algorithm to generate a digital signature, attach the digital signature to the SOAP envelope, and send the SOAP messages to Firm A's Process Broker via JAXM.

Firm A's Process Broker receives the service request. Firm A's Process Broker verifies the digital signature with the public key and decodes the SOAP message using a hashing algorithm. It then publishes the associated workflow events (such as check risk exposure). Upon completing the series of workflow events at Firm A, the Process Broker returns an acknowledgement to Customer B's Process Broker and Customer B respectively.

ebXML messaging using JAXM is a technology option to handle Closed Process Integration between two trading partners. Reliable messaging between trading partners may be important for business transactions containing high financial values. This Web Services pattern may provide reliable messaging for business transactions, so that each trading partner can focus on managing its internal processes.

This Closed Process Integration design pattern may be suitable, for example, for tightly coupled integration with a small number of trading partners and strong business service integration needs.

With an EAI implementation, architects and developers may use customized workflow integration tools and pre-agreed message formats (or APIs) for exchange between the two trading partners. With a Web Services implementation, ebXML Business Process Management tools may be used.

Open Process Integration Design Pattern

Context

Complex B2B integration may require multiple business workflow processes with dependencies. Workflow processes that may depend on one another may be referred to as open processes. An external party, rather than either one of the two trading partners, may handle workflow events (or shared public events), such as a call center or a managed Service Provider. In such a case (see FIG. 85), the business documents that are exchanged between the trading partners preferably reflect some information of the workflow event and the relevant workflow status. This may enable the intermediary (or the Process Broker) to route and process the workflow event accordingly.

Classical messaging approaches, such as EAI and SOAP messaging, may be used for exchanging business documents. However, open process collaboration may require more sophisticated workflow processing and reliable messaging. Business process collaboration may be done by using both SOAP messaging and workflow-enabled processing tools. It may also require reliable messaging between trading partners. ebXML Business Process and BPEL4WS are examples of specifications to support workflow processing.

Problem

There may be complex workflow events within open business processes. Open business processes may brand sophisticated business service offerings as one single service from one Service Provider, instead of silo processes from each of the Service Providers. This may depend on factors including one or more of, but not limited to: reliable messaging to handle business transactions and business process collaboration that handles complicated workflow processes. Simple SOAP messages may not be sufficient to handle workflow processing.

Force

There may be workflow processing rules and sequences for different Web Services applications. Trading partners may have workflow processes that may depend on one another.

Solution

Figure 85:
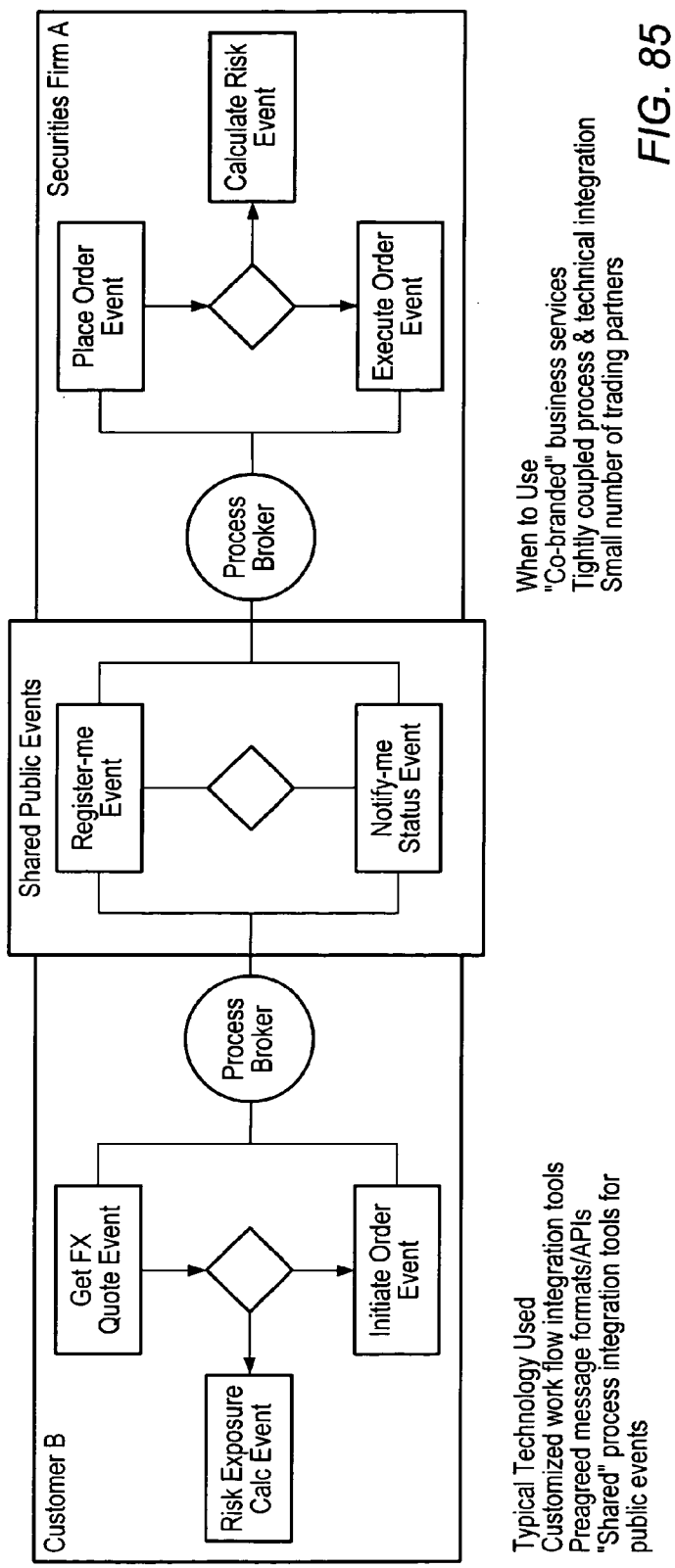
FIG. 85 illustrates an exemplary Open Process Integration Design Pattern according to one embodiment.

The open process scenario may have similarities with the closed process scenario. FIG. 85 illustrates an exemplary Open Process Integration Design Pattern according to one embodiment. In this sample scenario, Customer B registers customer profile with Firm A ("Register-me" event.) Customer B may not be able to initiate any FX transactions without completion of the registration ("Notify-me" status event). The Process Broker denotes an intelligent business process that can handle different workflow events and actions, as well as network connectivity and messaging with the corresponding Process Broker of the trading partner.

Figure 86:
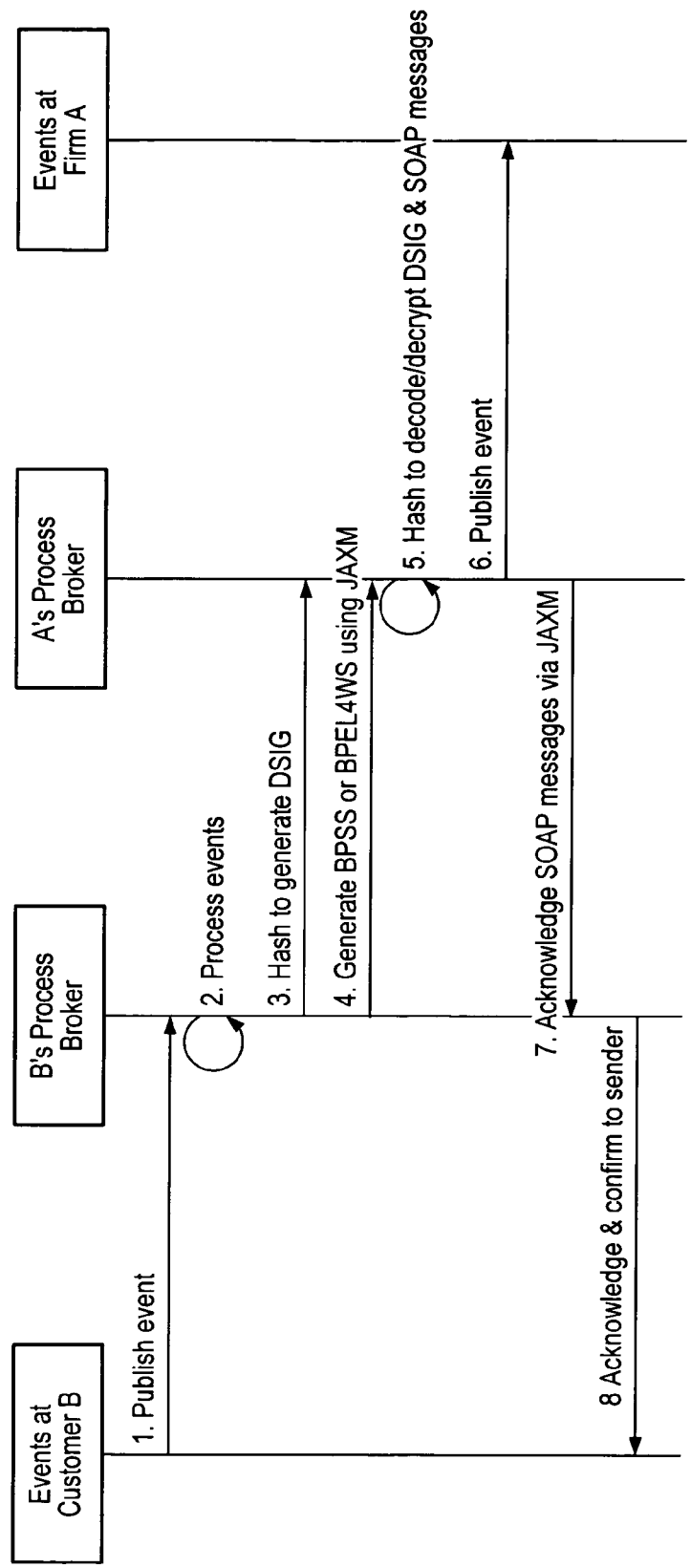
FIG. 86 illustrates an exemplary Open Process Integration Design Pattern Sequence Diagram according to one embodiment.

FIG. 86 illustrates an exemplary Open Process Integration Design Pattern Sequence Diagram according to one embodiment, and elaborates on the details of Open Process Integration design pattern using Web Services. Customer B publishes a workflow event (such as get a Foreign Exchange rate quote) to its Process Broker. The Process Broker begins to process the workflow events and creates a service request using a SOAP message. The Process Broker uses a hashing algorithm to generate a digital signature, attaches to the SOAP envelope, and sends the workflow events using ebXML Business Process (BPSS) or BPEL4WS to Firm A's Process Broker via JAXM.

Firm A's Process Broker receives the service request. Firm A's Process Broker verifies the digital signature with the public key and decodes the SOAP message using a hashing algorithm. Firm A's Process Broker then publishes the associated workflow events (such as check risk exposure). Upon completing the series of workflow events at Firm A, the Process Broker returns an acknowledgement to Customer B's Process Broker and Customer B, respectively.

This Web Services design pattern may support the use of business process collaboration using ebXML BPSS or BPEL4WS. ebXML BPSS or SOAP messaging using JAXM can provide reliable messaging for processing business transactions. These technologies may support business transactions with high financial values using reliable message services and address the issue of implementing complex workflow processes between trading partners.

The Open Process Integration design pattern may be suitable, for example, for tightly coupled processes and technical integration with a small number of trading partners. The business scenario may denote a strongly "co-branded" service where there is some interdependency among the different sets of business processes of each trading partner.

With an EAI implementation, architects and developers may use customized workflow integration tools and pre-agreed message formats or APIs for exchange between the two trading partners. With a Web Services implementation, ebXML Business Process Management tools may be used.

A private labeled online trading service (for example, a brokerage firm offering online trading services using its trading partner's existing online trading service and application infrastructure, but with its own branding) is one example of where the Open Process Integration design pattern may be used. For example, there may be open business processes (such as customer registration and risk exposure checking) that depend on one another, as the private labeled Service Provider (in this example, the brokerage firm) owns the customer account information. The underlying application infrastructure may depend, for example, on the provision of the customer account information from the private labeled Service Provider.

Broker Integration Design Patterns

Broker Integration Design Patterns may include one or more of, but are not limited to: a Service Consolidation-Broker Integration design pattern and a Reverse Auction-Broker Integration design pattern.

Service Consolidation-Broker Integration Design Pattern

Context

Intermediaries (e.g. information brokers) may offer portal services that consolidate or aggregate different business services. Content or Service Providers may integrate with the portal service, for example via URL rewriting, data exchange using XML and Web Services, or application-to-application interfaces (see FIG. 87). A Partner Directory may be created (e.g. Yellow Pages) to list all business services. UDDI or ebXML Service Registry may be used to implement the Partner Directory. Users (or subscribers) navigate in the Partner Directory and invoke relevant Web Services.

Architects and developers may consolidate business services from a number of service providers in order to provide an added-value service. Web Services technology may be used best to aggregate business information from different information sources or content providers. This preferably enables users to have a single front-end to access multiple marketplaces.

Problem

A potential problem is that different sources of Web Services may need to be consolidated to present a hybrid business service with added values.

Force

Different Service Providers may have different integration and security requirements. Some Service Providers may have lower service-level requirements (for example, their service is not around the clock), and some may have very proprietary technology that cannot be easily integrated or scaled up.

Solution

Figure 87:
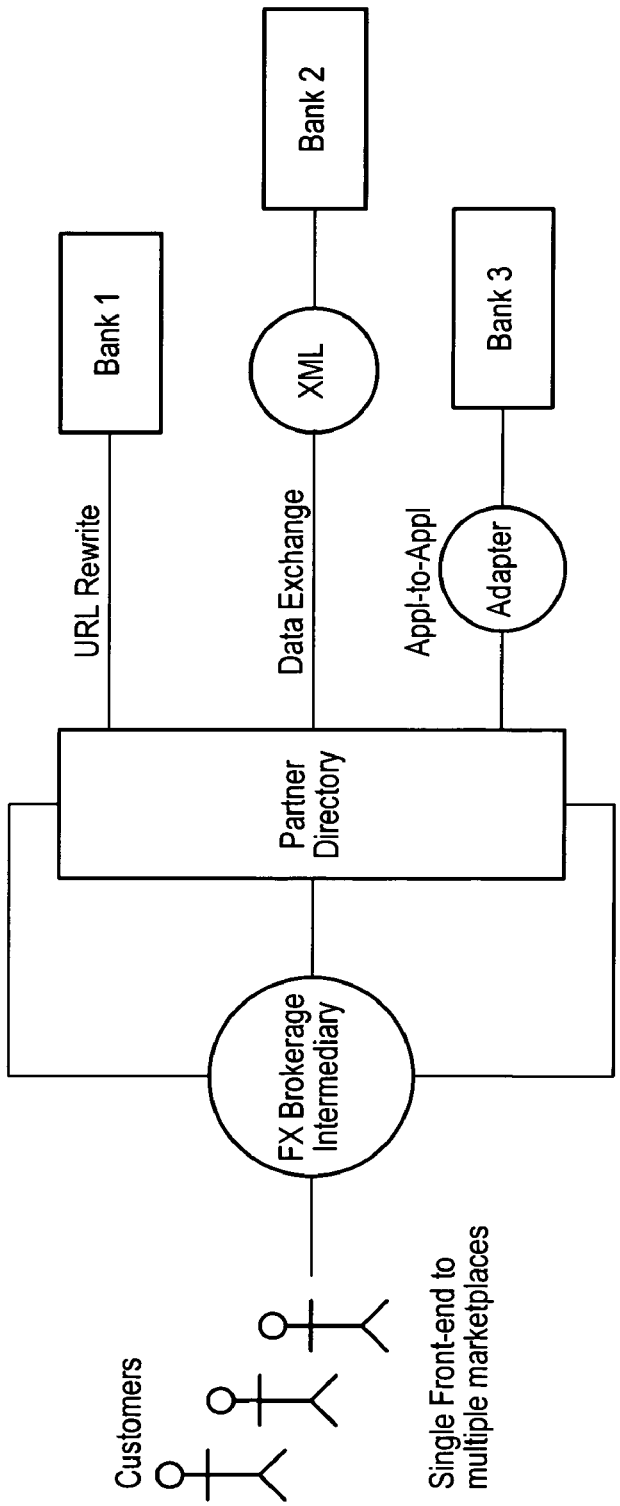
FIG. 87 illustrates an exemplary Service Consolidation-Broker Integration Design Pattern according to one embodiment.

FIG. 87 illustrates an exemplary Service Consolidation-Broker Integration Design Pattern according to one embodiment. In this sample scenario, customers search and discover a variety of FX trading services from the FX Brokerage Intermediary portal's Partner Directory. The FX Brokerage Intermediary aggregates information from different sources and consolidates it for better customer service. There may be a variety of integration points with different local technical integration constraints.

Figure 88:
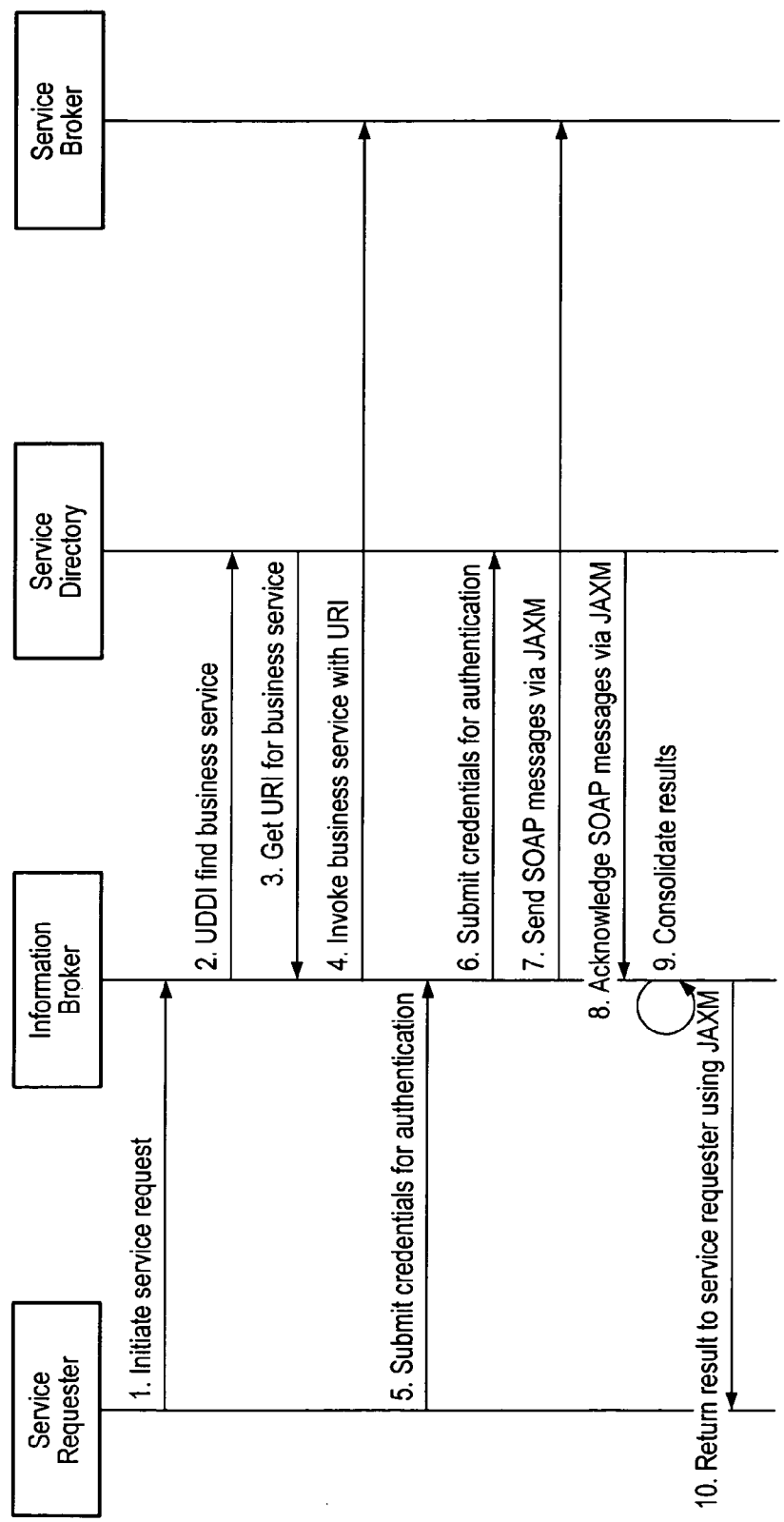
FIG. 88 illustrates an exemplary Service Consolidation-Broker Integration Design Pattern Sequence Diagram according to one embodiment.

FIG. 88 illustrates an exemplary Service Consolidation-Broker Integration Design Pattern Sequence Diagram according to one embodiment, and elaborates the details of Service Consolidation-Broker Integration pattern using Web Services. A Service Requester initiates a service request from the information broker (portal). The information broker performs a UDDI service lookup for the specified business service. The UDDI Service Registry returns the URI (service end-point) to the information broker. The information broker then invokes the business service. The remote business service provided by the Service Broker (Service Provider or content provider) may require authentication. The Service Requester may then submit credentials for authentication to the information broker and the Service Broker, respectively. Upon successful authentication, the information broker may send the service request in SOAP messages using JAXM. The Service Broker may acknowledge the SOAP messages and return with the business information as requested. The information broker consolidates the business information and returns the result to the Service Requester using JAXM.

This Web Services pattern may be useful, for example, for portal integration with multiple Service Providers or content providers. Traditional point-to-point partner integration typically requires complex technical customization for each partner's back-end application infrastructure. Using Web Services technology may preferably lower the cost of partner integration because SOAP messaging may be relatively flexible and less costly to implement. It can also accommodate different data formats and platform connectivity. Business information can easily be aggregated from multiple sources to create user-stickiness for the portal service.

The Service Consolidation-Broker Integration design pattern may be suitable, for example, for a brokerage service with a single front-end. The Brokerage Intermediary is preferably Service-Provider neutral. The integration approach is designed to cater for loosely coupled processes with a large number of trading partners.

With an EAI implementation, architects and developers may use customized workflow integration tools to cater for different proprietary integration requirements and message formats (or APIs). With a Web Services implementation, ebXML Business Process Management tools may be used. XML document (asynchronous data exchange) and XML-RPC (synchronous data exchange) may be used.

SOAP messaging with JAXM is a messaging API that may be used to consolidate and aggregate different information sources to implement the Service Consolidation-Broker Integration Pattern.

Reverse Auction-Broker Integration Design Pattern

Context

Architects and developers may consolidate business services from a number of Service Providers in order to provide the lowest-priced service. This is a reverse auction-like service brokerage (refer to FIG. 89).

Problem

The reverse auction business model may require real-time messaging and integration capability to different Service Providers' back-end systems and the client's capability to respond to the offered price or services.

Force

Real-time messaging capability may be required to support this auction-style business model.

Solution

Figure 89:
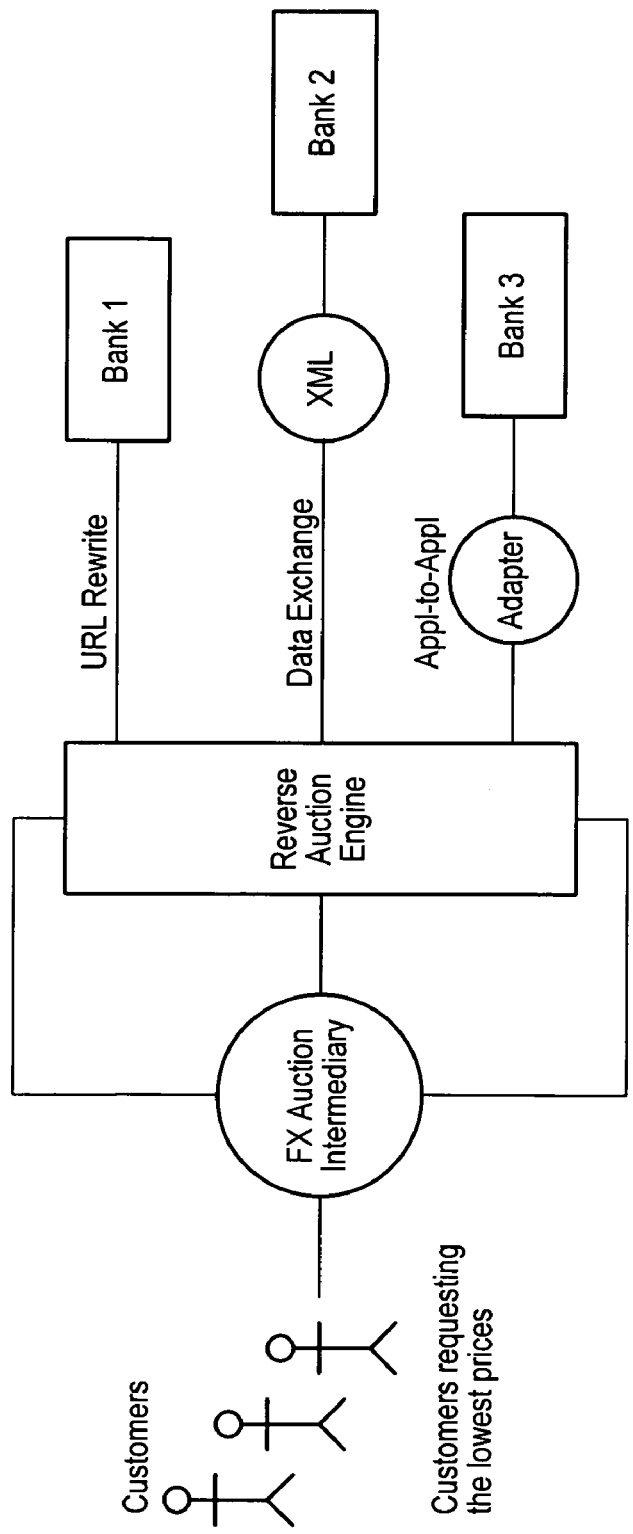
FIG. 89 illustrates an exemplary Reverse Auction-Broker Integration Design Pattern according to one embodiment.

FIG. 89 illustrates an exemplary Reverse Auction-Broker Integration Design Pattern according to one embodiment. In this sample scenario, customers may not need to search each Service Provider one by one from the FX Brokerage Intermediary portal's Partner Directory. They specify a criterion for the lowest FX transaction service from the FX Brokerage Intermediary. The FX Brokerage Intermediary aggregates information from different sources, then consolidates and filters information in order to locate the lowest-cost service. There may be a variety of integration points with different local technical integration constraints.

Figure 90:
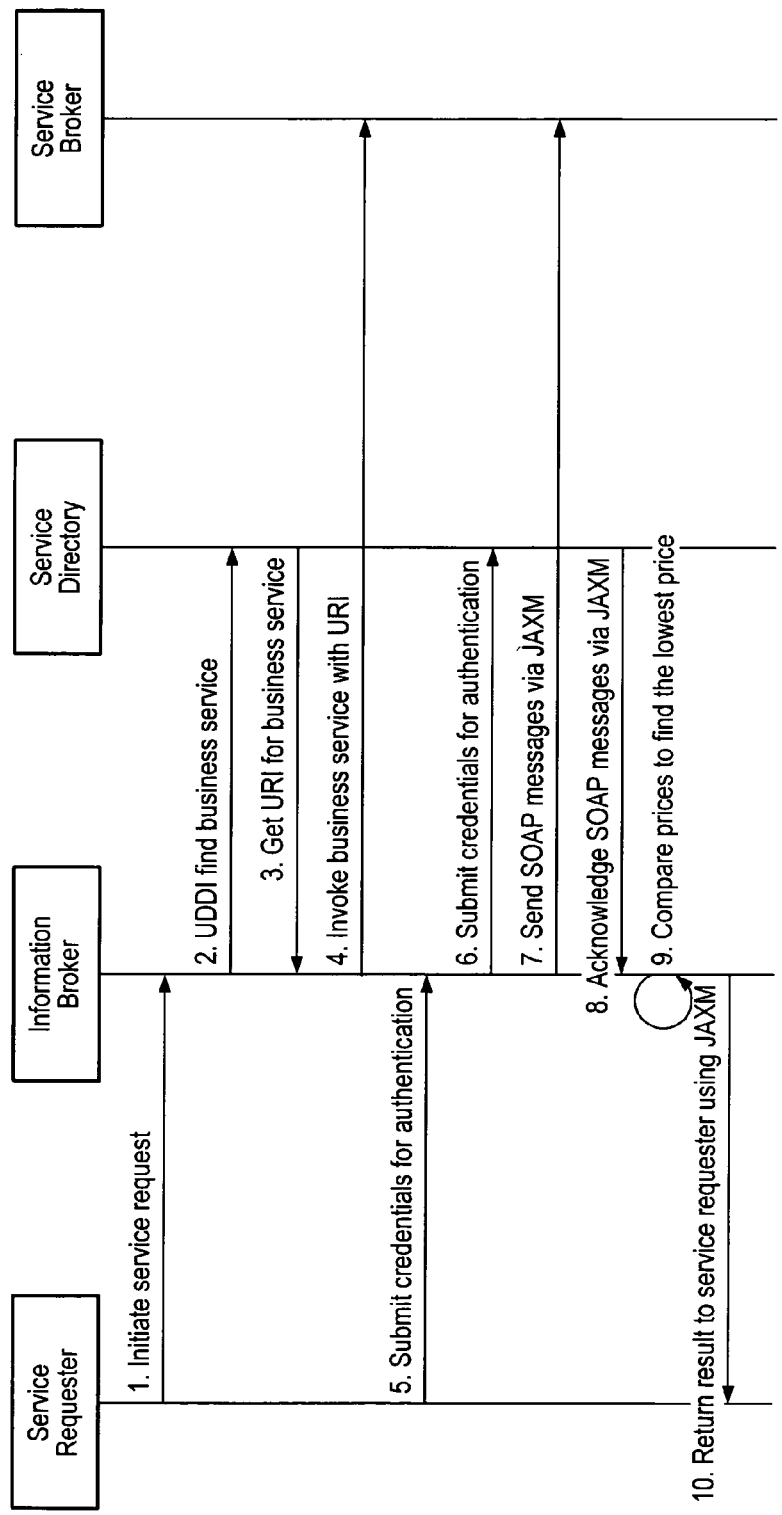
FIG. 90 illustrates an exemplary Reverse Auction-Broker Integration Design Pattern Sequence Diagram according to one embodiment.

FIG. 90 illustrates an exemplary Reverse Auction-Broker Integration Design Pattern Sequence Diagram according to one embodiment, and elaborates on the details of Reverse Auction-Broker Integration pattern using Web Services. A Service Requester initiates a service request from the information broker (portal). The information broker performs a UDDI service lookup for the specified business service. The UDDI Service Registry returns the URI (service end-point) to the information broker. The information broker then invokes the business service. The remote business service provided by the Service Broker (Service Provider or content provider) may require authentication from users. The Service Requester may then submit user credentials for authentication to the information broker and the Service Broker, respectively. Upon successful authentication, the information broker may send the service request in SOAP messages using JAXM. The Service Broker may acknowledge the SOAP service request and return with business information as requested. Finally, the information broker compares the prices to find the lower price and returns the result to the Service Requester using JAXM.

This Web Services pattern may be useful, for example, for reverse-auction style portal integration with multiple Service Providers or content providers. Traditional reverse auction typically requires highly customized point-to-point partner integration and real-time processing capability. Web Services technology may lower the cost of partner integration because SOAP messaging supports heterogeneous platform connectivity and real-time information processing (such as price comparison) at a lower implementation cost.

The Reverse Auction-Broker Integration design pattern may be suitable, for example, for a reverse auction-like brokerage service with a single front-end. The Brokerage Intermediary is Service-Provider neutral. The integration approach is designed to cater to loosely coupled processes with a large number of trading partners. The services provided may be, for example, price sensitive, time sensitive, and homogeneous. Auction-style Service Providers are exemplary candidates for this Web Services integration pattern.

With an EAI implementation, architects and developers may use customized workflow integration tools to cater to different proprietary integration requirements and message formats (or APIs). With a Web Services implementation, ebXML Business Process Management tools may be used. XML document (asynchronous data exchange) and XML-RPC (synchronous data exchange) may be used.

Using Integration Patterns

To optimize the integration patterns, it may be preferable to define integration requirements with Use Case modeling (for easier communication with vendors and partners) and to chart the big picture with prioritized targets. Note that the more details that are articulated, the more gaps and required changes may appear. Next, it may be preferable to map integration requirements to each integration pattern to see which one(s) is relevant. Integration patterns are not mutually exclusive. Thus, a hybrid or a mix-n-match of patterns may be preferable. The integration framework may be used as a guideline to identify components or areas of integration, and the protocols or standards to be used. Technology options may be examined for the technology used in the integration patterns. Once the integration architecture is ready and defined, the integration methodology may be customized in details. FIGS. 91 and 92 are tables that recapitulate the discussion of the different integration scenarios and design patterns.

Both EAI and Web Services technology may provide similar capabilities of one or more of, but not limited to: easier integration between systems, abstracting complex systems into simpler business services, good manageability of interfaces and infrastructure, preserving existing IT investments, and accommodating open technology standards evolution. Integrating data from multiple data sources across heterogeneous database vendor environments and database technology may be done using Java Web Services and XML.

Best Practices may include one or more of, but are not limited to:

Strong business proposition (and clearly defined requirements) for service integration.

Always start with a big picture and prioritized targets.

Use Open Standards (such as XML Web Services) wherever possible.

Keep the integration requirements and processes simple.

Decouple data contents or messages from the underlying transport to ease interoperability and integration.

Web Services Security

Firewall configurations may have filtered IF ports that block client applications from invoking applications and EJBs using RMI and RPC. Web Services applications, on one hand, may address firewall filtering features by utilizing the default IP port 80 or port 8080 and decoupling the data transport from the physical transport layer. On the other hand, they may also open up new areas of security integration requirements, including, but not limited to, key management, digital signature generation, authentication between trading partners, and application host (e.g. Solaris or Windows) security hardening. Architects and developers may overlook some of these security areas because they may focus on the SOAP message security alone.

Web Services (WS) Security is a security specification proposed to W3C from IBM, Microsoft, and VeriSign. The design objective is to provide a consolidated security framework to accommodate different security tokens (such as X.509v3 and Kerberos ticket), trust domains, multiple digital signature formats, and encryption technologies. It is intended to supersede the previous SOAP-SEC, WS-Security, WS-license, and various security token and encryption mechanisms.

Network identity management with Single Sign-on is an attraction for B2B integration and cross-enterprise integration. Project Liberty collaborates different XML security initiatives such as SAML to provide industry-wide specifications for Single Signon, federated data exchange, B2B transaction support, and a reliable Web Services security framework.

Web Services security may deal with SOAP security and digital signature for XML messages. There may also be Web Services security initiatives that cover key management (e.g. XKMS), security tokens and encryption (e.g. WS-Security), Single Signon (e.g. SAML), and network identity (e.g. Project Liberty). However, these initiatives may be designed to address a specific problem space, not the entire end-to-end security framework for implementing Web Services technology.

An end-to-end Web Services security framework is described that may address the security requirements by establishing a trust model of key management, authentication, and transactional security mechanisms. Initiatives on Web Services security standards, their design features, and the implications of implementing reliable Web Services applications are described.

Web Services security does not rely on SOAP messaging security alone. Web Services security preferably covers end-to-end applications and services, from network layer to application layer. SOAP message security is only a part of the end-to-end Web Services security.

HTTPS may provide data transport security from client browser to the server. To ensure end-to-end security, other components of Web Services security data transport may be used.

Passing XML data in clear text is insecure if done without encryption. In practice, the sensitive data in the SOAP messages is typically encrypted and signed with a digital signature to support non-repudiation. Therefore, the SOAP messages can be secured with digital signature and encryption, provided there is no compromise in the key management or exploit in the client or host.

The XML Key Management Specification (XKMS) provides public/private key management services for secure business transactions, without having to invest into an expensive Public Key Infrastructure implementation (such as implementing a Certificate Management Server and setting up processes to be an internal Certificate Authority).

Web Services security requires end-to-end protection, ranging from client, host, network transport, messages, and applications. Key management and network identity management are two other important areas. Digital signature is a mechanism to address non-repudiation. There may be other aspects of security requirements to be considered.

Web Services Security Requirements

Security may be an afterthought until something unpleasant happens or a security loophole is reported. Security is a process. Security requirements may be drivers for the Web Services security framework. They relate the security concerns to different areas of Web Services technology during the initial design and implementation stage.

Authentication

A client accessing business services, for example a Web browser, PDA, or WAP phone, is preferably authenticated with reliable credentials. Reliable credentials may be, for example, passwords, X.509v3 digital certificates, Kerberos tickets, or any secure token, and may be used to validate the identity of the Service Requester. This is important to Web Services because the business services, which are provided by a third party or a remote Service Provider from overseas, may incur high monetary value payment transactions using credit cards.

Authorization/Entitlement

Upon successful authentication, a client may request access to business services, whether locally or remotely. Because Web Services are "programmatic" interfaces, they are harder to monitor for suspicious activities. Therefore, it is preferable that there is proper access control for each business service invoked. In other words, each network identity is preferably entitled with access rights for the local or remote service and the access level of the Service Requester checked against a list of resource access rights at run time. The access request may be granted and the Web Services invoked upon successful authorization, or denied if insufficient access rights are identified.

Traceability

Each transactional Web Services call is preferably logged at the level of Web Services invocation and transport layer. This is in addition to the transaction log taken by the local or remote applications. In such a case, administrators may track and trace the service request at different points within the life cycle. For example, the HTTP/S activities may be tracked from the Web server's audit and log, and the XML-RPC SOAP calls may be traced from the SOAP server log.

Data Privacy and Confidentiality

Data privacy keeps information confidential, so that only the data owner and the target recipient are able to read it. Data privacy and confidentiality is typically accomplished using encryption. Web Services technology is preferably able to accommodate different encryption mechanisms (such as RSA-MD2, RSA-MD5, SHA, and NIST) with different key lengths (which may be subject to some countries' export regulations—for example, 128-bit encryption key for SSL may be restricted to certain countries).

Availability/Denial of Service

Denial of Service may be employed to attack Web sites and business services that have sophisticated security features. No matter how sophisticated these business services are, they may be vulnerable to a Denial of Service attack. It is preferable to profile the loading and capacity for each Web Services call so that appropriate preventive measures, such as load balancing, packet filtering, virus checking, failover, or backup, may be designed to protect from any potential Denial of Service.

Data Integrity

Transactions and private data, if transmitted in XML clear text, may be intercepted, modified, or tampered with. The use of different encryption mechanisms may protect the data from retrieval. However, if the keys are compromised, then a middleman or a replay attack may tamper with the data. Thus, in addition to encryption, checksums and MAC'ing, as part of the XML elements, may be used to support data integrity.

Non-repudiation

Increasing cross-enterprise data exchanges and B2B integration may require support for non-repudiation. This may have a legal implication. Digital signature using digital certificates (such as PKI X.509v3) or Kerberos tickets (such as Microsoft PASSPORT) is one element that may be used in providing non-repudiation. Non-repudiation preferably enables users to prove that a transaction has been committed with valid credentials. This preferably prevents a trading partner from claiming that the transaction never occurred. The support of non-repudiation may require logging details of the transactions at each point of exchange (including the application server at both ends), digital signatures along with the transactions, and a mechanism that ensures the logs and credentials are authentic.

Web Services Security Stack

To get the big picture of end-to-end Web Services, it may be important to understand the security stack of Web Services technology, the security characteristics of each layer, their potential point of attacks, and examples of commercial implementations. Next, it may be important to understand how trust models are built and the related threat profiling, where a risk mitigation mechanism may be implemented.

FIG. 93 is a table that illustrates a Web Services Security Stack, according to one embodiment, that may be used in designing Web Services applications. Protecting Web Services security may involve using different security technology and tools at each layer.

Platform security may be important in protecting the Service Provider and the Requester (Consumer). This may be the target for security attacks or exploitation—for example, a Denial of Service attack for SOAP servers may result in no service available even if the back-end applications are still running. To mitigate the platform security risks, architects and developers may, for example, use Operating System security hardening and penetration tests to secure the platform.

The Internet layer typically uses the TCP/IP protocol. A Virtual Private Network (VPN) gateway is one way to protect Web Services applications deployed using the public Internet. This may be in conjunction with using HTTPS and SSL for secure tunneling between the client and the server. Both trading partners preferably establish a VPN tunnel.

At the transport layer, HTTPS is an authentication protocol using a secure tunneling between the client and the server. It encodes the transmissions between the client and the server using Secure Sockets Layer (usually 128-bit SSL). As HTML form-based authentication passes user ID and password information in clear text, the use of HTTPS addresses the security issue of passing such data in clear text over HTTP. Web Services applications may be distributed, and HTTPS alone may not be sufficient to protect distributed Web Services from end to end. HTTPR from IBM may provide guaranteed message delivery of SOAP messages over HTTPS. The ebXML Message Service, which uses SOAP messaging as the transport and routing layer, is another initiative that may provide reliable message delivery over HTTPS.

IPSec is another security protocol on top of TCP/IP that protects the IP connectivity between the client and the server at the IP data-packet level. This provides additional transport-layer security, in conjunction with HTTPS. Operating system platforms, such as Windows 2000/XP and Solaris 80E, may have built-in IPSec.

Another security protection in conjunction with the network layer is host security hardening. This ensures the network services of the host infrastructure can be hardened and secured.

At the Transaction Routing layer, XML encryption, together with digital signatures, is a mechanism to protect sensitive data during message routing. Users may sign before they encrypt data or encrypt data before they sign. Encryption algorithms may include one or more of, but are not limited to, block encryption and chain mode. XML encryption and digital signatures may be covered in XML-ENC and WS-Security. Implementations of these standards may include, but are not limited to, IBM's XML Security Suite, Baltimore's Keytools, Microsoft's CAPICOM, and Sun's J2SE 1.4 security features (JCE, JSEE, Java CertPath, JAAS, and JGSS).

At the Service Discovery layer, Web Services may be discovered and bound to Web Services Description Language (WSDL) at run time. Commercial implementations of the Service Registry may use LDAP (for example, Sun ONE Registry Server) or RDBMS (for example, IBM UDDI), which require access rights for read access or administrative update. None of the service information is stored in clear text. Web Services may be discovered using a WSDL file, without UDDI. However, WSDL files may be stored in clear text and may be another target for attack. This is preferably addressed by security hardening of the host and a file-protection mechanism.

At the Service Negotiation layer, after service discovery, Web Services are negotiated and invoked upon successful authentication. XKMS is an exemplary security initiative to support a managed trust service (key management and identity authentication outsourced to an external trusted authority), as well as a homegrown trust service (customers performing authentication and key management). The security risk may be dependent on the trust level and reliability of the external or internal Trust Authority.

Upon successful authentication, Web Services Service Providers may retrieve the access rights and profile for the Service Requester. SAML and Project Liberty are exemplary cross-enterprise Single Sign-on technologies that may enable easier integration between trading partners, independent of the network identity management infrastructure or entitlement service technology used. XACML may provide a fine-grained access control capability of the XML data contents. However, without encryption, the SAML and XACML files are in clear text and may be another target of attack.

Figure 94:
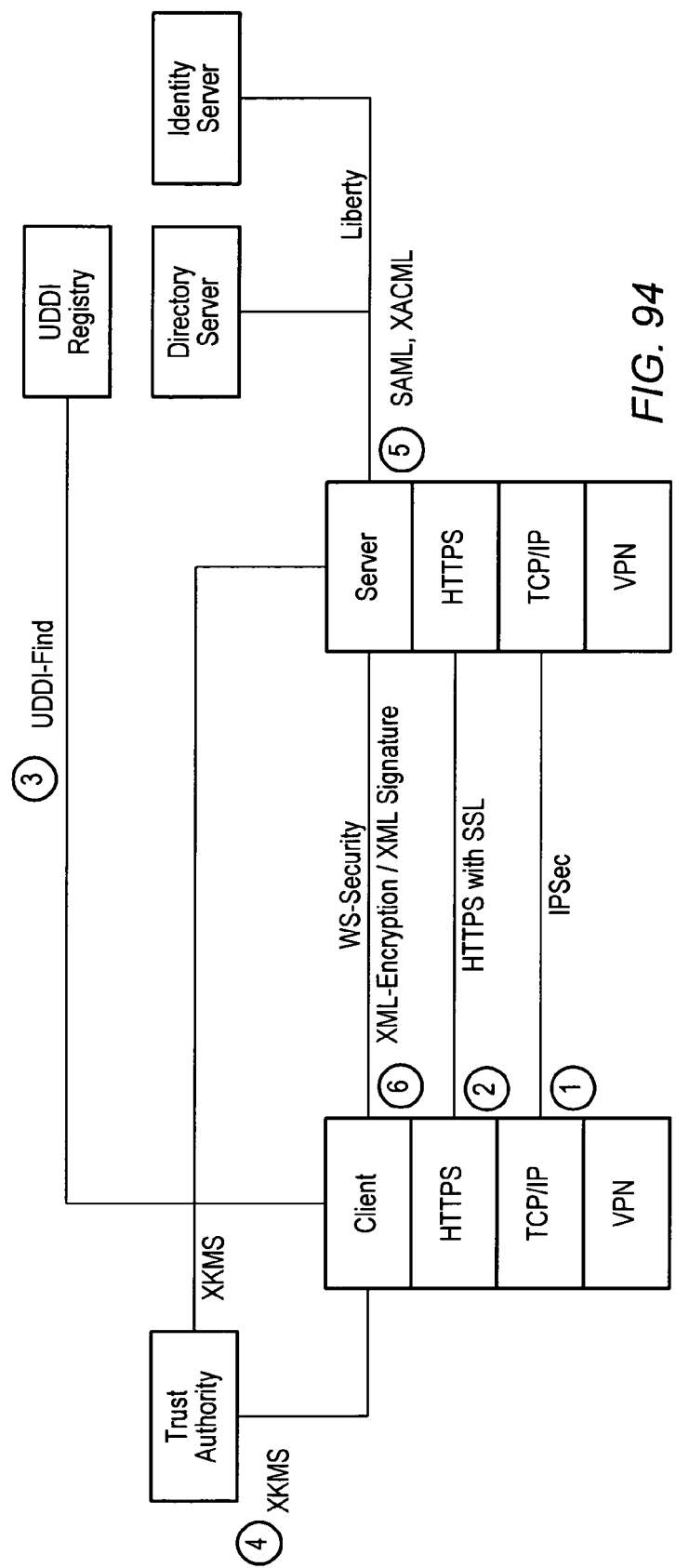
FIG. 94 illustrates an exemplary scenario in which a Web Services call may require different layers of security.

FIG. 94 illustrates an exemplary scenario in which a Web Services call may require different layers of security. Both the Service Requester (client) and the Service Provider (server) are assumed to have their platforms secured with operating system security hardening. This refers to the platform security. The following processes illustrate that a Web Services call preferably different security mechanisms in place to enable end-to-end Web Services.

A Service Requester may be connected to the Service Provider via a VPN over the Internet. The VPN makes use of the IPSec protocol to secure the connection between the client and the server (step 1). This refers to the Internet or network layer security. The client also uses HTTPS to secure the connection between the client browser and the server using a 128-bit SSL certificate (step 2). The use of HTTPS with SSL should safeguard the client session. This refers to the transport layer security. Using a secure HTTPS connection, the client browses various business services from a UDDI Service Registry. It finds the relevant business service, and retrieves the service endpoint URL (step 3). This refers to the service discovery security.

Upon invoking the business service, the Service Requester (the SOAP client) preferably provides user credentials in order to authenticate him/herself for using the remote Web Services. The Service Provider may be part of a Circle of Trust that is managed by an external Liberty-compliant Identity Provider, which provides an authentication service using the XML Key Management Specification. The client's key is located from the trust authority via XKMS (step 4). The Service Requester then provides a user ID and password to authenticate him/herself. Upon successful authentication, the Identity Provider enables Single Sign-on for the Service Requester using SAML and XACML protocols (step 5). Thus, the Service Requester does not need to log in again to use other Web Services. This refers to the service negotiation security.

When the Service Requester invokes a Web Service, the client side makes use of the public and private keys using XKMS to encrypt the data content in the SOAP message (XML Encryption) and to generate a digital signature (XML Signature) to attach to the SOAP envelope. WS-Security is a message-level security to protect SOAP messages. It may be built on top of the XML Encryption and XML Signature specifications. In such a way, the service request and the data content in the SOAP messages may be secured using the WS-Security specification (step 6). This refers to the transaction routing security.

Web Services Security Framework

Figure 95:
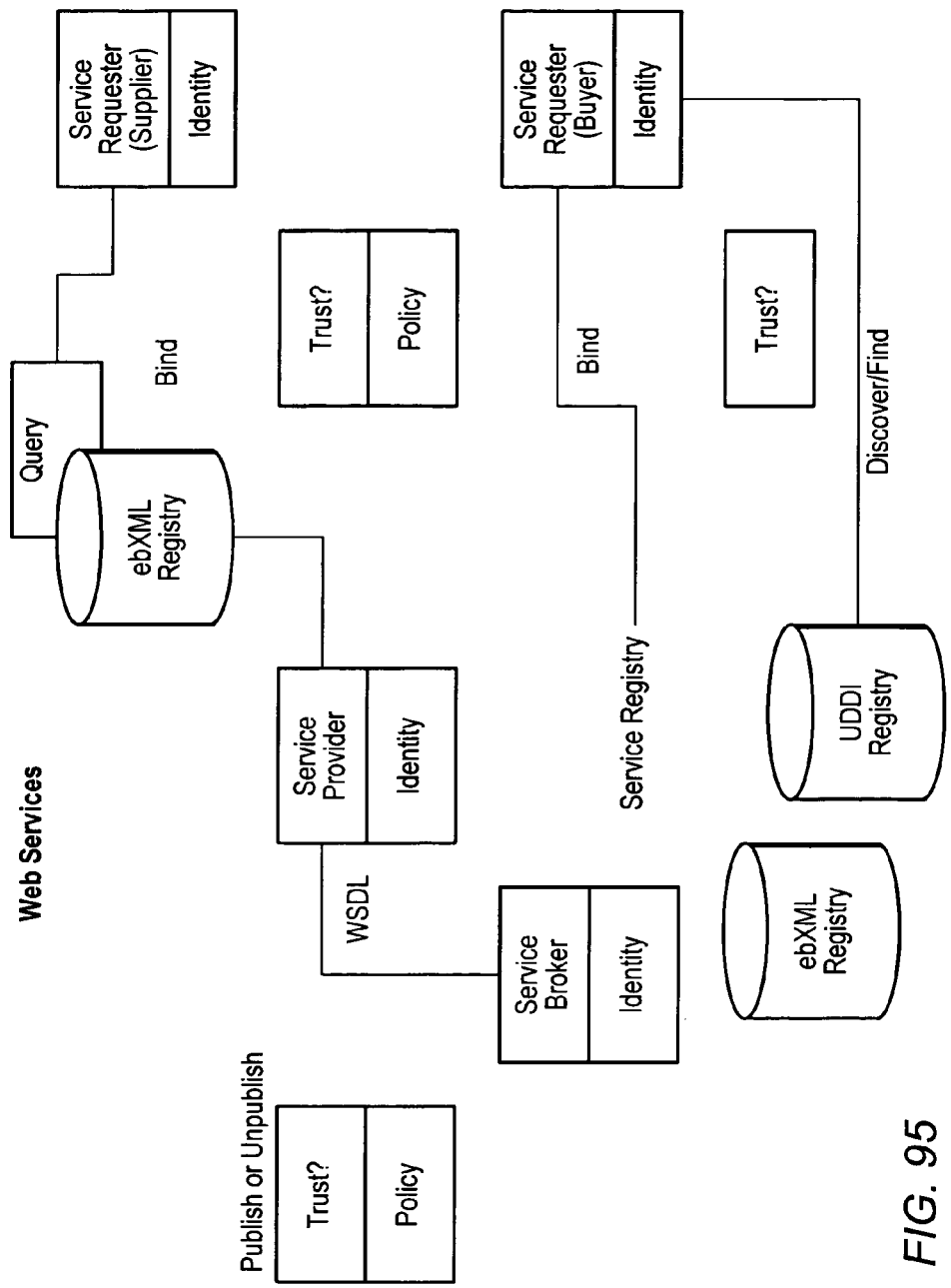
FIG. 95 illustrates an exemplary Web Services security framework in the context of web services according to one embodiment.

An end-to-end Web Services implementation preferably makes use of encryption and digital signatures appropriately for transactional security and a structural framework so that none of the development and implementation aspects are missed. Concepts that describe an end-to-end Web Services security framework may include, but are not limited to: Identity, Trust, Policy, and Threat Profiling. FIGS. 95 and 96 relate these concepts in the context of the interaction between Service Requesters, Service Providers, and Service Brokers.

FIG. 95 illustrates an exemplary Web Services security framework in the context of web services according to one embodiment. In FIG. 95, a Service Requester (supplier or buyer) is invoking a remote business service from a Service Provider or a Service Broker in a Business-to-Business (B2B) marketplace. The security concerns for the B2B market may include, but are not limited to: the identity of each marketplace player (in other words, is the identity of the person to do business with trusted, and is the person reliable for doing business with financially?) and the policy (in other words, what business functionality is the person entitled to?). If this is the first time doing business with the trading partner, the Service Requester may want the Service Provider or the Service Broker to authenticate the identity of the trading partner first. The Service Provider or the Service Broker may also authenticate the identity of every business corporation (trading partner) that publishes business services and service details in its Service Registry. This preferably ensures that the trading partner is not someone with a fake identity or somebody who is masqueraded by a security hacker.

FIG. 96 illustrates a Web Services Security Framework according to one embodiment, and elaborates the security concerns for the exemplary business scenario of FIG. 95 in more detail. Security threats may come from different areas to attack the identity and the policy. For instance, the identity of the Service Provider may be faked if the user ID and password are being hijacked (identity). A man-in-the-middle security attack may modify the service request content (such as modifying the account number in a financial transaction), which affects the reliability of the message security, the data transport security, and/or the platform security. These security risks may be a result of an overlooked security design or any security implementation pitfalls.

The platform security (such as operating system security hardening), the data transport security (such as HTTPS), and the messaging security (such as WS-Security, XML Encryption/XML-ENC, and XML Signature/XML-DSIG) are security design elements that preferably address the security concerns regarding the identity of the consumer or Service Provider. Once the identity is established and authenticated, the consumer or the Service Provider may be reliable to do business with.

Another security design element is the reliability of the business transaction between the consumer and the Service Provider. Project Liberty, together with the SAML specification, is an exemplary security specification that establishes a Circle of Trust (cross-domain Single Sign-on) where consumers can sign on once to the B2B marketplace to do reliable business transactions. Within the B2B marketplace, trading partners may also use the messaging security and the data transport security to assure the reliability of the business transactions.

Another security design element is policy. XACML and WS-Policy are examples of security specifications that may help govern only authorized users who can access the business transactions or resources. This preferably safeguards any unauthorized access to sensitive business information between different enterprises or domains.

The following describes the concepts of identity, trust, policy, and threat profiling in the Web Services security framework. Identity denotes how to authenticate the valid identity of the Service Requester or user. This may require authentication of the user credentials (security tokens in the form of user ID/password, digital certificates, or Kerberos tickets) and platform security. Trust denotes how to secure the messaging and transactions between two entities (identities). If the two entities (Service Requester and Service Provider) are authentic, the Service Requester is authenticated with the Service Provider, and they are within a secure environment, then they are in a Trust Domain. Service Providers exchanging messages with Service Requesters from an unauthenticated source or over the public Internet may be considered within a Non-trust Domain. In both cases, Web Services applications may require the use of different security mechanisms for the complete Web Services security stack in order to support transactional security. This may require a combination of platform security (for example, Operating System security hardening), data transport security (for example, HTTPS), and messaging security (for example, WS-Security) in order to support the requirements of confidentiality, traceability, non-repudiation, data integrity, and availability. Policy denotes authorization (entitlement) for accessing different resources, policy enforcement, and policy decision. Threat Profiling denotes profiling the Web Services objects, tools, and applications in order to assist in protecting these resources from potential hacker attacks and unauthorized access. This may involve defining and reinforcing security policies on how to protect and implement security mechanisms for the Web Services objects, tools, and applications on an ongoing basis.

Trust Domains

FIG. 97 is a table that illustrates Trust Domains and Threat Profiling according to one embodiment. The structural framework in the table covers the core components to establish a Trust Domain, which may be suitable for an organization, and what threats and potential risks exist for each Trust Domain.

From a security perspective, a business service and data exchange may be reliable only if both parties are "trusted," and are not "John Does" from an unknown place. Trusted parties here do not refer to business trust. The term trusted denotes the trust relationship between trading partners (if this is cross-enterprise) or business units (enterprise). A trusted trading partner means that the trading partner is authenticated with a valid network identity. The trading partner's user credentials may be issued and managed by an authorized Identity Provider. Under the management of the authentic Identity Provider, it may be secure to exchange business documents between the "trusted" trading partners. Business-to-Business transactions may involve high monetary value transactions, and thus authentic identity and a trust relationship may be crucial to reliable business services.

A trust relationship may be implemented by a combination of technology and processes. Examples of the technology are Public Key Infrastructure (which involves key management for trading partners), authentication of credentials using Directory Server, use of XML-based encryption, and digital signatures for transaction security.

Different business models of the trust relationship between trading partners, or Trust Domains, may influence how these technologies are used. If a business corporation decides to use an external Certificate Authority to issue digital certificates and manage key issuance, this trust service is a managed trust domain. However, if the business corporation has a large IT organization and decides to manage its own trust service, including key management, authentication services, and digital certificate operational support, then this is a client-responsible Trust Domain. The business may also decide which trust model (hierarchical, distributed, or direct) is suitable to implement its Public Key Infrastructure. In either case, each trust domain may have different Use Cases for key management, authentication of client and hosts, and handling of transaction security.

Key Management

Security tokens such as X.509v3 digital certificates may be fundamental to generating digital signatures for transactions. Security tokens may also be a key to authenticating user credentials and network identity. Transactions that are signed with digital signatures are preferably confidential and are preferably not able to be repudiated.

XKMS provides a framework for implementing key management. There are implementations to support different trust domains. Under the client-responsible Trust Domain, if customers are managing their own PKI infrastructure, the customers may prefer deploying Certificate Management Server together with home-grown key management and call center operation processes (for example, Certification Practice Statement and Certificates Policies).

Under the managed Trust Domain, these security tokens or key pairs may be issued and managed by an external trust service such as an external Certificate Authority (for example, UK Post Office or Identrus). Customers preferably establish a Web Services call for key retrieval or validation of the key name against the public key.

In either scenario, the server hosting the PKI infrastructure (for example, Certificate Management Server) or the client requesting the XKMS requests is preferably securely hardened. An exemplary platform security hardening tool is Titan. These tools scan and identify different network services and ports that are unused and may be easily exploited by hackers.

Authentication

Form-based (e.g. users presenting user ID and password in an HTML form) or security token (such as X.509v3 digital certificate) authentication are exemplary mechanisms to validate the network identity within an application. For enterprise-wide applications, authentication may be implemented, for example, using security tokens and Directory Server. This may require all applications, including back-end legacy systems, to invoke authentication services (such as LDAP authentication APIs or SAML assertion requests) from the authentication server. Thus, enterprise-wide Single Sign-on is preferable for the user experience and security administration. The capability to sign on once with the partners' systems is also more complex, as the trading partners are unlikely to use the same authentication service or infrastructure.

Single Sign-on may be implemented, for example, by proprietary authentication APIs on both ends, secure server-side cookies (such as Netegrity's Siteminder), meta-directory (such as Sun ONE Meta-Directory), or PKI implementation using digital certificates. Each of these options may have drawbacks.

SAML is an exemplary security protocol designed to address Single Sign-on, within an enterprise or across enterprises. It assumes the trading partners do not share the same security infrastructure and authentication mechanism. Using SOAP calls, SAML does not require customers to change the existing security infrastructure. SAML requires the client requester (Relying Party), under either the client-responsible or the managed Trust Domain, to send a request for authentication assertion during login to the Issuing Authority, which returns a SAML Assertion Response. SAML is dependent on a reliable key management infrastructure and processes.

Transaction Security

Message-level and application-level security preferably provides protection for the transaction. An appropriate choice of encryption algorithm (such as XML encryption or XMLENC) together with a digital signature (such as XML Signature or XML-DSIG) is preferable for the transaction security. XACML, for example, may provide a data-level access and addresses issues such as sending different subsets of the XML data contents to different groups of users.

The WS-Security specification may define a broader Web Services security framework by consolidating variants of security token and encryption specifications.

Different Web Services security specifications have provided a good framework. However, the reliability and scalability of the transaction security may depend on the physical implementation of the security infrastructure and the application design. The reliability and security of the client and host platform may require security hardening. Most hackers do not know these application security aspects, but they may be able to hack into the transactions from the platform security loopholes.

Threat Profiling

The following objects may become targets of attacks. Understanding how these objects operate may help in defending against attacks.

Hosts

Many servers, e.g. running Windows 2000 or Solaris OE, may be installed with default configuration settings. This may be an issue of security threat. For example, default configuration settings in Windows operating systems may leave objects and resources unprotected (for instance, an anonymous ID can access these objects). Customers may not be aware of the need to download and install security patches to the operating system in a timely way. Thus, many unused ports or services, such as RPC or COM_objects, may be easily exploited.

UDDI Service Registry

Local configuration or data files for the UDDI Service Registry are potential targets for attack. WSDL files, if they are stored in the Service Registry, are critical files that hackers may locate using the service endpoint URL as targets of attack.

Web Container/Application Server

Web Containers and/or Application Servers may store user access files in clear text. Another area of threat from specific application server implementations is that hackers may exploit the abuse of URL to CLASSPATH mapping, or cause source code disclosure or arbitrary file retrieval by forcing a FileServlet on a JSP file.

Hacker Attacks

Hacker attacks may start with information gathering by footprinting, scanning, and enumeration. If Web Services applications are implemented with poor security, hackers may simply intrude into the system and access data contents. For security-hardened systems, hackers may attempt Denial of Service or middleman attack.

Denial of Service

An approach to attacking Web Services applications with implementation of key management and digital signatures is a Denial of Service (DoS) attack. This is based on some information gathering about the profiling of the loading and capacity from the service endpoint URLs in the WSDL files. One possible countermeasure is to review the "ilities" of the overall architecture and to profile the loading and capacity regularly as preventive measures.

Man-in-the-Middle Attack

Figure 98:
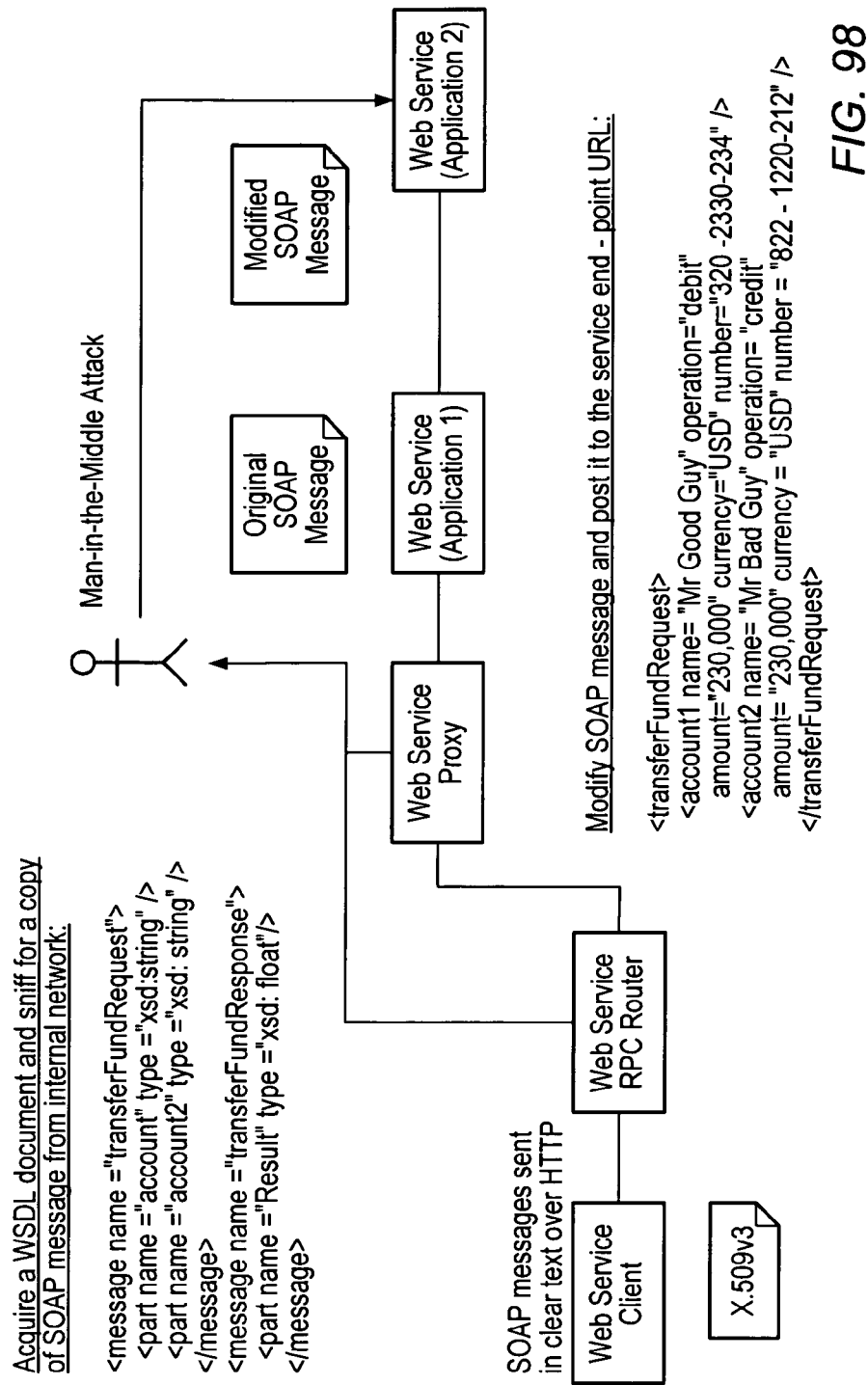
FIG. 98 is an exemplary scenario for man-in-the-middle attack risk for Web Services applications.

FIG. 98 is an exemplary scenario for man-in-the-middle attack risk for Web Services applications. A possible security attack approach is to spoof service requests to Web Services end-points by reusing previous key information and key name, which may be captured from previous footprinting. In this example, a SOAP client is sending a SOAP message that contains a fund transfer request in clear text. The data content includes user ID and password. The SOAP message is in unencrypted clear text and is supposed to be signed with a digital signature. It is assumed that SOAP messaging does not need data encryption within an internal proprietary network. Unfortunately, hackers may acquire a WSDL document in advance and sniff for a copy of SOAP messages from the internal network. Then, they may modify the SOAP message contents and post it to the target service endpoint URL.

Design Considerations

Digital Signature and Signing Server

Figure 99:
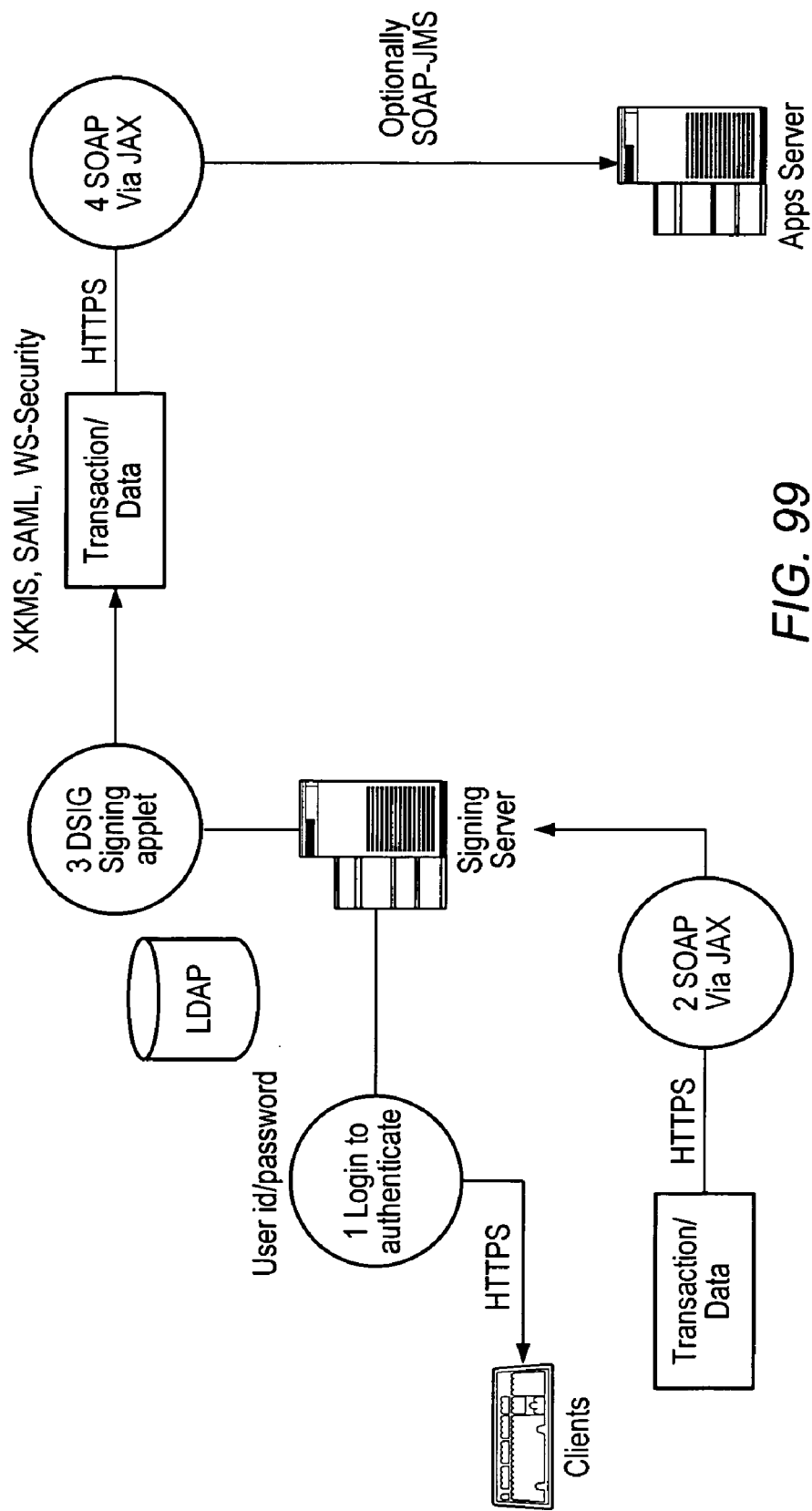
FIG. 99 illustrates a Server-Side Signing Model according to one embodiment.

Customers may implement a Signing Server to generate a digital signature for the client, instead of generating from the client browser. FIG. 99 illustrates a Server-Side Signing Model according to one embodiment, and presents an exemplary scenario where a service request (client) uses a Signing Server to digitally sign a SOAP message. The Signing Server may authenticate the credentials (e.g., user ID and password, as in step 1) against the client access profile. The client has just made a business transaction from the online shopping Web site. The business data is encapsulated in a SOAP message using JAX (step 2). Upon successful authentication, the signing applet may retrieve the key pairs from a secure database to generate a digital signature for the transaction (step 3) and transmit the transaction with the digital signature (e.g., in SOAP messages with a digital signature, as in step 4) to the application Service Provider.

This design addresses the challenge of a massive PKI security implementation and the associated implementation cost. For example, Internet banking for retail banking services may require tens of thousands of digital certificates to be deployed first. This is a considerable implementation effort with complicated digital certificate management processes and operations. Without the PKI infrastructure, consumers cannot pay their online shopping with their digital signature (generated from their digital certificate). For small and medium-sized financial institutions, PKI implementation may not be pragmatic, in the context of financial risks, implementation risks, and total cost of ownership.

Online payments via wireless devices may utilize the Signing Server design. For example, phone handsets may not support a smart card device or may not be able to store a digital certificate. The Signing Server stores the unique identifier of the phone handset or other device (which is unique for each phone set) and authenticates the user with a valid user ID and password.

Another consideration is that client-side digital-signature generation may require the client browser to install Java Virtual Machine (JVM) version 1.3 or higher. Client browsers may be configured with JVM version 1.2.x. Thus, users preferably install JVM 1.3 or higher manually. If the client browser does not support JVM 1.3 or higher, the client browser session preferably downloads Java classes in order to sign the transactions at run time. Alternatively, developers may use some digital signature tools (such as Baltimore's Keytools) that have a lightweight browser plug-in for generating signatures.

In summary, client-side generation of digital signatures is the preferable approach to implementing end-to-end Web Services security. This requires the local client to install a digital certificate and to download a signing applet (e.g. JCE/JAAS). The approach may be preferable for customers with PKI infrastructure implemented and for high value financial transactions. An implementation issue is that most browsers support JVM 1.2.2 or lower, and thus clients either upgrade to JVM 1.3 manually or download a signing applet at run time. The signing applet may have a relatively long response time for the signing. There may also be cost and implementation considerations of distributing and administering digital certificates.

Server-side generation of digital signatures denotes an intermediary server generating signatures on behalf of the end users. Certificates may be stored centrally on behalf of customers. A user ID and password may be used to authenticate the right user before retrieving the corresponding digital certificate for signature generation. This approach may be preferable for mass-market implementation with low-value or zero-value financial transactions. This Signing Server approach preferably does not require each end-user to own and install a digital certificate on its desktop. This may raise a security issue—there may be a security and liability concern and potentially a legal implication for the intermediary Signing Server. The intermediate server may be vulnerable to hacker or virus attack.

Web Services Security Design Patterns

Security technologies may not provide a complete solution to many complex business problems. They may need to be combined and implemented together in order to be contextual to different business issues. The following describes some exemplary Web Services security design patterns. A scenario where a design pattern may be applied may be described. In addition, how different Web Services security technologies may be implemented to provide complete business solutions may be described.

Single Sign-on Design Pattern

Context

Single Sign-on may be a requirement for many enterprises. Cross-domain Single Sign-on is one of the major challenges of Web Services security. Under a B2B cross-enterprise integration scenario (such as automated dispute management and exceptions management), a trading partner's server may need to access different servers from multiple trading partners' infrastructure. Embodiments may provide a vendor-independent framework to perform cross-domain Single Sign-on with login once for each application.

Security specifications and initiatives, such as Liberty and Security Assertion Markup Language (SAML), may address only certain aspects of cross-domain Single Sign-on. Liberty specification version 1.1 defines an authentication mechanism using a federated identity service model. It extends existing SAML schema for authentication entities, but does not address authorization, access control, or policies. On the other hand, SAML does not validate the identity or credentials presented during the authentication process.

This security design pattern addresses the requirement of cross-domain Single Sign-on. SAML assertions may be encapsulated in the XML message payload just like a security token. Upon successful authentication using the Liberty solution, the client may establish a trust with different servers. The system may then pass SAML assertions across trading partners' servers using the existing SAML specification. This may preferably provide a trusted environment to support cross-domain Single Sign-on from authentication and authorization to policies.

Problem

Users that have access to two or more different Service Providers may have different login IDs and passwords. As the Service Providers may be using different platforms and technologies for the applications, users may need to log in once for each Service Provider's application. If users need to switch from one application to another across different Service Providers (that is, cross-domain), they may have to log in more than once.

There are security products that support cross-domain Single Sign-on, but most of them require an affiliate agent (proprietary plug-in to the Web Server and/or Application Server that stores session cookies to enable Single Sign-on). Most Service Providers do not accept "foreign" (not their own domain or application systems) security modules or plug-ins from their trading partners to be installed in their application infrastructure because this may expose them to unknown security risks.

Forces

The level of security trust (the environment and level of security protection where the Service Requester may be operating) between the Service Requester and Service Providers varies, and it may be difficult to agree on a common security standard. It may not be viable to install an affiliate agent to all trading partners' production environments to achieve Single Sign-on, as each trading partner may have different security requirements. There may be considerable security integration costs, if a vendor-specific Single Sign-on product is used.

Solution

It is preferable to adopt Open Standards security standards (e.g. SAML and/or Liberty) to meet Single Sign-on requirements. These do not require installing any proprietary affiliate agent on the trading partner's site.

Figure 100:
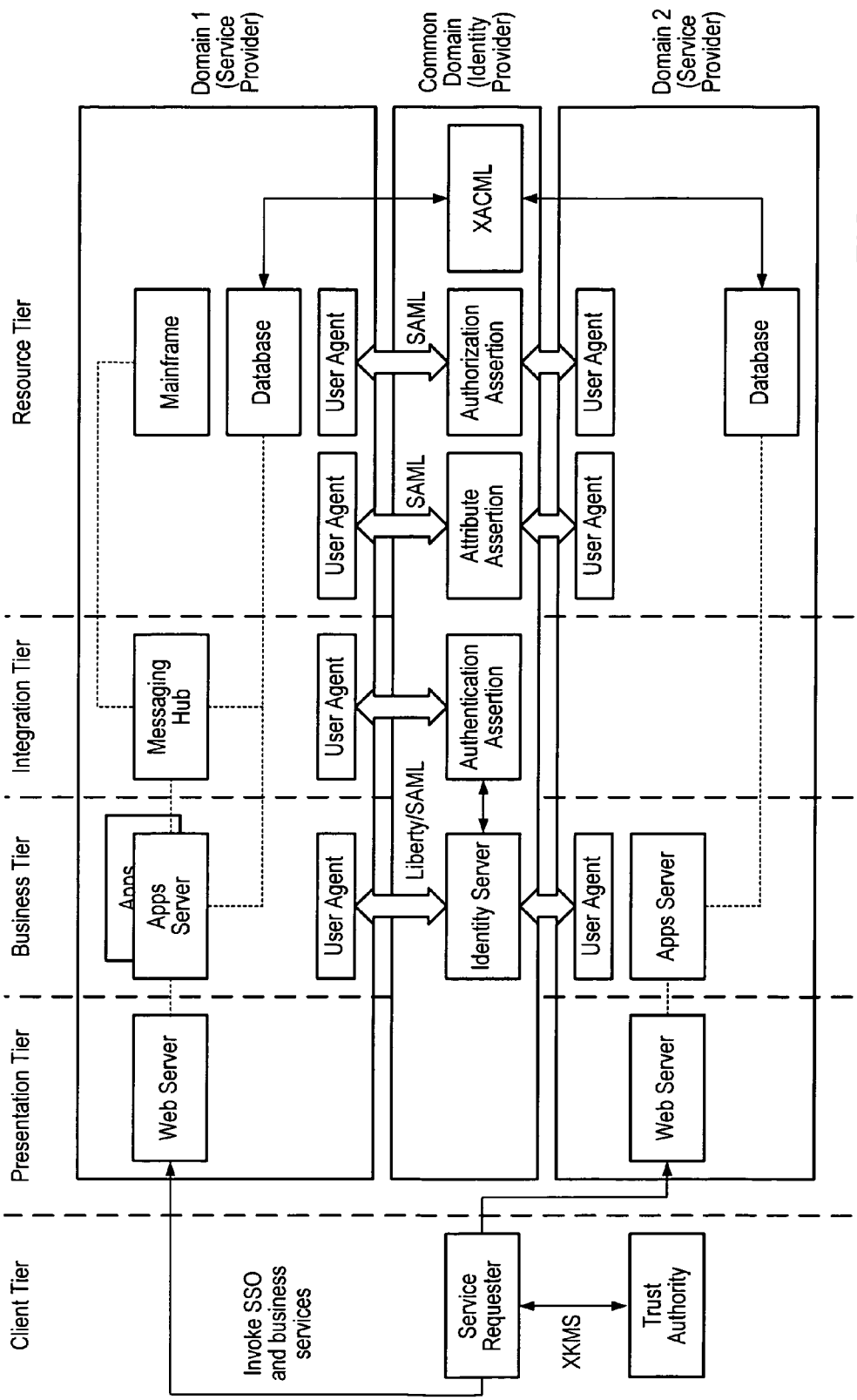
FIG. 100 illustrates a Single Sign-on Design Pattern according to one embodiment.

FIG. 100 illustrates a Single Sign-on Design Pattern according to one embodiment, and depicts what service components are preferably built in order to implement cross-domain Single Sign-on. A Service Requester is a subscriber to the user community that provides online shopping and business services in a portal service. There are different Service Providers supplying the online shopping and business services, each of which has a different system infrastructure (or different domains).

In FIG. 100, a common security domain is preferably defined to enclose the Service Requester and all the associated Service Providers (trading partners). This may require the use of an Identity Server (Identity Provider that centrally authenticates for the Service Requester and redirects to the Service Providers and/or Identity Providers). The physical Identity Server may reside in an external Service Provider that provides identity management services, or alternatively in the Service Requester's system environment.

Each of the system resources (for example, Application Server, Messaging Hub, etc.) may make use of User Agents (security agents that can intercept and respond to Liberty or SAML assertion requests). User Agents that are compliant with Liberty and SAML specifications may be implemented using Liberty-enabled or SAML-enabled development toolkits (such as Sun ONE Identity Server). The Service Requester preferably only logs in once, using a Single Sign-on User Agent. An authentication assertion request may be redirected to the Identity Server. Upon successful authentication, session information may be stored as server cookies in the Common Domain. If the Service Requester needs to access any applications or resources, whether in the Business Tier or in the Resource Tier, the User Agents may create Attribute Assertion or Authorization Assertion requests. It is also preferable to use the XML Access Control Markup Language (XACML) to express policies for information access. Upon the successful processing of these assertions, the Service Requester may access and retrieve information according to the policies set for the entitled access rights and roles.

The Common Domain processes different assertion requests that are processed in each domain. Thus, it may not matter if the two domains are using different system architecture; the Identity Server can support Single Sign-on, provided that the User Agents deployed in each resource and in each tier are Liberty- and/or SAML-compliant.

There may be some differences between the Liberty and the SAML approach in implementing Single Sign-on. The SAML approach may be used to implement cross-domain Single Sign-on without using Liberty. However, this may not address identity management issues, such as the authenticity of the Service Requester, or mobile/wireless support for SAML clients. On the other hand, the Liberty specification version 1.1 does not support Authorization Assertion. Thus, it may be preferable to use Liberty for identity management and Authentication Assertion while using SAML for Authorization Assertion and XACML for Policy Management. This may vary for other versions of Liberty, if those versions support Authorization Assertion. The Service Requester may also make use of an external Trust Authority to provide and administer user credentials (for example, digital certificates or key management), instead of implementing PKI or certificate management solutions within its operating environment.

Figure 101:
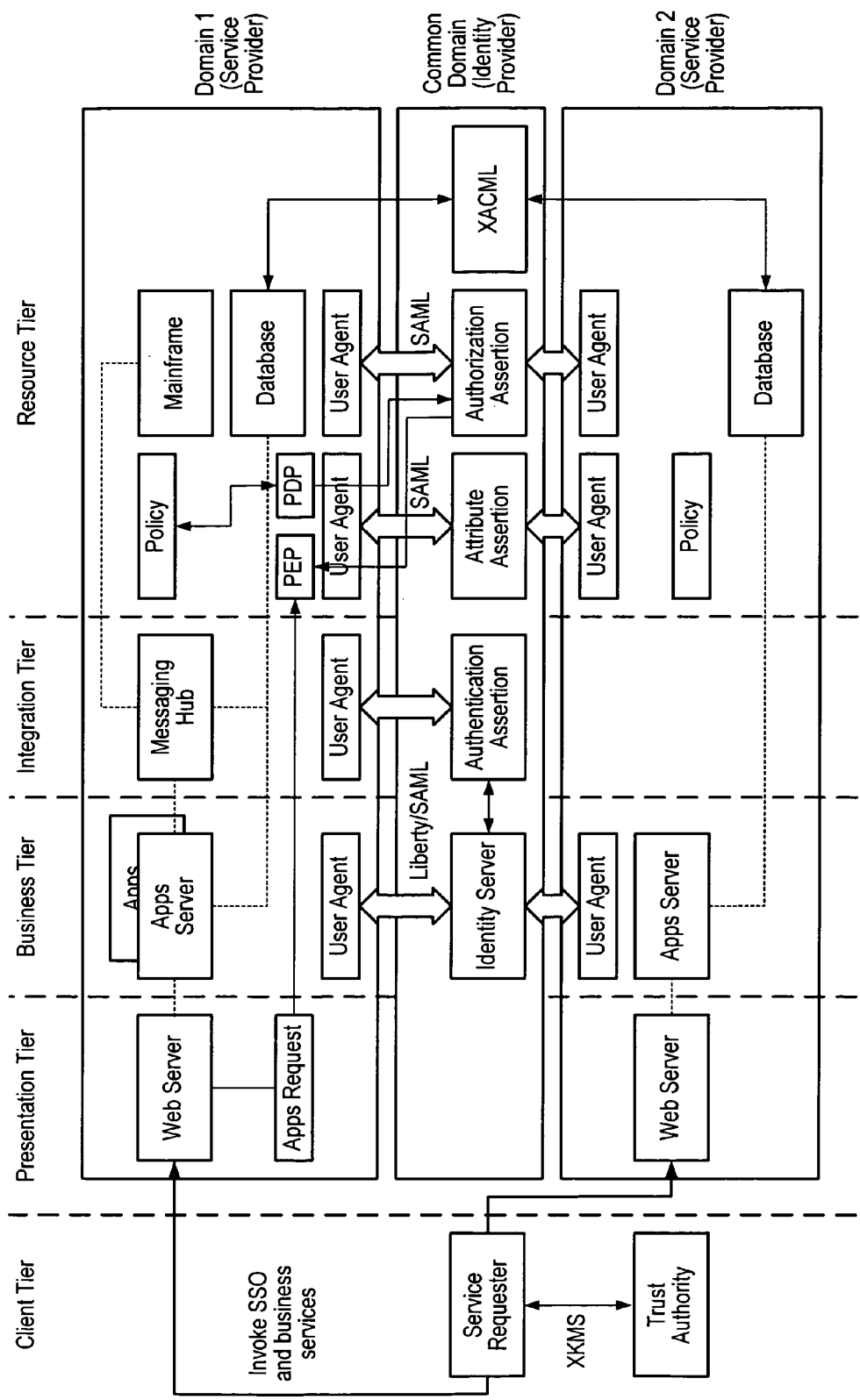
FIG. 101 illustrates a Single Sign-on Design Pattern with policy management details according to one embodiment.

FIG. 101 illustrates details of Single Sign-on Design Pattern with policy management details according to one embodiment, and elaborates on the details of the cross-domain Single Sign-on process. Under a hybrid security environment, after the Service Requester provides user credentials for Single Sign-on, the Identity Server may redirect authentication to the Identity Provider or Service Provider in Liberty protocol. Upon the successful processing of the Authentication Assertion request, the Service Requester may be granted sign-on to the common security domain. If the Service Requester makes an application request to access or update a system resource, an Authorization Assertion request may be created. The Policy Management module (for example, Policy Server) may forward the user access rights information to the Policy Decision Point (PDP), which may relate the user access rights information with the Authorization Assertion request. The application request may be forwarded to Policy Enforcement Point (PEP). The PEP, once it has user access rights and policies from the Policy Management module, may process the Authorization Assertion request.

Figure 102:
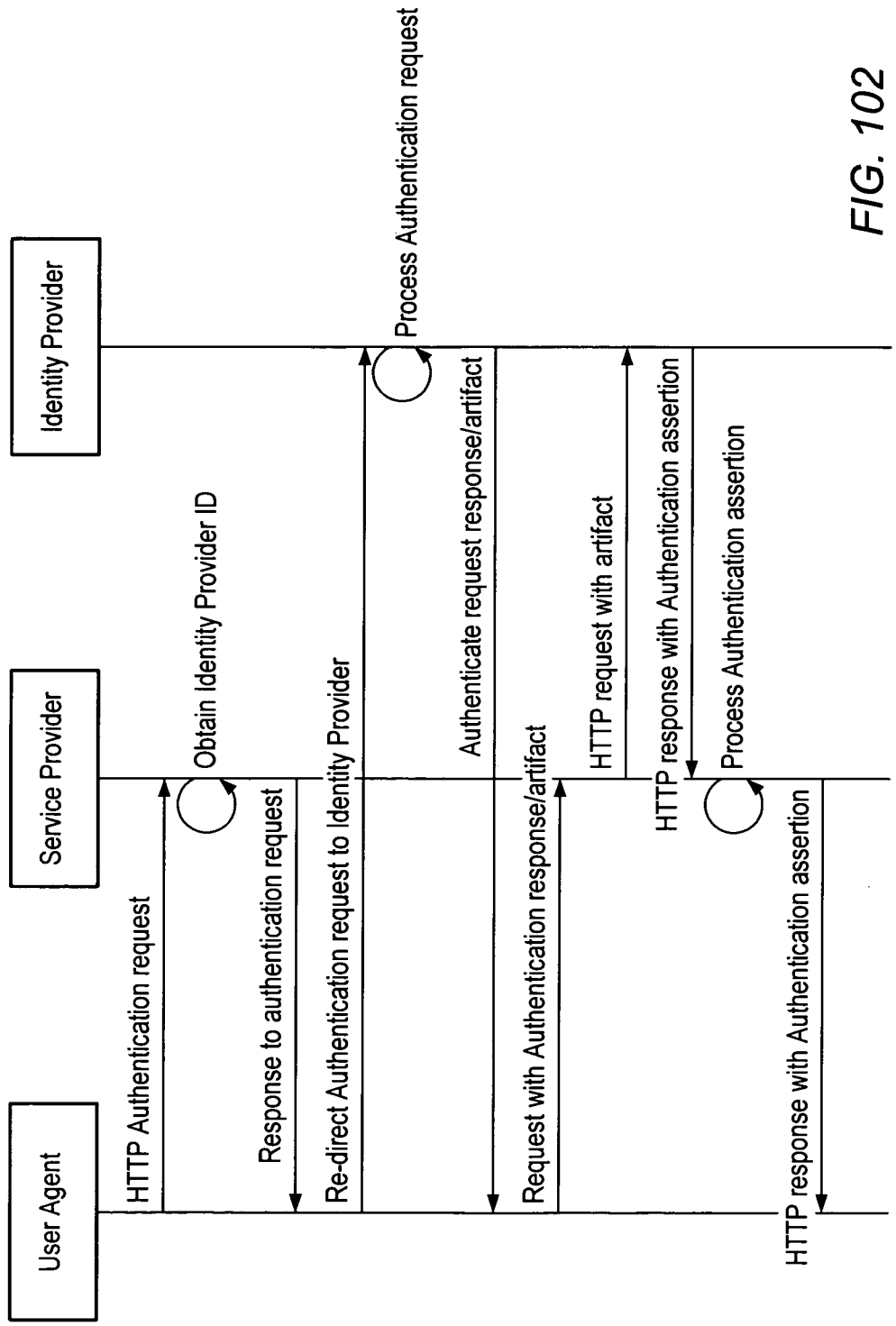
FIG. 102 illustrates details of Single Sign-on activities in a sequence diagram according to one embodiment.

FIG. 102 illustrates details of Single Sign-on activities in a sequence diagram according to one embodiment. When the Service Requester logs in, the Single Sign-on User Agent may issue an HTTP request for authentication to the Service Provider (in this example, Domain 1). The Service Provider obtains the Identity Provider ID, which is the Identity Server in the Common Domain. The Service Provider may then respond to the User Agent's authentication request with the Identity Provider ID. The User Agent may then redirect the authentication request to the Identity Provider, which is the Identity Server of the Common Domain.

Upon receiving the authentication request from the User Agent, the Identity Provider processes the request and returns with an authentication request response and an artifact. The User Agent may send an Authentication Assertion request with the artifact to the Service Provider, which may send an HTTP request with the artifact to the Identity Provider. The Identity Provider may then return with an Authentication Assertion request response to the Service Provider. The Service Provider may process the response and return the result (for example, authentication completed and grant access) to the User Agent. A Common Domain cookie may be created.

Common Domain cookies may be created to track the Identity Provider IDs allowed in the Common Domain. FIG. 103 is a Common Domain Cookie Management sequence diagram according to one embodiment, and elaborates on the details of creating a Common Domain cookie in the sequence diagram. Upon the successful processing of the Authentication Assertion requests, the Identity Provider redirects the User Agent to the cookie-writing service. The User Agent then accesses the cookie-writing service URL. The Common Domain cookie-writing service (implemented in the Identity Server) processes the request to write cookies and redirects to the Identity Provider Return URL upon completion of the cookie-writing service. Then the User Agent can access the Identity Provider Return URL.

Benefits

This pattern is intended for cross-domain Single Sign-on. It may be applicable for Single Sign-on within the same domain because the Identity Server for the cross-domain scenario manages the Authentication Assertion the same way as in the cross-domain scenario. Achieving Single Sign-on may preferably improve the user experience and customer expectations, as well as reduce the internal system or B2B integration cost. The solution does not require a proprietary affiliate agent and is compliant with Liberty, SAML, and XACML, where architects and developers can select a wider choice of vendor products for implementation.

Risks

Security specifications and standards may evolve to add more functionality and features. The existence of similar and competing Web Services security standards and specifications may create industry confusion.

EXAMPLE

A Membership Award Service may be an example of application of the Single Sign-on Design Pattern. The credit card business units of commercial banks that need to provide online membership award services to corporate card customers may require providing Single Sign-on to bank account services (such as credit card account balance and online statements) or membership award redemption from airlines, hotels, and car rental companies. Different trading partners of the commercial bank may run different application architectures and may not want to install a proprietary affiliate agent to enable Single Sign-on. Using a Liberty-based Identity Server, the commercial bank may enable online corporate customers to sign on once to all membership award service providers.

Messaging Transport Design Pattern

Context

Early pilots of Web Services applications typically focus on the technology Proof of Concept. Architects and developers may not incorporate security design in the SOAP message or in the data transport layer. In some cases, architects and developers have incorporated the security processing logic in the business logic to provide application security.

Architects and developers typically understand that Web Services applications need to secure both the messaging transport and the message contents. Web Services security specifications may describe how the message transport can be secured. There may be vendor tools that support message-level and data trans port layer security for Web Services applications. It is preferable for architects and developers to be aware of the use of appropriate vendor tools to add message-level and data transport layer security to Web Services applications.

Problem

Many architects and developers embed security business logic into application programs. Thus, when architects and developers need to upgrade the security business logic to a new version or to migrate to a new security standard, they may need to modify and retest the application programs. Tightly coupling the security and application program business logic may require developers to have an in-depth understanding of the security protocols and implementation knowledge.

Force

Financial services applications may require data and message encryption. Developers may incorporate security-processing logic into the application business logic. Once they make changes to the security-processing standards, considerable effort and impact may be required to retrofit changes to all application changes. The provision of message transport via encryption and digital signature may add performance overhead.

Solution

Web Services security specifications such as WS-Security, XML Encryption, and XML Signature may provide guidelines on how to protect the messaging transport layer. Developers may choose to embed the security processing logic (for example, encrypting and decrypting) into the application business logic or to decouple the messaging transport from the application business logic.

FIG. 104 illustrates a security pattern through which architects and developers may decouple the security processing logic (that is, messaging transport security) from the application business logic according to one embodiment. Both the consumer (SOAP client) and the Service Provider (SOAP server) preferably encrypt the business transactions in SOAP messages with XML Encryption and sign them with a digital signature (messaging security). SOAP appliances and WS-Security plug-ins for SOAP servers may provide the messaging security without adding the security processing logic in the business logic. The SOAP messages are preferably sent over secure data transport such as HTTPS (data transport layer security). Both XML Encryption and XML Signature may be used by the WSSecurity specification. This preferably allows application business logic to focus on the application processing flow and enables more options to secure the messaging transport based on different costs (for example, operating overheads of encryption and decryption by the application) and benefits (for example, ease of scaling the Web Services appliances that handle the XML message encryption). Architects and developers may also migrate to a more cost-effective messaging transport solution over time without impacting the application business logic.

Technology options to decouple messaging transport security from the applications may include, but are not limited to Web Services Appliances. Appliance products, such as Westbridge Technology's appliance products, may provide XML encryption and decryption. These appliance products, which may be configurable with higher CPU clock speed and encryption hardware devices, may use a previously assigned digital certificate (key pairs) to encrypt and decrypt SOAP messages, and thus off-load the performance overhead of the Application Server.

Secure Messaging Provider Class. Message provider classes, such as VeriSign's Trust Service Integration Kit, may provide secure messaging using XML Encryption and XML Signature. These may serve as the message provider (for example, JAXM message provider) so that the application business logic preferably does not need to cater for the details of message encryption, message decryption, and digital signature.

Risk

The performance overhead of encrypting and decrypting data contents may be a considerable operating cost for the applications. There may be different options to address the requirements, such as the use of Web Services appliances to off-load the processing overhead from the applications in a Trust Domain.

In summary, XML Encryption and XML Signature are basic technologies for application- and message-level protection for Web Services applications. Standards and specifications that may provide a framework for end-to-end Web Services security may include one or more of, but are not limited to: WS-Security, XKMS, SAML, and XACML. These may be complementary to cover different aspects of security. These technologies may be implemented, for example, as developer toolkits and may be embedded with security infrastructure products. Security hardening tools may be applied in platform security and end-to-end application architecture design.

Best practices for protecting Web Services hosts may include one or more of, but is not limited to:

Preferably run security-hardening tools before development starts and after development completes.

Preferably turn off unused network services and ports on the platform operating system.

Preferably use encryption and digital signatures for sensitive and confidential transactions.

Preferably ensure file protection for configuration files of UDDI registry and WSDL files.

As an example, under the Java Web Services Developer Pack development environment (which uses Apache Tomcat as the Web Container), the Web Services objects that may be of interest for security protection and checking are listed in a table in FIGS. 105A and 105B. In the development and production environment (whether Solaris OE™ or Windows), it is preferable to protect these objects or files from being a target for attack or exploitation with appropriate access rights.

Note that the use of HTTPS and encryption may have a direct impact on system performance and response time. It is preferable to profile each Web Services call for the benchmarking, and to check the log files during the first few months of deployment. The performance statistics may be used as a baseline metric for future comparison and troubleshooting purposes. If there is abnormal performance or and unusual data traffic pattern (for example, a sudden outburst of data traffic may be due to Denial of Service), then security administrators may check the previous Web Services profiling metrics.

Exemplary Web Services Case Study

The example presented in this section uses a relatively simple business requirement to illustrate how embodiments of a systemic Web Services architecture design and analysis may be used in a Web Services implementation, and is included for exemplary purposes and is not intended to be limiting. This section describes means for generating one or more Use Cases for the Web Service in accordance with one or more design patterns, means for generating a high-level architecture for the Web Service and in accordance with the one or more design patterns, and means for generating a logical architecture for the Web Service according to the use case scenarios and in accordance with the one or more design patterns in the context of the example, but note that these means may be extended to other cases.

An objective is to use a simplified Foreign Exchange (FX) Spot Rate Quote Service to illustrate how to wrap a remote FX Quote Service using a mixture of XML messaging (XML document using JAXM) and Remote Procedure Call (JAX-RPC) with secure SOAP Message Service (WS-Security) and Security Assertion Markup Language (SAML) protocol for Single Sign-on purpose. How it works is that, given a Sell/Buy currency pair (for example, Sell US Dollars and Buy Euro Dollars), the FX Quote Service will provide a quote based on the average daily exchange rate.

Assumptions

The business requirements, as depicted in Use Case diagrams and Sequence Diagrams, have been simplified for illustrative purposes. The sample physical architecture and future deployment architecture diagrams are for illustrative purposes, may not trace back to business requirements, and are not intended to be limiting.

A sample "key store" (sample_soap_keystore) is placed in the secure message services (server key store) and requester (client key store) directories. The sample key store is an asymmetric key pair generated for demonstrating the use of XML Encryption and digital signature for secure messaging. It comes with VeriSign's Trust Service Integration Kit (TSIK) and stores user credentials (in this case, a valid digital certificate for the MMC entity).

Netegrity's TSIK is used in this case study to provide secure message services (WSSecurity) for SOAP messages in the data transport layer. This denotes that a client request using SOAP messaging will be encrypted and digitally signed with valid security tokens to ensure data integrity, confidentiality, and non-repudiation.

Use Case Scenario

The business scenarios are based on the existing e-Treasury system of an international Bank. The Investment Banking unit has deployed a Java-based Liquidity Engine for online consumer FX services. It is also private labeling the online FX services for some foreign banks that do not have the infrastructure to support local FX services in some countries.

The Request for FX Spot Rate Quote is used in this example because it is relatively simple for illustrative purposes. In order to be generic enough to illustrate the objectives of achieving Single Sign-on and providing FX Spot Rate Quotes via a remote Web Service, some of the detailed business rules are not included. In addition, some of the necessary exception-handling rules are not included.

Business Requirements

Single Sign-on

The exemplary system preferably allows users to log in once to access multiple partner services. In other words, users enter login ID and password at the front page (for example, user ID "goodguy"), and then can access a number of partner Web sites with a list of URLs defined in a profile without hard-coding the URL into the program codes. This preferably supports the use of the SAML protocol as an Open Standard security protocol for Single Sign-on.

The exemplary system preferably validates the user credential against the user access list of the Application Server. It preferably also demonstrates cases where a user ID (for example, user ID "otherguy") can log in but does not have enough access rights to invoke all partner services.

The exemplary system preferably allows users to enter the Sell and Buy Currency codes to request an indicative FX Spot Rate Quote. This is preferably an online request for a quote, where the exemplary system preferably retrieves the Spot Rate from a local or remote FX Quote Server (e.g. Market Data Engine or Liquidity Engine).

If the user enters a currency code that is not available in the currency code list or any invalid currency code, then the exemplary system preferably returns a "Do not know" message in the response page.

Because the exemplary system is for instructional purposes, HTTPS with SSL is not used for simplicity. However, HTTPS with SSL may be turned on by reconfiguring the Web Container's server.xml file (in this example, this is Apache Tomcat's server.xml).

The exemplary system may demonstrate the use of WS-Security, which VeriSign's TSIK provides. This enables the XML message contents to be encrypted using a local sample key store.

The exemplary system is designed to be a prototype for instructional purposes. It preferably supports a transaction throughput of at least five Request for FX Quote per minute. The response time requirement for the quote is preferably less than 15 seconds. As this is an exemplary system, it does not require 24/7/365 or 99.999-percent availability. The target service availability for the exemplary system is 99.0 percent, assuming the development Application Server is running all the time.

Use Case Diagram

FIG. 106 illustrates exemplary Use Cases for the exemplary FX Spot Rate Quote Service according to one embodiment. Clients may need to enter a public or private financial portal that provides a variety of financial services, FX trading, and information services. The clients may need to provide a single user ID and password and be able to log in once for all the subscription-based services provided by the financial portal.

In this Use Case scenario, a primary focus is on having a Single Sign-on and Request for FX Quote capability. The Client selects the FX Spot Rate Quote Service to request an indicative spot rate by specifying the Sell and Buy Currency. 2-letter ISO currency codes may be used. Upon submitting the request, the remote FX Spot Rate Quote Service Provider may return an indicative rate.

Actors

- FX Client (Service Requester)—Corporate users who need to get an indicative Spot Rate Quote for a specific Foreign Currency pair of the current day.
- FX Service Broker—Investment Banks, financial institutions, and/or FX Portals that provide a broker service to provide an indicative FX Spot Rate Quote Service to an FX Client, where a remote FX Service Provider operates the actual FX quote service.
- FX Service Provider—FX Service Providers are financial institutions that provide either a delayed FX quote or a real-time FX quote to an FX Client. They may be another Investment Bank or financial institution, and also may be the Service Broker themselves.

Single Sign-on Use Case

Use Case Name: MyFX-UC-01

Description: Client enters a user ID and password in order to access FX Spot Rate Quote and multiple partner Web sites, based on prior trading partner agreements, without having to log in once for each Web site. There may be different access rights for each partner Web site, and thus the Client may not be able to access all partner Web sites without sufficient access rights granted.

Actors: FX Client, FX Service Broker

Assumptions: Client has an asymmetric key store (e.g. X.509v3 certificate) installed in a local directory.

Main Flow of Events:
1. Client invokes the Single Sign-on screen. The Single Sign-on process generates a one-time session key and forwards the user to a login page.
2. Client enters user ID and password.
3. The Single Sign-on process authenticates the user credentials against the Access Control List (in this example, this may check the user ID in the Web Container's Access Control List tomcat-users.xml under Tomcat version 4.x).
4. The Single Sign-on process checks for authorization (in this example, it may check for the user access rights for different partner URLs in user_attributes.xml maintained by Netegrity's jSAML sample program) and forward the user to main menu page.

Alternative Flows:
4. The Single Sign-on process cannot find the user ID or sufficient access rights and thus displays an error page to the user.
5. A login screen may be redisplayed for the Client to re-log in.

Special Requirements:
There are preferably regular backups of the Client key store.
The Application Server running the Single Sign-on process is preferably available online 24 hours every day to provide Single Sign-on.

Precondition: The Client key store is preferably stored in a local directory before Single Sign-on screen is invoked.

Post-condition: Upon successful login, the exemplary system preferably forwards the Client to the Request for FX Quote Use Case.

Constraints: For simpler environment set-up, HTTPS with SSL is not used.

Risks/Issues: Without HTTPS, there is a security risk for eavesdropping of the data sent between the Client and the Application Server. Because this is a example, the risk is manageable.

Request for Quote Use Case

Use Case Name: MyFX-UC-02

Description: Client selects FX Spot Rate Quote Service to request an indicative spot rate by specifying the Sell and Buy Currency. 3-letter ISO currency codes may be used. The quote service forwards the request to a remote FX Quote Service Provider.

Actors: FX Client, FX Service Broker, FX Service Provider

Assumptions: Client has done the sign-on with appropriate security verification.

Main Flow of Events:
1. Client enters Sell and Buy Currency codes to request an indicative FX Spot Rate for today.
2. Control Servlet looks up the remote FX Quote Service URL from the Service Registry.
3. Control Servlet invokes the FX Price engine to fetch the latest FX Spot Rate based on the given cross currency pair and returns the rate from the remote FX Quote Service.
4. Control Servlet invokes the request for the Buy Currency name from the back-end Reference Data via the Profile Servlet.
5. If there is a Spot Rate available, then the Control Servlet displays the FX Spot Rate Quote on the screen.

Alternative Flows:
6. If there is no Spot Rate available, then the Control Servlet may not display the rate on the screen.
7. If the currency code is invalid, then the Control Servlet may display a "Do Not Know" message in the currency description, and there may not be any rate displayed on the screen.

Special Requirements:
Active Internet connectivity (with appropriate firewall setting to allow access to the Internet) is available.
SOAP RPC Router (SOAP Server) is running with the Application Server.
FX Spot Rate Quote Web Service is deployed to the Web Container (which is a run-time Web Services engine. In this example, this refers to JWSDP Tomcat Web Server).

Precondition: Single Sign-on process is complete.

Post-condition: Inquiry completed.

Constraints: If the remote FX Quote Service is unavailable, there is no error message captured. Thus, the quote result may be blank.

Risks/Issues:
Insufficient exception handling for invalid currency code or having the remote FX Quote Service out of service may not indicate the error conditions in this example. This may not be easy to troubleshoot from the existing log files.
The debugging design and existing debugging log files may not be sufficient for troubleshooting.

High-Level Case Study Design

A Web Services architecture may include a Web Services Consumer (who uses and invokes the services), Web Services Service Registry (which provides a directory of business services available and points to their service endpoint URLs) and Web Services Service Provider (the business functionality provided to serve the consumers).

The Web Services Consumer finds or discovers different business services from the Web Services Service Registry. In this example, the Web Services Consumer wants to find a Request for FX Spot Rate Quote Service. The Web Services Service Registry may host business services information, such as organization name and service endpoint URLs where these services can be found. Web Services Service Providers may previously publish or register with the Service Registry. Once the Web Services Consumer finds the required business service, the system may bind the service endpoint and invoke the business service.

Figure 107:
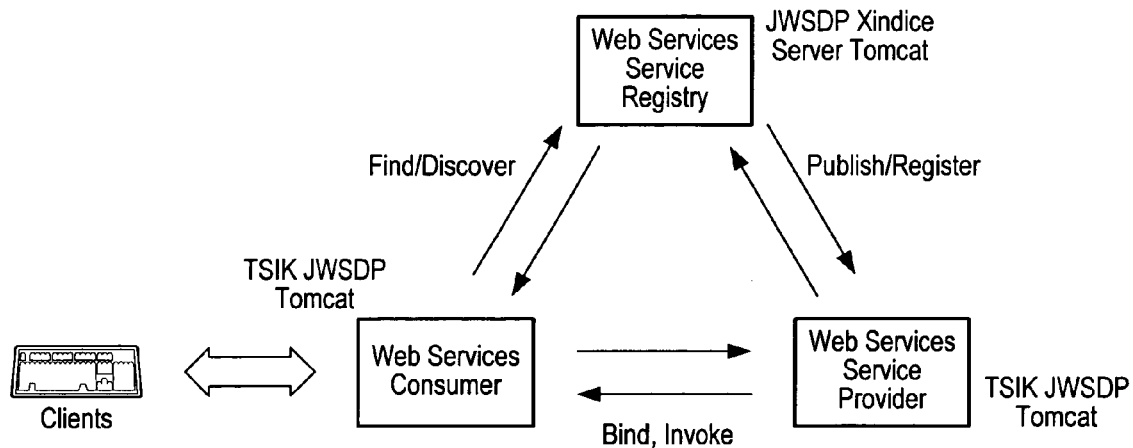
FIG. 107 illustrates an exemplary FX Spot Rate Quote Web Services high-level design according to one embodiment.

FIG. 107 illustrates an exemplary FX Spot Rate Quote Web Services high-level design and relationships among entities according to one embodiment. In this example, Sun Microsystems's Java Web Services Developer Pack may be used, which comes with Tomcat 4.0, Xindice database, and UDDI Service Registry. Netegrity's TSIK has been used as the secure message provider in this example. The Web Services Consumer may use JWSDP and TSIK on top of the Tomcat Web server to find/discover business services from the Web Services Service Registry. The Service Registry may be implemented using JWSDP with a Xindice server on top of the Tomcat Web server. The Web Services Service Provider registers with the Service Registry and publishes business services to the Service Registry, which may be invoked by the Web Services Consumer. Note that the use of these products and technologies is exemplary, and that other products and technologies may be used in other applications.

Figure 108:
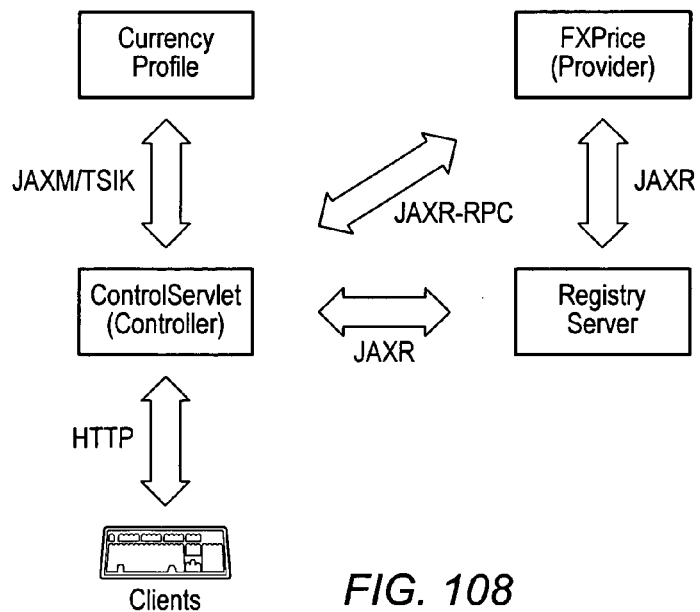
FIG. 108 illustrates the interaction between components in an exemplary FX Spot Rate Quote Web Service according to one embodiment.

It may be preferable to identify the Open Standards messaging protocols used for the interaction between different components. From a high-level perspective, components may include one or more of, but are not limited to: Clients, Control Servlet (e.g., Front Controller to handle Presentation-Tier requests), Currency Profile (or Reference Data), FX Price Provider (Service Provider for the FX Spot Rate Quote Service), and the Registry Server. FIG. 108 illustrates the interaction between these components according to one embodiment. The Service Requester (client) accesses the Web Services from the Front Controller via HTTP. The Front Controller acts as a SOAP client to look up the business services dynamically using JAXR, retrieves reference data (currency profile) using JAXM, and invokes remote business service (FX currency rate quote) using JAX-RPC.

In this example, HTTP is used instead of HTTPS between the Client and the Control Servlet because it is easier to configure for illustrative purposes. From the Control Servlet, requests and messages may be sent in secure SOAP messaging using the TSIK message provider. This denotes that Reference Data such as currency code may be transmitted securely over HTTP. Service lookup, publish, or removal from the registry request to the Registry Server may use JAXR so that it can shield off from registry-specific APIs or codes. This may preferably ease migration to ebXML Service Registry or switch to another UDDI Service Registry if desired. Between the Control Servlet and the FX Price Provider, JAX-RPC is used under the assumption that synchronous connectivity is desired to the remote Service Provider.

Logical Architecture

Figure 109:
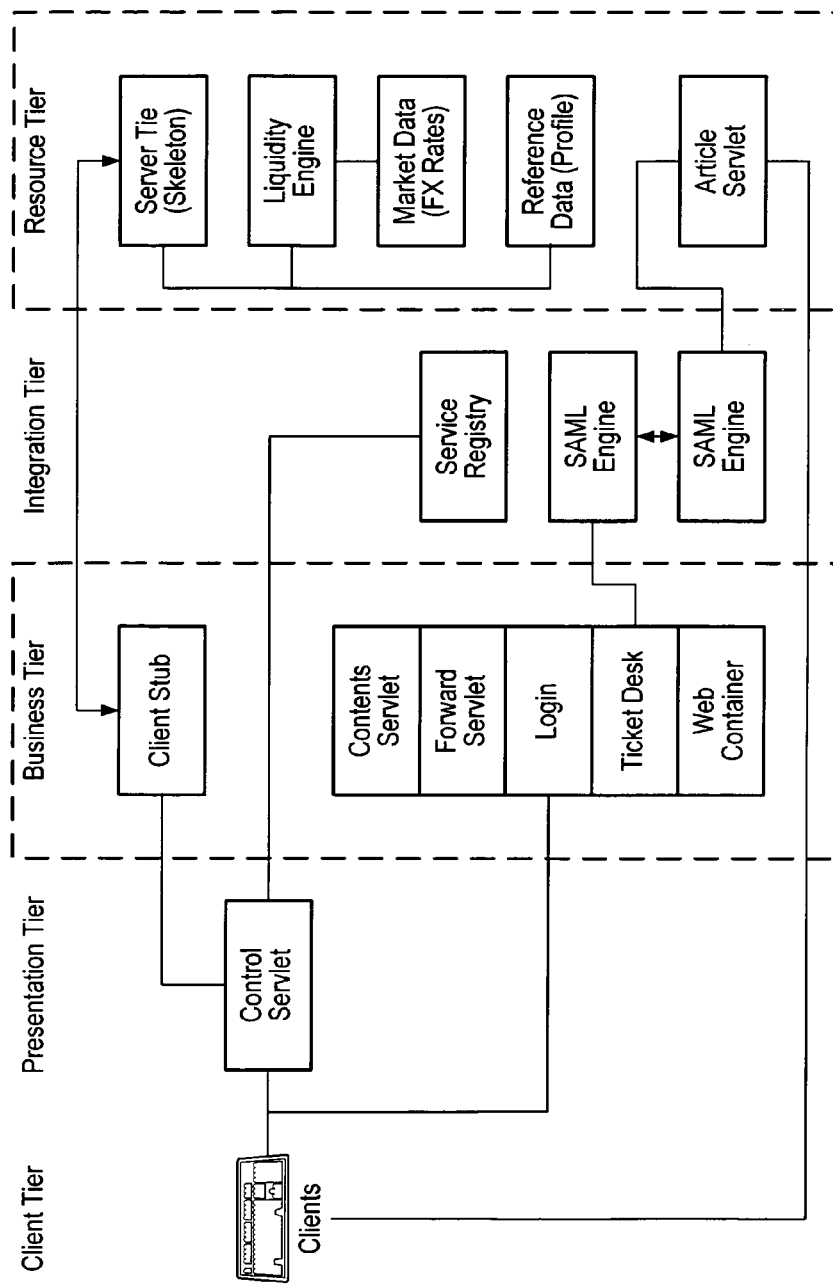
FIG. 109 illustrates an exemplary logical architecture for a FX Spot Rate Quote Service according to one embodiment.

FIG. 109 illustrates an exemplary logical architecture for a FX Spot Rate Quote Service according to one embodiment. Based on the Use Case scenarios (e.g. as illustrated in FIG. 106), logical components including one or more of, but not limited to, the following may be determined using the Tomcat Application Server platform:

Controller—User interface for Clients to perform Single Sign-on, and specify the Sell and Buy Currency codes to request an FX Spot Rate Quote.

Single Sign-On Components—These Single Sign-on components may be derived, for example, from Netegrity's jSAML Toolkit. These include Login Servlet, Contents Servlet, Forward Servlet, Ticket Desk, Article Servlet, and the SAML engine on the Service Provider's side.

Service Registry—This may be similar to the UDDI Service Registry that comes with the Java Web Services Developer Pack. It is preferably UDDI 2.0—compliant.

Web Container—In this example, the run-time Web Services engine is Apache Tomcat Application Server 4.1.2 and supports JSP and servlets.

Remote Web Services—These remote Web Services may be similar to different back-end systems, including Liquidity Engine (an FX deal system that handles request for quote, deal order management, and so forth), Market Data server (which takes in FX feeds from the Stock Exchange), and Reference Data (such as a currency code description). These systems may reside on a legacy mainframe or alternatively may be remotely hosted by another Service Provider. The Control Servlet takes in a client request and invokes a remote Web Service (via Server Tie or Skeleton) using the Client Stub.

Article Servlet—This module handles forwarding the partner service Web page to the Client upon successful Single Sign-on.

FIG. 110 illustrates an exemplary Quality of Services analysis according to one embodiment. The Quality of Service matrix in FIG. 110 denotes an analysis of different logical components, how they provide scalability, reliability, and availability, and how they may be extended in the future. Although this is a small-scale exemplary sample, it illustrates the "ilities" aspects of the Case Study architecture.

The different platform layers refer to different layers of the software stack, from Hardware Platform Layer (for example, hardware and storage), Lower Platform Layer (for example, Operating System), Upper Platform Layer (for example, Application Server), Virtual Platform Layer (for example, middleware) to Application Platform Layer (for example, business applications). The different tiers refer to different components that may be categorized by the physical boundaries of hardware and software products, from Client Tier (for example, Web browser), Presentation Tier (for example, Web Server), Business Tier (for example, EJBs), Integration Tier (for example, messaging services) to Resource Tier (for example, database).

Design Items

There are design items that may be addressed in the technical design. These design items may be applicable to any major Web Services development.

Security—should HTTPS with SSL only be used, or a mixture of HTTPS and WS-Security? Should hardware SSL Accelerator be used to enhance encryption and decryption performance? It may be preferable to use HTTPS and WS-Security together. In production, it may be preferable to use hardware SSL accelerator to enhance encryption and decryption performance.

Single Sign-on Approach—assuming SAML (or Liberty's Single Sign-on specification using extended SAML) is adopted to implement Single Signon, should the approach of Federated Directory Server with Liberty-compliant agents (off-the-shelf components) be used, or alternatively should Netegrity's jSAML-like toolkit be used to build home-grown components? Liberty is a security specification defined by multiple technology vendors and industry communities to enable federated identity management and cross-domain Single Sign-on. It extends the existing SAML specification for Single Sign-on integration with Directory Servers. Sun ONE Identity Server 6.0 is an exemplary commercial implementation that supports both SAML and Liberty functionality.

Application Tooling—what kind of application tooling may be necessary for successful Web Services development? When are Application Server Analyzer, Java Unit Testing tool, Web Services Stress Testing tool, or TCP/IP monitor used for Web Services?

XML Messaging Standards—should industry-specific XML messages such as fpML be used, even though the remote Web Services engine may be using a proprietary XML message structure? Should XSLT (XML stylesheet processor) be used to transcode from a proprietary XML message structure to an industry-specific XML message structure? As this example does not require FX deal-order processing, industry-specific XML messages such as fpML may not be required. If both industry-specific and proprietary XML messages are used, it may be preferable to customize XSLT to handle the transcoding.

Private Label Customization—when and where should the customization components be designed and implemented, for example for implementing Private Label customers? Should different Control Servlets be duplicated for each Private Label customer or should XML stylesheets be used?

Use of DOM/SAX Versus JAXP—for simple programs, should DOM or SAX directly be used, or should JAXP be used all through for consistency and portability purposes? JAXP is preferable for portability.

Interoperability With External Systems—what Web Services functionality should be exposed? This may be a matter of coarse-grained versus fine-grained Web Services design. The design considerations for coarse-grained or fine-grained Web Services design may include the number of APIs to be maintained and the extensibility and flexibility when developers need to modify the data structure or interfaces.

Technology Applied

Open Standards technologies JAX-RPC, JAXR, and WS-Security using Java Web Services Developer Pack and TSIK are illustrated in this example. These technologies are also supplemented by a Single Sign-on technology built on top of jSAML Toolkit. Note that other technologies may be used in other embodiments.

Design Patterns Applied

In this example, two Design Patterns are applied: Model-View-Controller Pattern (J2EE Design Pattern) and Service Consolidation-Broker Integration Pattern (B2Bi Pattern). The former denotes that the Control Servlet acts as a Controller (Presentation Tier) for the Model (business logic) and different Views (data sources or remote Web Services). It provides a cleaner approach to decouple the business logic and data from the presentation. The latter denotes a typical Web Services deployment scenario where a Service Broker needs to consolidate and aggregate information from multiple data sources (or remote Web Services).

Single Sign-on Case Study Design

Figure 111:
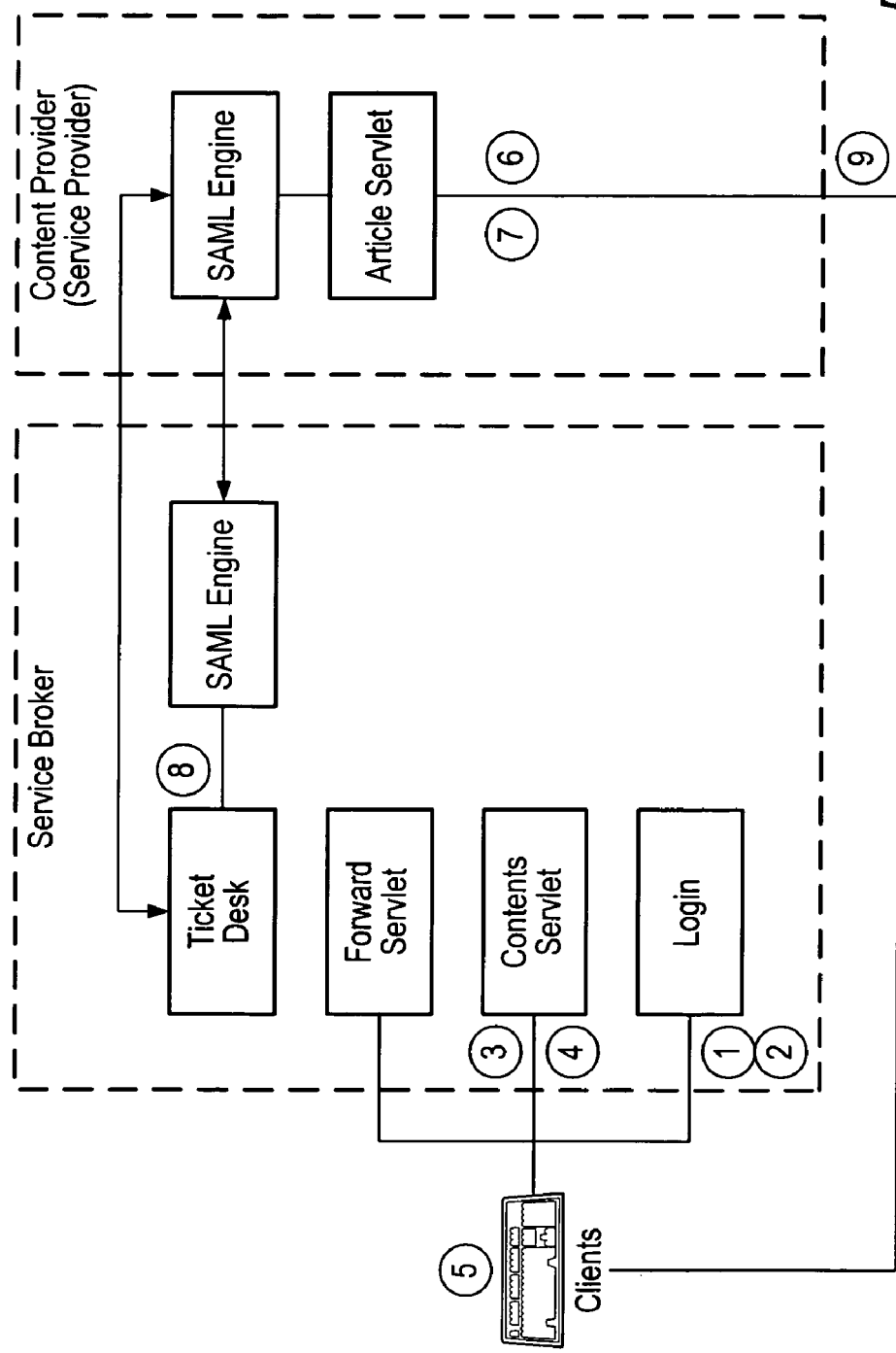
FIG. 111 illustrates the interaction Between Single Sign-on Components according to one embodiment.

FIG. 111 illustrates the interaction Between Single Sign-on Components according to one embodiment. The components may work together to provide one or more of, but not limited to:

Login—The Login.jsp accepts the Client's user ID and password for performing Single Sign-on. The Single Sign-on Servlet may generate a one-time session ID and display in the URL (functioning as the parameter for the next servlet).

Contents Servlet—The Contents Servlet generates a list of contents URLs (partner Web sites) as the menu page where the Client can choose to access.

Forward Servlet—The Forward Servlet forwards the Client to the target partner Web site URL once the SAML Assertion request is processed successfully and sufficient access rights are validated.

Ticket Desk—The Ticket Desk handles each SAML Assertion as a request ticket for each partner Web site access. It sends the SAML Assertion request to the Article Servlet of the target Web site for processing.

SAML Engine—The SAML APIs that handle SAML Assertion requests and respond to the Client requester.

Article Servlet—This module handles forwarding the partner service Web site page to the Client upon successful Single Sign-on.

Figure 112:
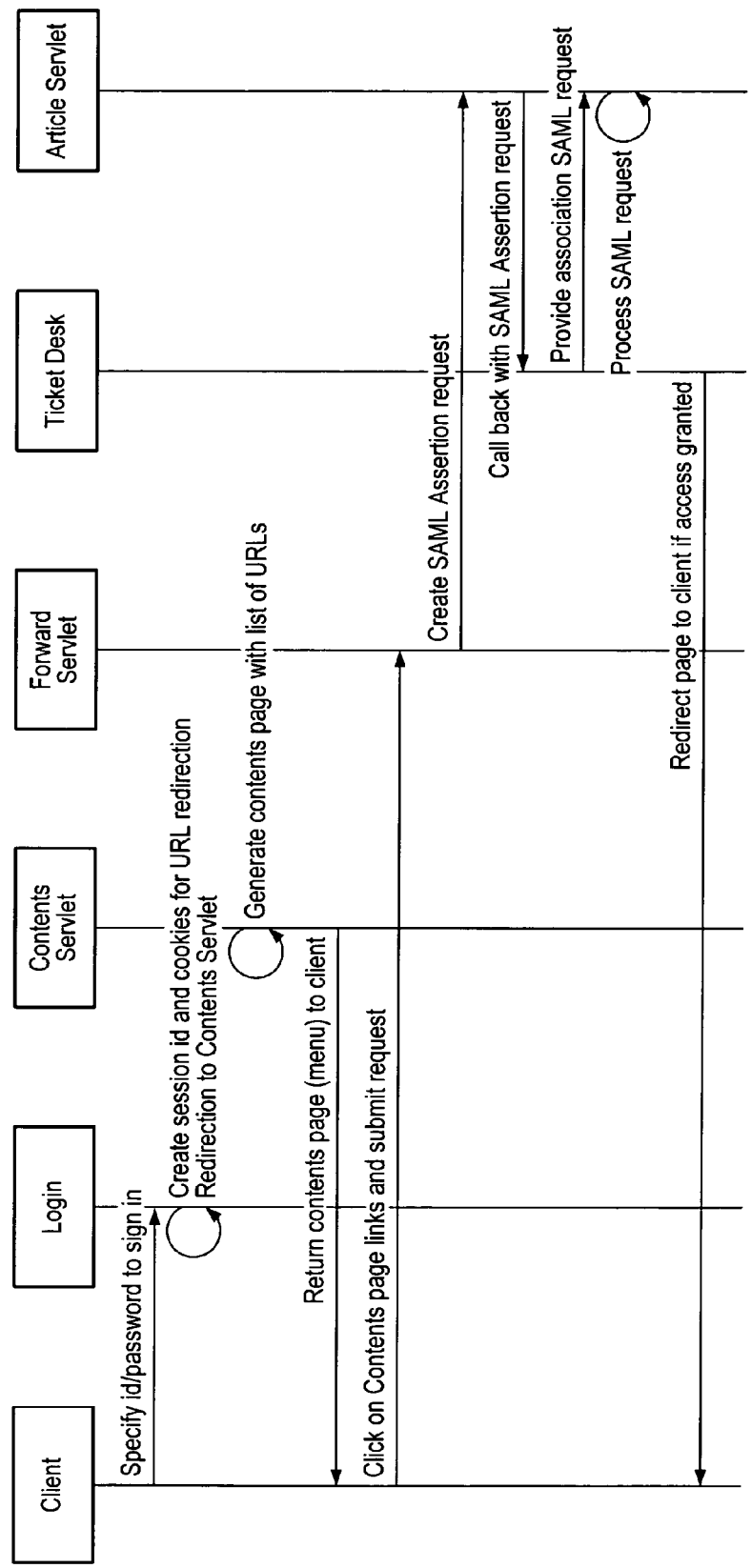
FIG. 112 illustrates an exemplary Sequence Diagram for the Single Sign-on Process according to one embodiment.

FIG. 112 illustrates an exemplary Sequence Diagram for the Single Sign-on Process according to one embodiment. The sequence diagram in FIG. 112 further depicts the detailed process between the Client and different components of the Single Sign-on process in FIG. 111. This may include, but is not limited to:

1. The Client enters user ID and password to sign on.
2. The Login process creates a one-time session ID and cookie. It redirects the Client to a login page and pass control to the Contents Servlet.
3. The Contents Servlet generates a contents page (menu page) with a list of partner Web site URLs.
4. The Contents Servlet returns the newly generated contents page to the Client.
5. The Client clicks on the contents page links and submits request.
6. The Forward Servlet creates an SAML Assertion request and sends it to the Article Servlet.
7. The Article Servlet makes a callback to the Ticket Desk with the SAML Assertion request. This ensures the appropriate trading partner has received and acknowledged the request.
8. The Ticket Desk provides the associated SAML Assertion request again to the Article Servlet.
9. The Article Servlet processes the SAML Assertion request and redirects the target partner Web site page to the Client if access is granted.

FX Quote Service Case Study Design

Figure 113:
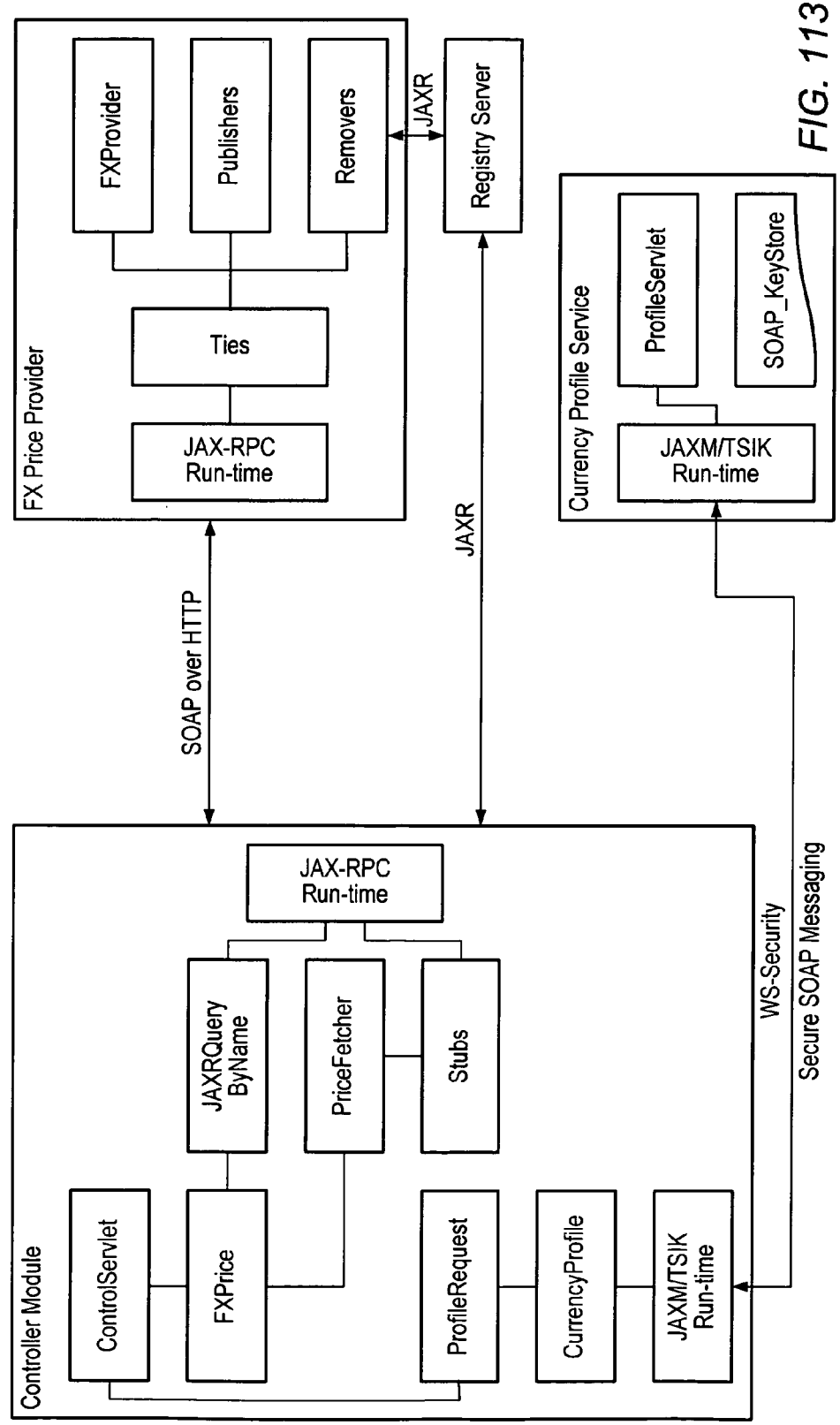
FIG. 113 illustrates exemplary FX Quote Web Services components according to one embodiment.
Figure 114:
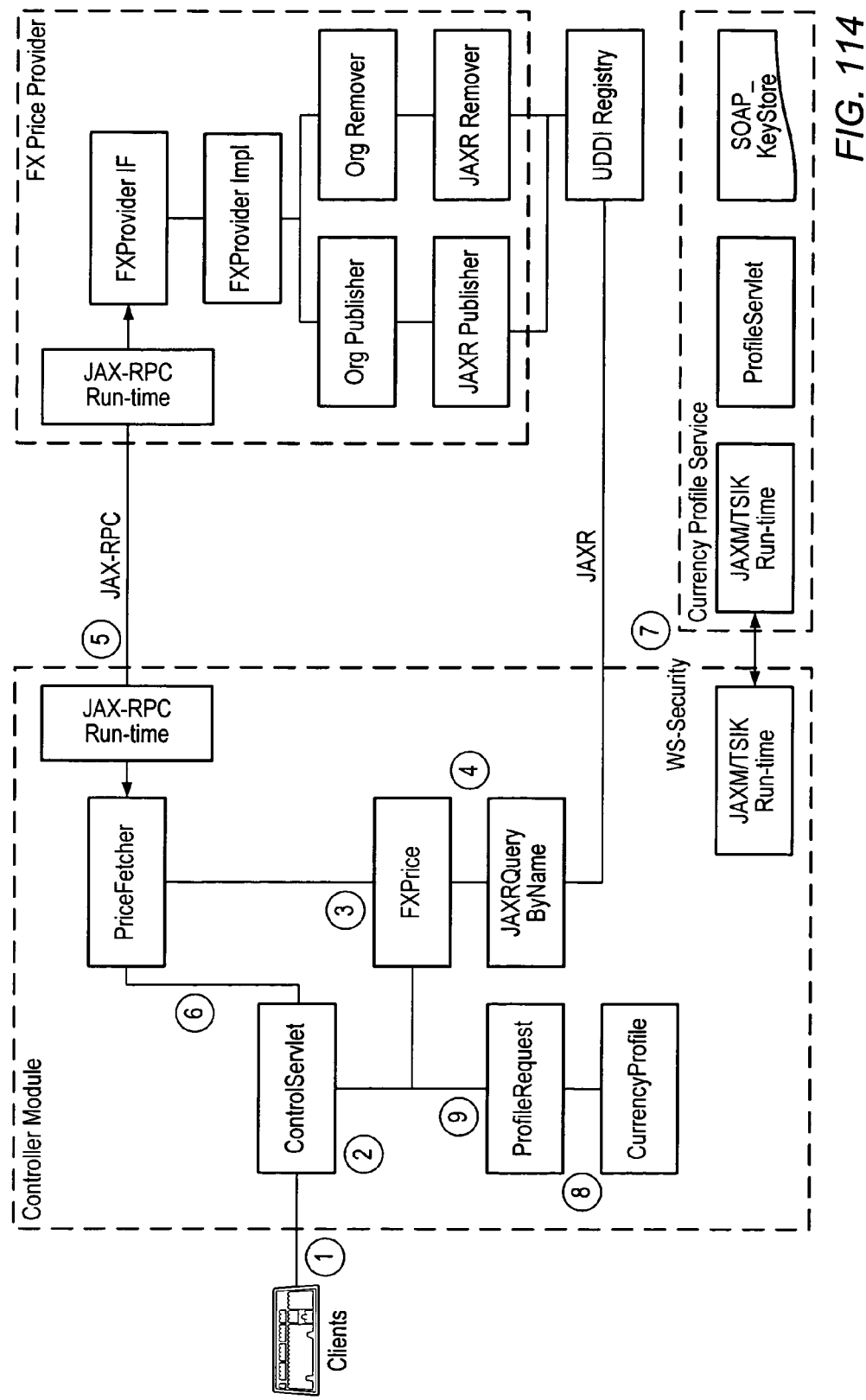
FIG. 114 illustrates the interaction Between FX Quote Service Components according to one embodiment.
Figure 115:
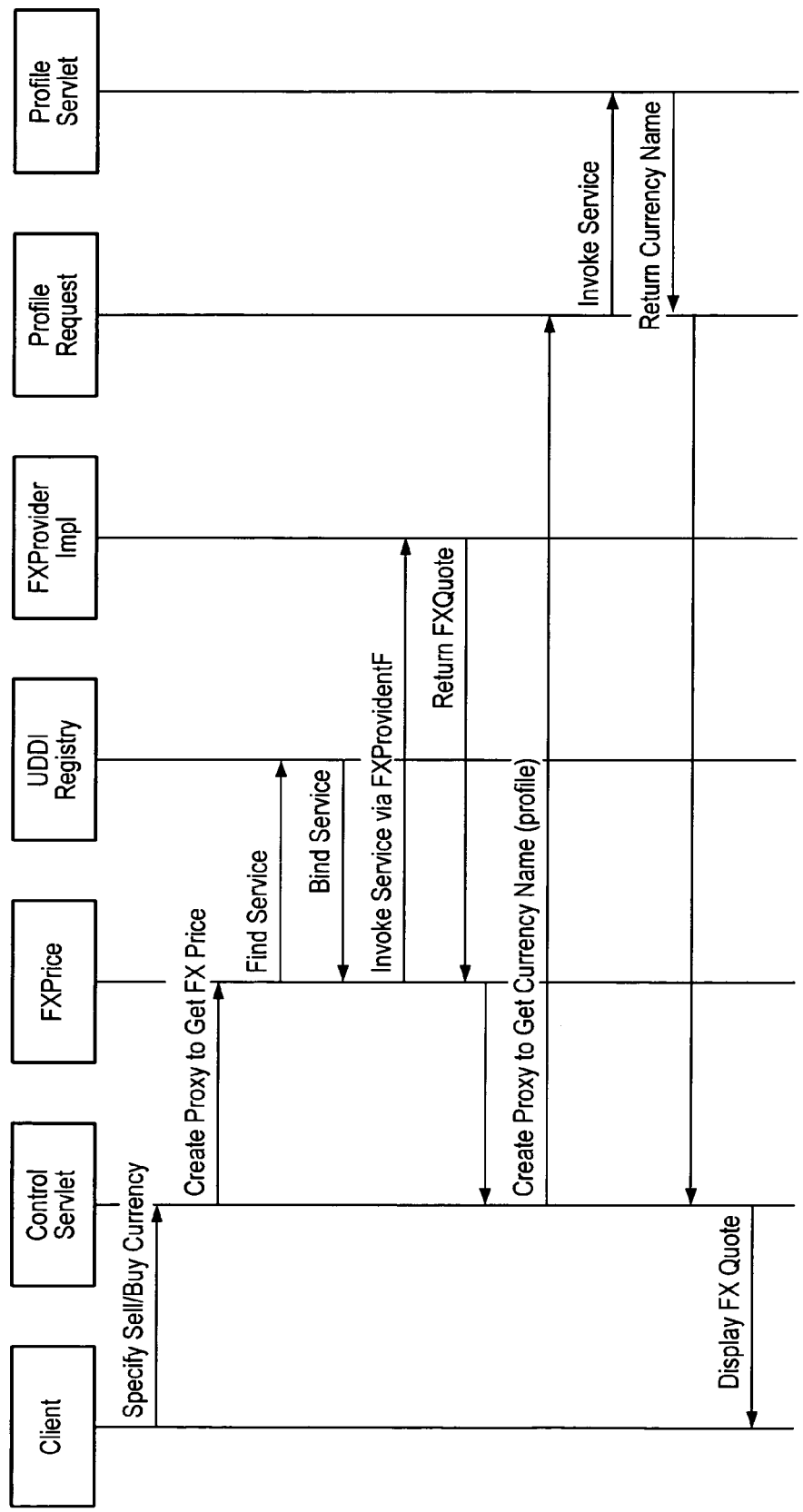
FIG. 115 is an exemplary Sequence Diagram for Request for FX Spot Rate Quote Process according to one embodiment.

FIGS. 113, 114, and 115 depict the detailed process(es) between the Client and different components of the Request for FX Spot Rate Quote process. FIG. 113 illustrates exemplary FX Quote Web Services components according to one embodiment. Components that preferably work together to provide FX Quote Service capability may include one or more of, but are not limited to:

Control Servlet—The Control Servlet acts as the Presentation Tier for user interaction to request an FX Spot Rate Quote.

Price Fetcher The Price Fetcher sets the properties of the remote service endpoint and operation name, and gets ready to invoke the remote FX Spot Rate Quote Service.

FXPrice—The FXPrice finds or discovers existing Request for FX Spot Rate Quote Services from the UDDI Service Registry.

JAXRQueryByName—A function to query the UDDI Service Registry by name.

ProfileRequest—The ProfileRequest implements how to retrieve the currency name with a given currency code.

CurrencyProfile—This is the service call to ProfileRequest.

FXProviderIF—This is the interface file to FXProviderImpl.

FXProviderImpl—This is the implementation for the FXProvider, which creates a Web Services call to a remote Service Provider for a FX Spot Rate Quote.

OrgPublisher—This is a utility to publish the organization information into the UDDI Service Registry.

OrgRemover—This is a utility to remove the organization information from the UDDI Service Registry.

JAXRPublisher—This is the utility to invoke a JAXR publish API.

JAXRRemover—This is the utility to invoke a JAXR remove API.

ProfileServlet—The ProfileServlet parses the SOAP request (stored in the file "request.xml") using the JAXM/TSIK Message Provider.

SOAP_KeyStore—This is the key store (storing user credentials) used by TSIK Message Provider for secure SOAP messaging (for example, XML Encryption and XML digital signature).

JAX-RPC Run time—This is the stub or tie (skeleton) to support JAX-RPC.

JAXM/TSIK Run time—This is the TSIK API (stub or tie/skeleton) to support JAXM/TSIK secure SOAP messaging.

FIG. 114 illustrates the interaction Between FX Quote Service Components according to one embodiment. FIG. 115 is an exemplary Sequence Diagram for Request for FX Spot Rate Quote Process according to one embodiment. In FIGS. 114 and 115:

1. The Client specifies the Sell and Buy Currency using 3-letter ISO currency codes.
2. The Control Servlet creates a proxy to get an FX price based on the cross-currency pair.
3. The FX Price looks up the UDDI registry to locate the remote FX Spot Rate Quote Web Services Service Provider.
4. Once the remote Web Service is found, the FX Price binds the service with the service endpoint URL.
5. The FX Price invokes the remote Web Service via FXProviderIF.
6. The FXProviderIF uses FXProviderImpl to invoke the remote FX Spot Rate Quote Service. FXProviderImpl fetches the spot rate from the remote Service Provider and returns it to the FXPrice via JAX-RPC. The FXPrice returns the Spot Rate Quote to the Control Servlet.
7. The Control Servlet creates a proxy to look up the Buy Currency name from CurrencyProfile via ProfileRequest.
8. The Profile Request looks up the currency name using Profile Servlet via JAXM with TSIK secure message provider.
9. The ProfileServlet returns the currency name in a text to Profile Request, then to the Control Servlet. The Control Servlet displays the FX quote and the currency name to the Client.

Physical Architecture

Figure 116:
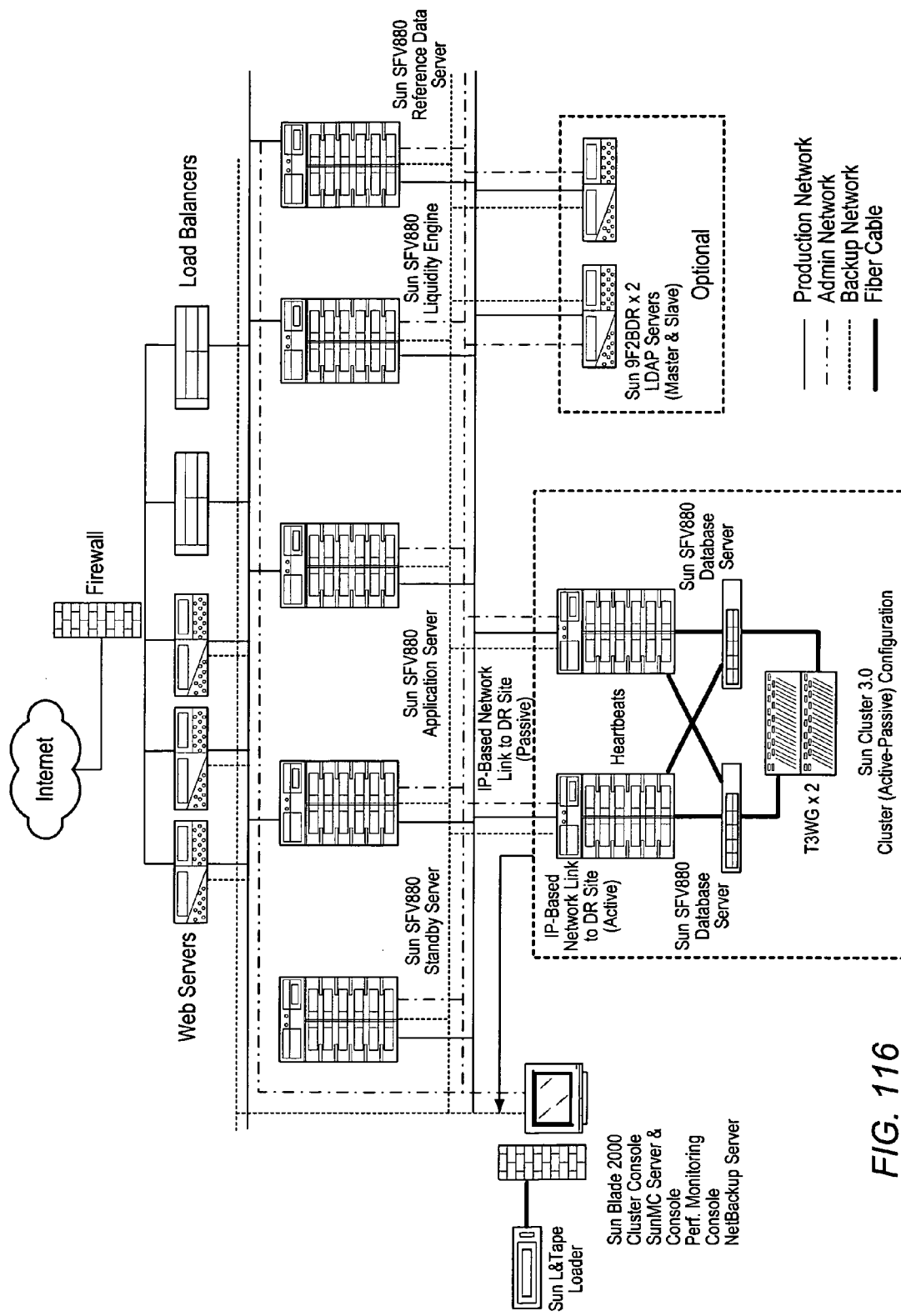
FIG. 116 is an exemplary physical architecture diagram according to one embodiment.

Based on the logical architecture depicted in FIGS. 109 and 113, a physical architecture may be derived that is ready for deployment based on the Service-Level Requirements. Assuming transaction processing requirements of handling 300,000 Request for Quotes per day and the need to support 24×7×365 high-availability requirements, the following exemplary physical architecture may be preferable, though other physical architectures may be used:

Two load balancers for handling HTTP traffic
Three Web Services (FX Spot Rate Quote Service, reference data or profile retrieval, and UDDI discovery service) to handle HTTP requests from client browsers
Two instances of Application Servers to host the business logic to support High Availability
Two instances of Reference Data servers to host the common trade reference data to support High Availability
Two instances of Database Servers using Sun Cluster to host all FX trade transactions to support High Availability
Two optional servers in the future to host the Directory Servers and Service Registry FIG. 116 is an exemplary physical architecture diagram according to one embodiment. Note that this diagram may not trace back to the Service Level Requirements. In practice, a hardware sizing exercise may be preferably conducted to analyze the data requirements, transaction volumes, and application resource requirements before the physical architecture is derived. In addition, the hardware sizing preferably traces back to the Special Requirements (which is Service-Level Requirements) in the Use Cases.

Deployment Architecture

The logical and physical architecture diagrams depicted in FIGS. 109, 113, and 116 refer to the Use Case based on a simplified exemplary scenario. If the exemplary system is to extend to a full-scale production scenario, other enterprise components may be preferably included to support 24×7×365 non-stop services.

Figure 117:
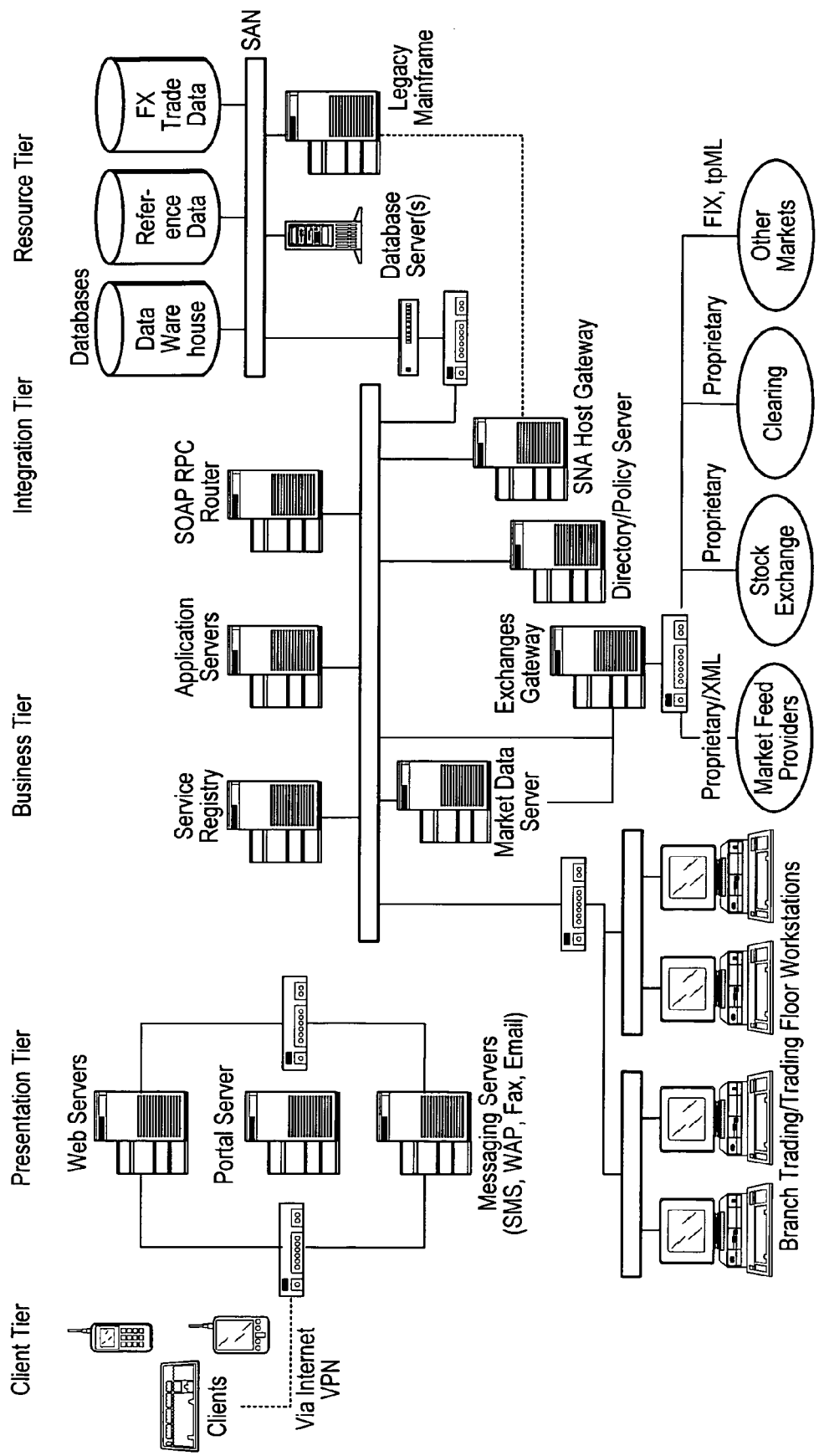
FIG. 117 illustrates an exemplary deployment architecture according to one embodiment.

FIG. 117 illustrates an exemplary deployment architecture according to one embodiment. The exemplary deployment architecture in FIG. 117 shows a possible deployment when the exemplary system is extended and integrated in a typical financial institution's Enterprise Architecture, where there may be different delivery channels supporting, for example, SMS, WAP phone, Fax and email, and interfaces with the external parties, such as the Stock Exchange and Market Data feed providers. The integration of the Web Services components may be handled either by a public or private Service Registry and a SOAP RPC Router.

Generating a Vendor-independent Web Service Architecture

Figure 118:
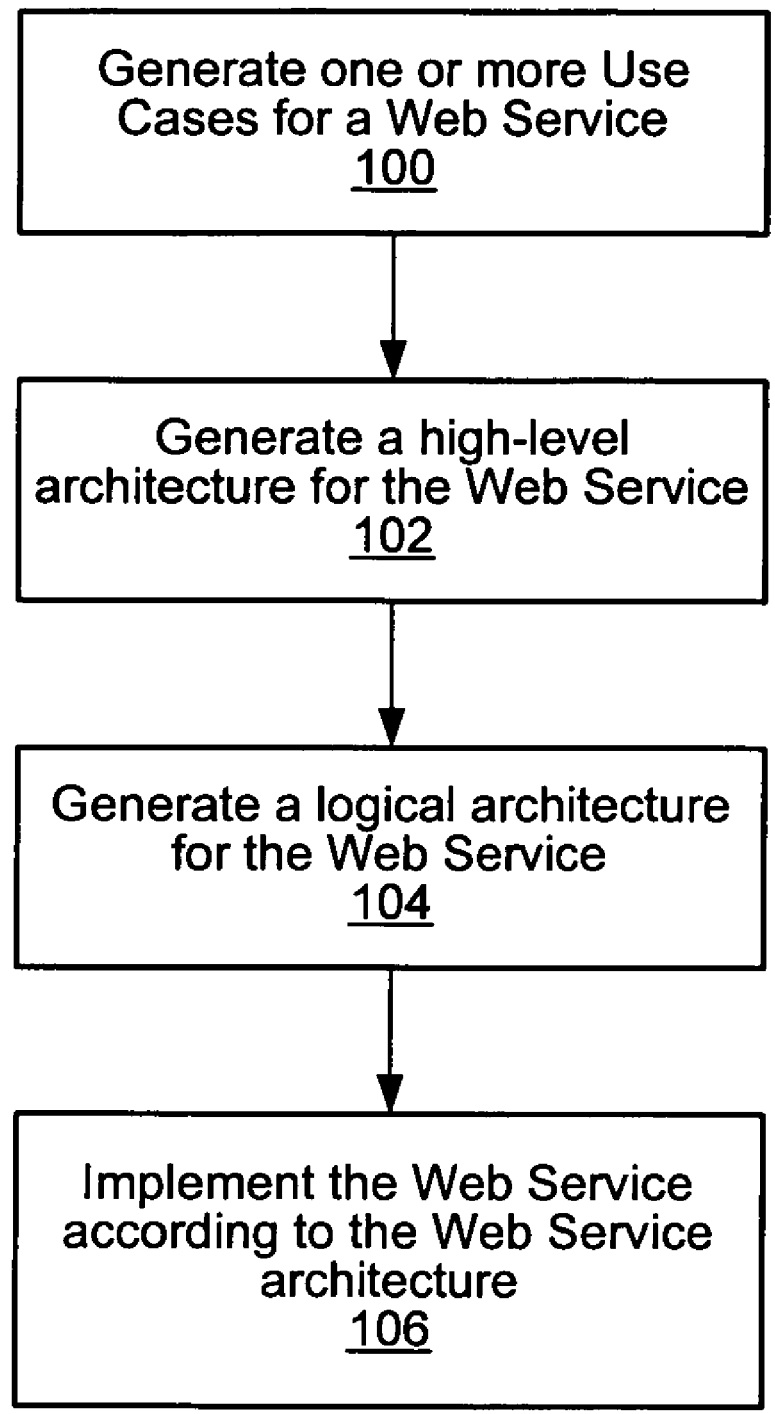
FIG. 118 is a flowchart of a method for generating a vendor-independent Web Service architecture including a plurality of heterogeneous components in accordance with one or more design patterns according to one embodiment.

FIG. 118 is a flowchart of a method for generating a vendor-independent Web Service architecture including a plurality of heterogeneous components in accordance with one or more design patterns according to one embodiment. As indicated at 100, one or more Use Cases for the Web Service may be generated. As indicated at 102, a high-level architecture for the Web Service may be generated. The high-level architecture may identify two or more entities of the Web Service and the relationships and interactions among the entities.

As indicated at 104, a logical architecture for the Web Service may be generated according to the use case scenarios. The logical architecture may identify two or more logical components of the Web Service and the relationship among the logical components. In one embodiment, generating a high-level architecture for the Web Service may include identifying one or more Open Standards protocols for use in the interactions among the entities. In one embodiment, the logical architecture may include two or more layers. The layers of the logical architecture may include one or more of, but are not limited to:

a network layer configured to serve as an underlying network for services (e.g. public Internet over TCP/IP);
a transport layer for delivering messages between components of the Web Service (e.g. HTTP, SMTP, or SOAP over HTTP);
a service description language layer configured to describe service type and functionality of the services of the service provider;
a transaction routing layer configured to route messages on the transport layer;
a service discovery layer configured to search for and locate services;
a service negotiation layer configured to negotiate exchanges between the service requesters and the service provider;
a management layer configured for provisioning of the services and for monitoring and administration of the services;
a Quality of Service layer configured to provide reliability, scalability, and availability on the Web Service;
a security layer configured to provide authentication, entitlement, and non-repudiation security on the transport layer; and
an Open Standards layer (e.g. XML)

One or more design patterns may be applied during the generation of the Web Services architecture. In one embodiment, the design patterns may include, but are not limited to, one or more Quality of Services design patterns; one or more Integration design patterns, and one or more Security design patterns. Quality of Services design patterns may include one or more of, but are not limited to:
- a SOAP Cache Design Pattern;
- a Java Message Service (JMS) Bridge Design Pattern;
- a Multiple Servlet Engines Design Pattern;
- an HTTP Load Balancer Design Pattern;
- a State Management Design Pattern;
- a SOAP Logger Design Pattern;
- a High Availability of Service Registry Design Pattern;
- a UDDI Deployment Design Pattern;
- a Publish, Unpublish, and Discover Web Services Design Pattern;
- a Version Management of Deployment and Service Registry Design Pattern; and
- a Registry Content Management Design Pattern.

Integration design patterns may include one or more of, but are not limited to:
- an Application-to-Application Design Pattern;
- a Standard Build Design Pattern;
- a Hub-Spoke Replication Design Pattern;
- a Federated Replication Design Pattern;
- a Multi-Step Application Integration Design Pattern;
- a Data Exchange Design Pattern;
- a Closed Process Integration Design Pattern;
- an Open Process Integration Design Pattern;
- a Service Consolidation-Broker Integration design pattern; and
- a Reverse Auction-Broker Integration design pattern.

Security design patterns may include one or more of, but are not limited to: a Single Sign-on Design Pattern and a Messaging Transport Design Pattern.

As indicated at 106, the Web Service may then be implemented according to the Web Service architecture. The Web Service architecture preferably incorporates Quality of Services including reliability, scalability, and availability on the Web Service system.

In one embodiment, the Web Service includes a service provider configured to provide one or more services and one or more service requesters configured to access the one or more services from the service provider via a network. In one embodiment, the Web Service includes a service broker configured to interact with the service provider and service requester to negotiate and provide the services of the service provider to the service requester. In one embodiment, the service provider may act as a service broker. One embodiment may include a service registry. The service provider may be configured to register and publish the services in the service registry, and the service requester may be configured to discover the service provider through the service registry.

In one embodiment, the Web Service is a Business-to-Consumer Web Service, the service provider is a business service provider, and the service requester is an end user. In one embodiment, the Web Service is a Business-to-Business Web Service, the service provider is a business service provider, and the service requester is a server.

Web Services Structured Methodology

Figure 119:
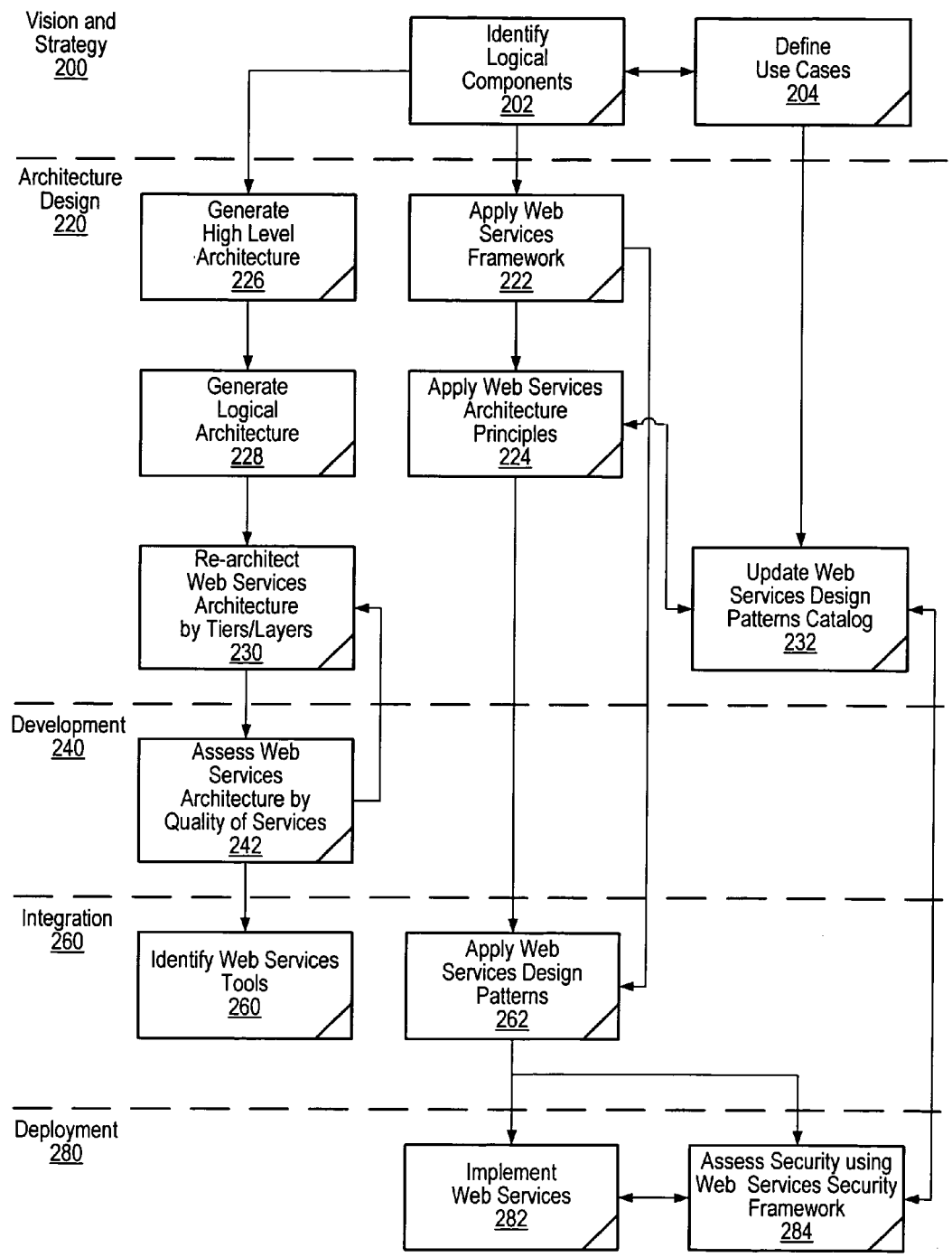
FIG. 119 is a flow diagram illustrating lifecycles of the structured methodology design process, processes within the lifecycles, and the flow through the lifecycles according to one embodiment.

This section summarizes embodiments of a structured methodology for designing and implementing Web Services described throughout this document. FIG. 119 is a flow diagram illustrating lifecycles of the structured methodology design process, processes within the lifecycles, and the flow through the lifecycles according to one embodiment. Lifecycles of the Web Services design process may include one or more of, but are not limited to: vision and strategy 200, architecture design 220, development, 240, integration 260, and deployment 280 lifecycles. In this embodiment, the design process may start with an Identify Logical Components 202 and Define Use Cases 204 process. These are design processes in the vision and strategy 200 Web Services life cycle. In the Define Use Cases 202 process, architects may collect user requirements and technical requirements, and encapsulate them into use case requirements using Use Case modeling techniques. In the Identify Logical Components 204 process, architects may translate these requirements into logical components of Web Services.

In the Architecture Design 220 life cycle, architects may apply the Web Services architecture framework 222, apply Web Services architecture principles 224, define high-level architecture 226, generate logical architecture 228, map the logical components to the meta-architecture framework, and decompose by tiers and layers 230. If there are new design experience lessons learned, architects may update a Web Services design pattern catalog 232. The design pattern catalog may be a collection of Web Services-specific patterns.

In the Development life cycle 240, after completion of software code development, architects may assess the architecture's quality of services 242 by examining each tier and layer using the Web Services quality of services tiers versus layers matrix (refer to FIG. 64). This is a systematic checklist that may be used to examine whether the design is sufficient and viable. If not, the architects may re-architect or re-engineer the specific Web Services components to meet the target quality of services.

In the Integration life cycle 260, architects may identify additional Web Services tools that may be used to complete or enhance the integration as indicated at 262. Tools may include one or more of, but are not limited to: integration testing tools, Web Services application integration tools. For Web Services design and development, some software code development tools may not be sufficient or may be out of scope. Architects may also apply integration Web Services design patterns wherever appropriate, as indicated at 262. Integration design patterns may be specific to the integration between Web Services components, and not to development or deployment.

The Deployment life cycle 280 may include, but is not limited to: implementing Web Services 282 and assessing security using a Web Services security framework 284 as previously described herein. In implementation 282, architects may deploy the tested and integrated Web Services components for production. In assessing security 284, architects preferably ask a third party (e.g., an external service company or an independent group other than the developers) to assess the security of the deployed Web Service. The Web Services security framework, described above, includes a separate methodology to ensure reliability and availability.

Figure 120:
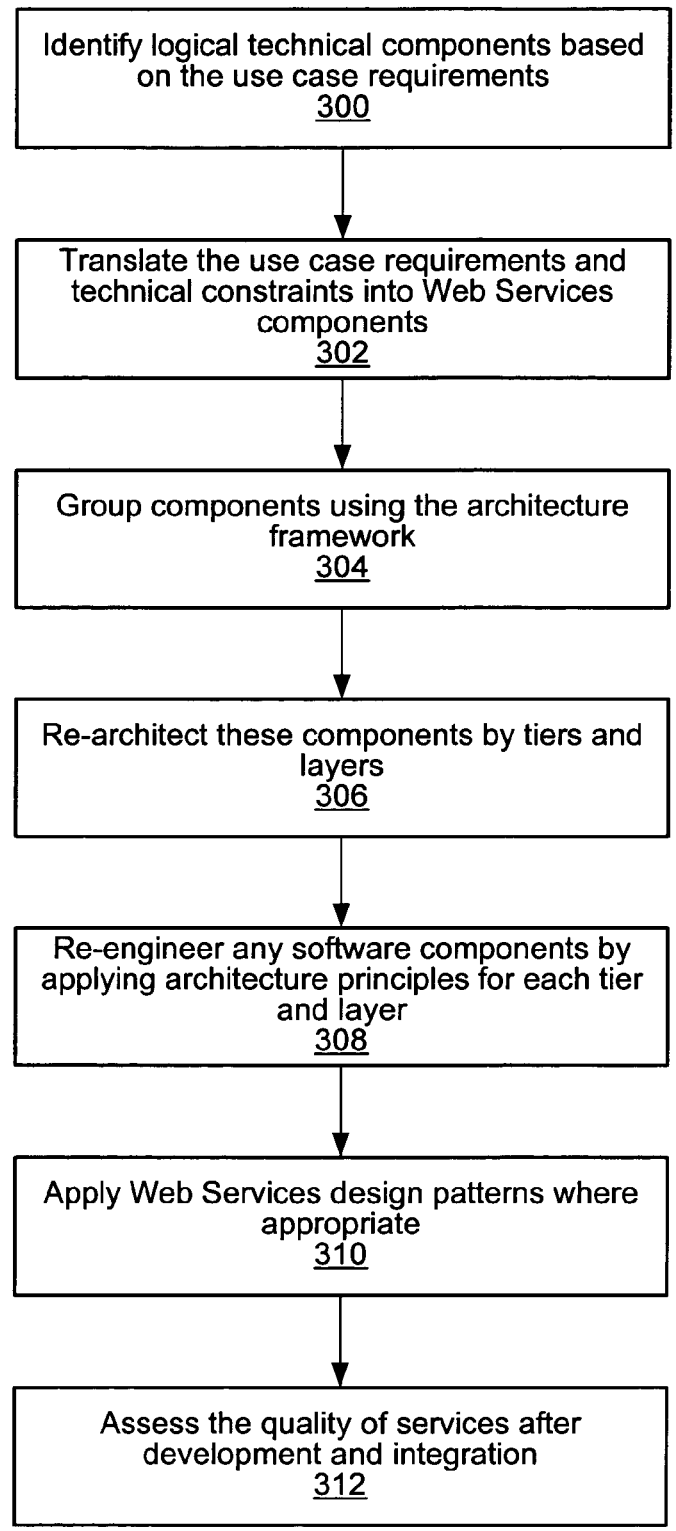
FIG. 120 is a flowchart of a structured methodology design process for Web Services according to one embodiment.

FIG. 120 is a flowchart of a structured methodology design process for Web Services according to one embodiment. As indicated at 300, logical technical components may be identified based on the use case requirements. As indicated at 302, the use case requirements and technical constraints may be translated into Web Services components (modules, objects, etc.). As indicated at 304, these components may be grouped or categorized using the architecture framework, e.g. the components may be collapsed into service delivery, service management, identity/policy, and services. As indicated at 306, the components may be re-architectured or organized by tiers and layers, so that each Web Service component is preferably easily scaled up or down and highly available in production quality. As indicated at 308, one or more software components may be re-engineered or modified by applying architecture principles for each tier and layer. As indicated at 310, Web Services design patterns may be applied wherever appropriate. As indicated at 312, the quality of services may be assessed after development and integration.

By applying embodiments of the structured methodology, architects are preferably able to derive reference architecture or implementation infrastructure for Web Services applications, and to maintain a customized Web Services design pattern catalog, based on past implementation experience and/or known design patterns. Note that the reinforcement of applying the Web Services-specific architecture principles and architecture framework, and retrofitting to the design patterns catalog may be critical to the success of the structured methodology. Thus, embodiments may be preferably implemented as a feedback system that makes the structured methodology dynamic and up-to-date for software re-use.

Web Services Security Assessment Structured Methodology

This section describes embodiments of a system and method for generating a generic, vendor-independent secure Web Services architecture incorporating a Web Services Security Assessment structured methodology and security design patterns for designing and implementing secure Web Services. Note that aspects of the Web Services Security Assessment structured methodology and design patterns are further described throughout this document. This section describes means for applying a Web Services security assessment structured methodology and one or more security design patterns to a Web Service architecture, means for implementing a secure Web Service according to the Web Service architecture, and means for assessing security levels of the secure Web Service implemented according to the Web Service Architecture.

Figure 121:
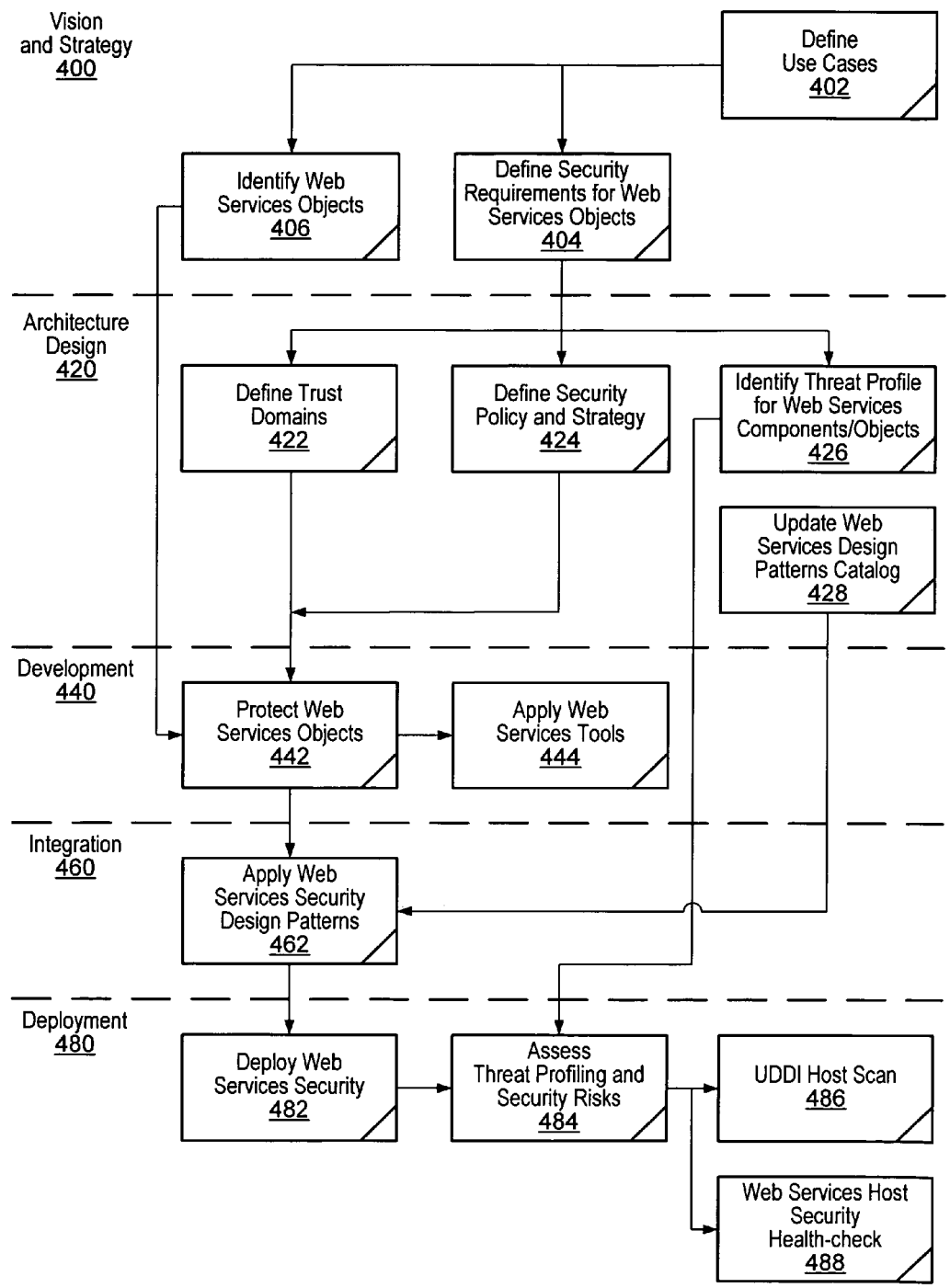

FIG. 121 is a flow diagram illustrating lifecycles of the Web Services Security Assessment structured methodology, processes within the lifecycles, and the flow through the lifecycles according to one embodiment. Lifecycles of the Web Services Security Assessment structured methodology may include one or more of, but are not limited to: vision and strategy 400, architecture design 420, development 440, integration 460, and deployment 480. In one embodiment, the design process may start with a Define Use Cases process 402. This is a design process in the Vision and Strategy Web Services life cycle, and in one embodiment may be similar to the Define Use Cases process previously described for the Web Services structured methodology. In the Define Use Cases process 402, architects may collect user security requirements and technical security requirements, and encapsulate them into use case requirements using Use Case modeling techniques. As a result, architects may identify a set of Web Services objects that need to be protected and secured, and their associated relationship in the context of the deployment infrastructure.

In the Architecture Design life cycle 420, architects may define the trust domains 422 (e.g. which security contexts or machines can be trusted or not trusted), define the security policy 424 (e.g. what should be secured, why and how), and identify the potential security threats 426 (e.g. what threat profile does the Web Services contain, what security risks may the Web Services be exposed to). These are elements to be considered and assessed during the architecture design stage. In other words, the architects preferably have sufficient design elements to protect the Web Services objects based on the user security requirements.

In the Development life cycle 440, architects may develop protection measures or security application codes to protect the Web Services objects and components 442. Refer to FIGS. 105A and 105B for a list of Web Services objects that may be protected. If necessary, architects may apply one or more Web Services security tools as indicated at 444.

In the Integration life cycle 460, architects may apply one or more Web Services security design patterns 462 to integrate different Web Services components together. Some exemplary security patterns were previously described here. Lessons learned may be retrofitted to updating the Web Services security patterns.

In the Deployment life cycle 480, architects may deploy the Web Services infrastructure in accordance with the generated secure Web Services architecture. In one embodiment, architects may ask a third party (e.g. an external service company or an independent group other than the developers) to assess the security of the deployed Web Service. The Web Services security assessment may include one or more of, but is not limited to, a UDDI host scan and Web Services host security health-checking.

Figure 122:
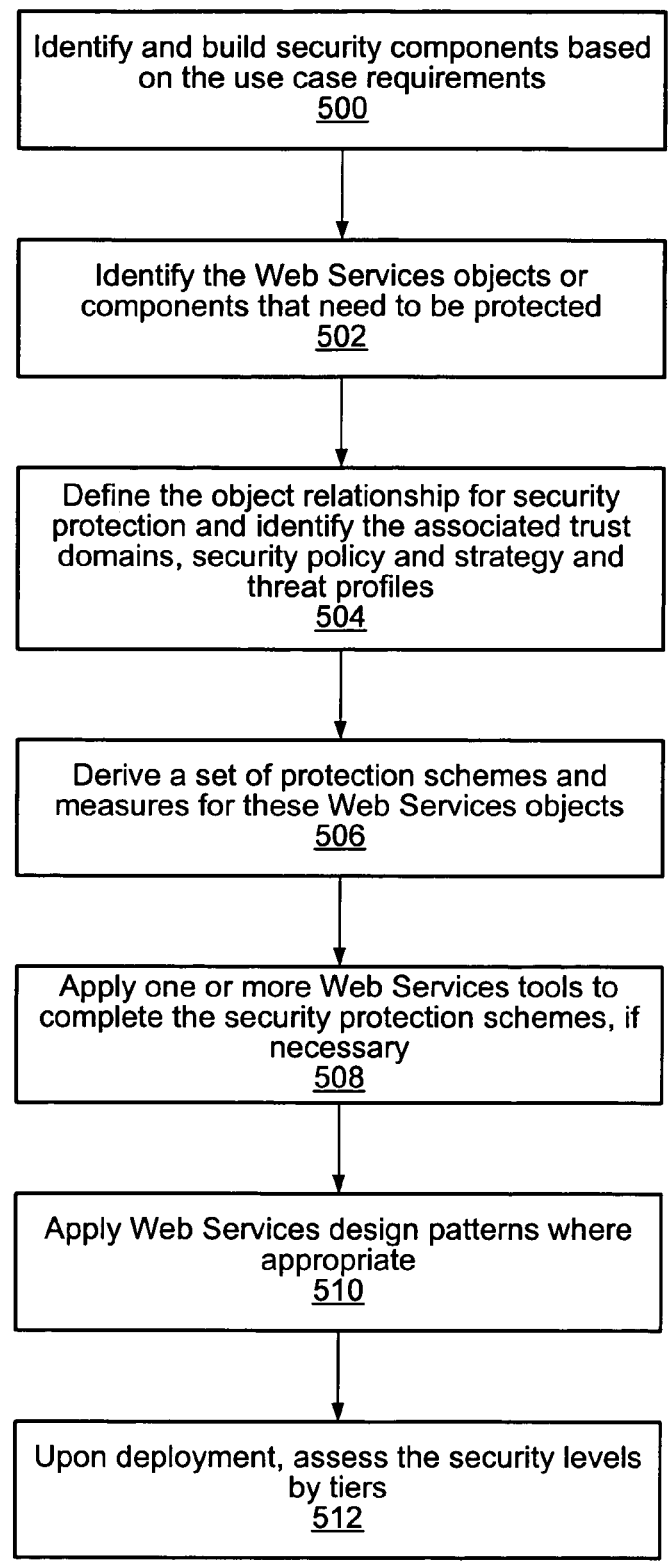

FIG. 122 is a flowchart of a Web Services Security Assessment methodology design process according to one embodiment. As indicated at 500, one or more security components may be identified and implemented based on one or more use case requirements. As indicated at 502, the Web Services objects or components that need to be protected may be identified. As indicated at 504, the object relationship for security protection may be defined, and the associated trust domains, security policy and strategy and threat profiles may be identified. As indicated at 506, a set of protection schemes and measures for these Web Services objects may be derived. As indicated at 508, one or more supporting Web Services (security) tools may be applied to complete the security protection schemes, if necessary. As indicated at 510, Web Services design patterns may be applied wherever appropriate. In some cases, re-architecting or re-engineering may be desired or required. As indicated at 512, upon deployment to production, the security levels may be assessed by tiers, e.g. host scan and host security health checking.

Figure 123:
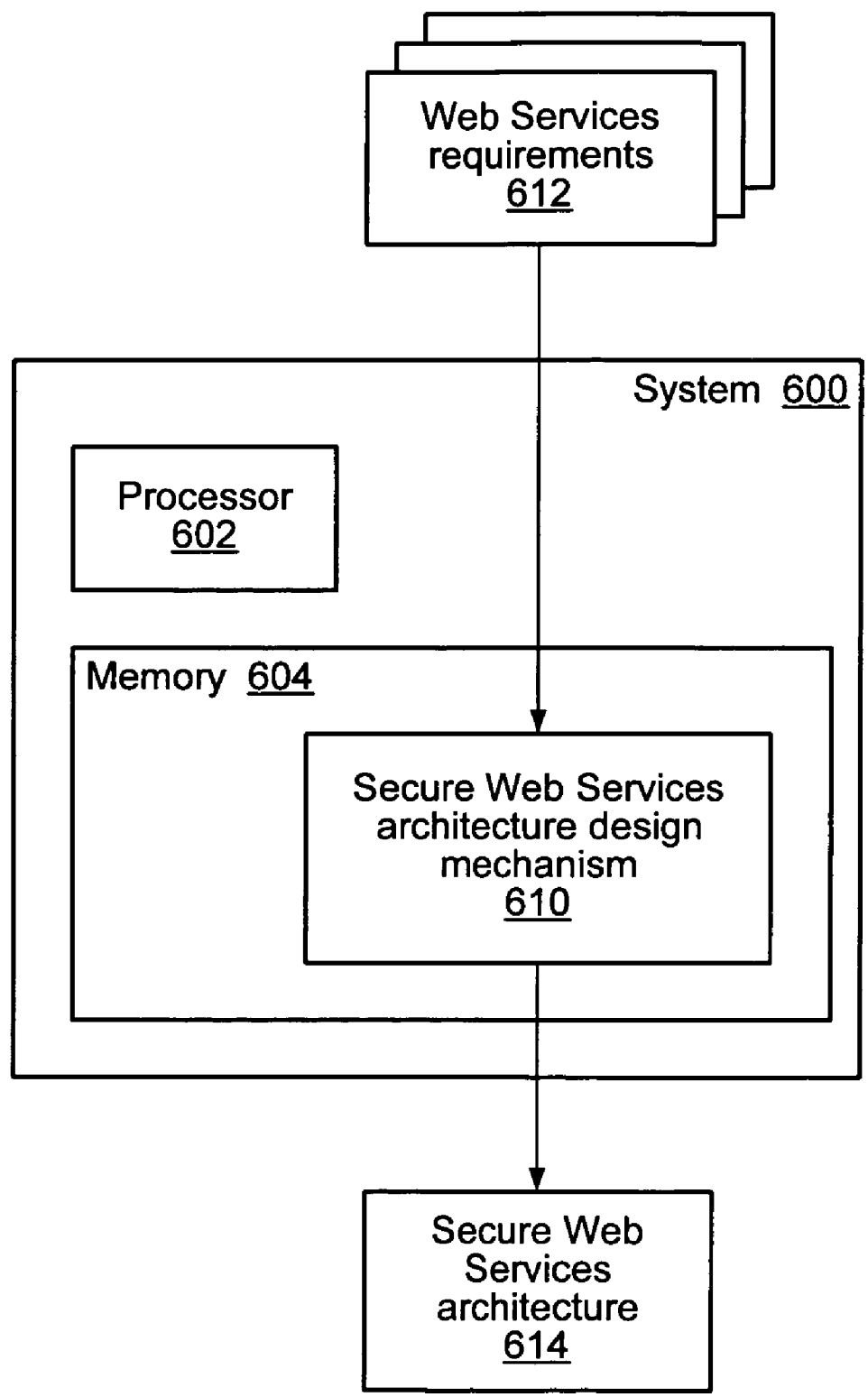

FIG. 123 illustrates a system implementing a Secure Web Services architecture design mechanism according to one embodiment. System 600 may be any of various types of devices, including, but not limited to, a personal computer system, desktop computer, laptop or notebook computer, mainframe computer system, workstation, network computer, or other suitable device. System 600 may include at least one processor 602. The processor 602 may be coupled to a memory 604. Memory 604 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 600 may couple over a network to one or more other devices via one or more wired or wireless network interfaces (not shown).

System 600 may include, in memory 604, a Secure Web Services architecture design mechanism 610. In one embodiment, Secure Web Services architecture design mechanism 610 may receive Web Services requirements 612 as input and, using the input, assist a user in generating a secure Web Services architecture 614 as output. Web Services requirements 612 may include, but are not limited to, user security requirements and technical security requirements. Secure Web Services architecture design mechanism 610 may be used to encapsulate one or more of requirements 612 in use case requirements using Use Case modeling techniques. Secure Web Services architecture design mechanism 610 may then be used to identify a set of Web Services objects that need to be protected and secured and their associated relationship in the context of the deployment infrastructure.

Secure Web Services architecture design mechanism 610 may then be used to define one or more trust domains, define a security policy (e.g. what should be secured, why and how), and identify potential security threats. Secure Web Services architecture design mechanism 610 may then be used to develop protection measures or security application codes to protect the Web Service objects and components. If necessary or desired, architects may apply one or more Web Services security tools in this process.

Secure Web Services architecture design mechanism 610 may be used to apply one or more Web Services security design patterns, or other types of design patterns, to the secure Web Services architecture 614 during the design process. In one embodiment, Secure Web Services architecture design mechanism 610 may include and be used to maintain a customized design pattern catalog.

A Web Services infrastructure may then be deployed or implemented in accordance with the secure Web Services architecture 614. In one embodiment, architects may ask a third party (e.g. an external service company or an independent group other than the developers) to assess the security of the deployed Web Service. In one embodiment, secure Web Services architecture design mechanism 610 may include functionality to perform security assessment of an implemented Web Service. Web Services security assessment may include one or more of, but is not limited to, a UDDI host scan and Web Services host security health-checking.

System 600 may also include one or more display devices (not shown) for displaying output of Secure Web Services architecture design mechanism 610 and/or one or more user input devices (e.g. keyboard, mouse, etc.; not shown) for accepting user input to Secure Web Services architecture design mechanism 610.

By applying embodiments of this Web Services Security Assessment structured methodology, architects are preferably able to determine if an existing or target Web Services architecture or implementation infrastructure is secure and reliable, and to maintain a customized Web Services security design pattern catalog, based on past implementation experience and/or known design patterns. Note that the reinforcement of applying the Web Services-specific architecture principles and architecture framework, and retrofitting to the design patterns catalog may be critical to the success of the structured methodology. Thus, embodiments may be preferably implemented as a feedback system that makes the structured methodology dynamic and up-to-date for software re-use.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A Web Service system, comprising:
a service provider comprising one or more computer systems configured to provide one or more secure Web Services on the Web Service system; and
one or more service requesters each comprising one or more computer systems and each configured to access the one or more secure Web Services from the service provider via a network;
wherein the Web Service system is configured according to output of a computer-implemented Web Service architecture design system for designing secure Web Services comprising a plurality of heterogeneous components and one or more security components, wherein the Web Service architecture design system is configured to:
receive one or more Web Service requirements for the Web Service system;
receive user input specifying one or more design aspects of a secure Web Service architecture for the Web Service system;
generate the Web Service architecture in accordance with the received Web Service requirements, the received user input, a Web Services security assessment structured methodology, and one or more security design patterns; and
generate the output including information indicating the secure Web Service architecture; and
wherein the Web service system further comprises a service registry implemented on one or more computer systems, wherein the service provider is further configured to register and publish the secure Web Services in the service registry, and wherein the service requester is further configured to discover the service provider through the service registry.

2. The Web Service system as recited in claim 1, wherein, to generate the Web Service architecture in accordance with the Web Services security assessment structured methodology, the Web Service architecture design system is configured to:
determine one or more security components of the Web Service architecture according to one or more Use Case requirements for the Web Service architecture;
determine one or more Web Service objects of the Web Service architecture to be protected;
define an object relationship for security protection in the Web Service architecture;
determine one or more associated trust domains, security policy and strategy, and one or more threat profiles for the Web Service architecture;
determine one or more protection schemes and measures for the Web Services objects; and
apply one or more Web Services design patterns including the one or more security design patterns to the Web Service architecture.

3. The Web Service system as recited in claim 1, wherein the secure Web Service architecture incorporates Quality of Services including reliability, scalability, and availability on the Web Service system.

4. The Web Service system as recited in claim 1, further comprising a service broker implemented on one or more computer systems and configured to securely interact with the service provider and service requester to negotiate and provide the secure Web Services to the service requester.

5. The Web Service system as recited in claim 4, wherein the service provider is configured as the service broker.

6. The Web Service system as recited in claim 1, wherein the Web Service system is a Business-to-Consumer Web Service, wherein the service provider is a business service provider, and wherein the service requester is an end user.

7. The Web Service system as recited in claim 1, wherein the Web Service system is a Business-to-Business Web Service, wherein the service provider is a business service provider, and wherein the service requester is a server.

8. The Web Service system as recited in claim 1, wherein the Web Service system comprises a plurality of layers, wherein the plurality of layers comprises two or more of:
 a network layer configured to serve as an underlying network for services;
 a transport layer for delivering messages between components of the Web Service system;
 a service description language layer configured to describe service type and functionality of the services of the service provider;
 a transaction routing layer configured to route messages on the transport layer;
 a service discovery layer configured to search for and locate services;
 a service negotiation layer configured to negotiate exchanges between the service requesters and the service provider;
 a management layer configured for provisioning of the services and for monitoring and administration of the services;
 a Quality of Service layer configured to provide reliability, scalability, and availability on the Web Service system;
 a security layer configured to provide authentication, entitlement, and non-repudiation security on the transport layer; and
 an Open Standards layer.

9. The Web Service system as recited in claim 8, wherein the Open Standards layer is XML.

10. The Web Service system as recited in claim 8, wherein the network layer is the public Internet over TCP/IP.

11. The Web Service system as recited in claim 8, wherein the transport layer is one of HTTP, SMTP, and SOAP over HTTP.

12. The Web Service system as recited in claim 1, wherein the security design patterns comprise one or more of:
 a Single Sign-on Design Pattern; and
 a Messaging Transport Design Pattern.

13. The Web Service system as recited in claim 1, wherein the Web Service system comprises two or more of:
 a client tier;
 a presentation tier;
 a business tier;
 an integration tier; and
 a resource tier.

14. A system for designing and implementing secure Web Services comprising a plurality of heterogeneous components, comprising:
 means for applying a Web Services security assessment structured methodology and one or more security design patterns to generate output indicating a Web Service architecture; and
 means for implementing a secure Web Service according to the generated output indicating the Web Service architectures;
 wherein said Web Services security assessment structured methodology comprises:
  means for determining one or more security components according to one or more Use Case requirements for the Web Service architecture;
  means for determining one or more Web Service objects of the Web Service architecture to be protected;
  means for defining an object relationship for security protection in the Web Service architecture;
  means for determining one or more associated trust domains, security policy and strategy, and one or more threat profiles for the Web Service architecture;
  means for determining one or more protection schemes and measures for the Web Services objects; and
  means for applying one or more Web Services design patterns to the Web Service architecture.

15. The system as recited in claim 14, further comprising means for assessing security levels of the secure Web Service implemented according to the Web Service Architecture.

16. A system for generating a vendor-independent Web Service architecture, comprising:
 a processor; and
 a memory comprising program instructions, wherein the program instructions are executable by the processor to:
  determine one or more security components of a Web Service architecture according to one or more Use Case requirements for the Web Service architecture;
  determine one or more Web Service objects of the Web Service architecture to be protected; define an object relationship for security protection in the Web Service architecture;
  determine one or more associated trust domains, security policy and strategy, and one or more threat profiles for the Web Service architecture;
  determine one or more protection schemes and measures for the Web Services objects;
  apply one or more Web Services design patterns to the Web Service architecture; and
  generate output including information indicating the generated Web Service architecture, wherein the generated output is configured for use in implementing the Web Service architecture.

17. The system as recited in claim 16, wherein the program instructions are further executable by the processor to assess security levels of a secure Web Service implemented according to the Web Service architecture.

18. The system as recited in claim 16, wherein the generated output is configured for use in implementing a secure Web Service in accordance with the Web Service architecture.

19. The system as recited in claim 18, wherein the program instructions are further executable by the processor to apply one or more Web Services security tools to implement the protection schemes in the secure Web Service.

20. The system as recited in claim 18, wherein the secure Web Service comprises:
 a service provider comprising one or more computer systems configured to provide one or more services of the secure Web Service on a network; and one or more service requesters each comprising one or more computer systems and each configured to access the one or more services of the secure Web Service on the service provider via the network.

21. The system as recited in claim 20, wherein the secure Web Service further comprises a service registry implemented on one or more computer systems, wherein the service provider is further configured to register and publish the one or more services of the secure Web Service in the service registry, and wherein the service requester is further configured to discover the service provider through the service registry.

22. The system as recited in claim 20, wherein the secure Web Service is a Business-to-Consumer Web Service, wherein the service provider is a business service provider, and wherein the service requester is an end user.

23. The system as recited in claim 20, wherein the secure Web Service is a Business-to-Business Web Service, wherein the service provider is a business service provider, and wherein the service requester is a server.

24. The system as recited in claim 18, wherein the Web Service architecture comprises a plurality of layers, where the layers comprise two or more of:
   a network layer configured to serve as an underlying network for secure Web Services implemented according to the Web Service architecture;
   a transport layer for delivering messages between components of the secure Web Services;
   a service description language layer configured to describe service type and functionality of the secure Web Services;
   a transaction routing layer configured to route messages on the transport layer;
   a service discovery layer configured to search for and locate the secure Web Services;
   a service negotiation layer configured to negotiate exchanges between service requesters and service providers implemented according to the Web Service architecture;
   a management layer configured for provisioning of the secure Web Services and for monitoring and administration of the secure Web Services;
   a Quality of Service layer configured to provide reliability, scalability, and availability for the secure Web Services;
   a security layer configured to provide authentication, entitlement, and non-repudiation security on the transport layer; and
   an Open Standards layer.

25. The system as recited in claim 18, wherein the Web Service architecture comprises a plurality of tiers, wherein the tiers comprise two or more of:
   a client tier;
   a presentation tier;
   a business tier;
   an integration tier; and
   a resource tier.

26. The system as recited in claim 18, wherein the Web Services design patterns comprise one or more of:
   one or more Quality of Services design patterns;
   one or more integration design patterns; and
   one or more security design patterns.

27. The system as recited in claim 18, wherein the Web Services design patterns comprise one or more security design patterns.

28. The system as recited in claim 27, wherein the security design patterns comprise one or more of:
   a Single Sign-on design pattern; and
   a Messaging Transport design pattern.

29. A computer-implemented method for generating a vendor-independent Web Service architecture, the method comprising:
   determining one or more security components according to one or more Use Case requirements for the Web Service architecture;
   determining one or more Web Service objects of the Web Service architecture to be protected;
   defining an object relationship for security protection in the Web Service architecture;
   determining one or more associated trust domains, security policy and strategy, and one or more threat profiles for the Web Service architecture;
   determining one or more protection schemes and measures for the Web Services objects;
   applying one or more Web Services design patterns to the Web Service architecture; and
   generating output including information indicating the generated Web Service architecture, wherein the generated output is configured for use in implementing the Web Service architecture.

30. The method as recited in claim 29, further comprising generating the one or more Use Cases for the Web Service architecture.

31. The method as recited in claim 29, further comprising building the one or more security components according to the one or more Use Case requirements for the Web Service architecture.

32. The method as recited in claim 29, further comprising implementing a secure Web Service in accordance with the generated output.

33. The method as recited in claim 32, further comprising assessing security levels of the secure Web Service according to two or more tiers of the Web Service architecture.

34. The method as recited in claim 32, further comprising applying one or more Web Services security tools to implement the protection schemes in the secure Web Service.

35. The method as recited in claim 32, wherein the secure Web Service comprises a service provider comprising one or more computer systems and a service requester comprising one or more computer systems, the method further comprising:
   the service provider providing one or more services of the secure Web Service on a network; and
   the service requester accessing the one or more services of the secure Web Service on the service provider via the network.

36. The method as recited in claim 35, wherein the secure Web Service further comprises a service registry implemented on one or more computer systems, the method further comprising:
   the service provider registering and publishing the one or more services of the secure Web Service in the service registry; and
   the service requester discovering the service provider through the service registry.

37. The method as recited in claim 35, wherein the secure Web Service is a Business-to-Consumer Web Service, wherein the service provider is a business service provider, and wherein the service requester is an end user.

38. The method as recited in claim 35, wherein the secure Web Service is a Business-to-Business Web Service, wherein the service provider is a business service provider, and wherein the service requester is a server.

39. The method as recited in claim 29, wherein the Web Service architecture comprises a plurality of layers, where the layers comprise two or more of:
   a network layer configured to serve as an underlying network for secure Web Services implemented according to the Web Service architecture;
   a transport layer for delivering messages between components of the secure Web Services;
   a service description language layer configured to describe service type and functionality of the secure Web Services;
   a transaction routing layer configured to route messages on the transport layer;
   a service discovery layer configured to search for and locate the secure Web Services;
   a service negotiation layer configured to negotiate exchanges between service requesters and service providers implemented according to the Web Service architecture;
   a management layer configured for provisioning of the secure Web Services and for monitoring and administration of the secure Web Services;
   a Quality of Service layer configured to provide reliability, scalability, and availability for the secure Web Services;
   a security layer configured to provide authentication, entitlement, and non-repudiation security on the transport layer; and
   an Open Standards layer.

40. The method as recited in claim 29, wherein the Web Service architecture comprises a plurality of tiers, wherein the tiers comprise two or more of:
   a client tier;
   a presentation tier;
   a business tier;
   an integration tier; and
   a resource tier.

41. The method as recited in claim 29, wherein the Web Services design patterns comprise one or more of:
   one or more Quality of Services design patterns;
   one or more integration design patterns; and
   one or more security design patterns.

42. The method as recited in claim 29, wherein the Web Services design patterns comprise one or more security design patterns.

43. The method as recited in claim 42, wherein the security design patterns comprise one or more of:
   a Single Sign-on design pattern; and
   a Messaging Transport design pattern.

44. A computer-accessible storage medium comprising program instructions, wherein the program instructions are computer-executable to implement:
   determining one or more security components according to one or more Use Case requirements for the Web Service architecture;
   determining one or more Web Service objects of the Web Service architecture to be protected;
   defining an object relationship for security protection in the Web Service architecture;
   determining one or more associated trust domains, security policy and strategy, and one or more threat profiles for the Web Service architecture;
   determining one or more protection schemes and measures for the Web Services objects;
   applying one or more Web Services design patterns to the Web Service architecture; and
   generating output including information indicating the generated Web Service architecture, wherein the generated output is configured for use in implementing the Web Service architecture.

45. The computer-accessible storage medium as recited in claim 44, wherein the program instructions are further computer-executable to implement generating the one or more Use Cases for the Web Service architecture.

46. The computer-accessible storage medium as recited in claim 44, wherein the generated output is configured for use in implementing a secure Web Service in accordance with the Web Service architecture.

47. The computer-accessible storage medium as recited in claim 46, wherein the program instructions are further computer-executable to implement assessing security levels of the secure Web Service according to two or more tiers of the Web Service architecture.

48. The computer-accessible storage medium as recited in claim 46, wherein the program instructions are further computer-executable to implement applying one or more Web Services security tools to implement the protection schemes in the secure Web Service.

49. The computer-accessible storage medium as recited in claim 46, wherein the secure Web Service comprises:
   a service provider comprising one or more computer systems configured to provide one or more services of the secure Web Service on a network; and
   a service requester comprising one or more computer systems configured to access the one or more services of the secure Web Service on the service provider via the network.

50. The computer-accessible storage medium as recited in claim 49, wherein the secure Web Service further comprises a service registry implemented on one or more computer systems, wherein the service provider is further configured to register and publish the one or more services of the secure Web Service in the service registry, and wherein the service requester is further configured to discover the service provider through the service registry.

51. The computer-accessible storage medium as recited in claim 49, wherein the secure Web Service is a Business-to-Consumer Web Service, wherein the service provider is a business service provider, and wherein the service requester is an end user.

52. The computer-accessible storage medium as recited in claim 49, wherein the secure Web Service is a Business-to-Business Web Service, wherein the service provider is a business service provider, and wherein the service requester is a server.

53. The computer-accessible storage medium as recited in claim 44, wherein the Web Service architecture comprises a plurality of layers, where the layers comprise two or more of:
   a network layer configured to serve as an underlying network for secure Web Services implemented according to the Web Service architecture;
   a transport layer for delivering messages between components of the secure Web Services;
   a service description language layer configured to describe service type and functionality of the secure Web Services;
   a transaction routing layer configured to route messages on the transport layer;
   a service discovery layer configured to search for and locate the secure Web Services;

a service negotiation layer configured to negotiate exchanges between service requesters and service providers implemented according to the Web Service architecture;

a management layer configured for provisioning of the secure Web Services and for monitoring and administration of the secure Web Services;

a Quality of Service layer configured to provide reliability, scalability, and availability for the secure Web Services;

a security layer configured to provide authentication, entitlement, and non-repudiation security on the transport layer; and an Open Standards layer.

54. The computer-accessible storage medium as recited in claim 44, wherein the Web Service architecture comprises a plurality of tiers, wherein the tiers comprise two or more of:
a client tier;
a presentation tier;
a business tier;
an integration tier; and
a resource tier.

55. The computer-accessible storage medium as recited in claim 44, wherein the Web Services design patterns comprise one or more of:
one or more Quality of Services design patterns;
one or more integration design patterns; and
one or more security design patterns.

56. The computer-accessible storage medium as recited in claim 44, wherein the Web Services design patterns comprise one or more security design patterns.

57. The computer-accessible storage medium as recited in claim 56, wherein the security design patterns comprise one or more of:
a Single Sign-on design pattern; and
a Messaging Transport design pattern.

* * * * *